(12) United States Patent
Lessing et al.

(10) Patent No.: US 7,617,136 B1
(45) Date of Patent: Nov. 10, 2009

(54) SYSTEM AND METHOD FOR CAPTURING, STORING AND ANALYZING REVENUE MANAGEMENT INFORMATION FOR THE TRAVEL AND TRANSPORTATION INDUSTRIES

(75) Inventors: Pieter Lessing, Los Angeles, CA (US); David W. Hubbard, Atlanta, GA (US); Sreedhar Srikant, Marietta, GA (US)

(73) Assignee: Teradata US, Inc., Miamisburg, OH (US)

( * ) Notice: Subject to any disclaimer, the term of this patent is extended or adjusted under 35 U.S.C. 154(b) by 0 days.

(21) Appl. No.: 10/888,765

(22) Filed: Jul. 9, 2004

Related U.S. Application Data

(60) Provisional application No. 60/487,547, filed on Jul. 15, 2003.

(51) Int. Cl.
*G06Q 10/00* (2006.01)
*G06G 1/14* (2006.01)
*G06Q 20/00* (2006.01)

(52) U.S. Cl. .......................................... 705/28; 705/22

(58) Field of Classification Search ................. 701/201; 705/5, 6, 8, 10, 22, 28
See application file for complete search history.

(56) References Cited

U.S. PATENT DOCUMENTS

| | | | | |
|---|---|---|---|---|
| 5,021,953 A | * | 6/1991 | Webber et al. | 705/6 |
| 5,255,184 A | * | 10/1993 | Hornick et al. | 705/6 |
| 5,560,005 A | * | 9/1996 | Hoover et al. | 707/10 |
| 5,652,867 A | * | 7/1997 | Barlow et al. | 703/6 |
| 5,897,620 A | * | 4/1999 | Walker et al. | 705/5 |
| 5,918,209 A | * | 6/1999 | Campbell et al. | 705/5 |
| 5,948,040 A | * | 9/1999 | DeLorme et al. | 701/201 |
| 6,263,315 B1 | * | 7/2001 | Talluri | 705/8 |
| 6,336,097 B1 | * | 1/2002 | Scipioni | 705/6 |
| 2002/0069093 A1 | * | 6/2002 | Stanfield | 705/5 |
| 2002/0120492 A1 | * | 8/2002 | Phillips et al. | 705/10 |

(Continued)

OTHER PUBLICATIONS

Silverston, Len. The Data Model Resource Book, ISBN: 0471380237, Mar. 6, 2001, vol. 1, revised ed., Wiley publishing co.. Chapters 7, 8 and appendix A—Invoice, Accounting and Budgeting.*

(Continued)

*Primary Examiner*—Evens J Augustin
*Assistant Examiner*—Nancy T Le
(74) *Attorney, Agent, or Firm*—James Stover

(57) ABSTRACT

A revenue management system for a travel provider, such as airline, a car rental agency, a cruise line, a lodging provider; a travel agency; a bus line or a passenger rail service provider. The revenue management system comprises a database for storing revenue, product and service, and customer information; a logical data model comprising a plurality of entities and relationships defining the manner in which the revenue, product and service, and customer information is stored and organized within the database; and a revenue management application for analyzing the revenue, product and service, and customer information contained within the database to manage inventory, pricing and demand forecasting for the travel provider. Analysis of Passenger Name Record (PNR), booking, ticketing, inventory, schedule, authorization adjustment and flown/ticket lift data maintained within the database enables a travel provider to identify fraudulent and improper booking and ticketing activity, or an airline to determine optimal passenger and revenue mix for airline flights.

1 Claim, 110 Drawing Sheets

U.S. PATENT DOCUMENTS

| | | | |
|---|---|---|---|
| 2002/0178034 A1* | 11/2002 | Gardner et al. | 705/5 |
| 2003/0055689 A1* | 3/2003 | Block et al. | 705/5 |
| 2003/0110062 A1* | 6/2003 | Mogler et al. | 705/5 |
| 2003/0115093 A1* | 6/2003 | Lim et al. | 705/10 |
| 2003/0225600 A1* | 12/2003 | Slivka et al. | 705/5 |
| 2004/0015409 A1* | 1/2004 | Chittenden et al. | 705/26 |
| 2004/0044664 A1* | 3/2004 | Cash et al. | 707/9 |
| 2004/0054549 A1* | 3/2004 | Chittenden et al. | 705/1 |
| 2005/0004818 A1* | 1/2005 | Liman | 705/28 |

OTHER PUBLICATIONS

Silverston, Len. The Data Model Resource Book, ISBN: 0471353485, Mar. 7, 2001, vol. 2, revised ed., Wiley publishing co.. Chapter 8—Travel, pp. 353-391, and Appendix G, pp. 508-517.*

Carkenord, Barbara A.. Why Build A Logical Data Model. http://www.Embarcadero.com/resources/tech_papers/datamodel.pdf, p. 4.*

* cited by examiner

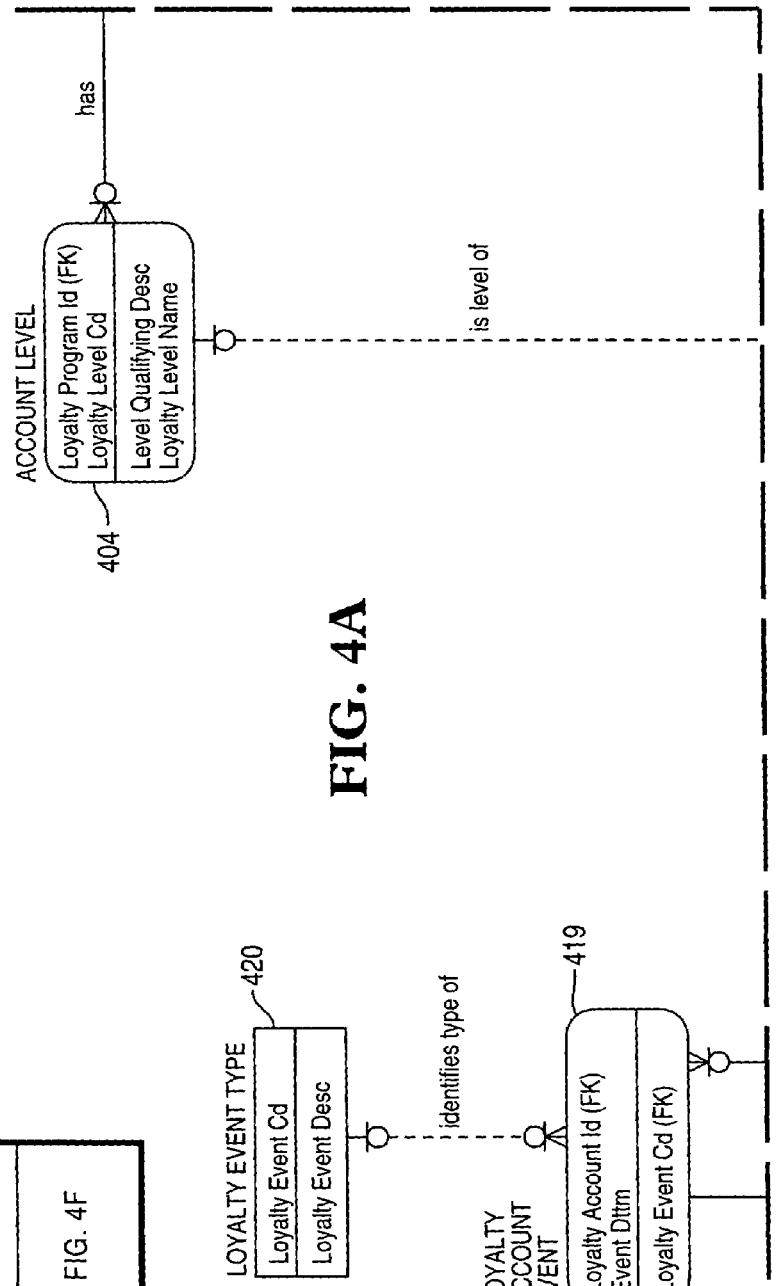

FIG. 8
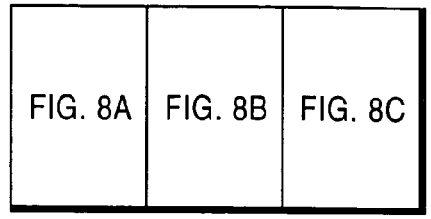
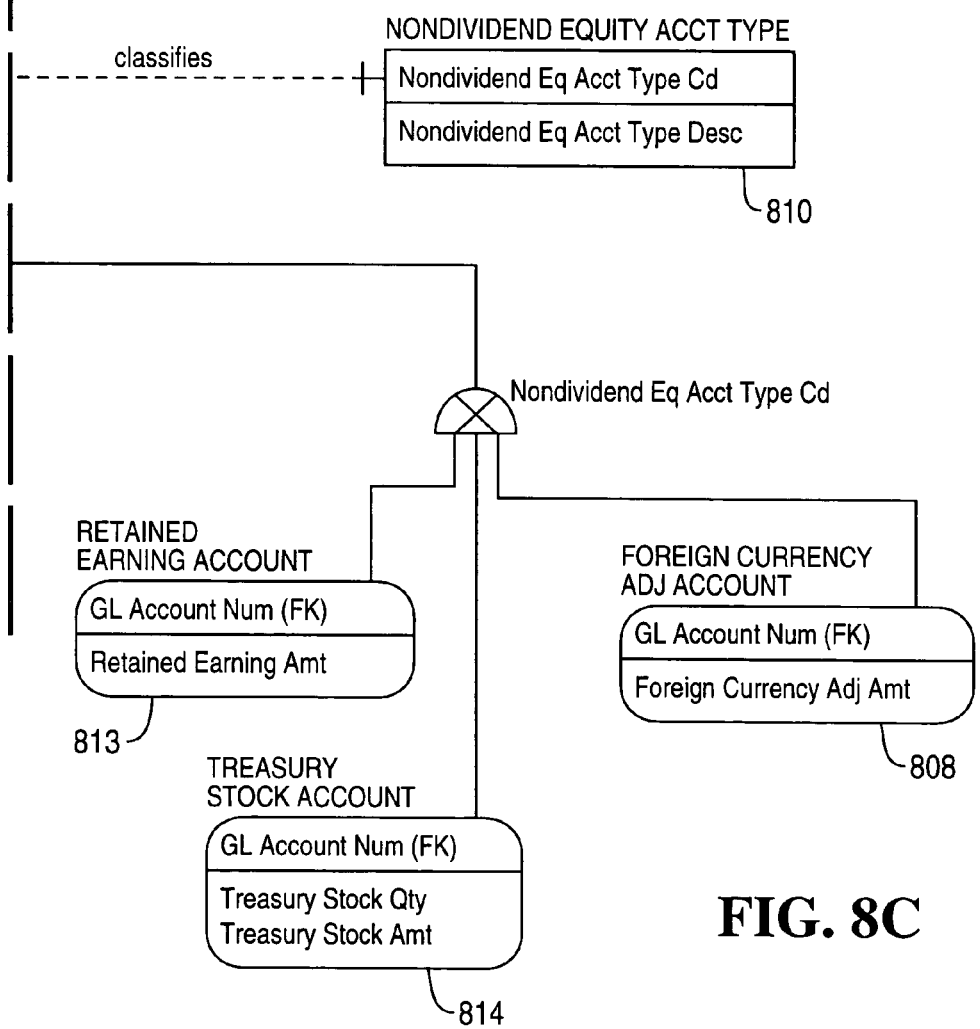
FIG. 8C

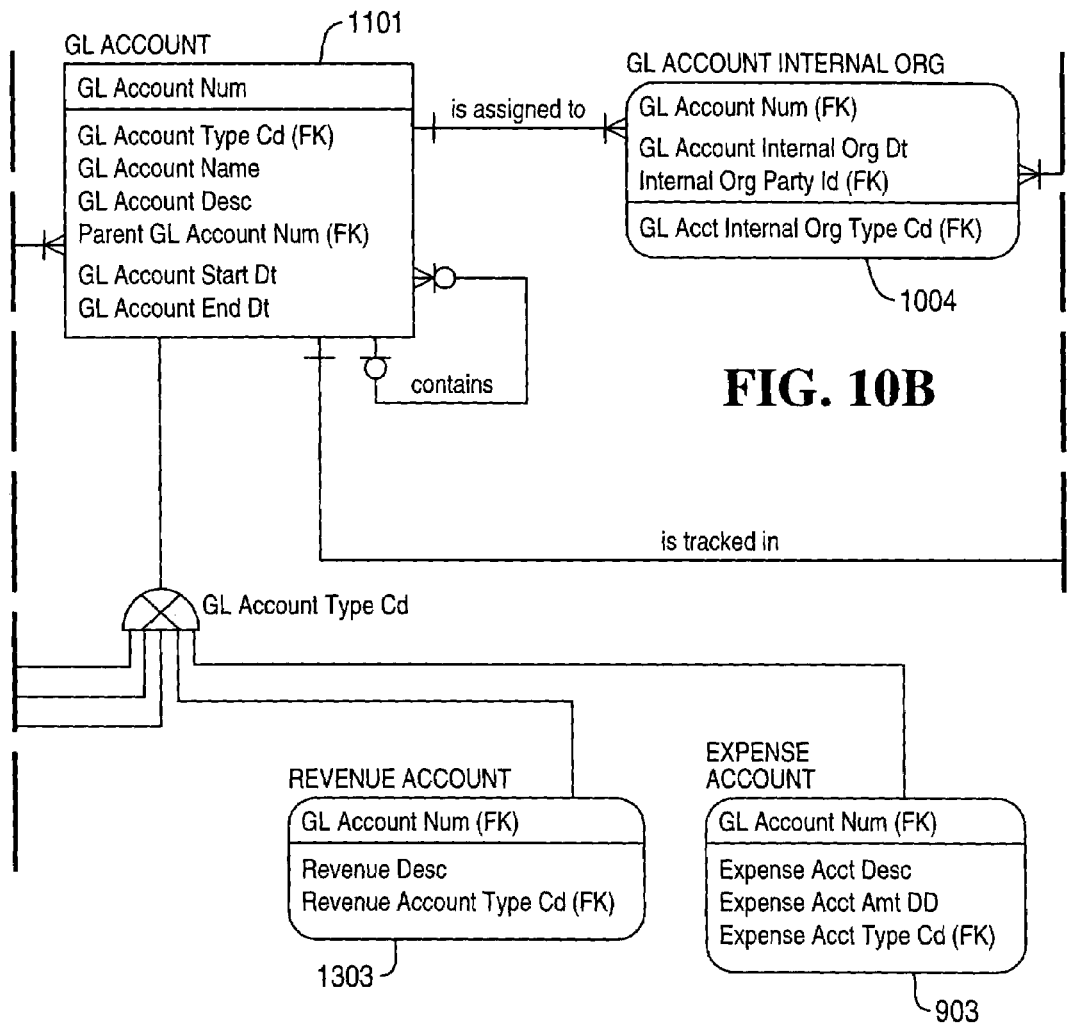
FIG. 10B
FIG. 10
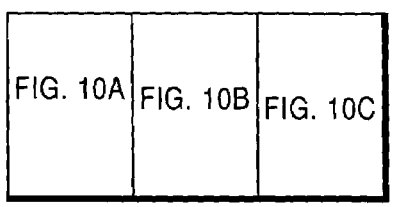

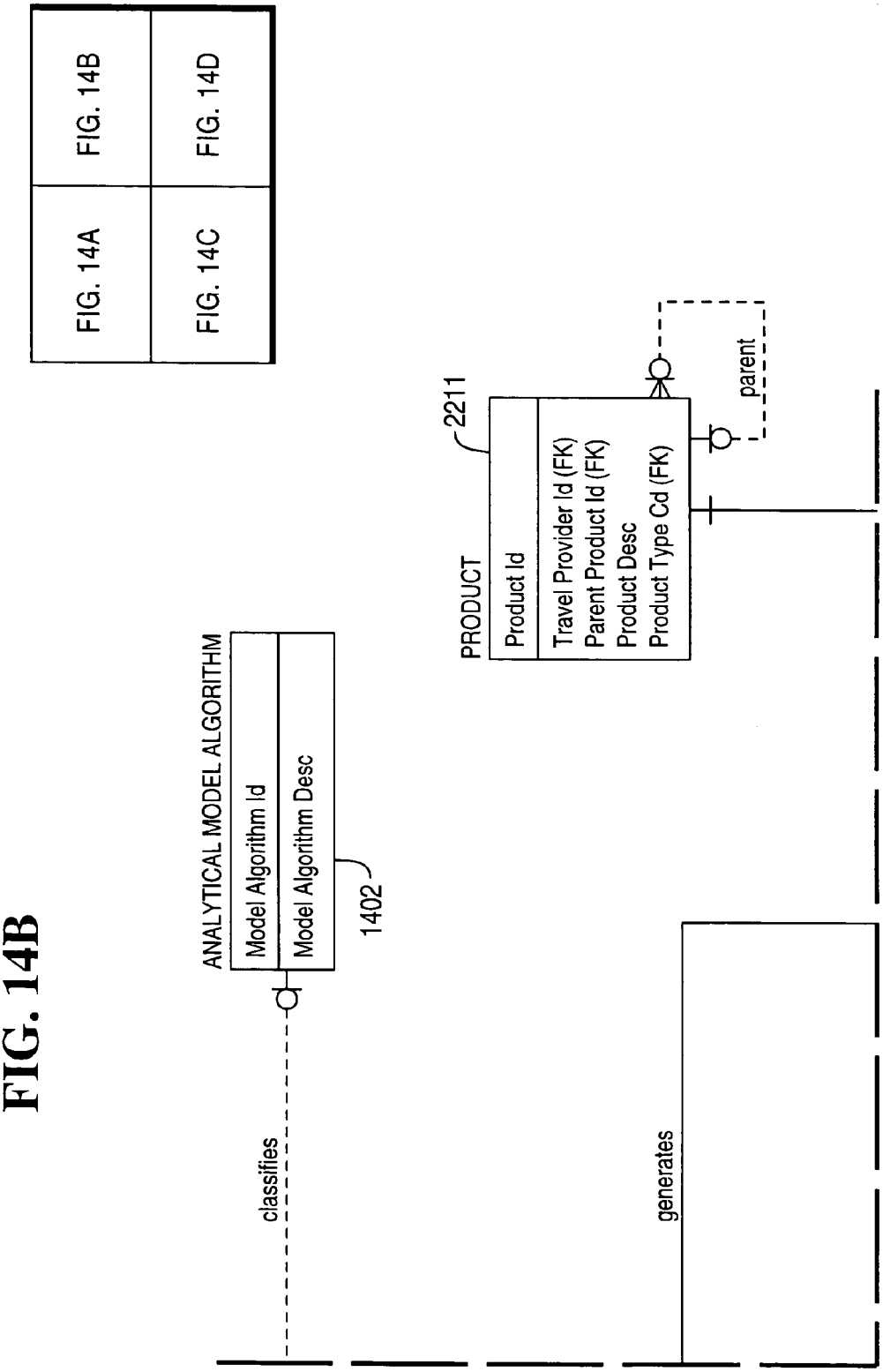

| FIG. 16A | FIG. 16B |
| --- | --- |
| FIG. 16C | FIG. 16D |

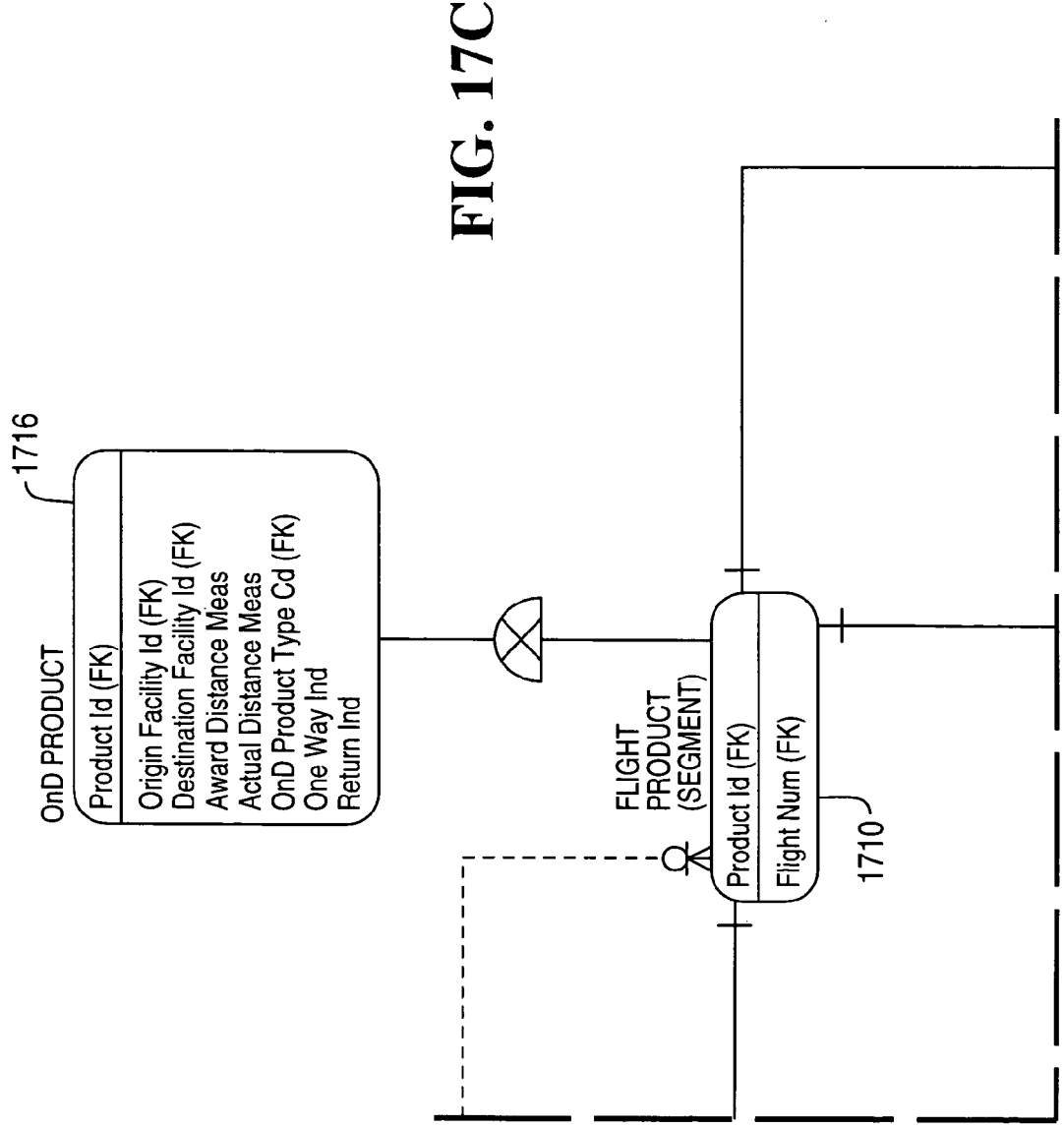

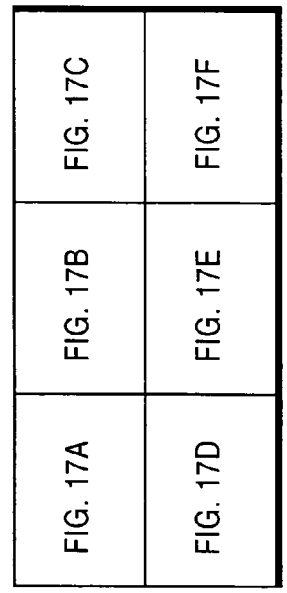
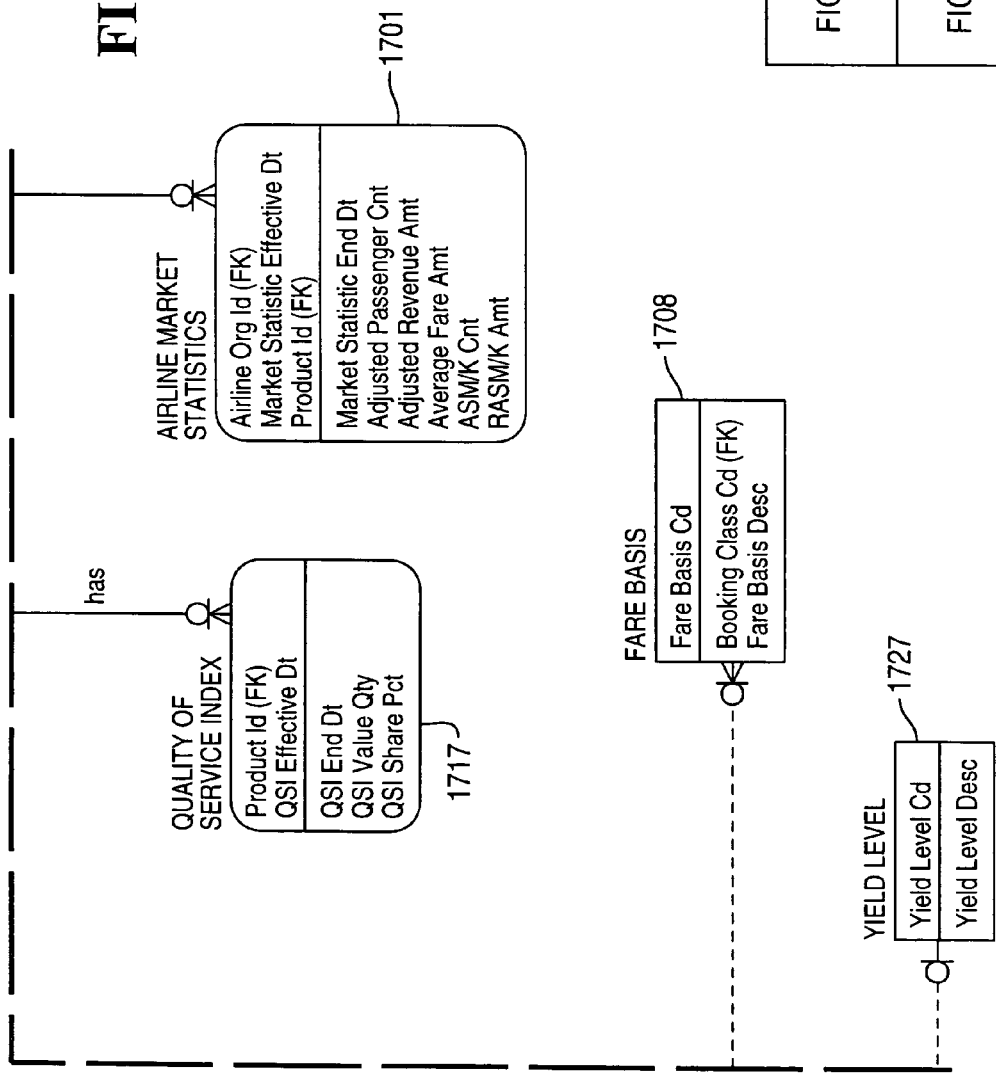

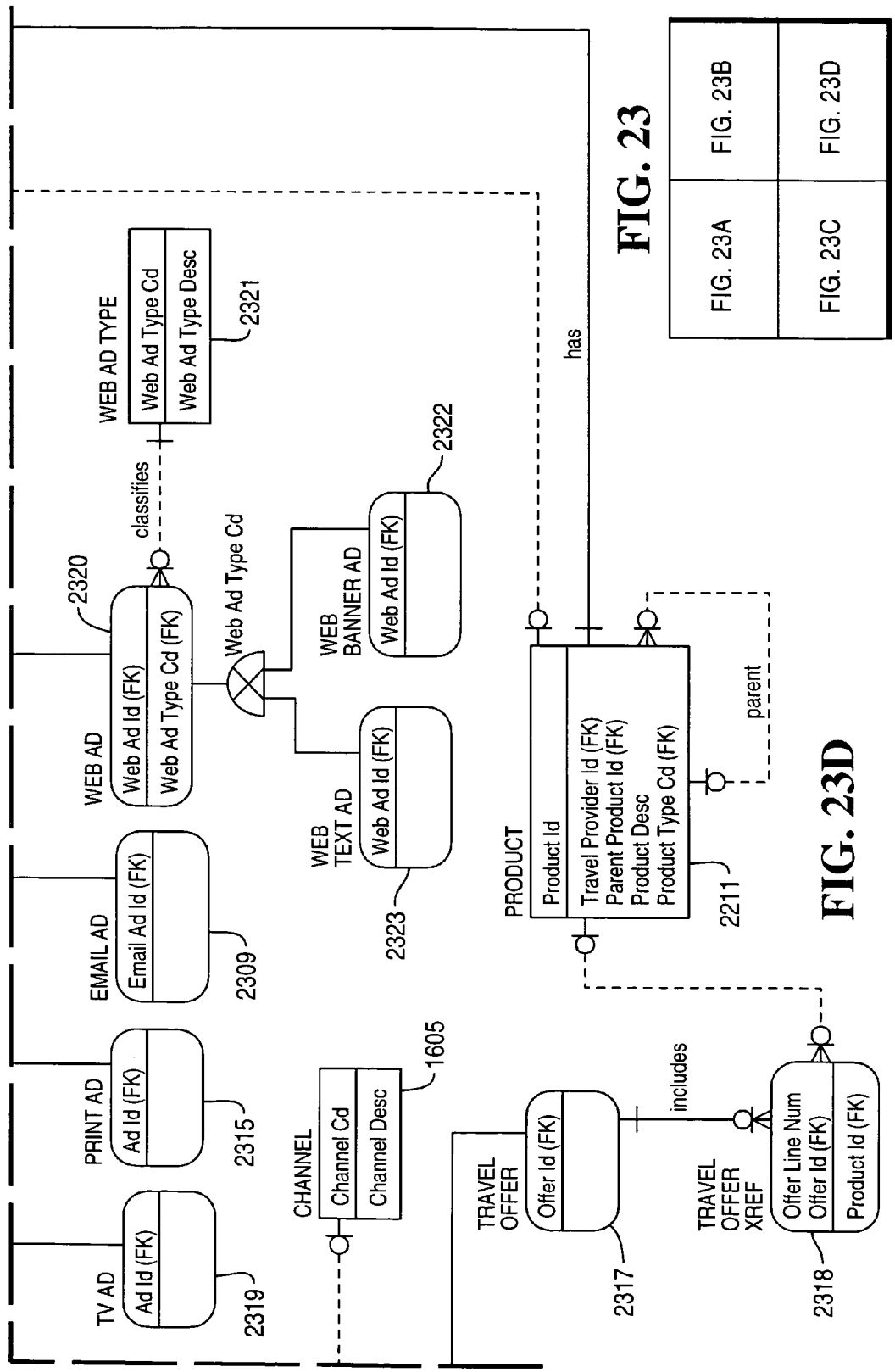

FIG. 24F
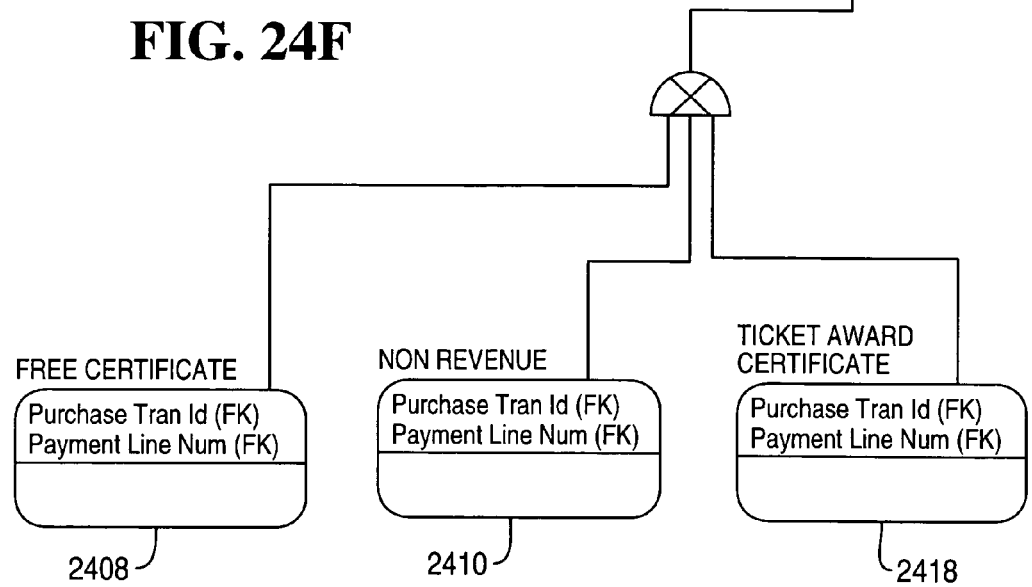
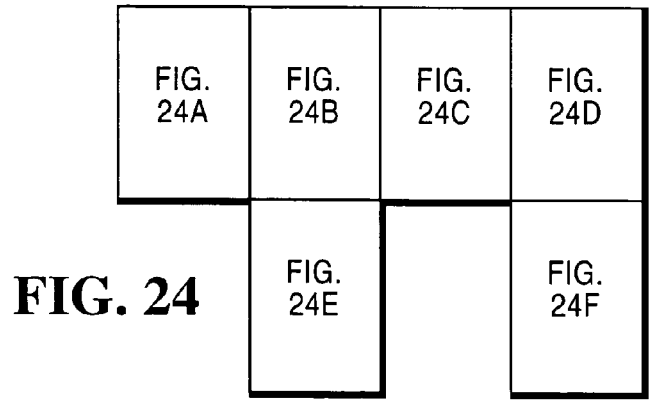
FIG. 24

| FIG. 26A | FIG. 26B |
| --- | --- |
| FIG. 26C | FIG. 26D |

SYSTEM AND METHOD FOR CAPTURING, STORING AND ANALYZING REVENUE MANAGEMENT INFORMATION FOR THE TRAVEL AND TRANSPORTATION INDUSTRIES

CROSS REFERENCE TO RELATED APPLICATIONS

This application claims priority under 35 U.S.C. § 119(e) to the following co-pending and commonly-assigned patent application:

Provisional Application Ser. No. 60/487,547, entitled "SYSTEM AND METHOD FOR CAPTURING, STORING AND ANALYZING REVENUE MANAGEMENT INFORMATION FOR THE TRAVEL AND TRANSPORTATION INDUSTRIES," filed on Jul. 15, 2003.

This application is related to the following co-pending and commonly assigned patent application:

application Ser. No. 10/027,967, entitled "SYSTEM AND METHOD FOR CAPTURING AND STORING BUSINESS INFORMATION FOR THE TRAVEL AND TRANSPORTATION INDUSTRIES"; filed on Dec. 21, 2001 by Pieter Lessing, William Black, John Kumar, David Hubbard, and Kim Nguyen-Hargett; and application Ser. No. 10/190,099, entitled "SYSTEM AND METHOD FOR CAPTURING AND STORING FINANCIAL MANAGEMENT INFORMATION"; filed on Jul. 3, 2002 by Sreedhar Srikant, William S. Black, Scott Kilmo, Karen Papierniak, and James W. Smith.

FIELD OF THE INVENTION

The present invention relates generally to Data Warehouse solutions, and more particularly, to systems and methods for capturing, storing and using detailed business information for the travel and transportation industries. Still more particularly, the present invention is related to a logical data model for storing and organizing revenue management information for travel and transportation industries such as airlines, travel agencies, cruise lines, hotel companies, rental car companies, passenger rail companies and bus lines.

BACKGROUND OF THE INVENTION

NCR Corporation has developed a data warehouse solution including a comprehensive suite of analytical and operational applications that captures, organizes and advances the use of high-value business information for the travel and transportation industries. This solution provides a travel provider with answers to basic questions such as:

What is my program revenue distribution? (Senior fares, gift certificates, zone fare programs.)
Who are my highest revenue customers?
What are the characteristics of my Frequent Flyer members?
What is the value of my Partner and Alliance relationships?
Which customers show the greatest spending growth?
What is my Market and Product usage distribution?
What are my best revenue Markets and Products?

The Enterprise Data Warehouse (EDW) has proved a strategic weapon for most modern organizations. It should be active, dynamic and flexible in order to cope with changing business requirements. It should provide a strategic background to support changing retail consumer-travel provider relationships.

The foundation of the enterprise data warehouse is a comprehensive and responsive logical data model addressing challenges in the near future without compromising existing business processes. A logical data model is a graphical representation of the way data is organized in a data warehouse environment. The logical data model specifically defines which individual data elements can be stored and how they relate to one another to provide a model of the business information. The data model ultimately defines which business questions can be answered from the data warehouse and thus determines the business value of the entire decision support system.

A properly designed LDM provides a foundation for more effective sales, marketing and customer management and supports the customer relationship management (CRM) requirements related to identifying, acquiring, retaining and growing valuable customers. A logical data model for the travel and transportation industries reflects the operating principles and policies of these industries and provides the underlying structure for the data imported into the data warehouse.

Ideally, a logical data model for the travel industry should provide support for current and future revenue management applications, such as NCR Corporation's Teradata® Revenue-Management Intelligence (RMI) solution. The Teradata RMI solution offers travel providers the capability to understand customer demand and behavior and optimize their current revenue-management systems and processes. The Teradata RMI solution allows travel providers to integrate historic, current and future inventory, schedule, flight and booking data onto a single platform to support both tactical and strategic decision-making, allowing for reduced delays and gaps in information. Travel providers will also be able to monitor and refine the success of their efforts through the measurement, tracking and reporting of revenue-management performance.

SUMMARY OF THE INVENTION

It is an object of the present invention to provide a new and useful system and method for capturing, storing and organizing information supporting revenue management applications for travel and transportation industries.

It is a further object of the present invention to provide a logical data model that defines the structure for storing and organizing revenue management information for travel and transportation industries.

The foregoing objects are accomplished through utilization of a revenue management system for a travel provider comprising: a database for storing revenue, product and service, and customer information for a travel provider; a logical data model comprising a plurality of entities and relationships defining the manner in which the revenue, product and service, and customer information is stored and organized within the database; and a revenue management application for analyzing the revenue, product and service, and customer information contained within the database to manage inventory, pricing and demand forecasting for the travel provider. The travel provider can be an airline, a car rental agency, a cruise line, a lodging provider; a travel agency; a bus line or a passenger rail service provider.

Analysis of Passenger Name Record (PNR), booking, ticketing, inventory, schedule, authorization adjustment and flown/ticket lift data maintained within the database enables a travel provider to identify fraudulent and improper booking and ticketing activity, or an airline to determine optimal passenger and revenue mix for airline flights.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein:

FIGS. 4A through 4F illustrate an entity-relationship diagram of the ACCOUNT Subject Area of the logical data model in accordance with the preferred embodiment of the present invention;

FIGS. 8A through 8C illustrate an entity-relationship diagram of the FM EQUITY Subject Area of the logical data model in accordance with the preferred embodiment of the present invention;

FIGS. 10A through 10C illustrate an entity-relationship diagram of the FM GENERAL LEDGER ACCOUNT Subject Area of the logical data model in accordance with the preferred embodiment of the present invention;

FIGS. 14A through 14D illustrate an entity-relationship diagram of the FORECASTS and MODEL SCORES Subject Area of the logical data model in accordance with the preferred embodiment of the present invention;

FIGS. 17A through 17F illustrate an entity-relationship diagram of the OnD PRODUCT PERFORMANCE Subject Area of the logical data model in accordance with the preferred embodiment of the present invention;

FIGS. 23A through 23D illustrate an entity-relationship diagram of the PROMOTION Subject Area of the logical data model in accordance with the preferred embodiment of the present invention;

FIGS. 24A through 24F illustrate an entity-relationship diagram of the PURCHASE Subject Area of the logical data model in accordance with the preferred embodiment of the present invention;

BEST MODE FOR CARRYING OUT THE INVENTION

Figure 1:
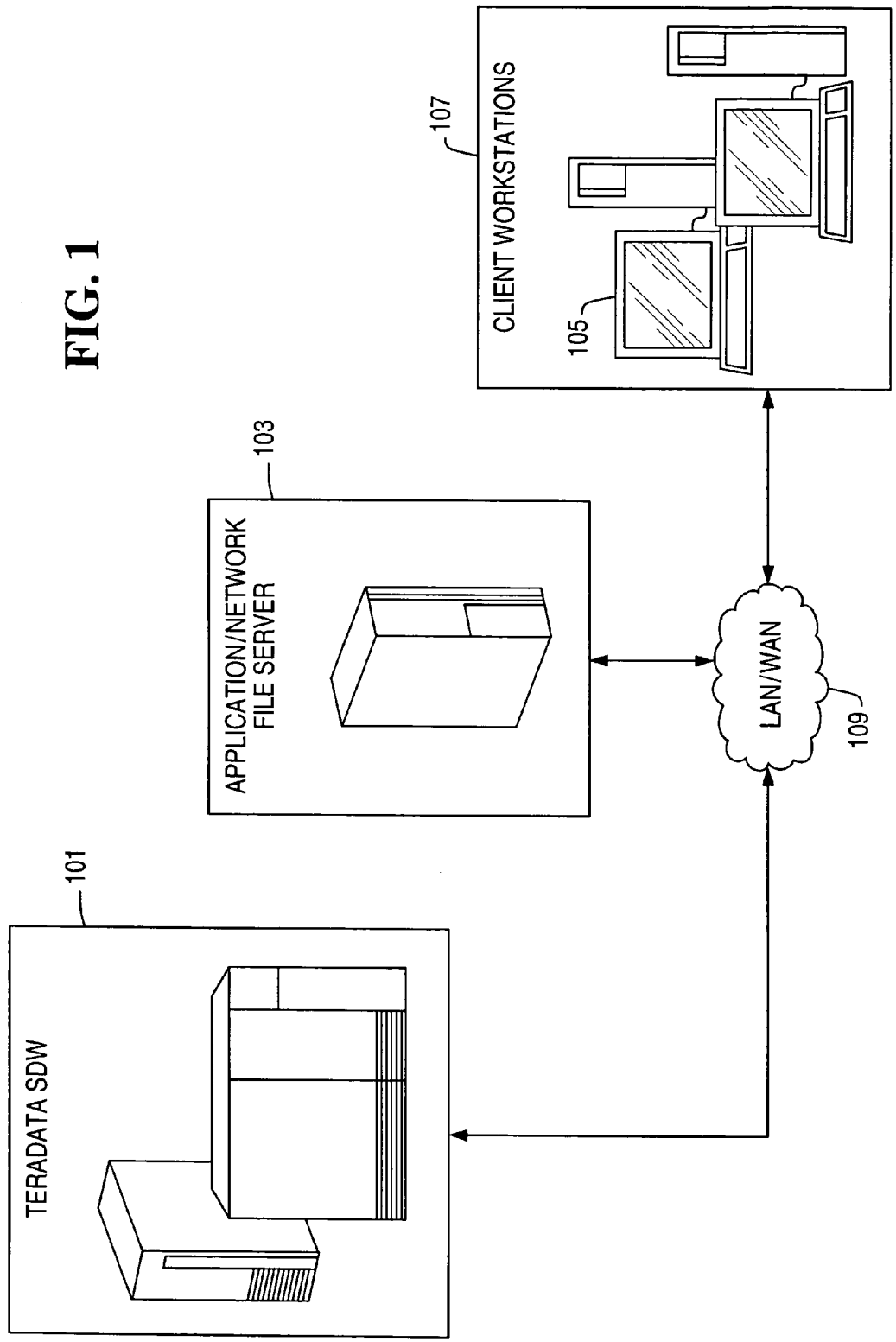
FIG. 1 provides an overview of the hardware components of a data warehouse system.

FIG. 1 provides an overview of the hardware required for a data warehouse solution solution. The basic components consist of an NCR Corporation Teradata Scalable Data Warehouse 101, an administrative server 103, and client and administrative workstations 105 and 107, respectively. The components communicate with each other through a Local Area Network (LAN) or Wide Area Network (WAN), identified by reference numeral 109.

A travel and transportation industry customer-centric warehouse is established on the Teradata Scalable Data Warehouse 101 as defined by the Travel Logical Data Model (TLDM), described below. The application server 103 supports analytic and operational applications, such as NCR Corporation's Teradata Solutions for Travel and Transportation suite of business applications.

Figure 2:
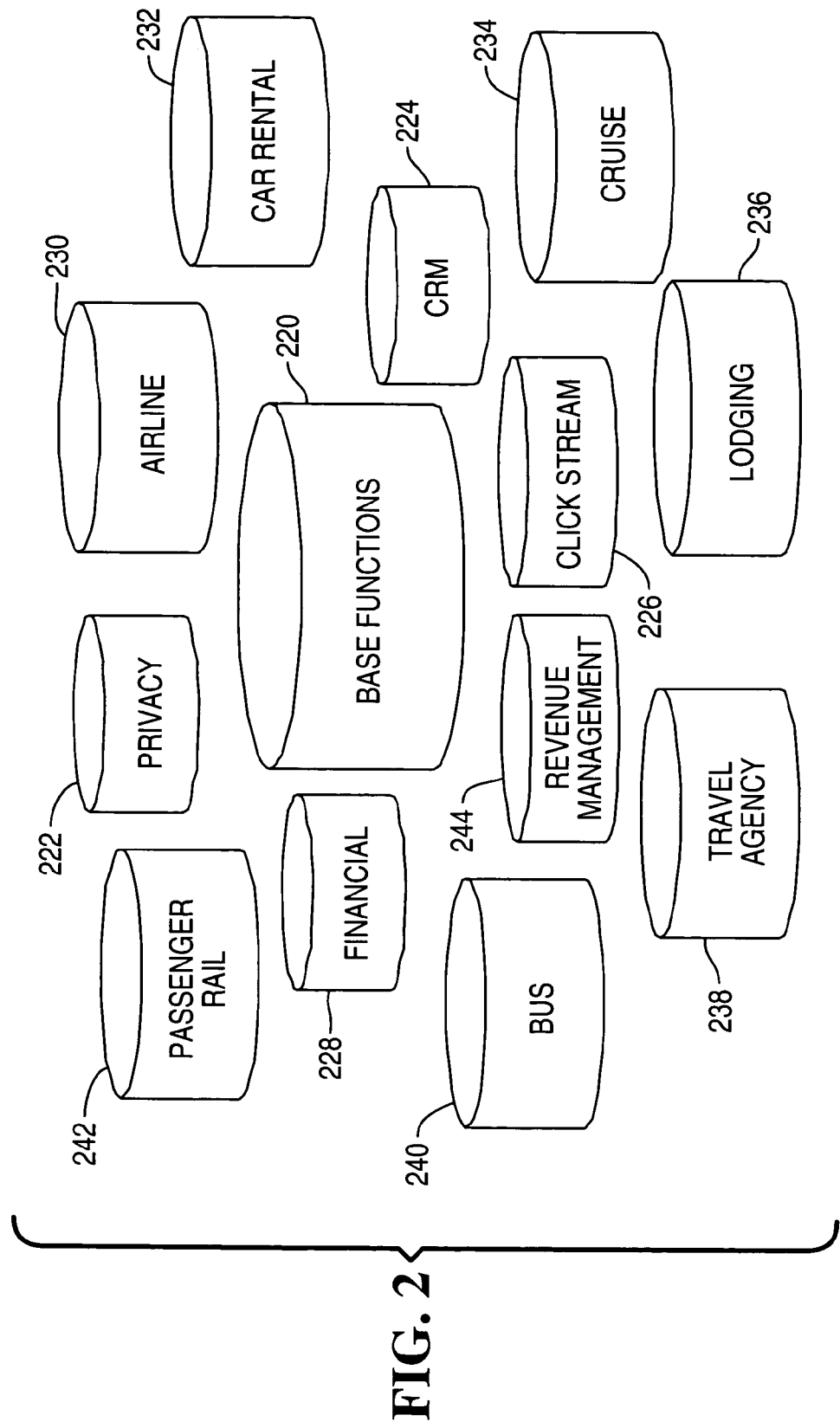
FIG. 2 illustrates the travel and transportation core, industry and revenue management segments supported by the Travel Logical Data Model, in accordance with the preferred embodiment of the present invention.

The Travel Logical Data Model is a consumer-centric travel data model supporting Revenue Management, Financial Management, Customer Relationship Management, Privacy and Click Stream analysis. It can serve as the base for a full enterprise data warehouse implemented at the client's site. The model has been designed in a modular fashion so non-relevant components can be removed without impacting the consistency of the model. It's an integrated, subject-oriented base of strategic business information that serves as a single source of decision support, providing the travel provider with the ability to make simple reports or sophisticated information analysis. FIG. 2 shows the travel and transportation core, industry, and revenue management segments supported by the TLDM.

The TLDM supports the following core areas: Base Functions 220, Privacy 222, Customer Relationship Management (CRM) 224, Click Stream 226 and Financial 228. Together with Revenue Management segment 244, the TDLM supports functionality broken down into three main areas:

(1) Solution support—The Travel LDM supports the Teradata CRM, the Financial Management and the Revenue Management Intelligence solution offers.

(2) Business Information areas covered by the Model— The Travel LDM contains application-neutral information about the following subjects and more:
- Customers, Partners, Travel Suppliers, Loyalty Accounts, Awards,
- Customer Preferences, Customer Demographics, Sales Channels Performance,
- Address Information, Asset Information, Travel Supplier, Locations,
- Products, Product Performance, Promotions, Reservations, Purchases,
- Web Interaction, Web Server,
- Revenue Management,
- Financial Management.

(3) Business Intelligence that can be derived from the information—The Treavel LDM supports a vast amount of business intelligence. Some examples:
- Customer analysis—Revenue generated vs. miles flown, consumer profitability, lifetime value, and usage trends.
- Promotional analysis—Which ads generate the best response in terms of booking activity? Do ads impact a particular market or offer? What is the relationship between promotions and web usage?
- Product affinity—Is there any correlation between booking rates on the web if frequent flyer miles are offered?
- Load Analysis—What are the results by flight (quarter over quarter) based on some changing variable such as price or time of departure?
- Channel Analysis—Have the sales made on the web reduced booking from Travel Agents or do they net new sales? What is the effect on average ticket price?
- Consumer Activity—Track consumer behavior from Looking, Booking, through Travel Experience. Were there irregular Operation impacts, complaints, and/or compliments?
- Fraud Detection—Which travel agencies are abusing special incentives? Which consumers are not completing multiple leg flights?
- Web Activity—What is happening on the web, such as consumer interactions, patterns, and usage? Channel effectiveness, what is working best?
- Loyalty Program Analysis—Which promotions are generating the greatest activity? What is the booking behavior for premium members?
- Partner/Alliance Member Analysis—How are my customers utilizing my business partners? What is the impact of promotions on use of Alliance Members?
- Revenue Management Analysis—allows analysts to perform multi-dimensional analytics (i.e. drill down, drill across) to investigate exceptions to demand and booking patterns for future flight activity by accessing current information, historic trends and previous market activity.
- Financial Management Analysis—allows analysts to measure and manage business financial performance; identify trends in financial statements; perform multi dimensional analysis of financial results; and provide accessibility to detailed financial information The Teradata Travel Logical Data Model, as described herein, serves several different kinds of customers, including Airlines 230, Rental Car Companies 232, Cruise Lines 234, Lodging (Hotel) Companies 236, Travel Agencies 238, Bus Lines 140, and Passenger Rail 242. Companies.

Logical Data Model Design Basics

As stated earlier, a properly designed logical data model provides a foundation for more effective sales, marketing, and operations management and supports the customer relationship management requirements related to identifying, acquiring, retaining and growing valuable customers.

A logical data model (LDM) is an abstract construct that is physically realized in the database or data warehouse. The data model provides an architecture for the information that will be included in a data warehouse. The database provides the physical realization of that architecture in a form that can be efficiently maintained and used. There may well be some differences between the logical data model and the final database design. The database may include some tables (summary tables, etc.) or columns that have no direct correlation in the logical data model. Elements in the logical model may be grouped differently in the physical database.

A logical data model is organized by Subject Areas, each comprised of numerous Entities, Attributes and Relationships. The data model hierarchy includes one or more Subject Areas. Each Subject Area includes one or more Entities or Tables, each having Attributes and Relationships. Each Attribute describes a fact about an Entity. Relationships between two or more Entities are further defined by Cardinality. The Relationships define which entities are connected to other entities and the cardinality of the relationships. Each of these elements will be described in greater detail below.

Subject Area

A subject area is a subset of objects taken from the universe of data objects for a particular line of business or industry that focus on a particular Business Process. Typically, a subject area is created to help manage large data architectures that may encompass multiple business processes or business subjects. This is the highest-level data concept within a conceptual entity/relationship (E/R) model. Working with subject areas is especially useful when designing and maintaining a large or complex data model. Dividing the enterprise into several distinct subject areas allows different groups within an organization to concentrate on the processes and functions pertinent to their business area.

Entity

An Entity represents a person, place, thing, concept, or event (e.g. PARTY, ACCOUNT, PRODUCT, etc.). It represents something for which the business has the means and the desire to collect and store data. An Entity must have distinguishable occurrences, e.g., one must be able to uniquely identify each occurrence of an entity with a primary key (e.g. Party Identifier, Account Identifier, Invoice Number, etc.). An Entity is typically named with a unique singular noun or noun phrase (e.g., PARTY, TRANSPORTED PASSENGER, etc.) that describes one occurrence of the Entity and cannot be used for any other Entity. It should be exclusive of every other Entity in the database. An Entity cannot appear more than once in the conceptual entity/relationship (E/R) model. Each Entity may have relationships to other Entities residing in its own Subject Area or in other Subject Areas.

Attribute

An Attribute is a data fact about an Entity or Relationship. It is a logical (not physical) construct. It is data in its atomic form. In other words, it is the lowest level of information that still has business meaning without further decomposition. An example would be FIRST NAME, or LAST NAME. An example of an invalid attribute would be PERSON NAME if it includes both the first and last names, as this could be further decomposed into the separate, definable (first name, last name) data facts.

Relationship

A Relationship is an association that links occurrences of one or more Entities. A Relationship must connect at least one Entity. If only one Entity is connected, the Relationship is said to be Recursive. A Relationship is described by a noun or passive verb or verb phase that describes the action taken in the Relationship. A Relationship represent a static state of being between the occurrences of the Entities it connects. Relationships are not intended to represent processes or data flows. They cannot be linked to another Relationships. They may optionally represent future, present, and/or past relatedness. The time frame must be explicitly defined in the data definition. Relationships may contain attributes. In a normalized model, a Relationship containing Attributes will result in the creation of an Entity.

Cardinality

In order for a data model to be considered accurate, it must contain both the maximum and minimum number of Entity occurrences expected. This is controlled by rules of cardinality, which describes a relationship between two Entities based on how many occurrences of one Entity type may exist relative to the occurrence of the other Entity. Typically, it is a ratio, commonly depicted as a one-to-one (1:1); one-to-many (1:N); and many-to-many (M:N) relationship.

The maximum cardinality may be an infinite number or a fixed number but never zero. The minimum cardinality may be zero, or some other positive number, but it must be less than or equal to the maximum cardinality for the same relationship.

The logical data model for the E-Business will now be described in more detail. The logical data model uses IDEF1X modeling conventions, as shown in Table 1.

TABLE 1

| Entity Conventions | |
|---|---|
| Convention | Definition |
| ENTITY1<br>Entity1_PK | Independent entity. An entity is depicted as a box, with its name above the box in singular, uppercase form. Square-boxed entities are independent. They rely on no other entity for their identification. Primary keys are attributes that uniquely identify the entity. Primary keys are shown at the top of the box, separated from other listed attributes by a horizontal line. |
| ENTITY2<br>Entity1_PK (FK)<br>Entity2_PK | Dependent entity. Round-cornered entities are dependent on one or more entities for their identification. (FK) following the primary key attribute indicates a foreign key - an attribute in the entity that is the primary key in another, closely related entity. |
| ENTITY2<br>Entity2_PK<br>Entity1_PK (FK) | An independent entity may also include a foreign key as a "non-primary key foreign key". A non-primary key foreign key is shown below the horizontal line separating primary key attributes from other entity attributes. |

Relationship and cardinality conventions are shown in Table 2.

TABLE 2

| Relationship/Cardinality Conventions | |
|---|---|
| Convention | Definition |
| A —— B | A single line at the end of a relationship link means that a single record entity B is related to only one record in entity A.. |

TABLE 2-continued

Relationship/Cardinality Conventions

| Convention | Definition |
|---|---|
| 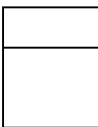 | A circle indicates that the presence of a linked record in entity A is optional. |
| 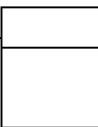 | One-to-one relationship. |
| 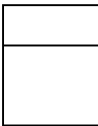 | One-to-many relationship. The crow's foot symbol means that more than one instance of an entity is associated with another entity. |
|  | One-to-zero-one-or-more relationship. A circle with a crow's feet symbol means there may be zero, one, or many instances of the entity associated with the other entity. |
| 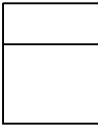 | A dotted relationship line indicates that the identity of entity B is not linked to entity A. |

Travel Logical Data Model

The Travel Logical Data Model (TLDM) is a large data model composed of a large number of tables. To effectively view and understand the data model, the data tables have been logically organized into smaller groups called subject areas. Each subject area is comprised of a set of tables that contain information relevant to a particular entity. In addition, the subject areas address particular business questions.

The Travel Logical Data Model is presented in the following views to facilitate its understanding:

Conceptual View (FIG. 3); and

Subject Area Views (FIGS. 4 through 29).

Figure 3A:
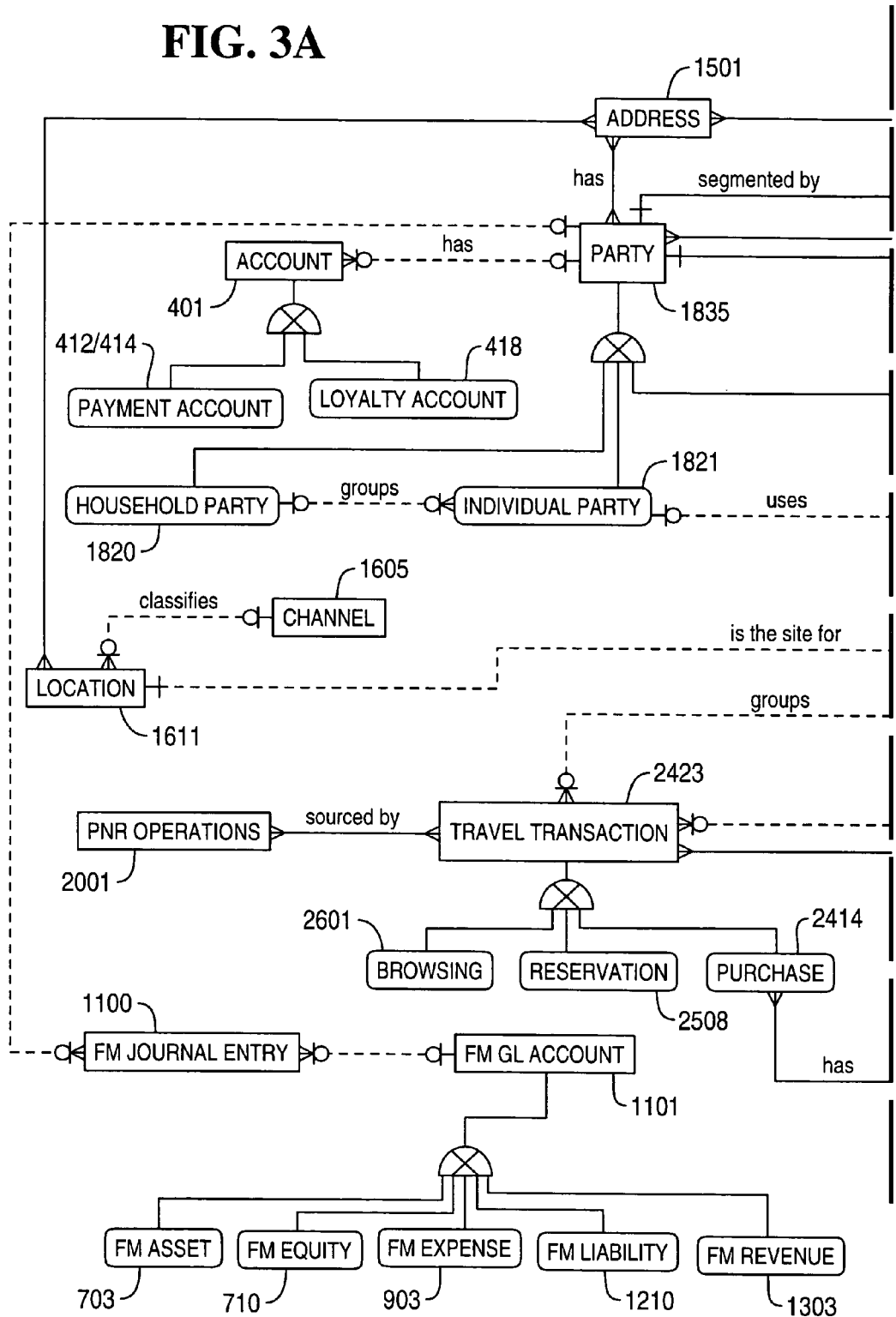
FIGS. 3A through 3C, taken together, provide a conceptual data model view of a travel industry logical data model (travel LDM) illustrating the most important entities in the travel LDM and how they generally relate to each other, in accordance with the preferred embodiment of the present invention.
Figure 3B:
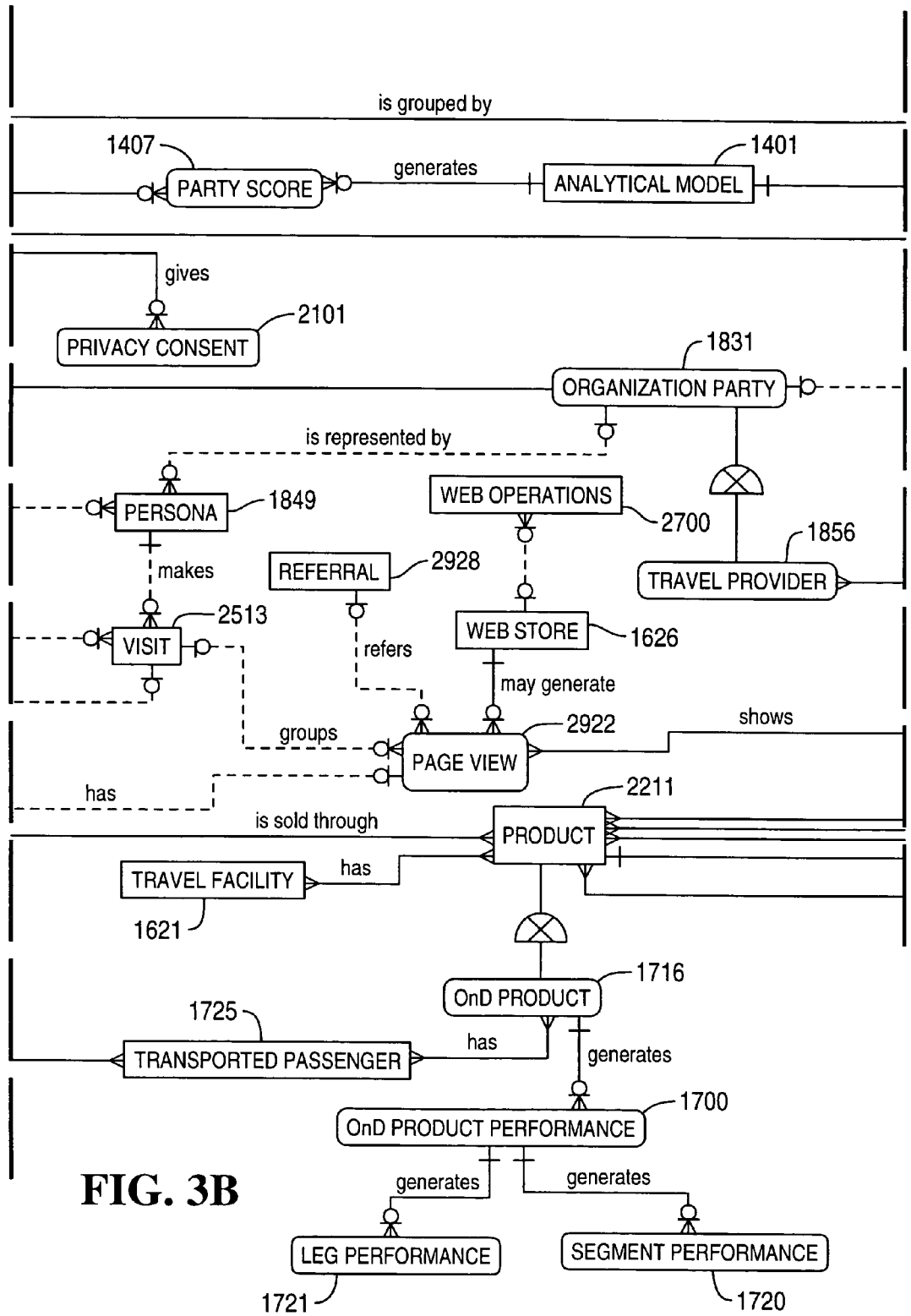
Figure 3C:
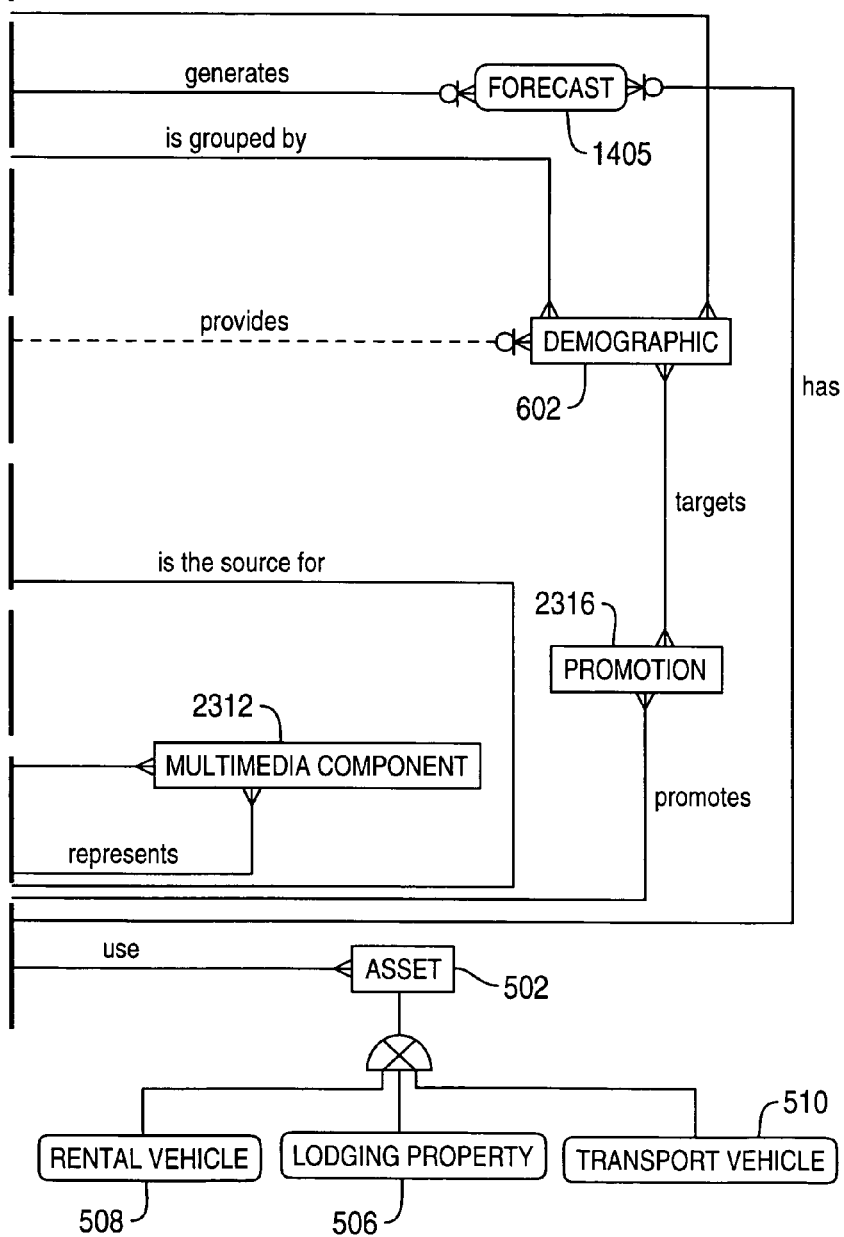
Figure 3:
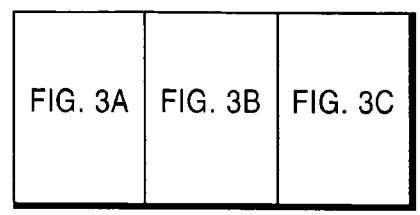
Figure 4B:
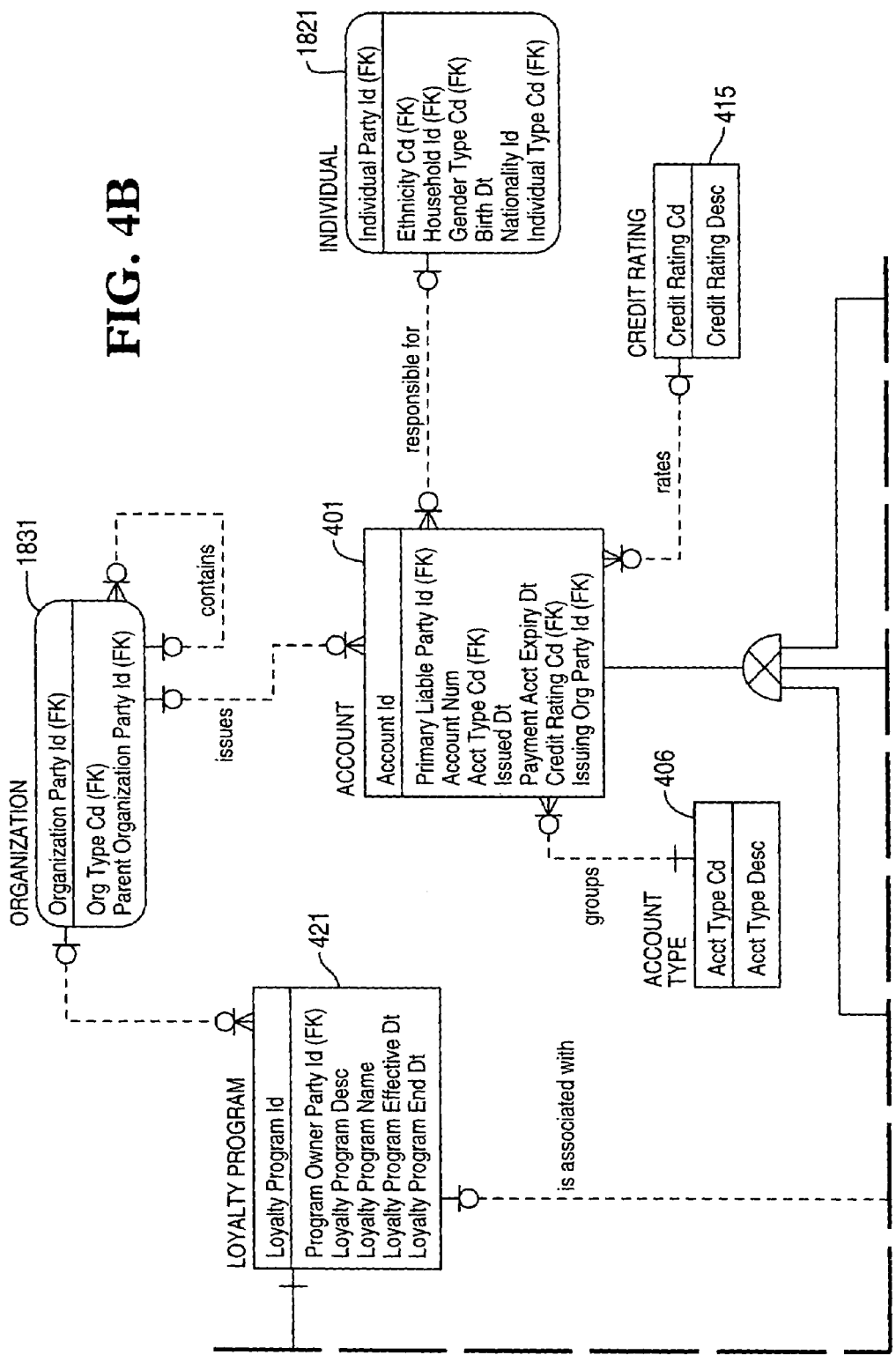
Figure 4C:
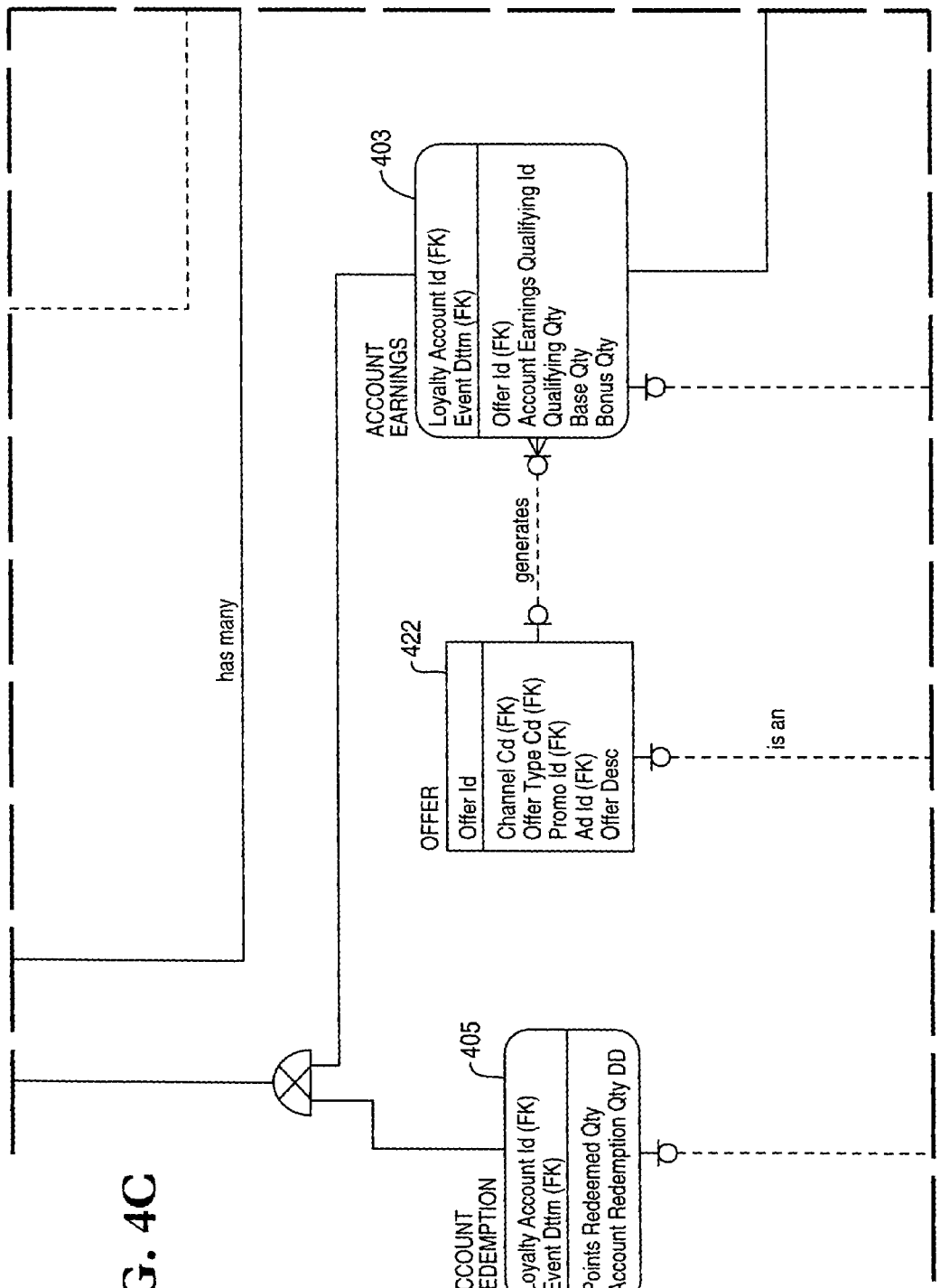
Figure 4D:
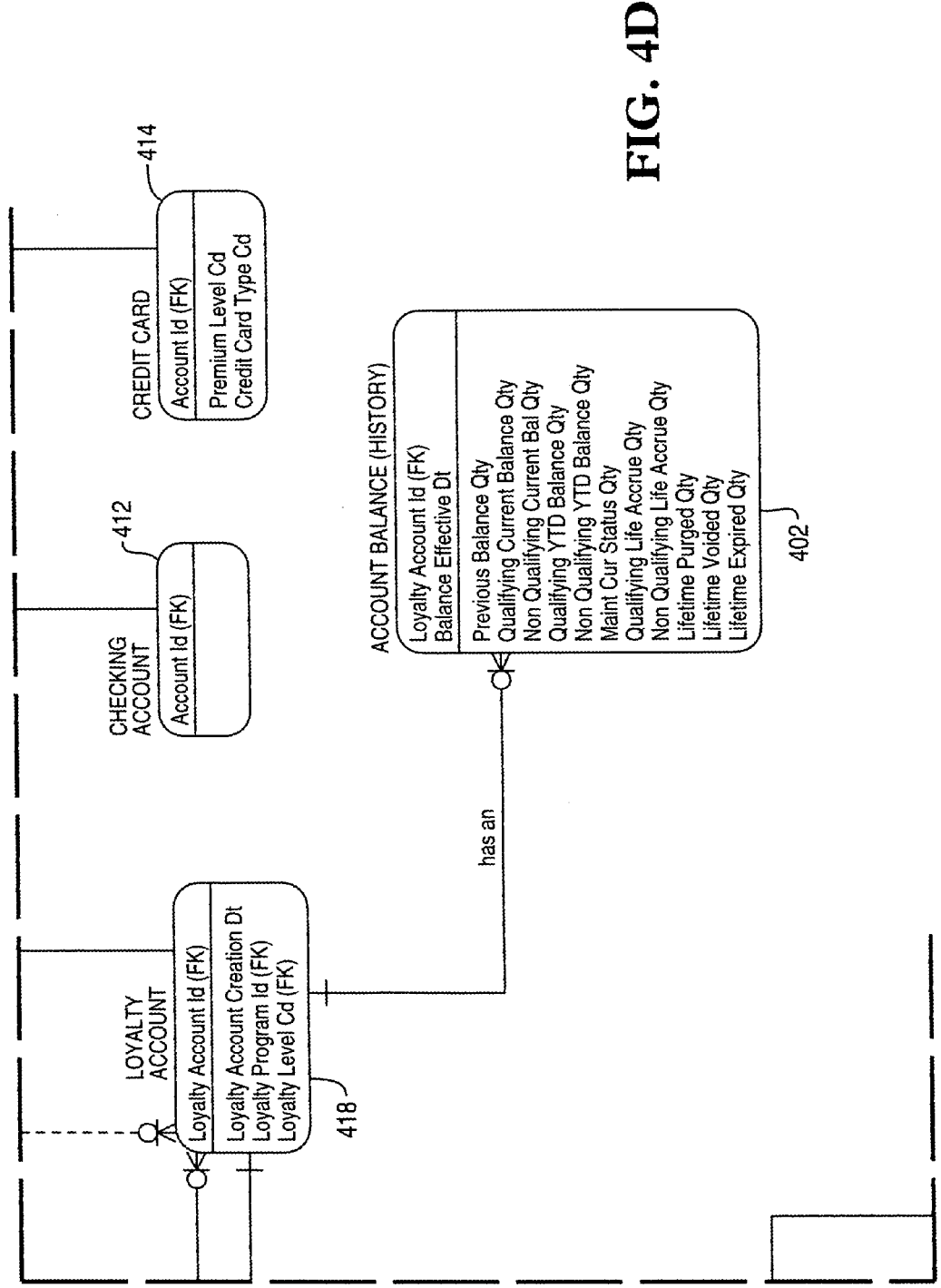
Figure 4E:
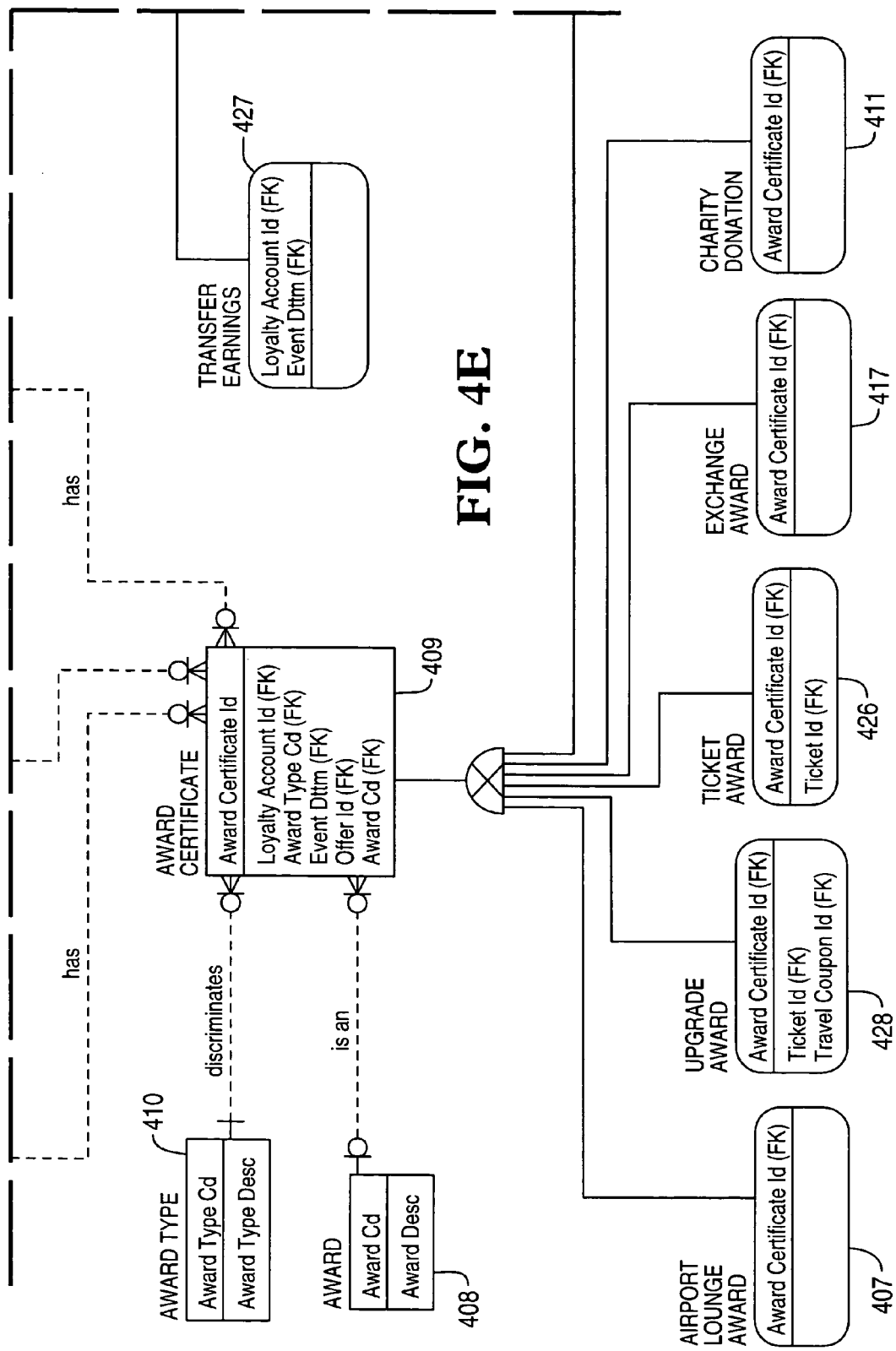
Figure 4F:
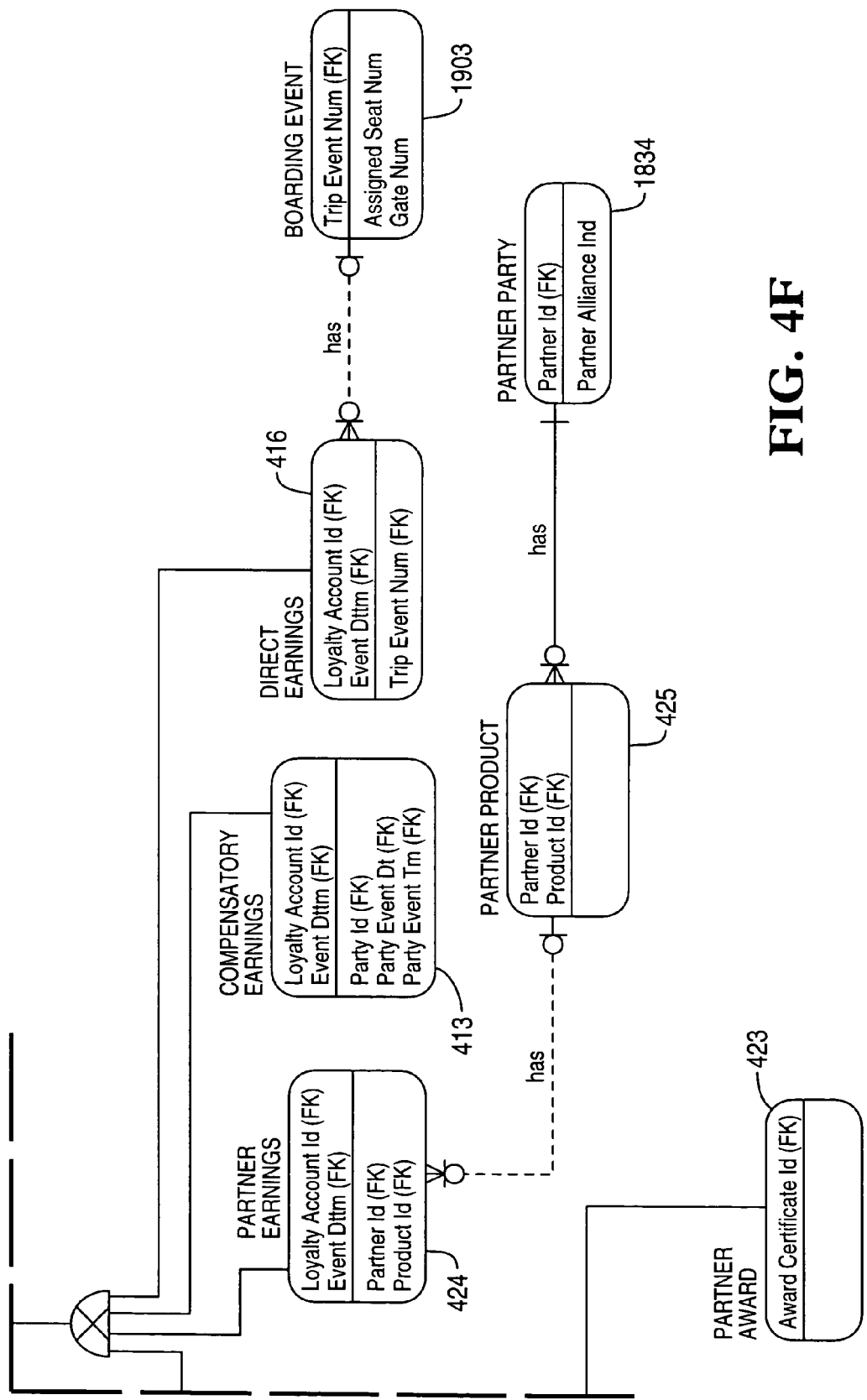

The Conceptual View of the Travel Logical Data Model is illustrated in FIGS. 3A-3C. This view provides an overall high-level understanding of the major entities and how they relate to each other. This conceptual level forms the foundation for the remaining views. Its purpose is to show the most important entities in the logical data model and how they generally relate to each other.

The Conceptual View is derived directly from the Travel Logical Data Model by selecting the most important entities from every subject area, being sure that at least one entity from each subject area was selected and distilling the relationships among the selected entities, while still maintaining the general nature of the way the entities relate to each other. During this process, intervening entities were abstracted into relationships. Many-to-many relationships were used where appropriate. Several entities shown in the Conceptual View, e.g., PAYMENT ACCOUNT 412/414, OnD PRODUCT PERFORMANCE 1700, FM JOURNAL ENTRY 2001, and WEB OPERATIONS 2700, represent a subject area or combination of entities within a subject area. The result is a simple, easy to understand diagram that conveys the general content of the underlying logical data model.

Each subject area within the logical data model, as well as the entities included within the subject area, will be illustrated in the Figures and described in greater detail below.

The Subject Area Views show small (but highly detailed) subsets of the model. Subject areas are collections of entities about business information objects or concepts that are closely related. The sum total of all subject areas equals the TLDM. These views contain the definitive full details of the logical data model. For example, one view shows entities related to assets controlled by the travel business and another view shows entities related to reservations with the travel business. Subject areas are application neutral, and make no assumption as to usage. Additionally, subject areas form the building blocks with which to construct solution views.

For ease of use and understanding, the Travel Logical Data Model has been divided into twenty-six subject areas titled: ACCOUNT, ASSET, DEMOGRAPHICS, FM ASSET, FM EQUITY, FM EXPENSE, FM GENERAL LEDGER ACCOUNT, FM JOURNAL ENTRY, FM LIABILITIES, FM REVENUE, FORECASTS AND MODELS, GEOGRAPHY, LOCATION, OND PRODUCT PERFORMANCE, PARTY, PASSENGER EN ROUTE, PRN OPERATIONS, PRIVACY, PRODUCT, PROMOTION, PURCHASE, RESERVATION, TRAVEL TRANSACTION, WEB OPERATIONS, WEB SITE, and WEB VISIT subject areas. There is some natural overlap between the subject areas, i.e., an entity may appear in multiple subject areas if it has direct relationships with entities in multiple subject areas. For example, the FARE BASIS table appears in the Figures for both the PURCHASE and RESERVATION subject areas. This means that the information in the FARE BASIS table is relevant to each of those subject areas; each subject area refers to the same physical item table.

A discussion of the subject area views illustrated in detail in FIGS. 4 through 29 is presented below.

Account Subject Area

The ACCOUNT Subject Area, shown in FIGS. 4A through 4F, deals mainly with tracking balances associated with consumer loyalty programs, such as frequent flyer programs, and allowing customers to redeem points earned or on LEGs traveled for travel awards or other items such as retail discounts or points exchanges.

Provisions have been made to handle award balance transfers from partners and their various loyalty programs. These can include hotel, rental car, credit card and other loyalty programs. Most current award redemption options are built into the model. Additional award options can to be added. These reflect awards in an actual AWARD CERTIFICATE or an electronic version of one.

Payment can be made in a variety of ways. Checking Account and Credit Card are present as sub-types of Account in the Account Subject Area. Cash, Travel Pass, and Certificate are present as sub-types of Payment in the Purchase Subject Area.

The entities of the ACCOUNT Subject Area are defined as follows:

ACCOUNT (401) An account established by a PARTY with an ORGANIZATION typically to facilitate and enable the transfer of funds.

ACCOUNT BALANCE (HISTORY) (402) A history of all transactions associated with a rewards account. It tracks earnings as well as dispersions (Award Redemption) and maintains current as well as lifetime balances. This is an example of a physicalized/history construct that would be needed if all information since inception is not kept.

ACCOUNT EARNINGS (403) A subtype of transaction associated with an Account Balance transaction that tracks all reward earnings posted to a Rewards Account.

ACCOUNT LEVEL (404) This entity is the domain of Account Levels achievable within a Rewards Program. Example Levels can be Bronze, Silver, Gold or Standard, Premier, Executive Premier, etc.

ACCOUNT REDEMPTION (405) A subtype of transaction associated with an Account Balance transaction that tracks all Award disbursements from a Rewards Account.

ACCOUNT TYPE (406) Describes a kind of ACCOUNT. Example: Checking, Credit Card, Loyalty Card, etc.

AIRPORT LOUNGE AWARD (407) This entity is a sub-type of Award Certificate and allows a specific airline customer to gain access to the VIP LOUNGE.

AWARD (408) The entity that represents an award requested by the customer as a result of redemption of frequent traveler points or as payment by the travel provider for having provided poor service.

AWARD CERTIFICATE (409) The actual certificate or type of Award requested and received by a customer.

AWARD TYPE (410) The domain that discriminates the type or kind of AWARD. Example: First Class Round Trip or First Class Upgrade.

CHARITY DONATION (411) The sub-type for redemption certificates used to contribute airline mileage to charitable organizations.

CHECKING ACCOUNT (412) An agreement between a PARTY and a financial ORGANIZATION to establish an account to draw funds against using a checkbook. Example: Bank of America VIP Plus Checking Account #333-444-333

COMPENSATORY EARNINGS (413) Segment credits, points, and other earnings given as compensation to a customer by Customer Service. Usually as a result of a service incident or complaint.

CREDIT CARD (414) A physical card issued by an ORGANIZATION, enabling customers to make purchases on credit. Example: Citibank platinum Visa CREDIT RATING (415) Internal or external ways of classifying a PARTY's or a PAYMENT ACCOUNT's credit worthiness. Example: Do not extend credit to this person, low risk, high risk, TRW score.

DIRECT EARNINGS (416) Segment credits and points award earnings resulting from customer's use of travel related services.

EXCHANGE AWARD (417) A subtype of Award Certificate that associates a specific Account Redemption to a Reward Program exchange.

LOYALTY ACCOUNT (418) An account issued by an enterprise to a PARTY to encourage purchase behavior in the form of DISCOUNTs or the collection of frequent purchaser points LOYALTY ACCOUNT EVENT (419) This entity represents the activity taking place in a PARTY's Loyalty Account. Example: ACCOUNT EARNINGS or ACCOUNT REDEMPTION.

LOYALTY EVENT TYPE (420) The domain of the discriminator of an Account Balance transaction. Examples are: Earnings, Redemptions, Adjustments, etc.

LOYALTY PROGRAM (421) A defined program for tracking and qualifying reward earnings and granting award packages.

OFFER (422) A specific incentive made available to customers. Usually contains 2 parts: a.) condition(s) to be met, and b.) the reward for a.) Example: Fly American to Hawaii in December 2001 and stay free at the Sheraton for a weekend.

PARTNER AWARD (423) A subtype of Award Certificate that associates a specific Account Redemption to a PARTNER.

PARTNER EARNINGS (424) A sub-type of the ACCOUNT EARNINGS that represents the earnings received from PARTNER PARTYs.

PARTNER PRODUCT (425) Identifies the PRODUCTs offered by a PARTNER PARTY.

TICKET AWARD (426) This entity is a subtype of AWARD CERTIFICATE and associates a specific ACCOUNT REDEMPTION to a TICKET or Flight Pass.

TRANSFER EARNINGS (427) A sub-type of the ACCOUNT EARNINGS that represents the earnings transferred to or from a PARTY.

Figure 5A:
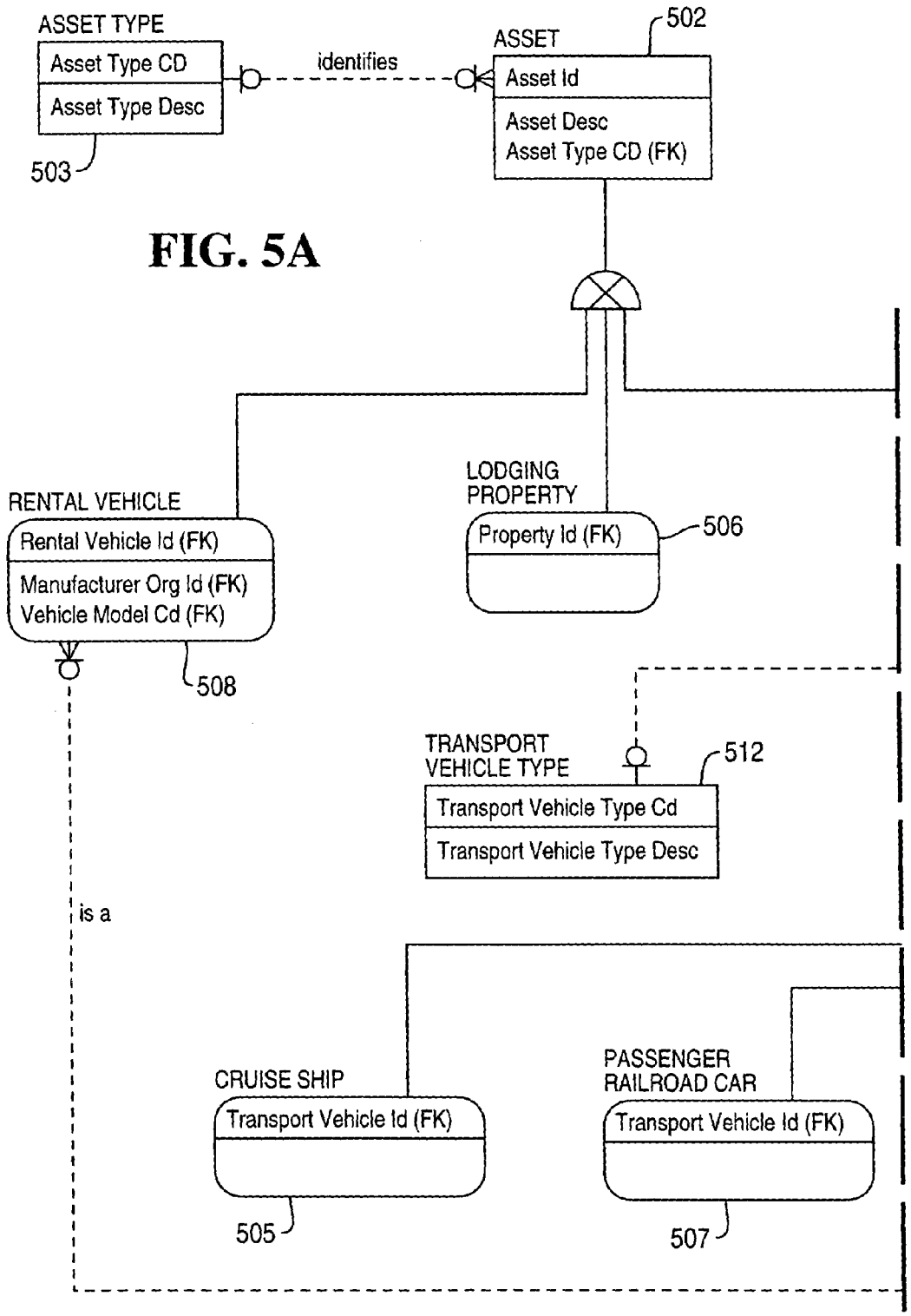
FIGS. 5A through 5C illustrate an entity-relationship diagram of the ASSET Subject Area of the logical data model in accordance with the preferred embodiment of the present invention.
Figure 5B:
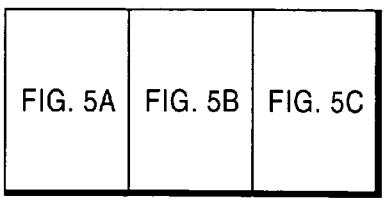
Figure 5B:
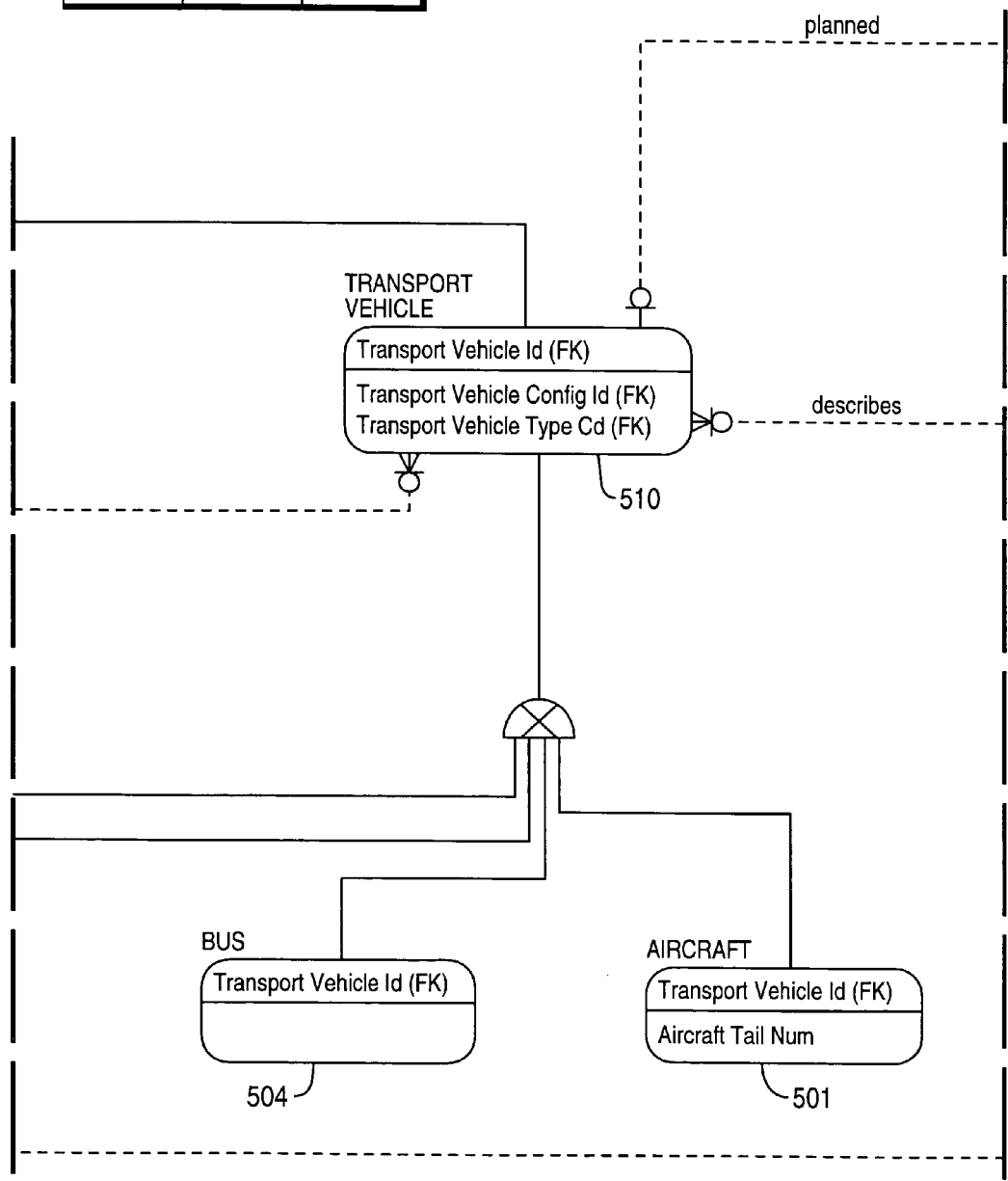
Figure 5C:
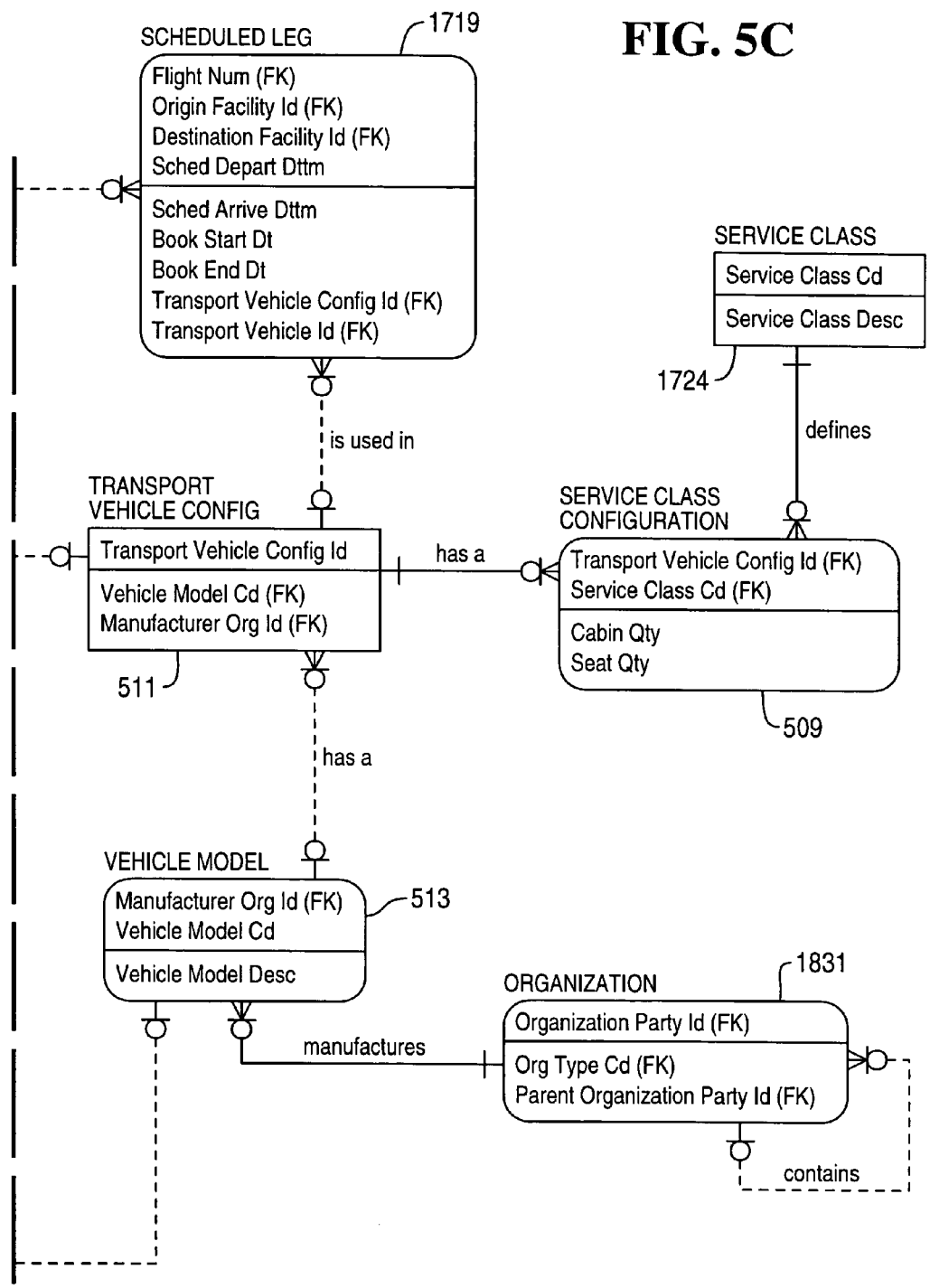

UPGRADE AWARD (428) This entity is a subtype of AWARD CERTIFICATE and tracks information associated with a Transportation Fare Class Upgrade Award ASSET Subject Area FIGS. 5A through 5C illustrate an entity-relationship diagram of the ASSET Subject Area of the Travel Logical Data Model. The ASSET Subject Area defines the relationship between various TRANSPORT VEHICLEs and the OnD PRODUCTs that use them.

The entities of the ASSET Subject Area are defined as follows:

AIRCRAFT (501) This entity reflects a specific airplane used to transport passengers and goods.

ASSET (502) A specific passenger, freight vehicle, or lodging property.

ASSET TYPE (503) A subtype of asset which describes the particular kind of ASSET. Example: BUS, TRAIN, AIRCRAFT, CRUISE SHIP, etc.

BUS (504) This entity reflects a ground based vehicle used for transporting multiple customers and goods.

CRUISE SHIP (505) This entity reflects a specific Ship used to transport passengers and goods.

LODGING PROPERTY (506) A property that provides temporary lodging for INDIVIDUALs.

PASSENGER RAILROAD CAR (507) This entity reflects a specific passenger train car used to transport passengers.

RENTAL VEHICLE (508) A specific vehicle which customers can rent for temporary use. Example: Ford Taurus, Buick Century.

SERVICE CLASS CONFIGURATION (509) Indicates the sellable capacity per class of service. Expressed in "seats" for aircraft, "cabins" for Ships, etc. Example: AIRCRAFT: 20 1st class seats, 120 coach class seats, etc.

TRANSPORT VEHICLE (510) This entity reflects the domain of vehicles used to transport passengers and goods.

TRANSPORT VEHICLE CONFIG (511) A Pre-defined configuration of a TRANSPORT VEHICLE with a fixed number of sellable "spots" per SERVICE CLASS.

TRANSPORT VEHICLE TYPE (512) Identifies the type of TRANSPORT VEHICLE Example: Cruise Ship, Aircraft, etc.

VEHICLE MODEL (513) The type of vehicle as manufactured. Example: Boeing 747 model 300, Acura 3.2 TL.

DEMOGRAPHICS Subject Area

Figure 6A:
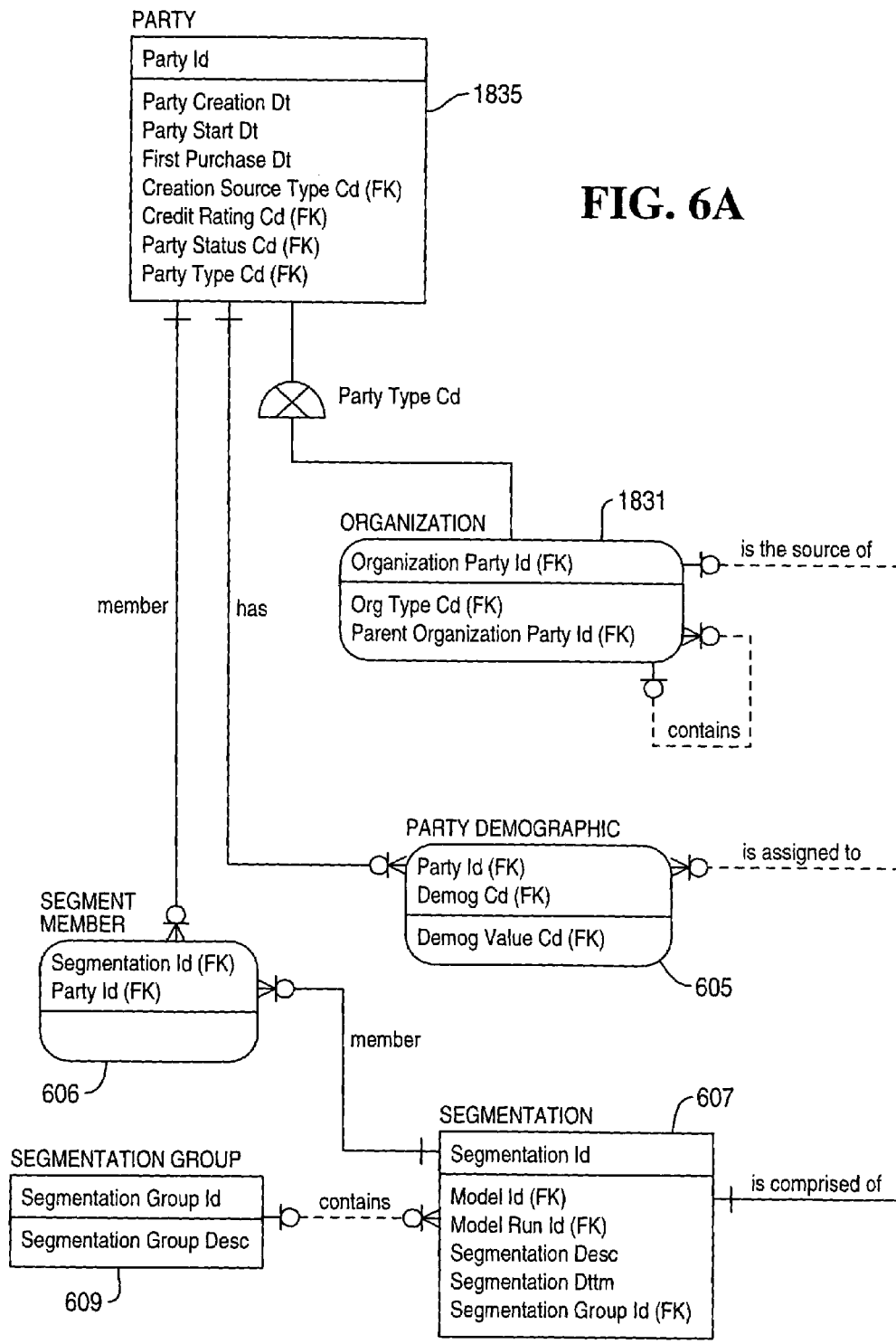
FIGS. 6A and 6B illustrate an entity-relationship diagram of the DEMOGRAPHICS Subject Area of the logical data model in accordance with the preferred embodiment of the present invention.
Figure 6B:
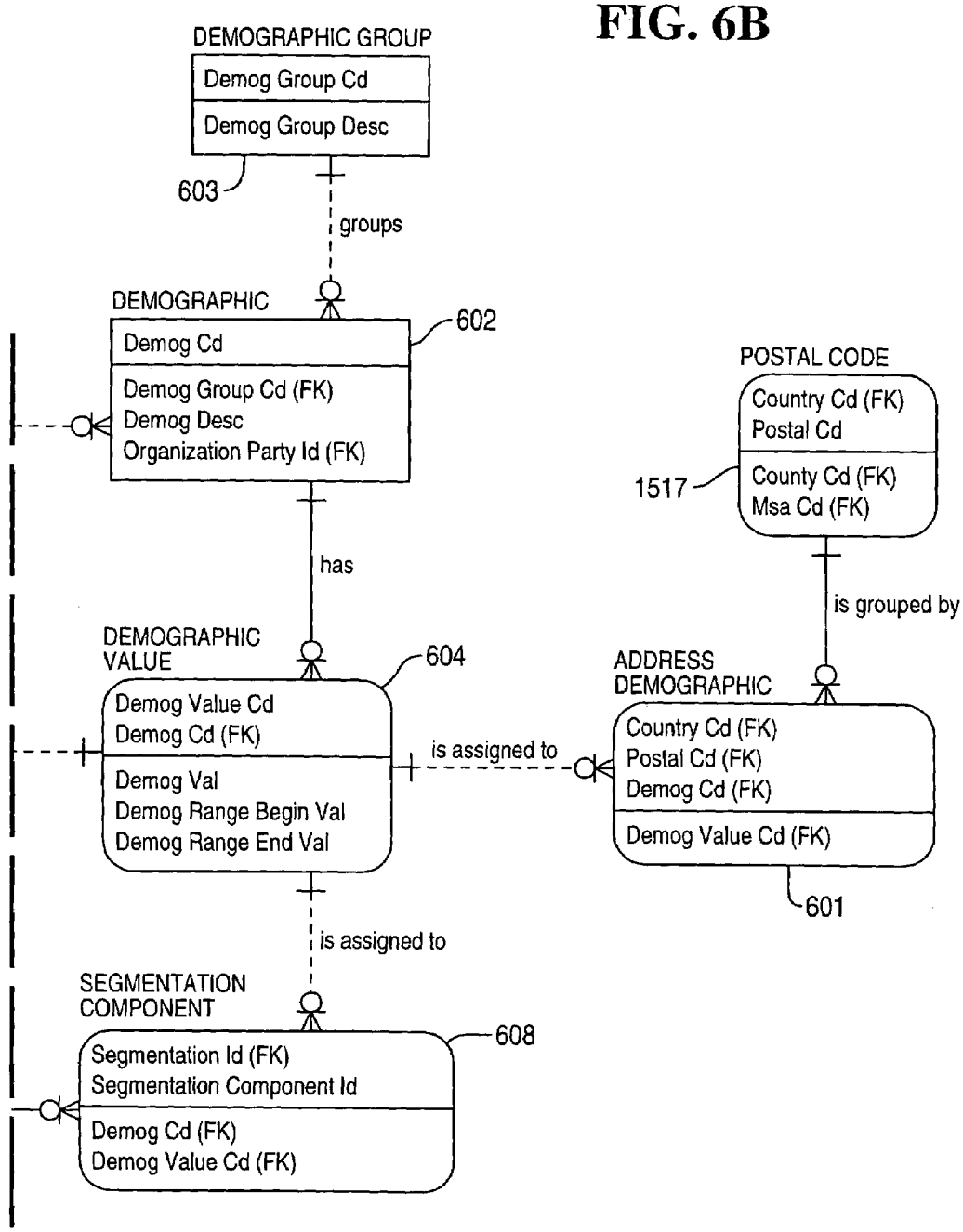

FIGS. 6A and 6B illustrate an entity-relationship diagram of the DEMOGRAPHIC Subject Area of the logical data model. The DEMOGRAPHIC Subject Area stores information concerning customer segments of interest to the retail enterprise. Its primary usage is for the creation of market or consumer SEGMENTs (groups of PARTYs sharing common characteristics) for marketing purposes. Additionally, DEMOGRAPHICs can be used to find common characteristics or profiles of a select group of consumers. This information is typically obtained (purchased or leased) from a third party.

The entities of the DEMOGRAPHIC Subject Area are defined as follows:

ADDRESS DEMOGRAPHIC (601) Contains specific characteristic information about a geographic area. Typically purchased from a 3rd Party. Example: Zip Code 90210 has a characteristic of Median Income >$100,000 per year.

DEMOGRAPHIC (602) Information (usually purchased form a third party) describing a PARTY or geographic area or PARTYs in a geographic area. Example: PARTY Income Level, Credit Rating, Number of children, etc. Geographic: Average temperature in January, etc. PARTYs in a Geographic Area: Typical household size, Number of automobiles, etc.

DEMOGRAPHIC GROUP (603) A clustering of related DEMOGRAPHICs. Example: Financial (contains Income Level, Credit Rating, etc.)

DEMOGRAPHIC VALUE (604) The actual value of a DEMOGRAPHIC. Example: Income level='Between $40,000 and $49,999'

PARTY DEMOGRAPHIC (605) Contains specific characteristic information about a PARTY. Typically purchased from a 3rd Party. Example: INDIVIDUAL: Rachel has an income of $120,000 HOUSEHOLD: The Smiths have 5 kids and 2 cars. ORGANIZATION: Acme Explosives & Gifts has annual sales revenue of $4M.

SEGMENT MEMBER (606) An associative entity that maps INDIVIDUALs into SEGMENTs. An INDIVIDUAL can be a member of multiple SEGMENTs, and vice versa.

SEGMENTATION (607) A cluster of PARTYs for marketing purposes. A SEGMENTATION can be re-used, and can receive multiple OFFERs Note: This is typically called a SEGMENT, but we choose SEGMENTATION instead to avoid confusion due to the specialized use of the term "SEGMENT" in the airline industry.

SEGMENTATION COMPONENT (608) The characteristics that qualifies a PARTY to be a member of a SEGMENTATION. Example: 'Income between $20,000 and $29,999', 'Made more than 5 purchases in the last month', etc.

SEGMENTATION GROUP (609) Allows related SEGMENTATIONs to be grouped together. Example: to segment top spenders into 10 decile segments—these 10 segments can now all be grouped together by relating them to the same SEGMENTATION GROUP: e.g: "Top Spenders by decile"

Financial Management (FM) Subject Areas

Financial Management information is detailed in seven Subject Areas, all prefixed with "FM" (Financial Management). Financial Management Subject Areas include FM ASSET, FM EQUITY, FM EXPENSE, FM GENERAL LEDGER ACCOUNT, FM JOURNAL ENTRY, FM LIABILITIES, and FM REVENUE Subject Areas.

FM ASSET Subject Area

Everything a business owns is usually referred to as Assets. These range from cash and investments to natural resources such as land, timber, etc. For accounting purposes these are usually classified under three groups: Current Assets, Fixed Assets and Other Assets.

Figure 7A:
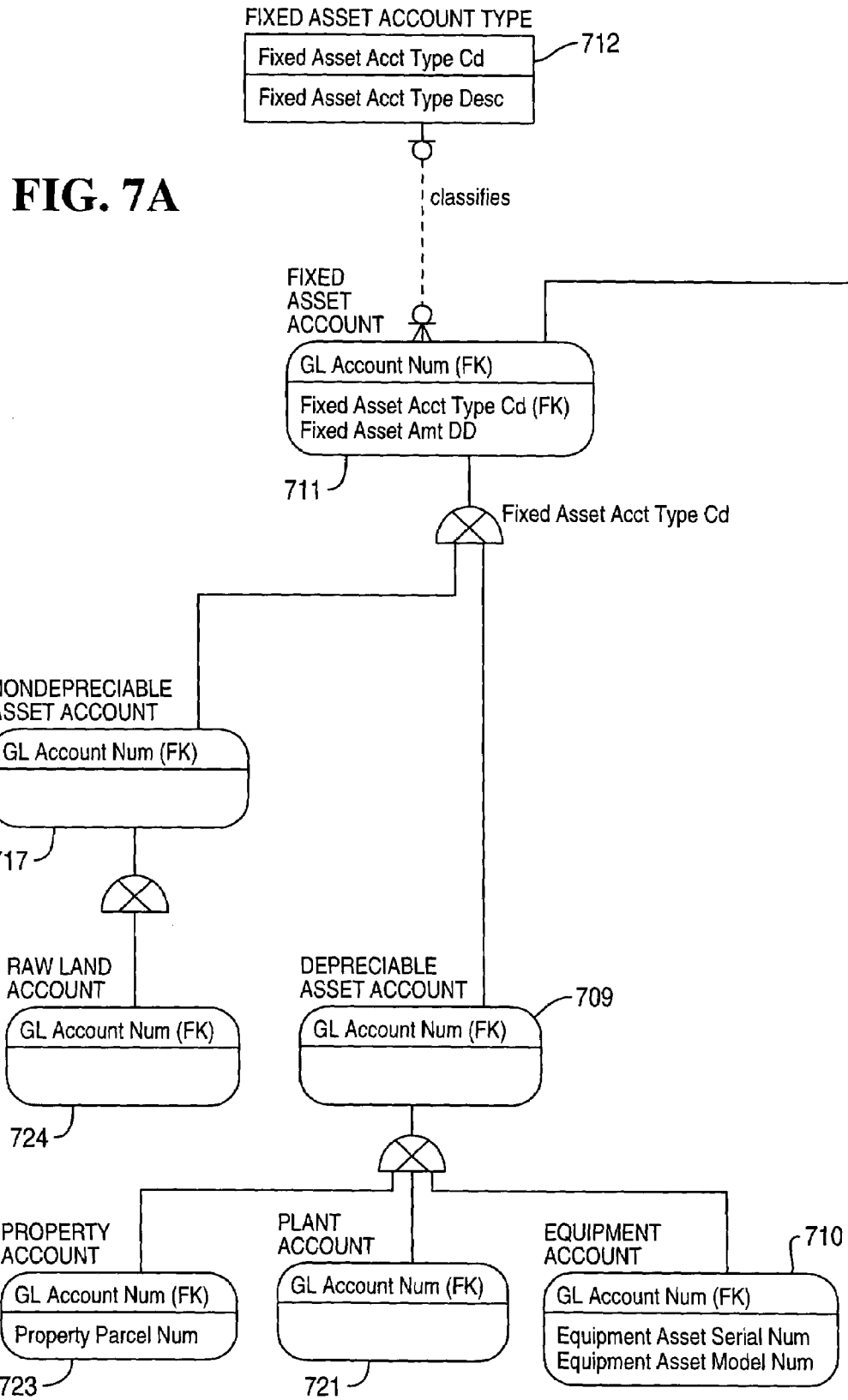
FIGS. 7A through 7C illustrate an entity-relationship diagram of the FM ASSET Subject Area of the logical data model in accordance with the preferred embodiment of the present invention.
Figure 7B:
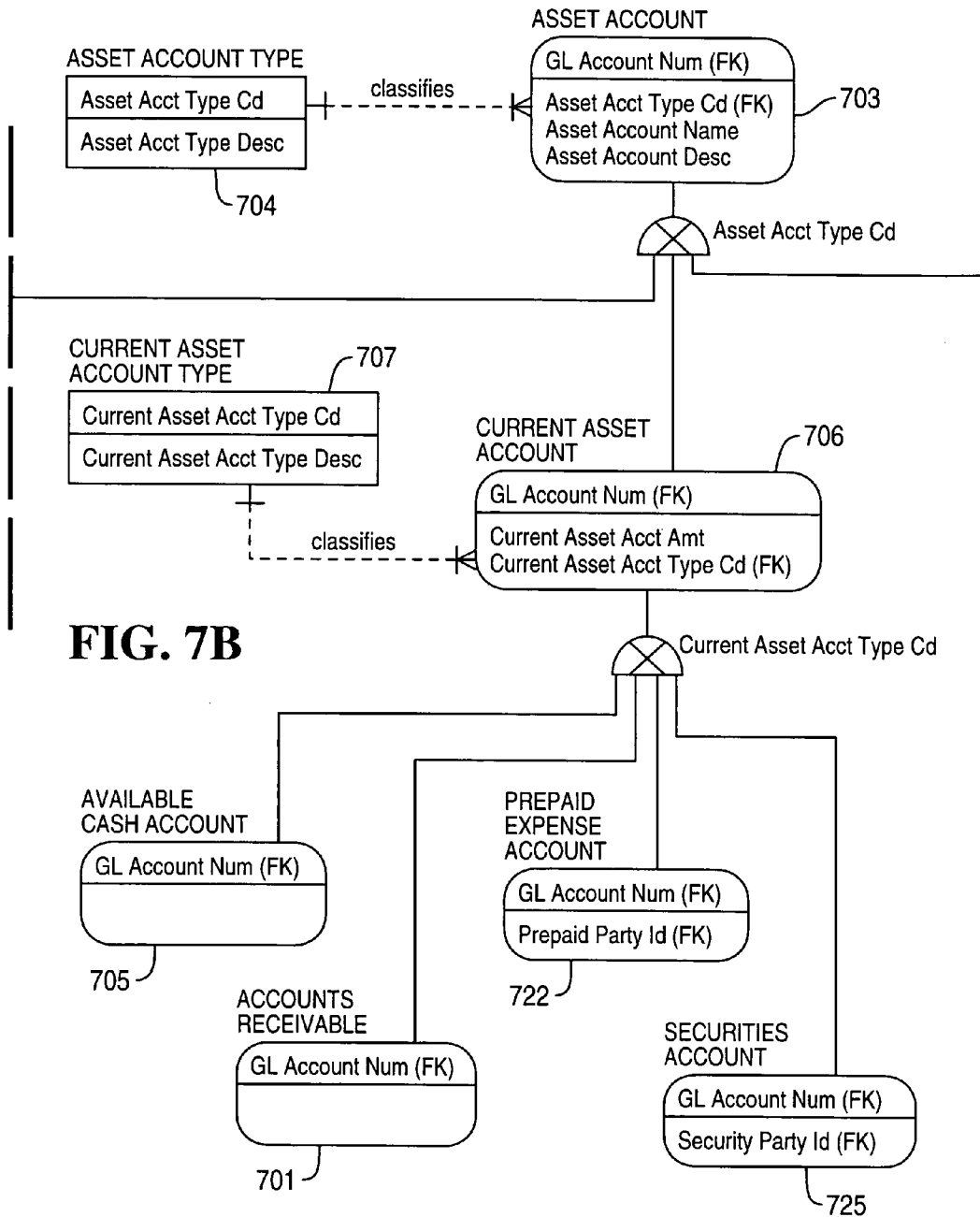
Figure 7:
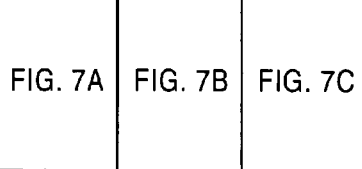
Figure 7C:
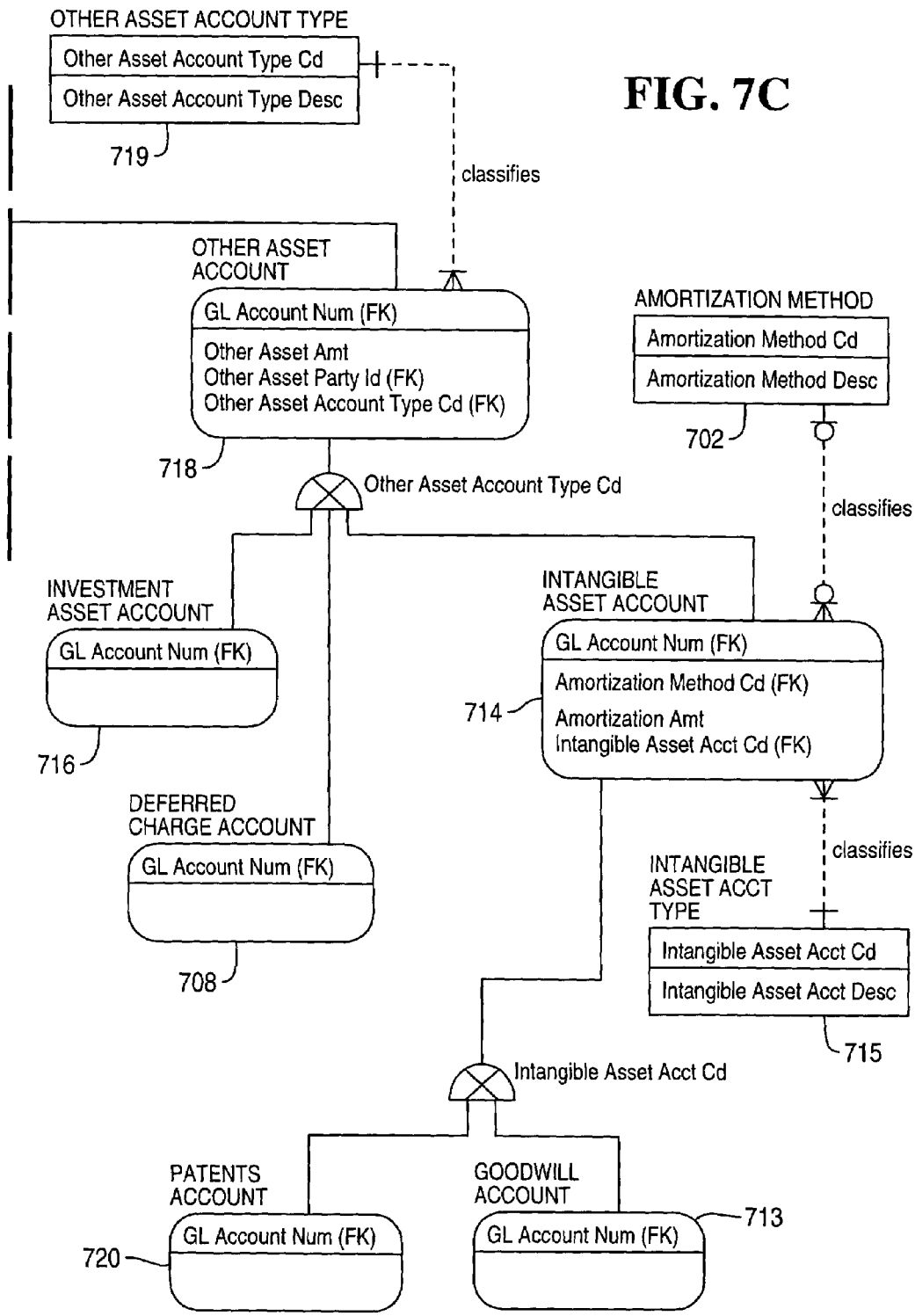

The entities of the FM ASSET Subject Area, illustrated in FIGS. 7A through 7C, are defined as follows:

ACCOUNTS RECEIVABLE (701) The entity that provides details for the accounts receivable accounts. Accounts receivable are the payments a company expects to collect from a party. Accounts receivable accounts are types of current assets.

AMORTIZATION METHOD (702) This reference entity contains the various ways that an amount can be amortized such as cash basis (no amortization), straight line, declining balance, and interest method. A=cash basis (assumed that there should not be an entry specifying cash) B=straight line C=declining balance D=interest method ASSET ACCOUNT (703) The entity that indicates the types of asset accounts.

ASSET ACCOUNT TYPE (704) The entity that identifies the type of asset like fixed asset, current asset, or other asset.

AVAILABLE CASH ACCOUNT (705) The entity that provides details for the available cash accounts. These accounts are any cash in currency, checking and savings accounts. Available cash accounts are types of current assets.

CURRENT ASSET ACCOUNT (706) The entity that indicates the types of current asset accounts.

CURRENT ASSET ACCOUNT TYPE (707) The entity that identifies the type of current asset like available cash, prepaid expenses, inventory, accounts receivable, or securities.

DEFERRED CHARGE ACCOUNT (708) The entity that provides details for deferred charges. These are expenditures that will be gradually written off over a future period of time.

DEPRECIABLE ASSET ACCOUNT (709) The entity that identifies the depreciable fixed asset account. Depreciable assets include property, plant and equipment.

EQUIPMENT ACCOUNT (710) The entity that provides details for equipment accounts. Equipment is used to perform company business. Equipment is a type of a depreciable asset.

FIXED ASSET ACCOUNT (711) The entity that indicates the types of fixed asset accounts.

FIXED ASSET ACCOUNT TYPE (712) The entity that identifies the type of fixed asset account like depreciable asset or non-depreciable asset account.

GOODWILL ACCOUNT (713) The entity that provides details for goodwill. These details could include the cost differential between the acquisition cost of a business and the market value of the asset acquired.

INTANGIBLE ASSET ACCOUNT (714) The entity that indicates the other asset is intangible. Types of intangible assets are patents and goodwill. These assets have no physical existence, yet having a substantial value to the company.

INTANGIBLE ASSET ACCT TYPE (715) The entity that indicates the type of an intangible asset account. For example: patent or goodwill.

INVESTMENT ASSET ACCOUNT (716) The entity that provides details for investments. These investments in debt securities with a positive intent and the ability to hold these securities until they mature.

NONDEPRECIABLE ASSET ACCOUNT (717) The entity that identifies the non-depreciable fixed asset account. Non-depreciable assets include things like raw land.

OTHER ASSET ACCOUNT (718) The entity that indicates the asset account is a other asset account. Types of other asset accounts include investments, deferred charges or intangible assets.

OTHER ASSET ACCOUNT TYPE (719) The entity that indicates the type of an other asset. For example: investments, deferred charges or intangible asset.

PATENTS ACCOUNT (720) The entity that provides details for patents. These details could include the legal cost a company paid an individual or a company to obtain a patent.

PLANT ACCOUNT (721) The entity that provides details for plant accounts. Plants are the buildings that are used to perform company business. Plants are a type of a depreciable asset.

PREPAID EXPENSE ACCOUNT (722) The entity that provides details for the prepaid expense accounts. Prepaid expenses are those expense that have been paid in advance like insurance. Prepaid expense accounts are types of current assets.

PROPERTY ACCOUNT (723) The entity that provides details for property accounts. Property is a type of a depreciable asset.

RAW LAND ACCOUNT (724) The entity that provides details for raw land accounts. Raw land is a type of a non-depreciable asset.

SECURITIES ACCOUNT (725) The entity that provides details for the securities accounts. Securities are short term investments with a maturity of three to twelve months. Securities accounts are types of current assets.

FM EQUITY Subject Area

Figure 8A:
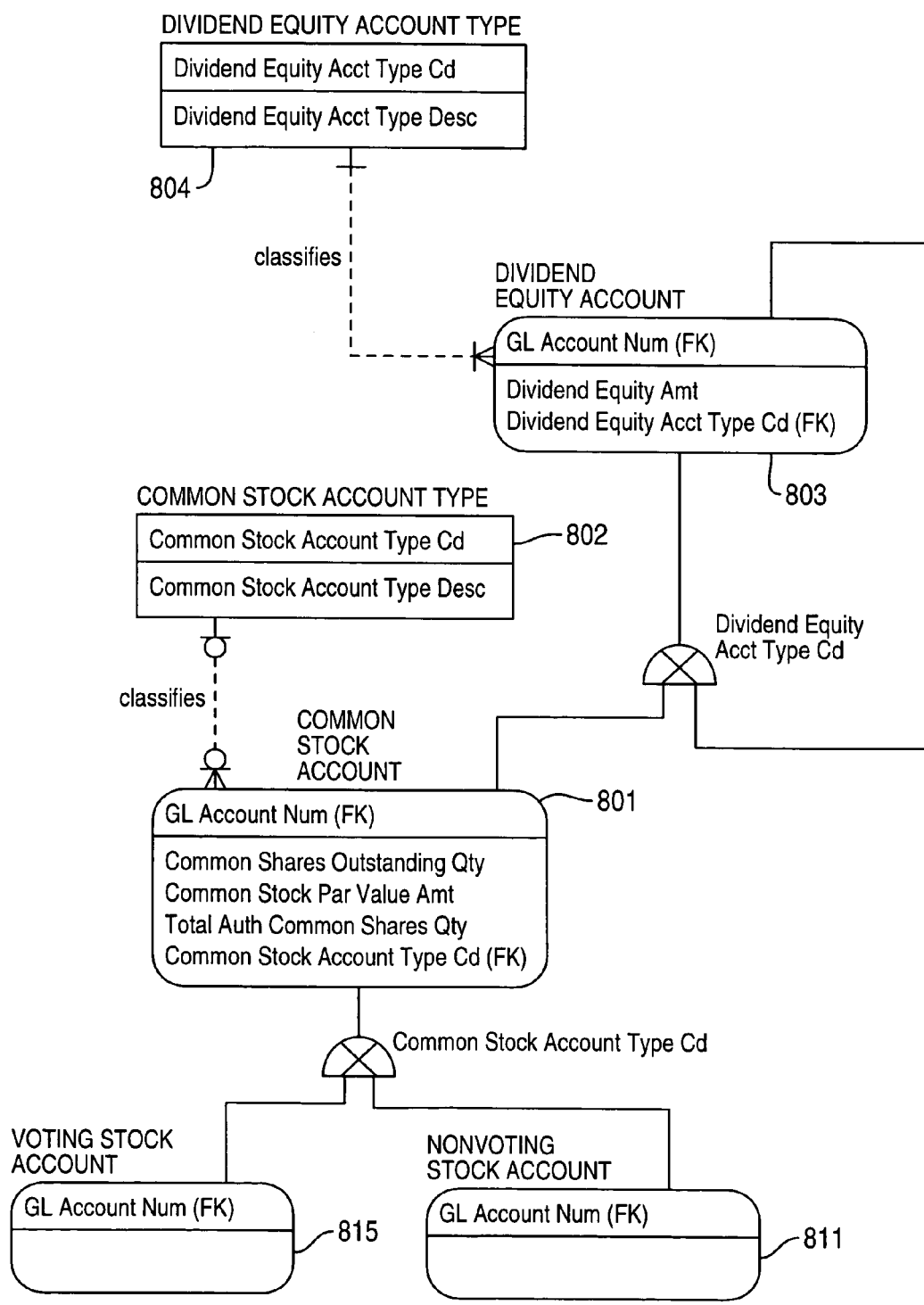
Figure 8B:
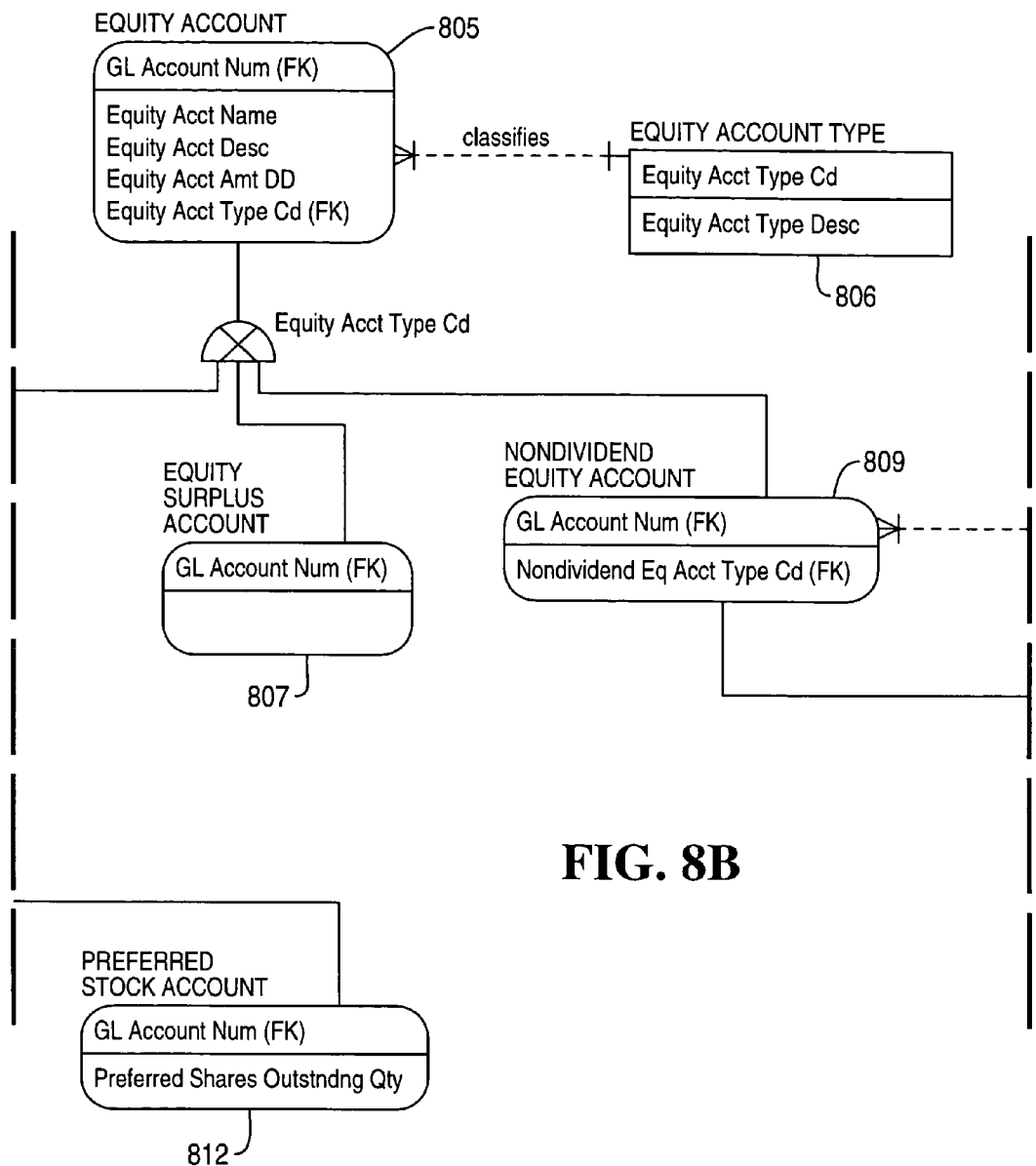
Figure 9A:
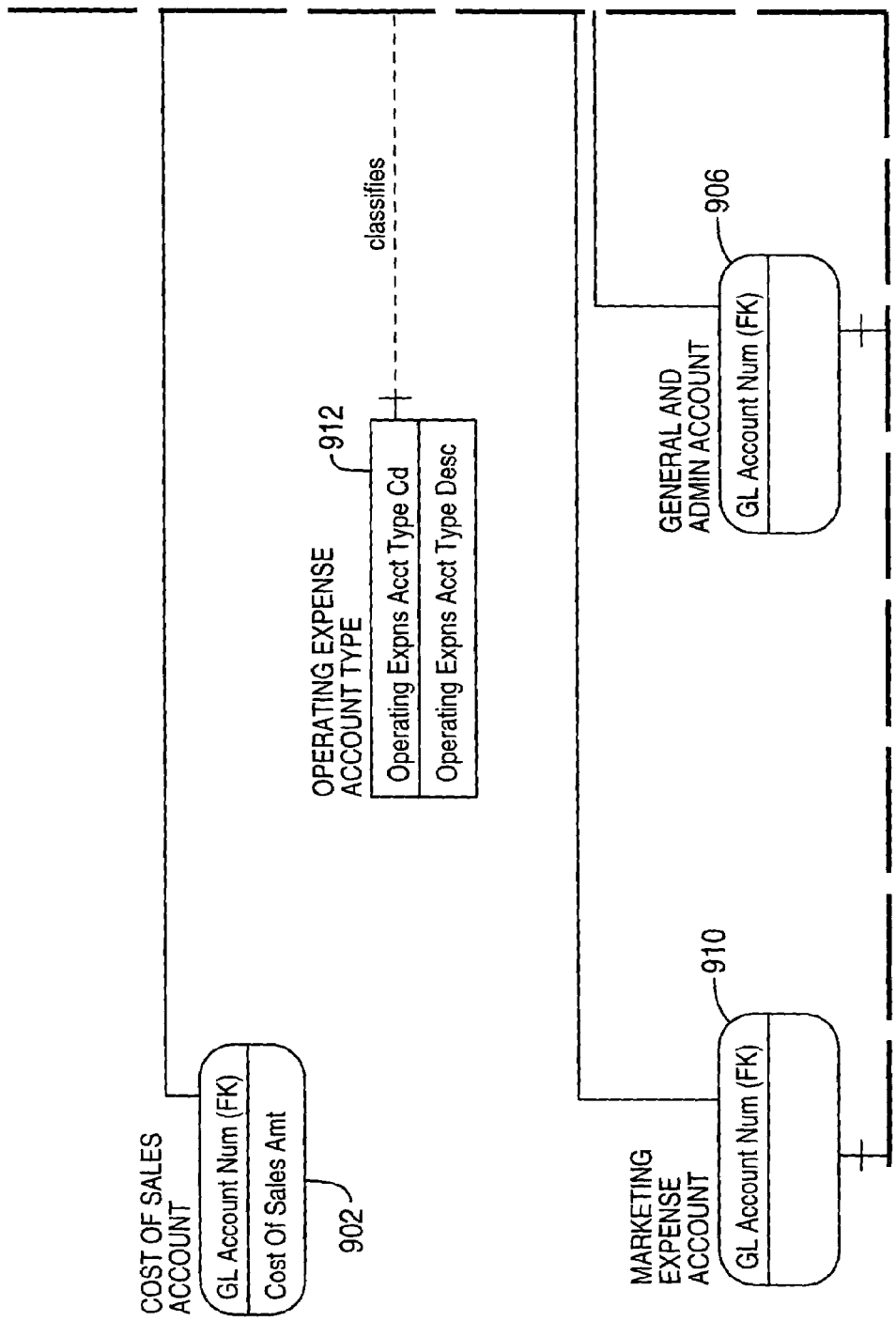
FIGS. 9A through 9D illustrate an entity-relationship diagram of the FM EXPENSE Subject Area of the logical data model in accordance with the preferred embodiment of the present invention.
Figure 9B:
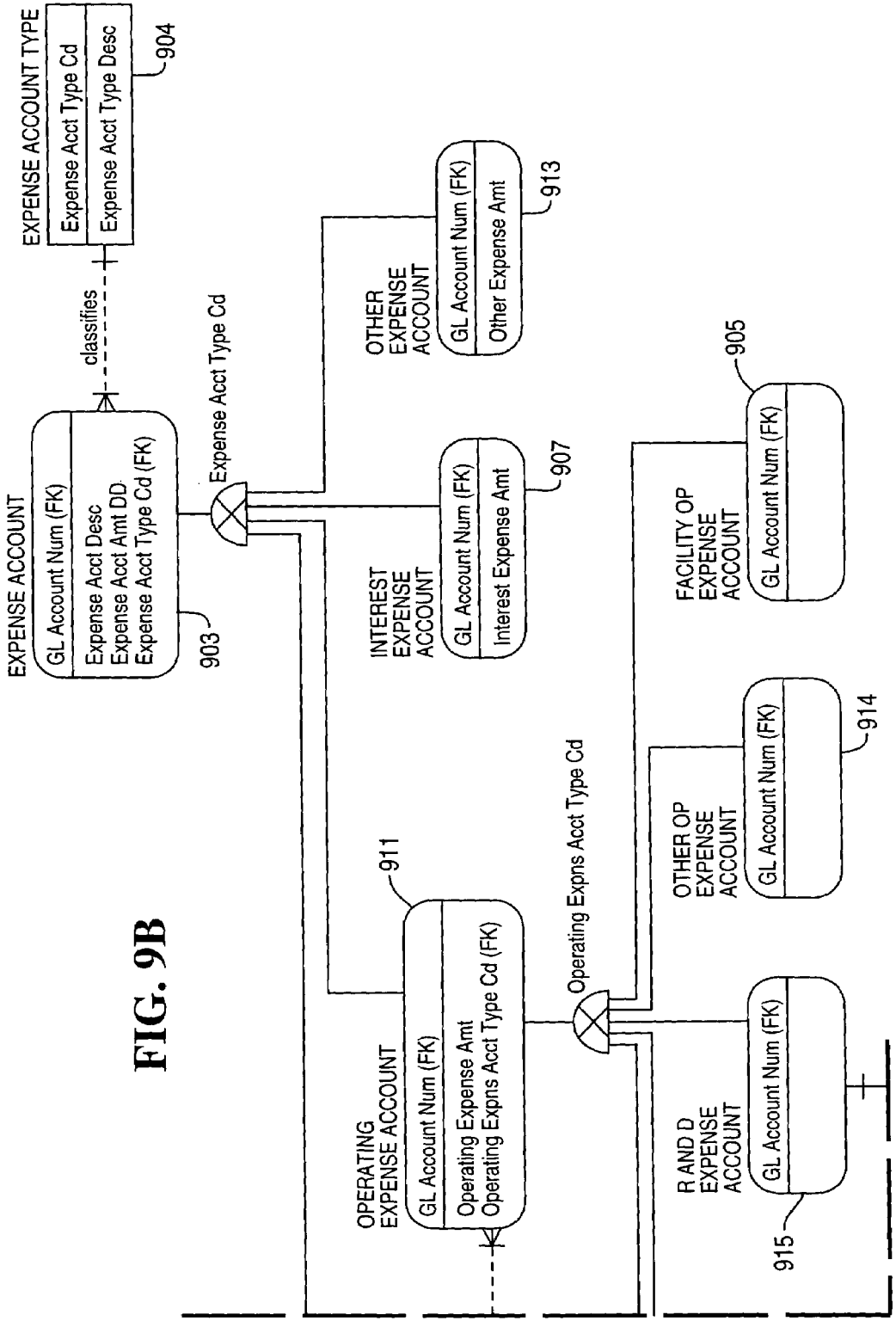
Figure 9C:
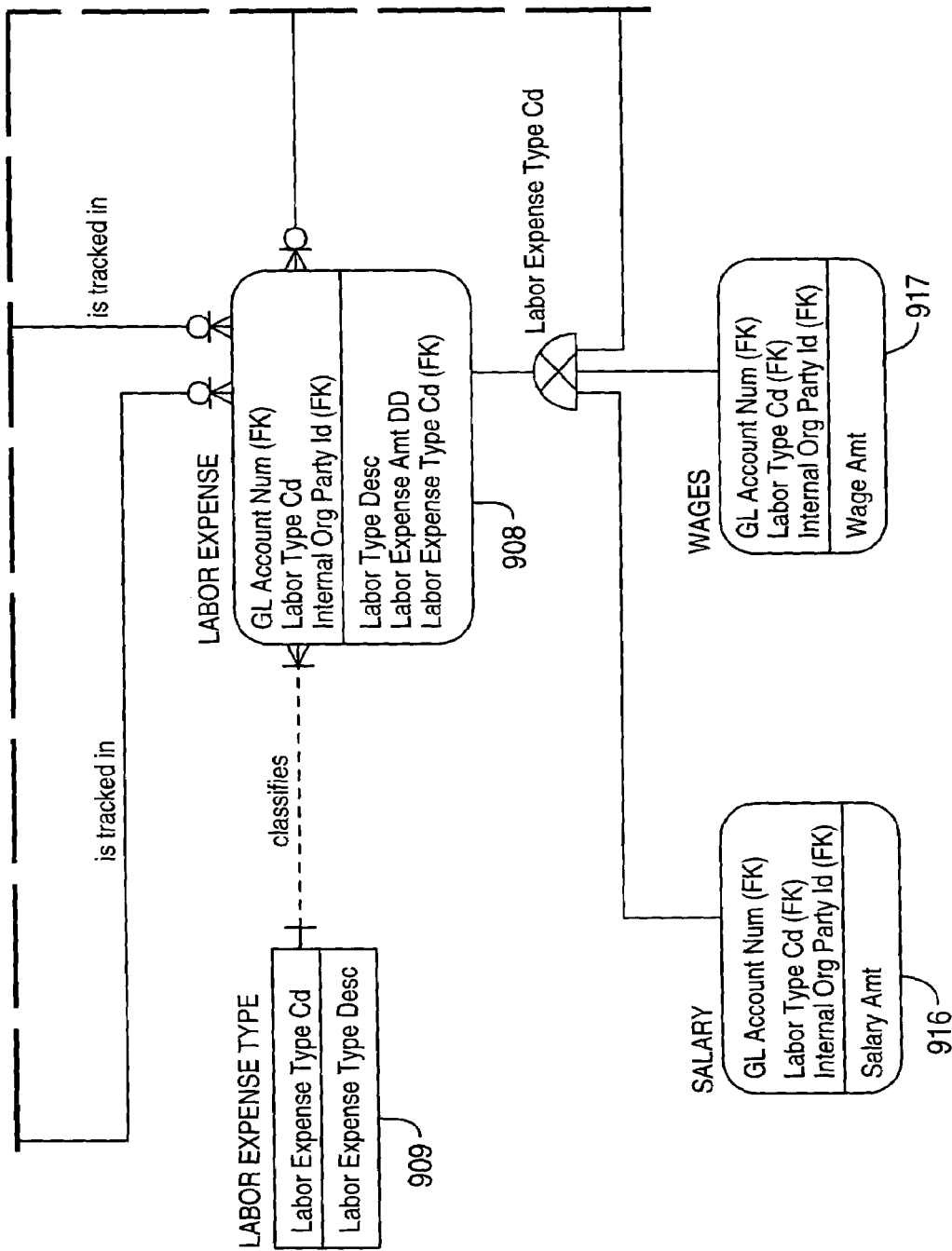
Figure 9:
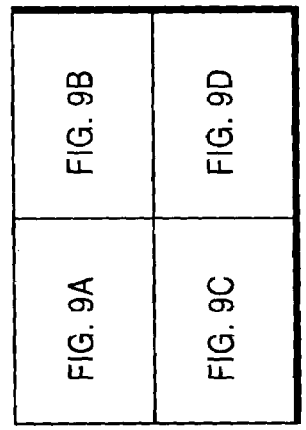
Figure 9D:
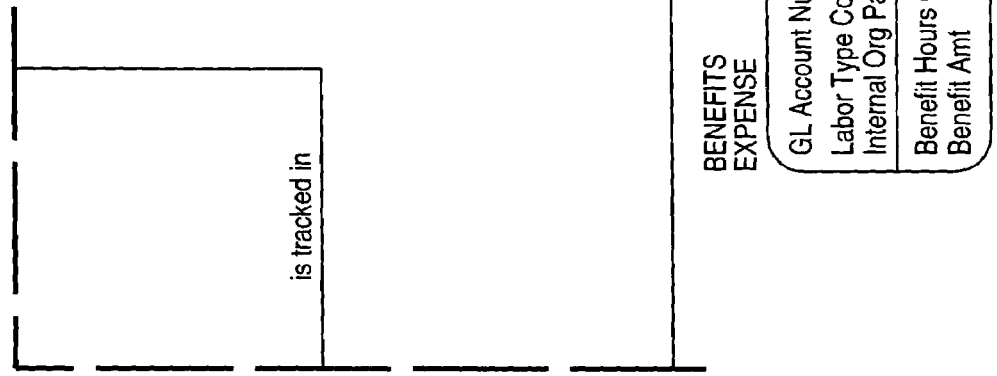

The FM EQUITY Subject Area, illustrated in FIGS. 8A through 8C, is mainly used to track dividends paid out to shareholders (external equity) and the amount of retained earnings (internal equity) that a company re-invests back in the business.

Entities belonging to this Subject Area and their definitions are as follows:

COMMON STOCK ACCOUNT (801) The entity that identifies a dividend equity as common stock. Common stock are units of ownership of a public corporation.

COMMON STOCK ACCOUNT TYPE (802) The entity that identifies the type of common stock accounts. Types of common stock include voting stock and non-voting stock.

DIVIDEND EQUITY ACCOUNT (803) The entity that identifies the equity account has dividends. Types of dividend equities are common stock and preferred stock.

DIVIDEND EQUITY ACCOUNT TYPE (804) The entity that identifies the type of dividend for dividend equity accounts. Types of dividend equities are common stock and preferred stock.

EQUITY ACCOUNT (805) The entity that indicates a general ledger account is an equity account. These accounts are related to ownership interest possessed by the shareholders in a company. Types of equity accounts include dividend equity and non-dividend equity.

EQUITY ACCOUNT TYPE (806) The entity that identifies the type of equity account. Types of equity accounts include dividend equity and non-dividend equity.

EQUITY SURPLUS ACCOUNT (807) The entity that identifies the net worth that is from stock issued at a premium over par or stated value.

FOREIGN CURRENCY ADJ ACCOUNT (808) The entity that identifies a non-dividend equity as a foreign currency adjustment. Foreign currency adjustments are the gains or losses resulting from a translation of one currency into another.

NONDIVIDEND EQUITY ACCOUNT (809) The entity that identifies the type of non-dividend equity. Types of non-dividend equities include retained earnings, treasury stock and foreign currency adjustments.

NONDIVIDEND EQUITY ACCT TYPE (810) The entity that Identifies the type of non-dividend equity accounts. Types of non-dividend equity accounts include retained earnings, treasury stock and foreign currency adjustments.

NONVOTING STOCK ACCOUNT (811) The entity that identifies a common stock dividend equity as a non-voting stock. Non-voting stock equities of a public corporation do not posses voting rights.

PREFERRED STOCK ACCOUNT (812) The entity that identifies a dividend equity as preferred stock. Preferred stock has preference over common stock in the payment of dividends and the liquidation of assets.

RETAINED EARNING ACCOUNT (813) The entity that identifies a non-dividend equity as retained earnings.

Retained earnings are net profits kept to accumulate in a business after dividends are paid.

TREASURY STOCK ACCOUNT (814) The entity that identifies a non-dividend equity as treasury stock. Treasury stock is required by the issuing company and is available for resale or retirement.

VOTING STOCK ACCOUNT (815) The entity that identifies a common stock dividend equity as a voting stock. Voting stock equities of a public corporation have voting rights.

FM EXPENSE Subject Area

The FM EXPENSE Subject Area tracks expense detail data, effecting easy tracking of expenses, e.g. salaries, product costs, etc., by Accounting Period (time), Travel Transaction, Customer, etc.

The entities of the FM EXPENSE Subject Area, illustrated in FIGS. 9A through 9D, are defined as follows:

BENEFITS EXPENSE (901) The entity that provides details for benefit accounts. Benefits are set-aside for associates for services rendered. Benefit accounts are a type of labor accounts.

COST OF SALES ACCOUNT (902) The entity that indicates the expense account is a cost of sales. These are costs a company incurs to purchase products or services that it sells.

EXPENSE ACCOUNT (903) The entity that indicates a general ledger account is an expense account. Types of expense accounts include operating expense, interest expense and other expense.

EXPENSE ACCOUNT TYPE (904) The entity that indicates the type of expense account. Types of expense accounts include cost of sales, operating expense, interest expense, interest income and other expense.

FACILITY OP EXPENSE ACCOUNT (905) The entity that indicates the operating expense pertains to facilities. Facility expenses are related to the maintenance of a physical facility.

GENERAL AND ADMIN ACCOUNT (906) The entity that indicates the operating expense pertains to general and administrative. These expenses are typically classified as administrative in nature. For example: advertising, salaries, commissions, office expense, etc.

INTEREST EXPENSE ACCOUNT (907) The entity that indicates the expense account is an interest expense. Interest expense is paid to bondholder's for the use of their money.

LABOR EXPENSE (908) The entity that indicates labor expenses related to salary, wages and benefits for operating expenses such as marketing expense, general and administrative and research and development.

LABOR EXPENSE TYPE (909) The entity that indicates the type of labor expense. Labor expenses include salary, wages and benefits.

MARKETING EXPENSE ACCOUNT (910) The entity that indicates the operating expense pertains to marketing. Marketing expenses are related the actual marketing of a product (i.e. advertising).

OPERATING EXPENSE ACCOUNT (911) The entity that indicates the expense account is an operating expense. Operating expenses are those that are required to run a company.

OPERATING EXPENSE ACCOUNT TYPE (912) The entity that indicates the type of operating expense accounts. Operating expenses include selling, marketing, general and administrative, research and development, facilities and others.

OTHER EXPENSE ACCOUNT (913) The entity that indicates the expense account is for other operating expense. Other expenses are those that are required to run a company and cannot be classified as one of the other types of expenses.

OTHER OP EXPENSE ACCOUNT (914) The entity that indicates the operating expense pertains to other operating expenses. These expenses are general in nature and cannot be classified as one of the other types of operating expenses.

R AND D EXPENSE ACCOUNT (915) The entity that indicates the operating expense pertains to research and development. Research and development expenses are related to research and development of products or services for a company.

SALARY (916) The entity that provides details for salary accounts. Salary is compensation paid to associates for services rendered. Salary accounts are a type of labor accounts.

WAGES (917) The entity that provides details for wage accounts. Wages is compensation paid to hourly employees for services rendered. Wage accounts are a type of labor accounts.

Figure 10A:
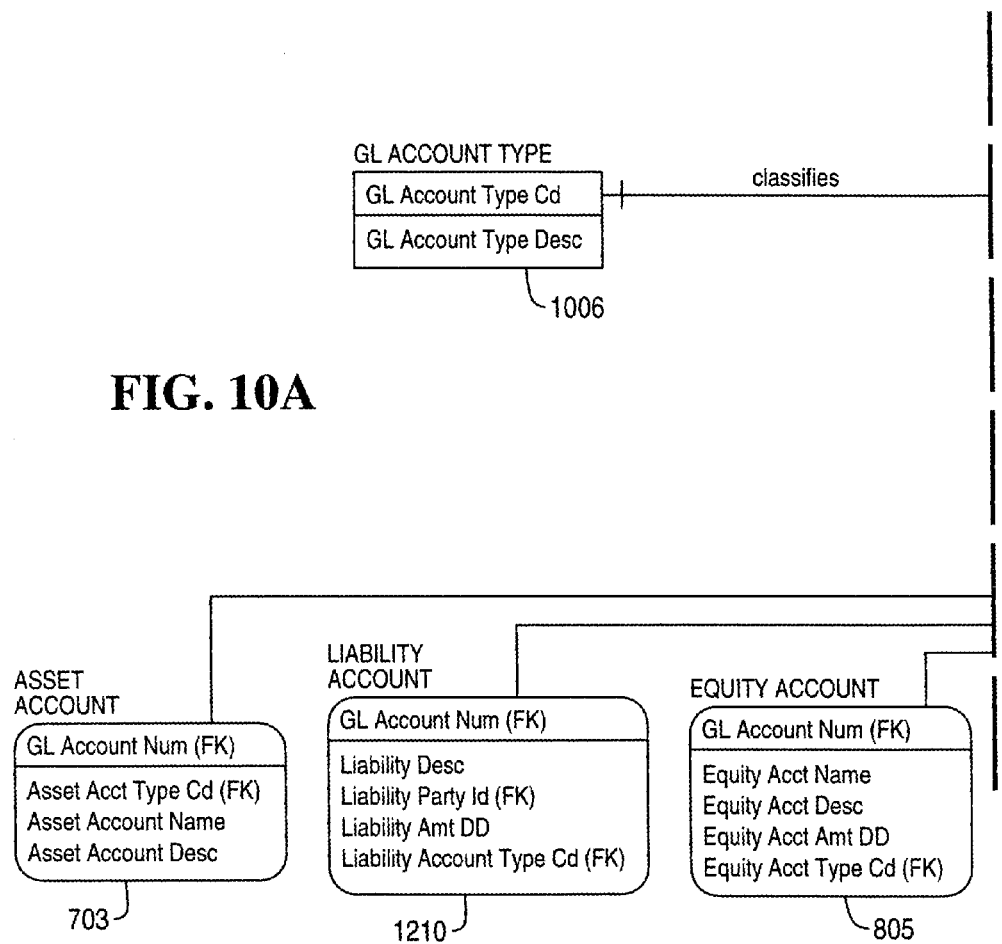
Figure 10C:
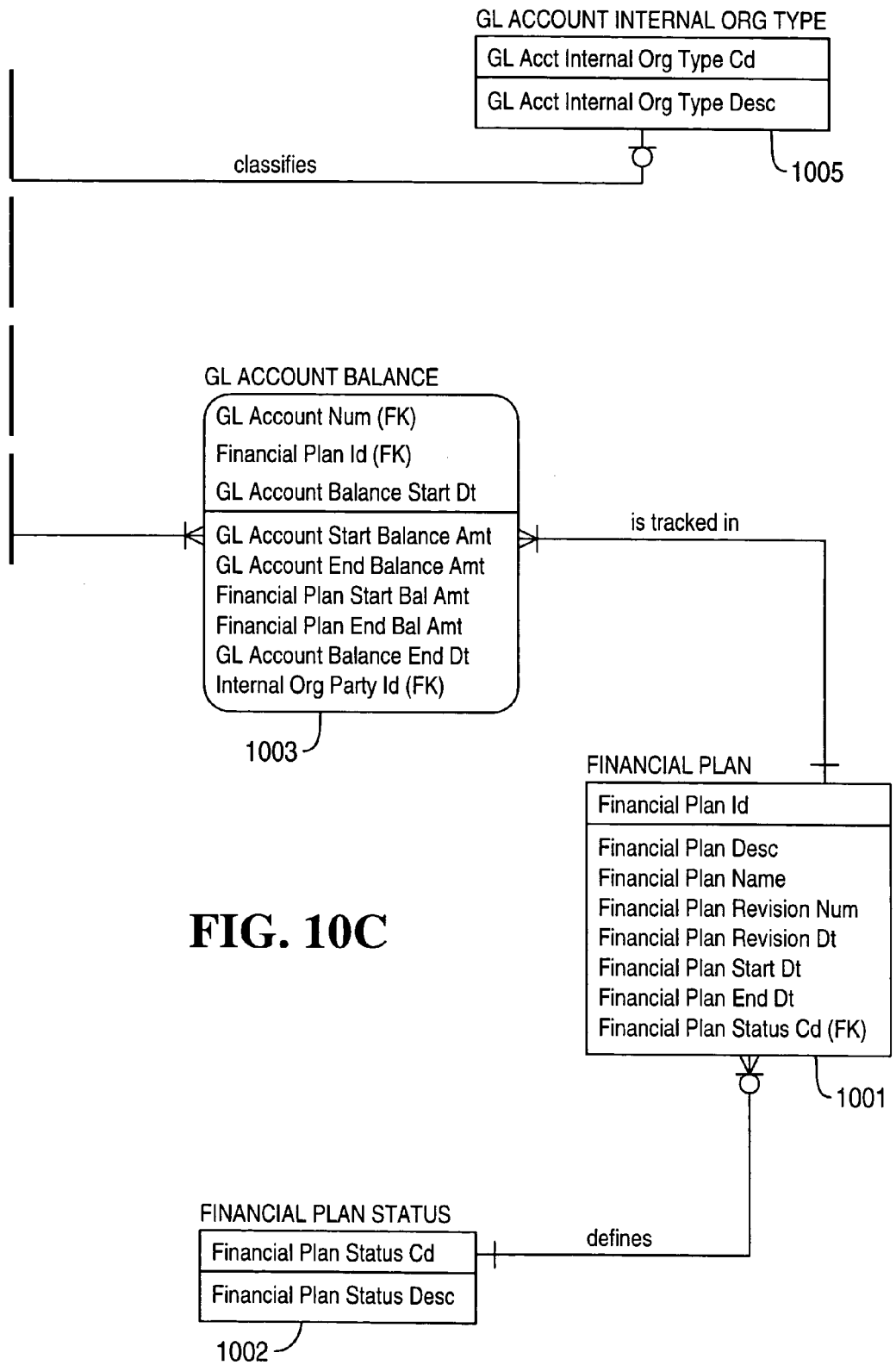

FM GENERAL LEDGER ACCOUNT Subject Area FIGS. 10A through 10C illustrate an entity-relationship diagram of the FM GENERAL LEDGER subject area of the Travel Logical Data Model. The FM GENERAL LEDGER subject area contains various entities that contain information about an airline or other travel provider's accounting transactions and their details.

There are five main types of General Ledger Accounts. They are ASSET ACCOUNT, LIABILITY ACCOUNT, EXPENSE ACCOUNT, REVENUE ACCOUNT and EQUITY ACCOUNT. Each account in turn may have subledgers. For example, ASSET ACCOUNT consists of FIXED ASSET or CURRENT ASSET, etc.

Entities belonging to this Subject Area and their definitions follow:

FINANCIAL PLAN (1001) The entity that provides details about how much money is planned to be available, how it is to be divided up and spent for various purposes.

FINANCIAL PLAN STATUS (1002) The entity that provides the status of a financial plan.

GL ACCOUNT BALANCE (1003) The entity that indicates the balance amounts for various combinations of projects, departments and general ledger accounts.

GL ACCOUNT INTERNAL ORG (1004) The entity that provides an association between general ledger accounts and internal departments.

GL ACCOUNT INTERNAL ORG TYPE (1005) The entity that indicates the types of general ledger accounts and how internal organizations use them.

FM JOURNAL ENTRY Subject Area

Figure 11A:
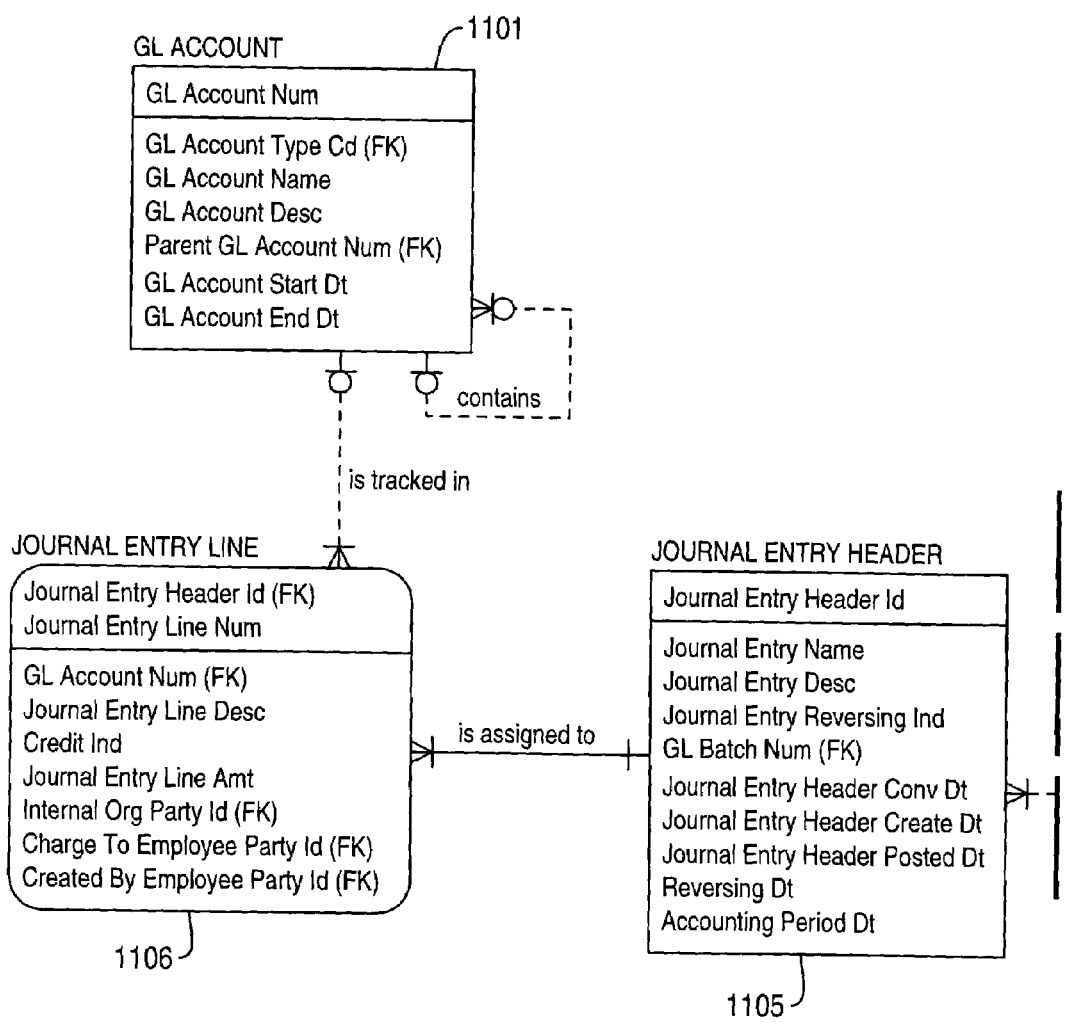
FIGS. 11A and 11B illustrate an entity-relationship diagram of the FM JOURNAL ENTRY Subject Area of the logical data model in accordance with the preferred embodiment of the present invention.
Figure 11B:
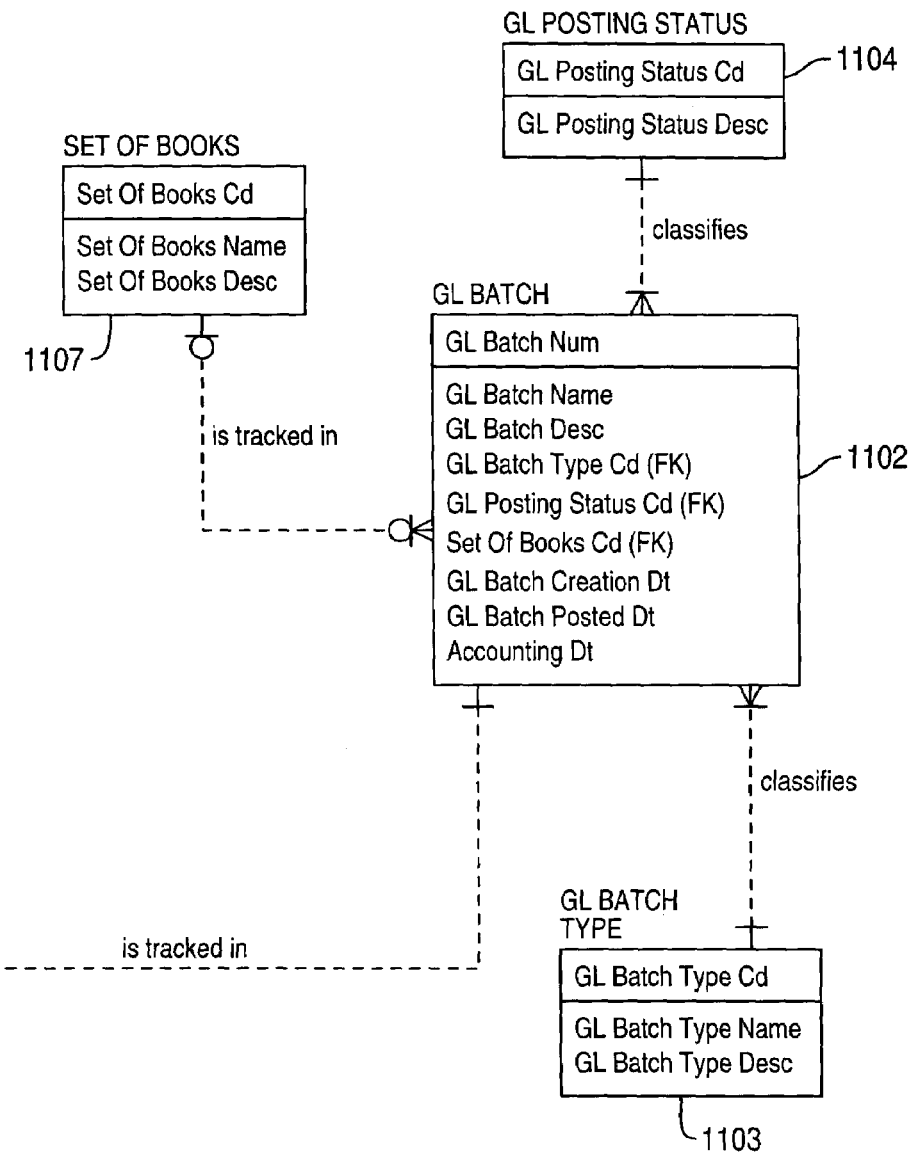

FIGS. 11A and 11B illustrate an entity-relationship diagram of the FM JOURNAL ENTRY Subject Area of the Travel Management Logical Data Model. When manual accounting systems were the norm, transactions were first recorded in the Journal and then "posted" to the ledger. The Journal is a record of accounting transactions in the order of occurrence. Supporting information referencing the events or items affected are recorded in the Journal as an entry.

Usually journal entries are batch processed into the general ledger system by the feeder systems. For example, an airline's expense reimbursement system likely interfaces with the general ledger on a periodic cycle, resulting in a batch posting of journal entries. A journal entry has one header and multiple lines, each journal entry line having a monetary amount that can be translated to accommodate the airlines' standard currency. A large airline will likely have many sets of books to track journal entries. This is a mechanism to help manage the accounting process. An internal organization will use many general ledger accounts to record transactions, but only one set of books.

Entities belonging to this Subject Area and their definitions are as follows:

GL ACCOUNT TYPE (1006) The entity that indicates the types of general ledger accounts.

GL ACCOUNT (1101) The entity that indicates accounts used in financial transactions for a company. This includes both the general ledger and subsidiary ledger accounts.

GL BATCH (1102) The entity that groups journal entries into general ledger transactions.

GL BATCH TYPE (1103) The entity that indicates the type of general ledger batch.

GL POSTING STATUS (1104) The entity that indicates the posting status of a general ledger batch.

JOURNAL ENTRY HEADER (1105) The entity that provides summary of an accounting transaction recorded in the general ledger.

JOURNAL ENTRY LINE (1106) The entity that provides details of an accounting transaction usually, credit or debit recorded for a transaction. One journal entry header will have multiple journal entry lines.

SET OF BOOKS (1107) The entity that indicates a collection of accounting transactions used by a company. A collection is typically referred to as a 'set of books'.

FM LIABILITIES Subject Area

Figure 12A:
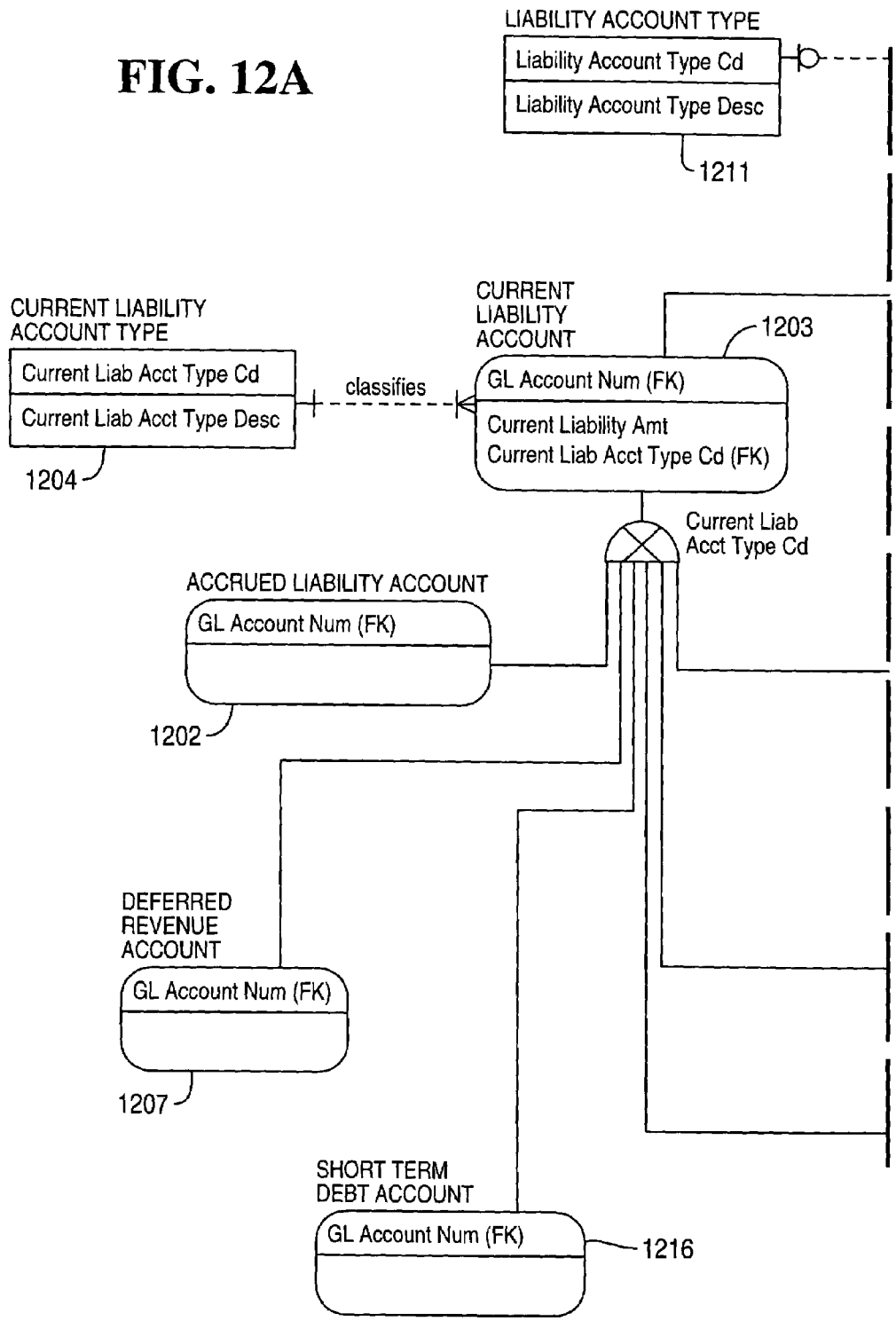
FIGS. 12A through 12C illustrate an entity-relationship diagram of the FM LIABILITIES Subject Area of the logical data model in accordance with the preferred embodiment of the present invention.
Figure 12B:
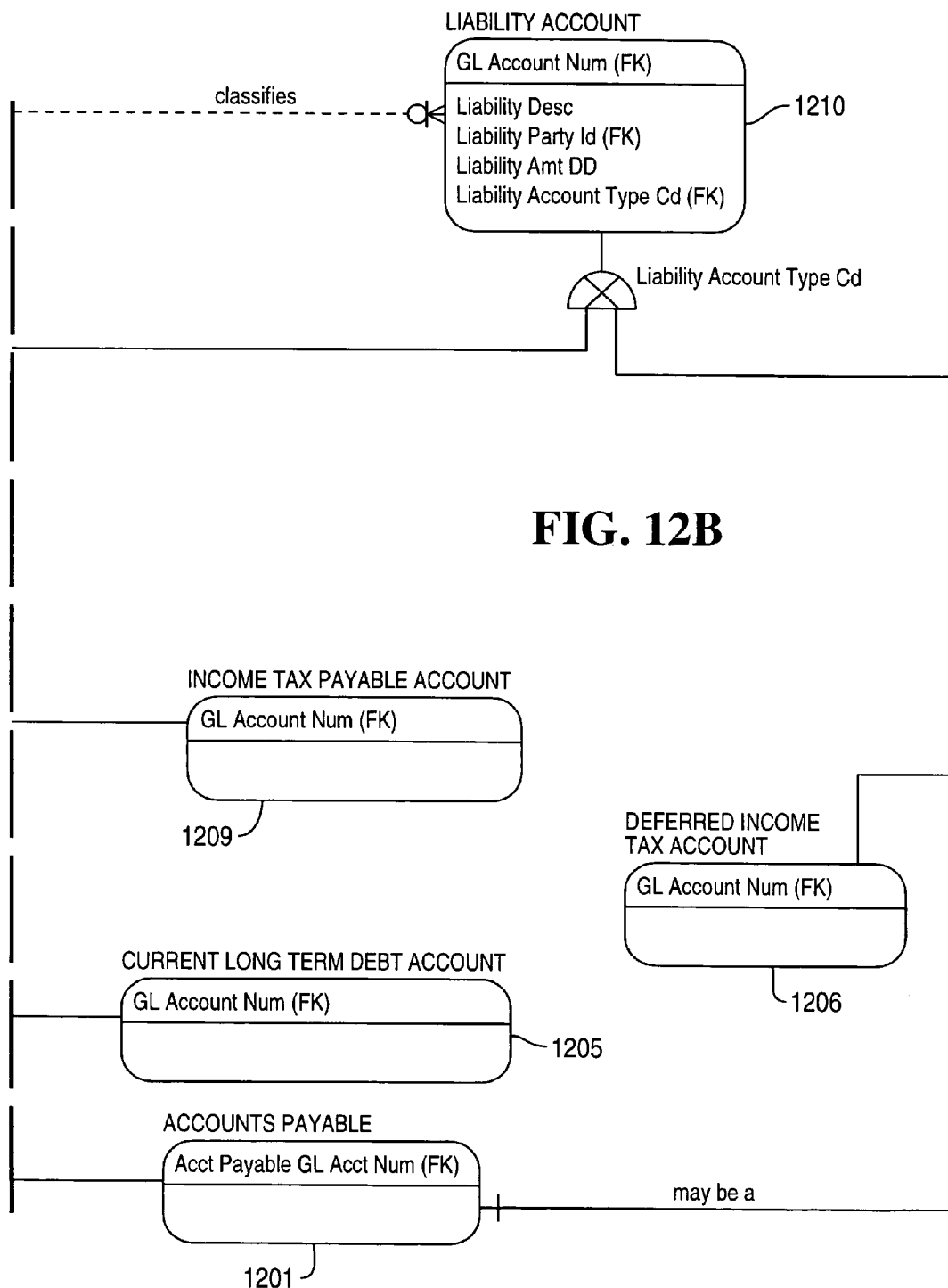
Figure 12C:
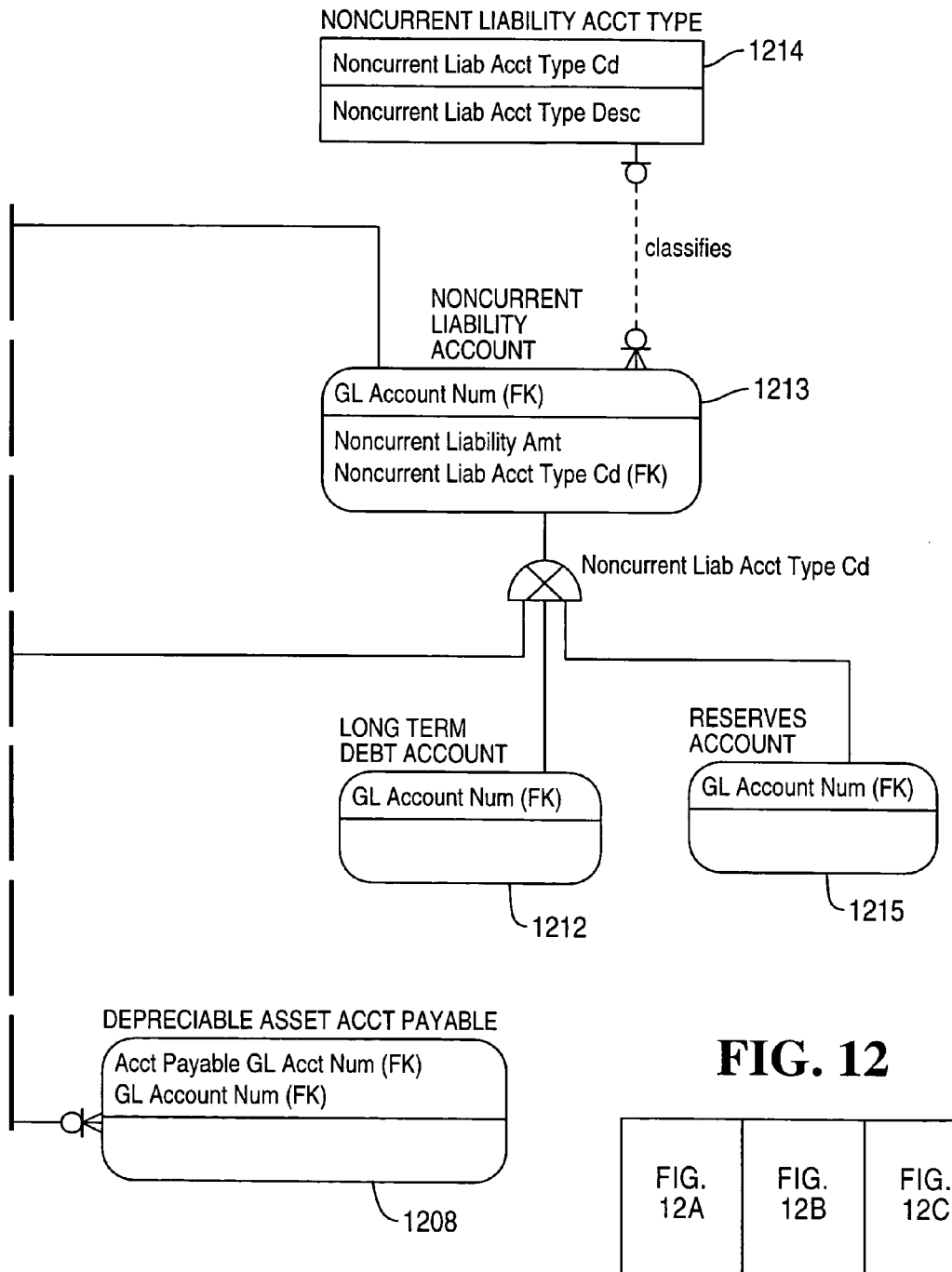

FIGS. 12A through 12C illustrate an entity-relationship diagram of the FM LIABILITIES subject area of the Travel Logical Data Model. The FM LIABILITIES subject area stores information concerning various liabilities of a travel company.

The entities of the LIABILITIES subject area are defined as follows:

ACCOUNTS PAYABLE (1201) The entity that provides details of accounts payable for a company. Accounts payable records how much a company owes suppliers for the purchase of supplies or services on credit.

ACCRUED LIABILITY ACCOUNT (1202) The entity that provides details for the accrued liabilities. Accrued liabilities are expenses from prior periods that have not been paid.

CURRENT LIABILITY ACCOUNT (1203) The entity that indicates the types of current liability accounts.

CURRENT LIABILITY ACCOUNT TYPE (1204) The entity that identifies the type of current liability accounts. Types of current liabilities include accrued liability, deferred revenue, short-term debt, current long-term debt, income taxes and accounts payable.

CURRENT LONG TERM DEBT ACCOUNT (1205) The entity that provides details for the current long-term debt. Long-term debt is the principal on the long-term debt due in the next year.

DEFERRED INCOME TAX ACCOUNT (1206) The entity that provides details for the deferred income taxes. Deferred income taxes are the tax liabilities a company may postpone paying until some future time.

DEFERRED REVENUE ACCOUNT (1207) The entity that provides details for the deferred revenue. Deferred revenue is sales or revenues the company has been paid but has not yet earned, such as advance deposits on a contract.

DEPRECIABLE ASSET ACCT PAYABLE (1208) This associative entity provides details of accounts payable for a company and identifies the depreciable fixed asset general ledger account.

INCOME TAX PAYABLE ACCOUNT (1209) The entity that provides details for the income taxes. Income taxes are the amount due to taxing authorities.

LIABILITY ACCOUNT (1210) The entity that indicates a general ledger account is a liability account. These accounts are related to money owed to owner party. Types of liability accounts include current liability and non-current liability.

LIABILITY ACCOUNT TYPE (1211) The entity that identifies the type of liability account. Types of liability accounts are current liability and non-current liability.

LONG TERM DEBT ACCOUNT (1212) The entity that provides details for the long-term debt. Long-term debt is the liability amount due in a year or more.

NONCURRENT LIABILITY ACCOUNT (1213) The entity that indicates the liability account is a non-current liability. Non-current liabilities that are not due in the next twelve months. Types of non-current liabilities include deferred income taxes, long-term debt and reserves.

NONCURRENT LIABILITY ACCT TYPE (1214) The entity that identifies the type of non-current liability accounts. Types of non-current liabilities include deferred income taxes, long-term debt and reserves.

RESERVES ACCOUNT (1215) The entity that provides details for the reserves. Reserves are the accrual of anticipated expenses to be paid out in the future, such as product liability, litigation, etc.

SHORT TERM DEBT ACCOUNT (1216) The entity that provides details for the short term debt. Short term debt is all dept obligations coming due within one year.

FM REVENUE Subject Area

Figure 13:
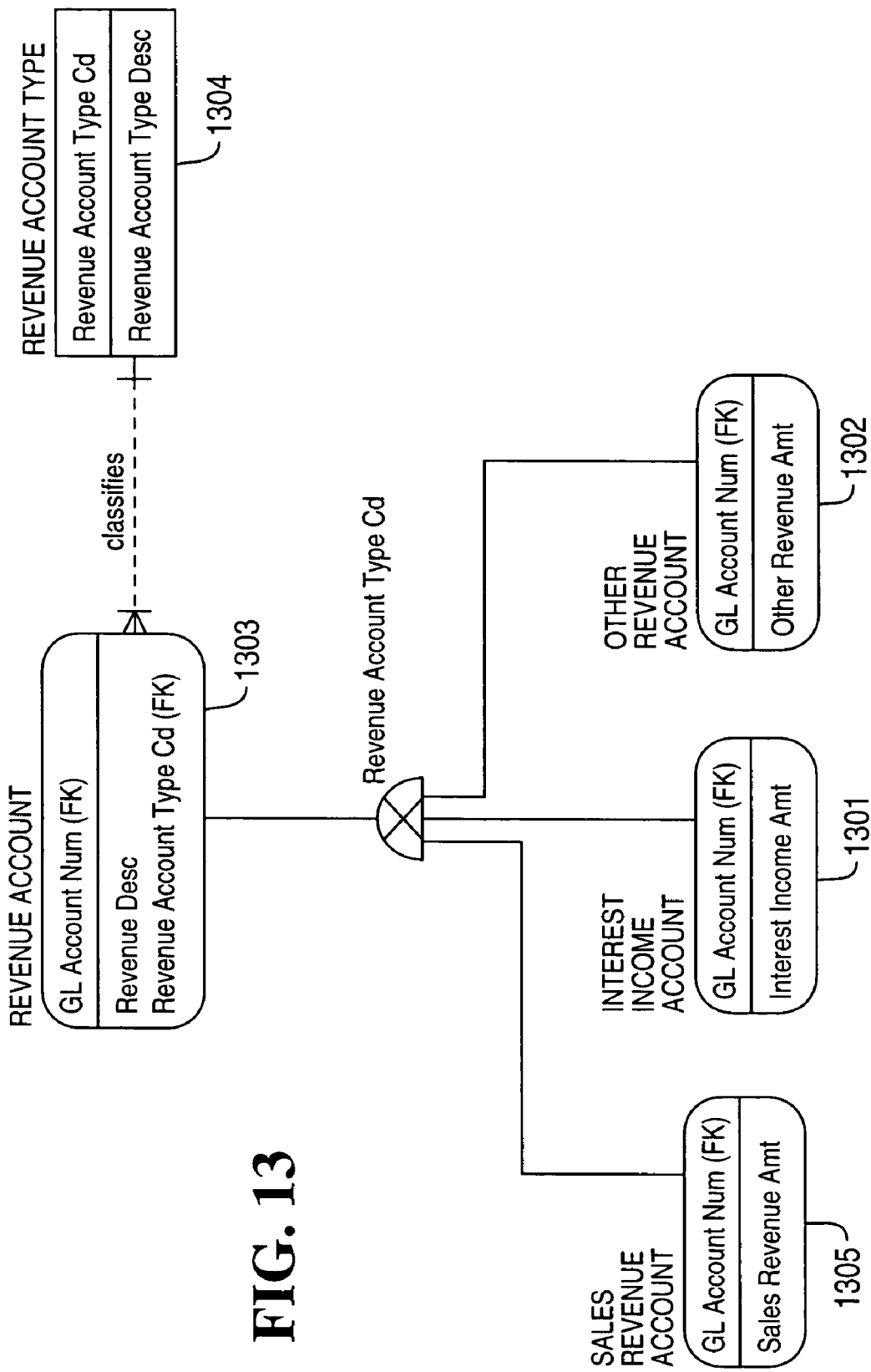
FIG. 13 illustrates an entity-relationship diagram of the FM REVENUE Subject Area of the logical data model in accordance with the preferred embodiment of the present invention.
Figure 14A:
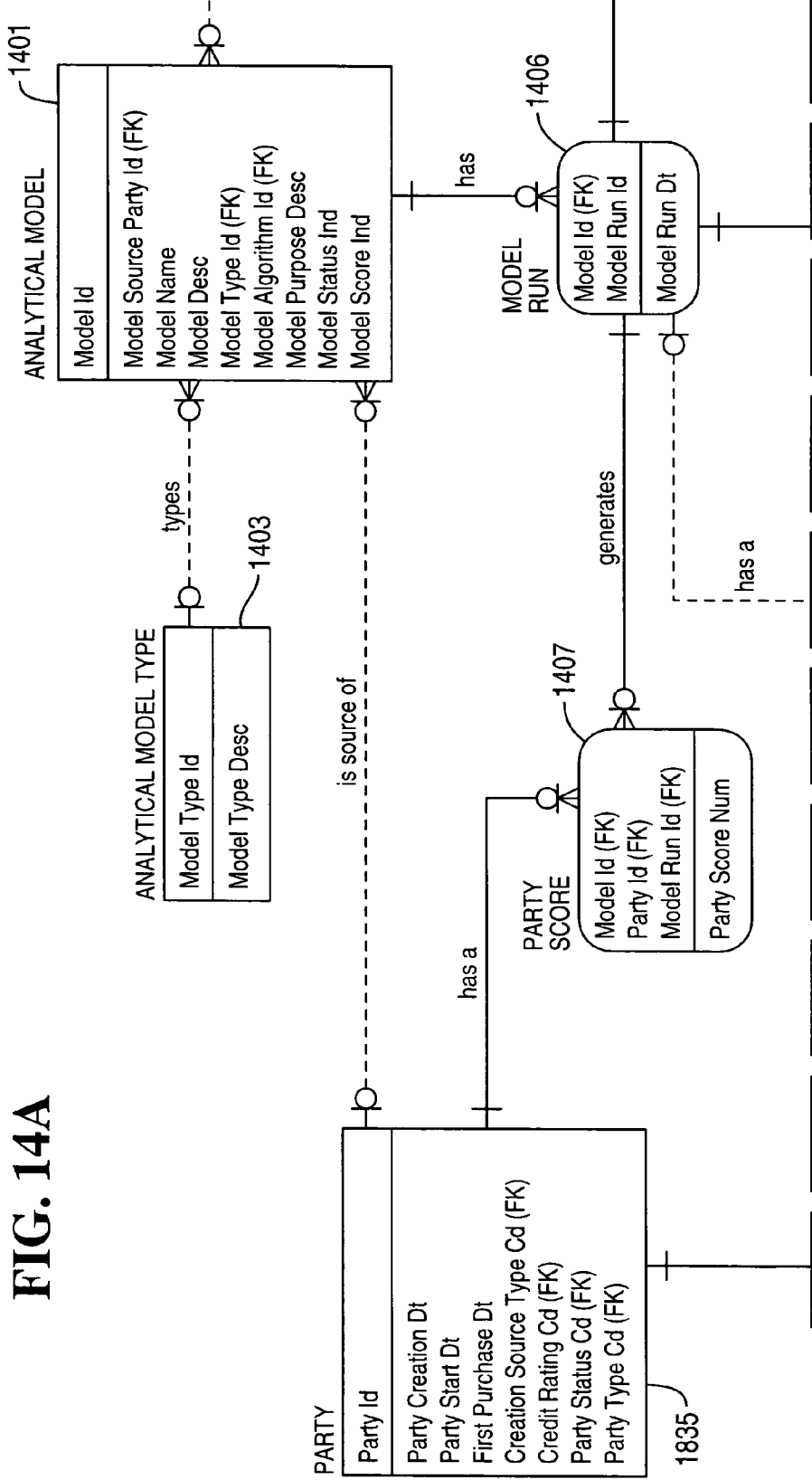
Figure 14C:
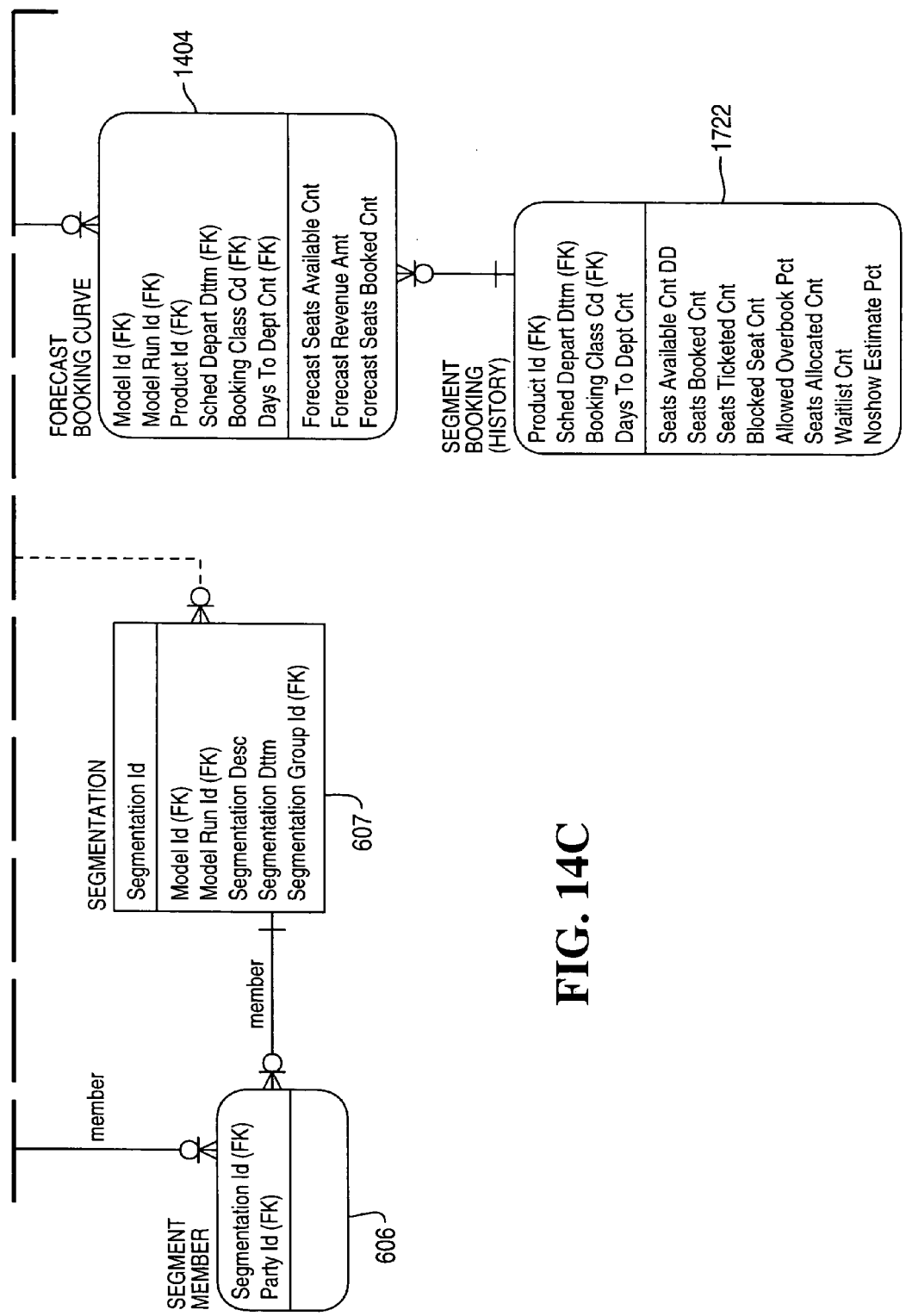
Figure 14D:
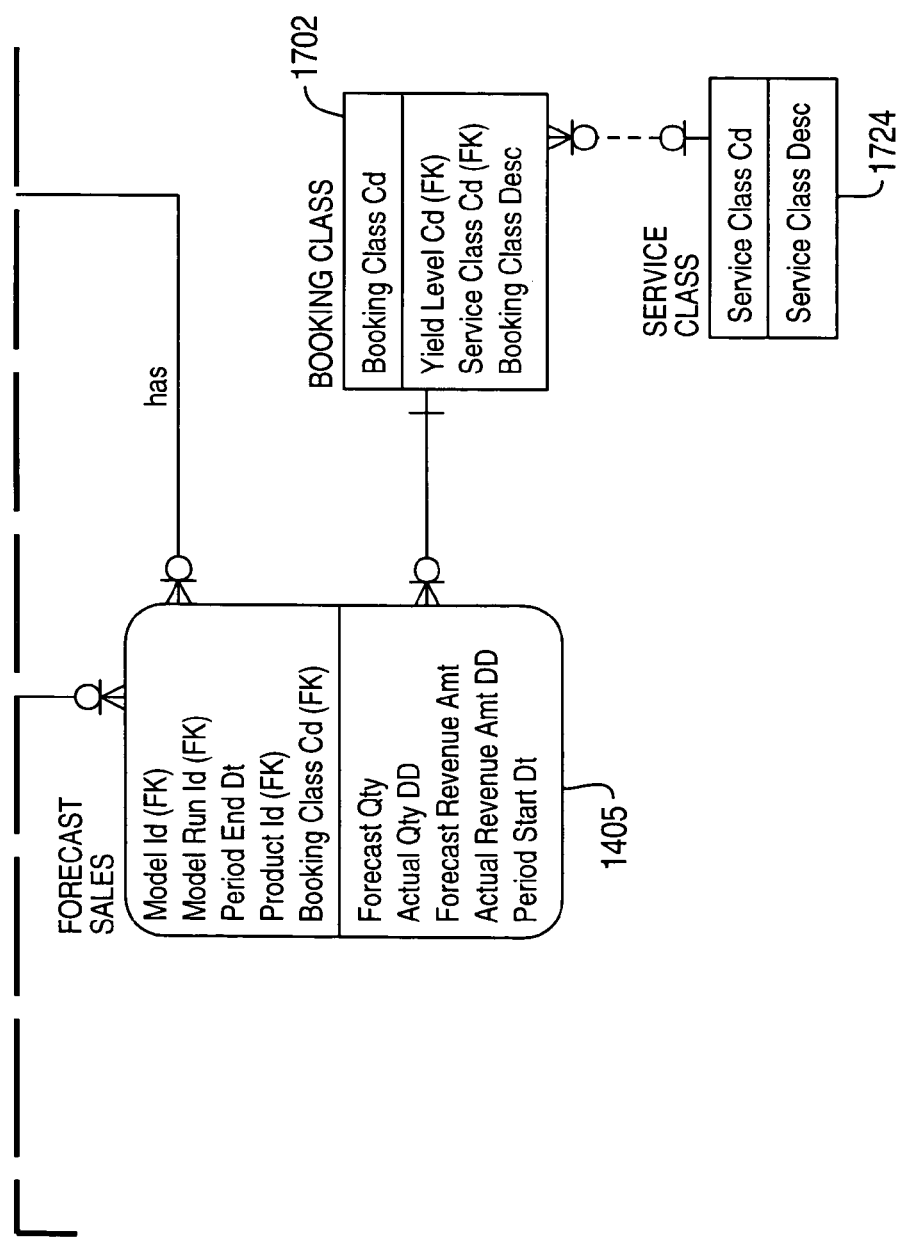
Figure 15A:
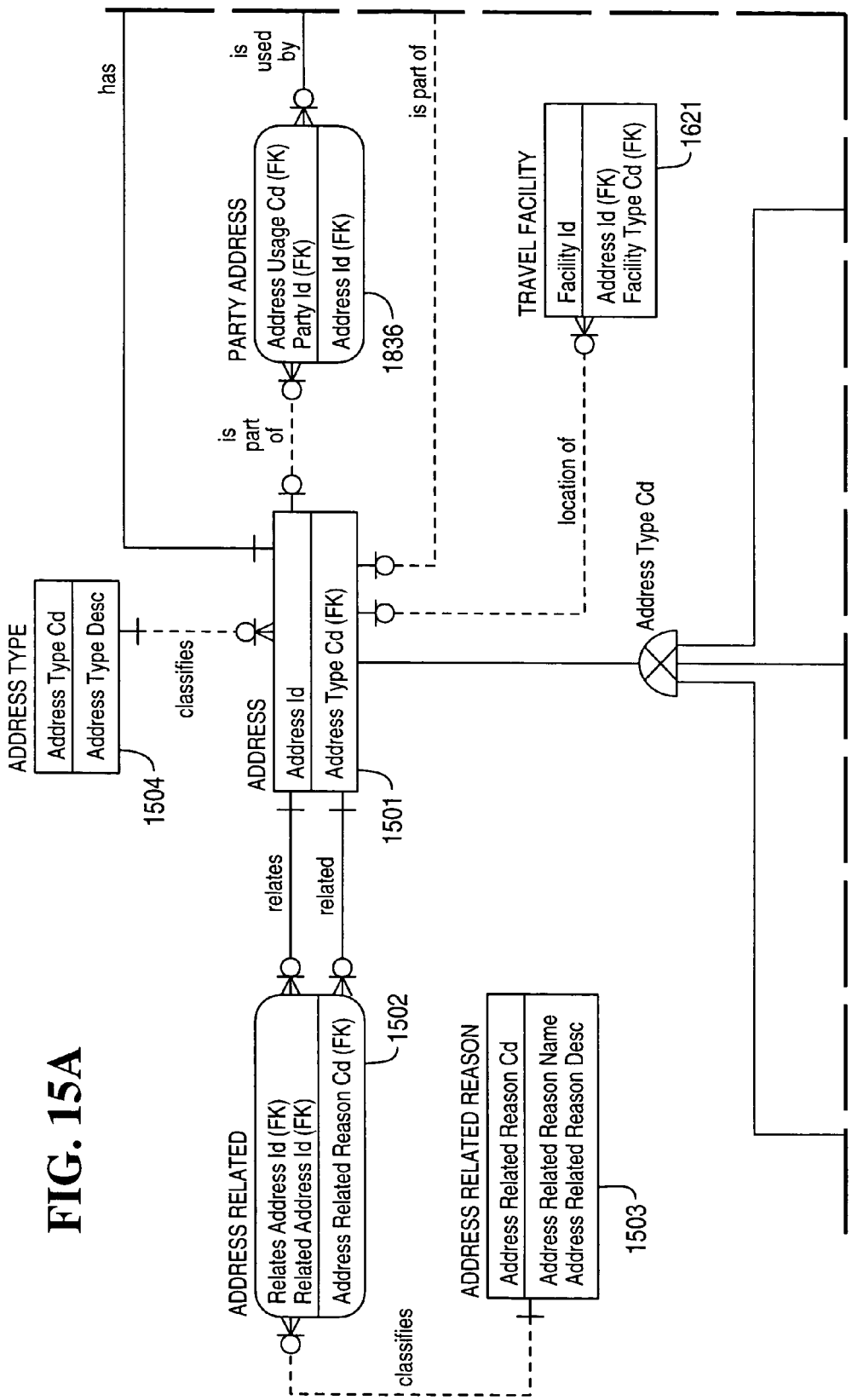
FIGS. 15A through 15D illustrate an entity-relationship diagram of the GEOGRAPHY Subject Area of the logical data model in accordance with the preferred embodiment of the present invention.
Figure 15B:
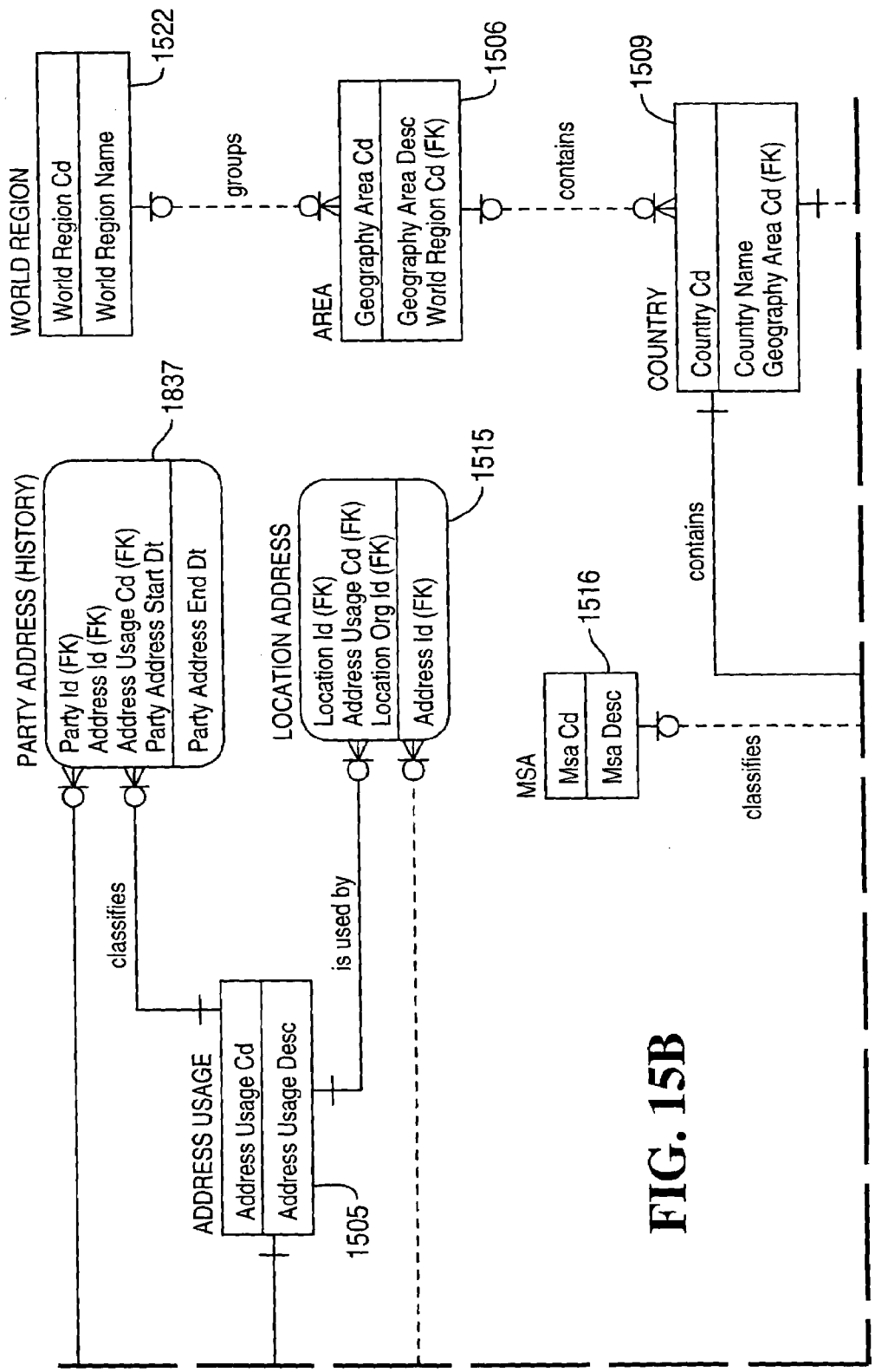
Figure 15C:
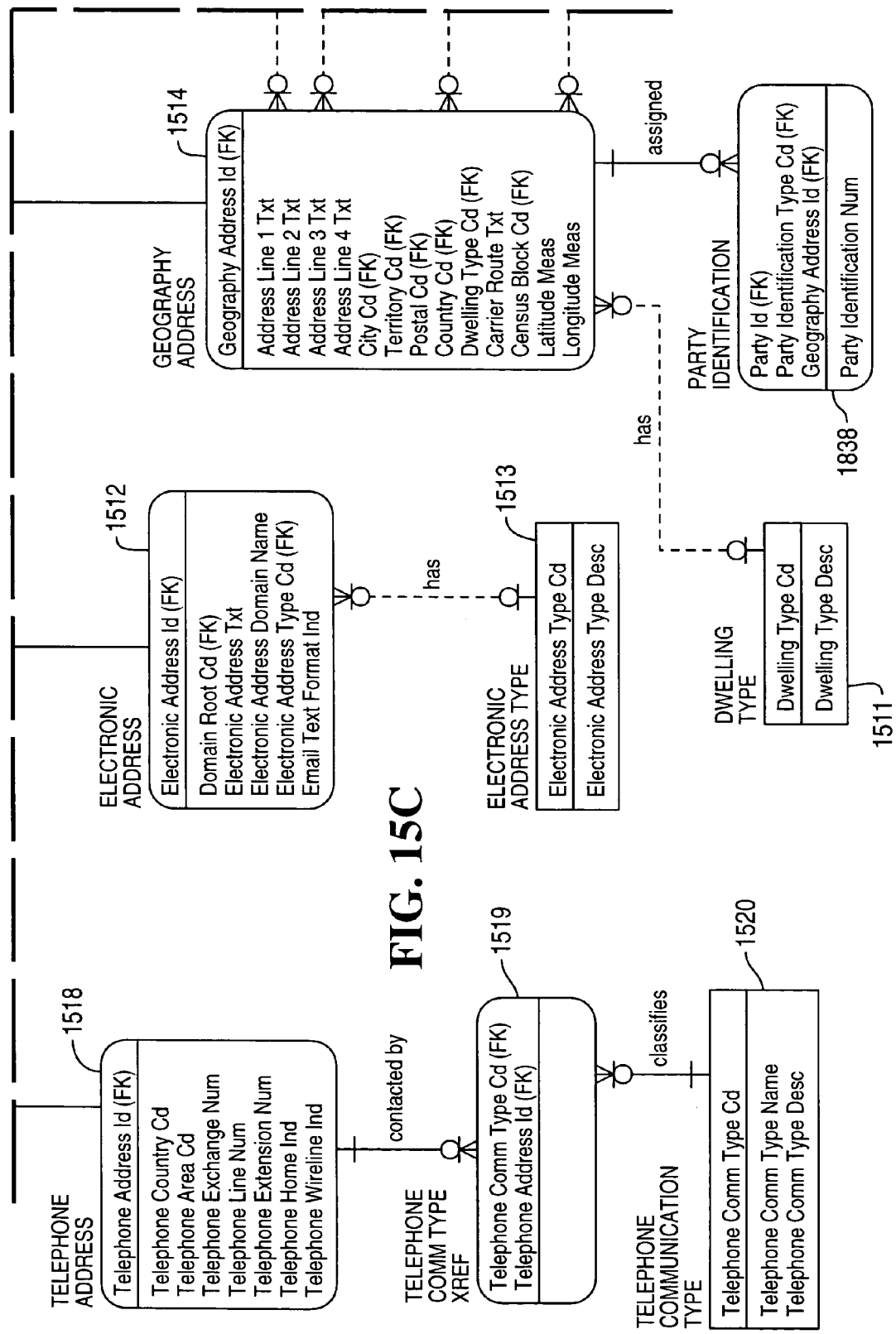
Figures 15, 15D:
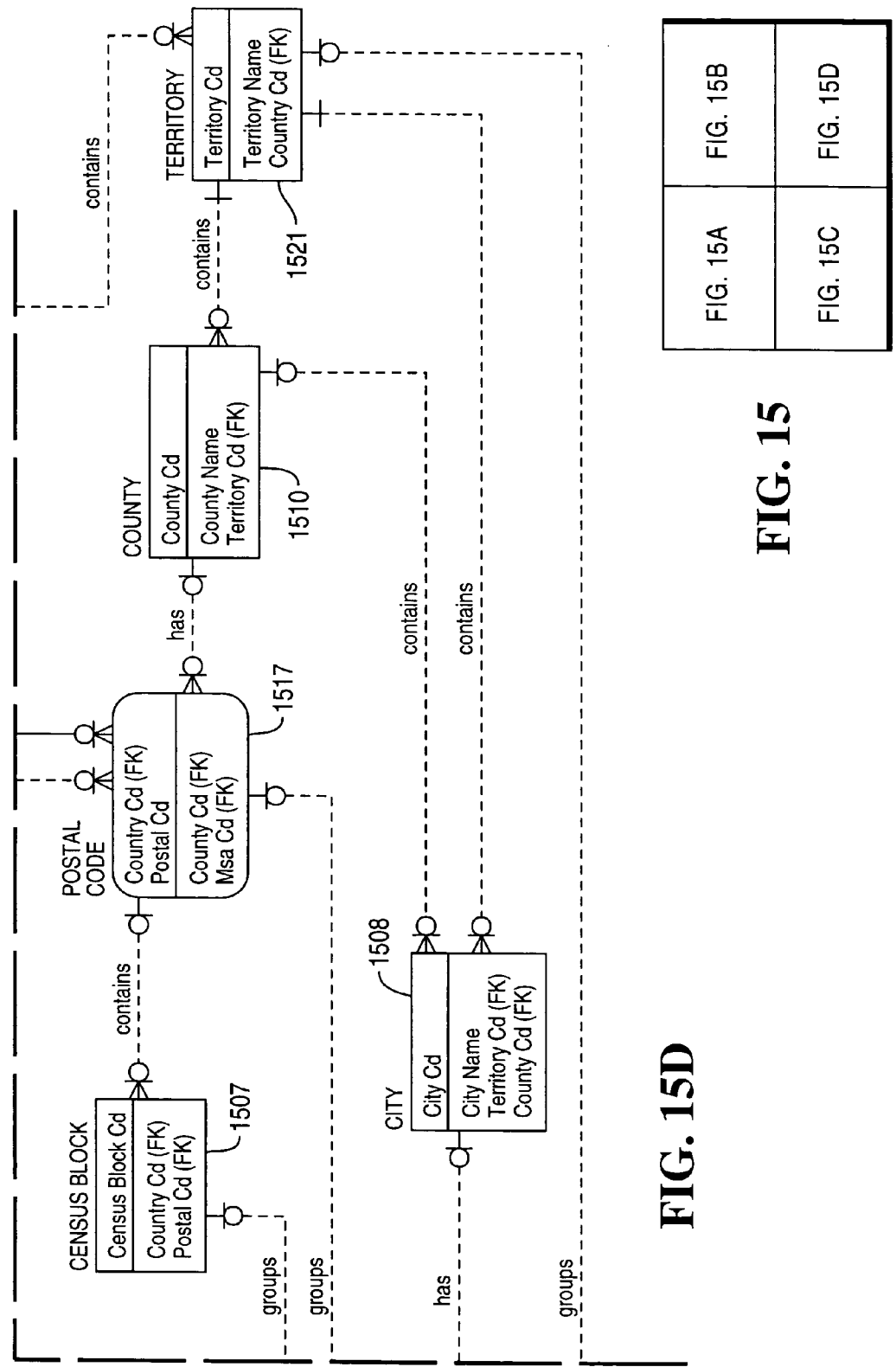
Figures 16, 16A:
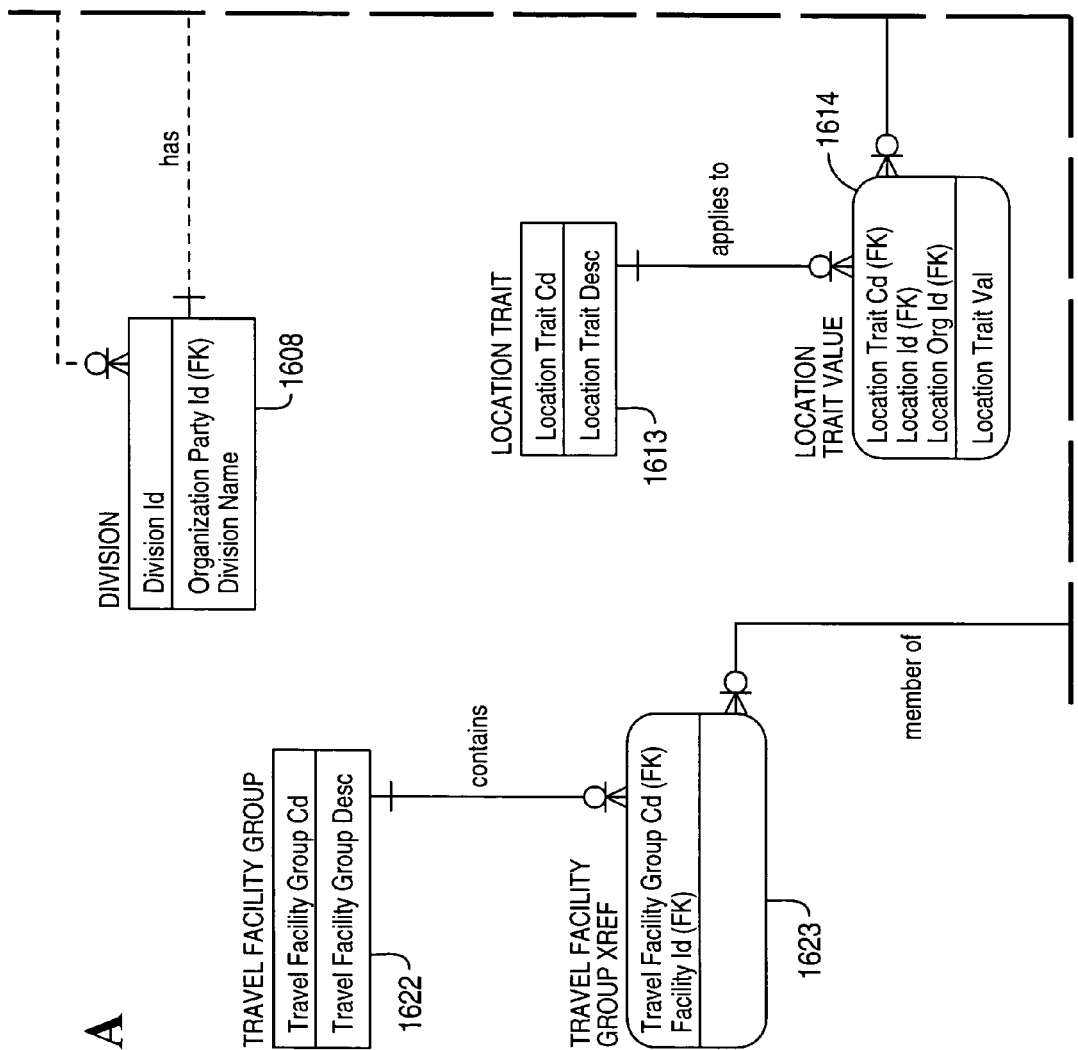
FIGS. 16A through 16D illustrate an entity-relationship diagram of the LOCATION Subject Area of the logical data model in accordance with the preferred embodiment of the present invention.
Figure 16B:
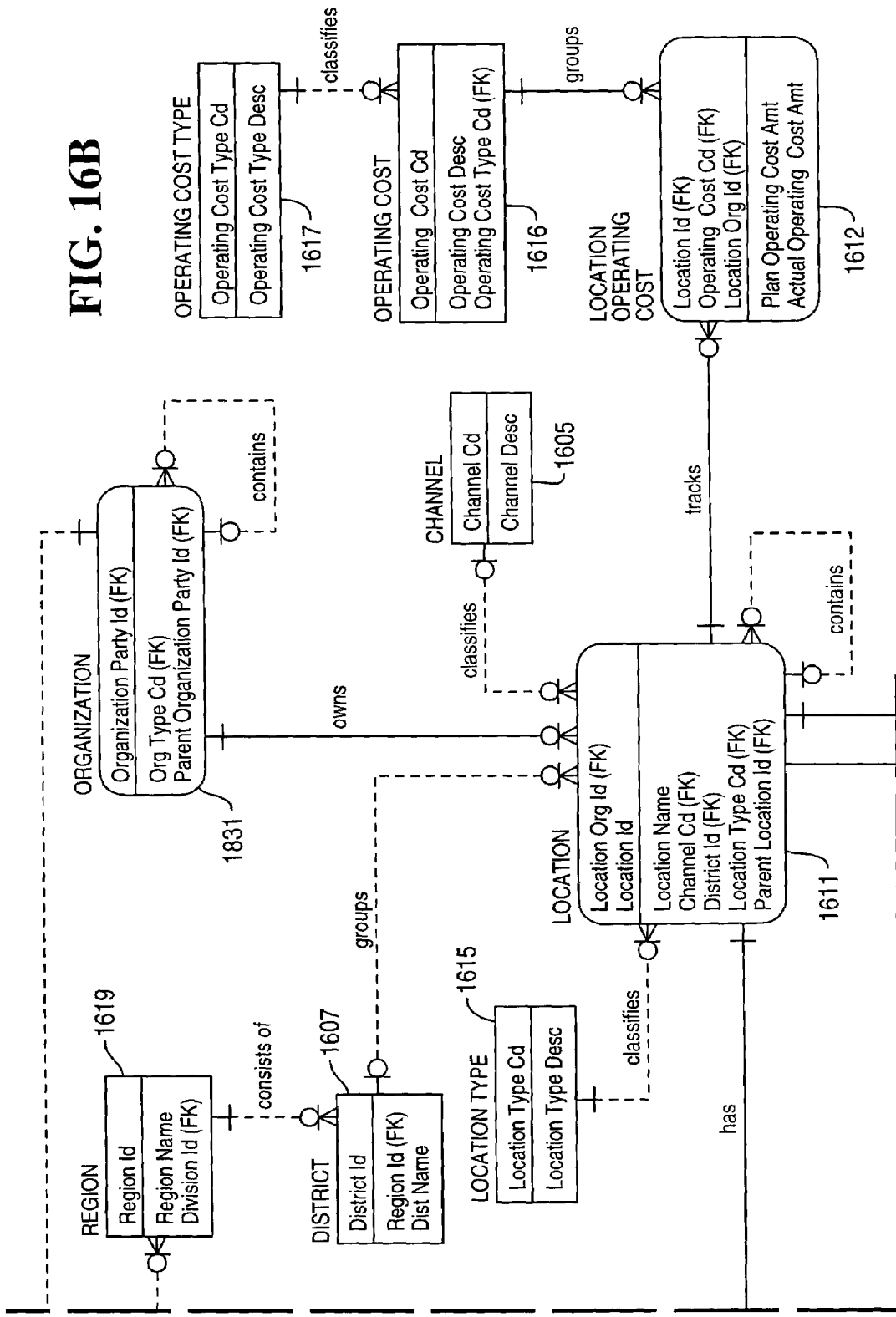
Figure 16C:
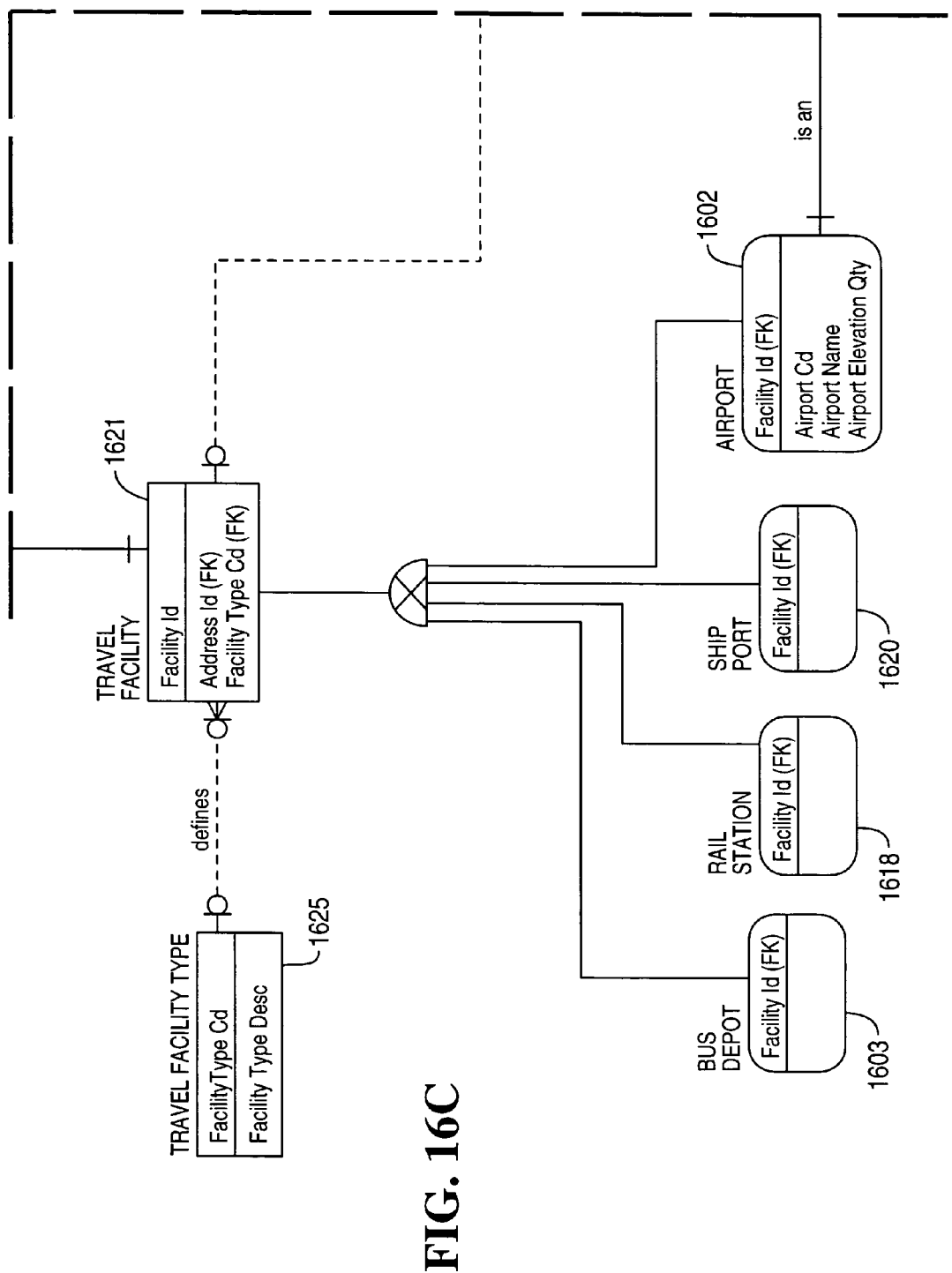
Figure 16D:
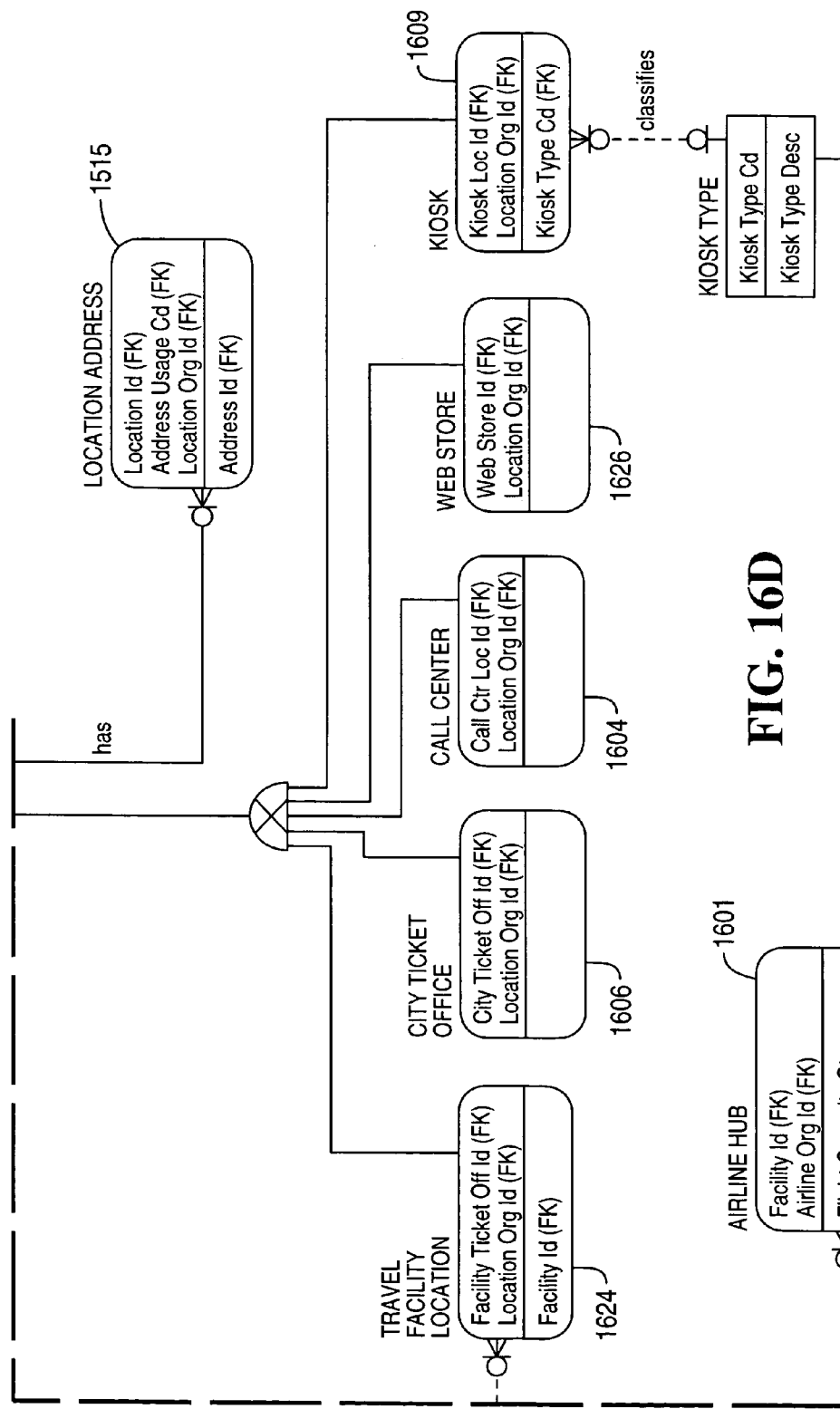
Figure 17A:
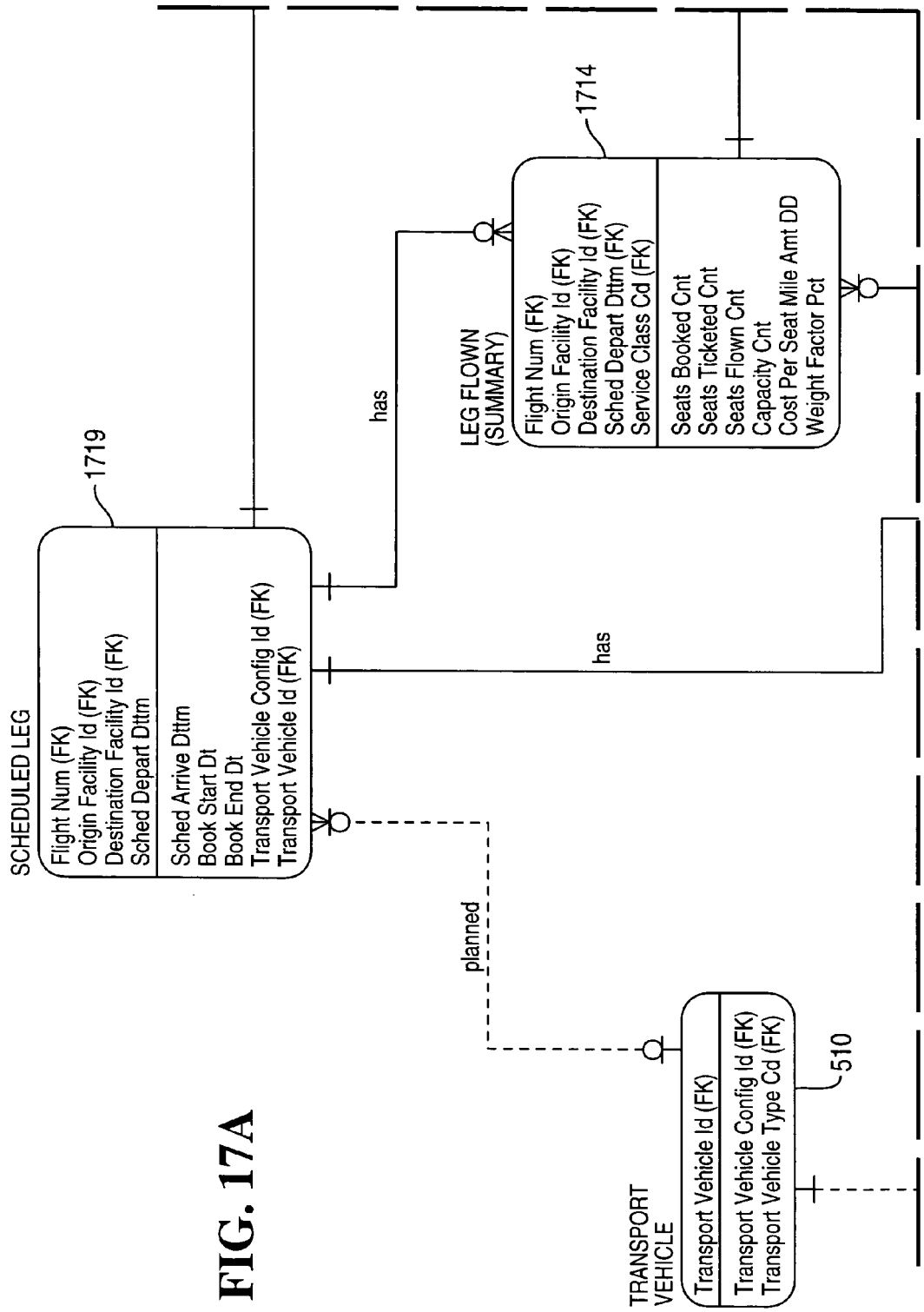
Figure 17B:
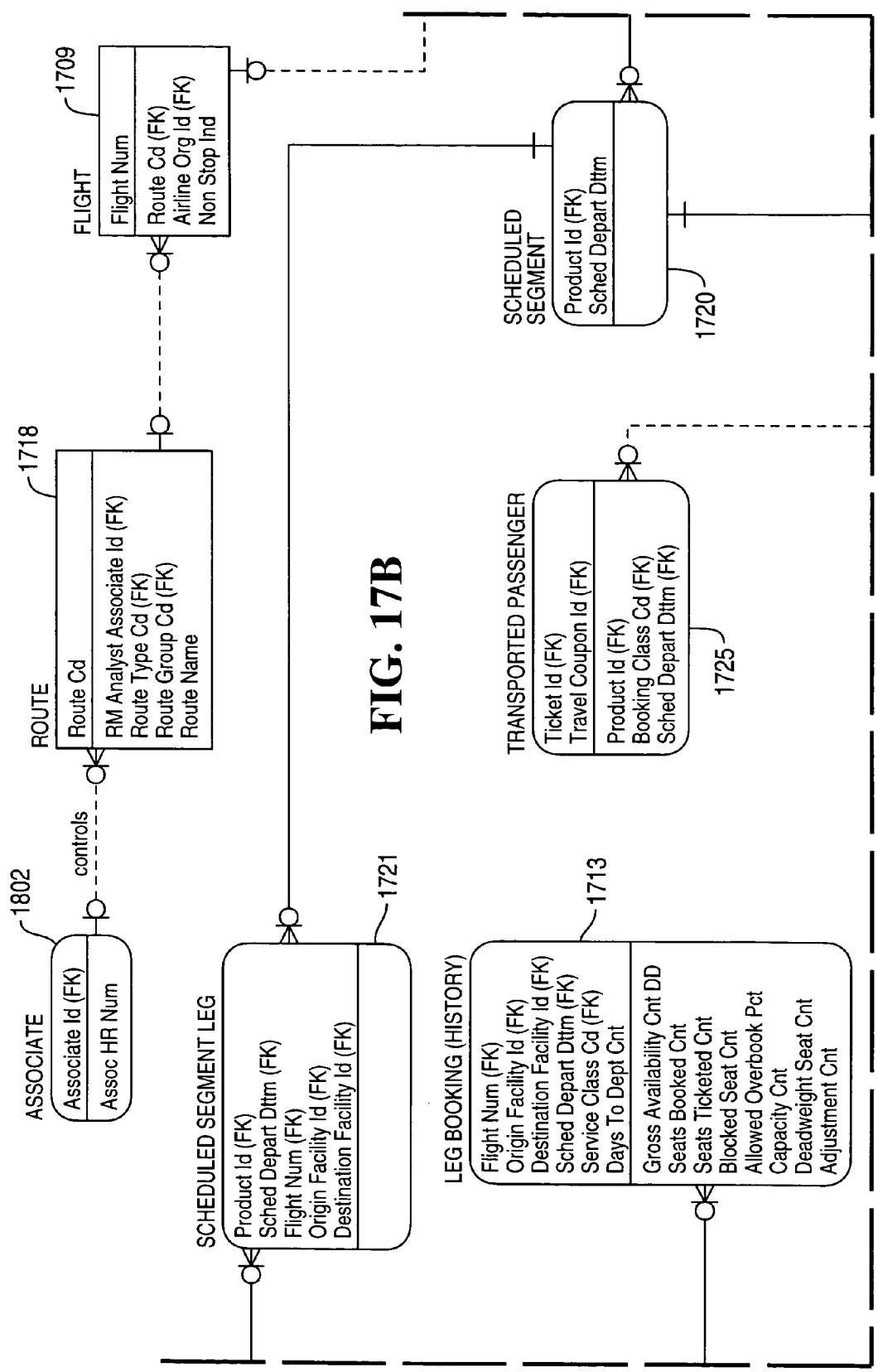
Figure 17D:
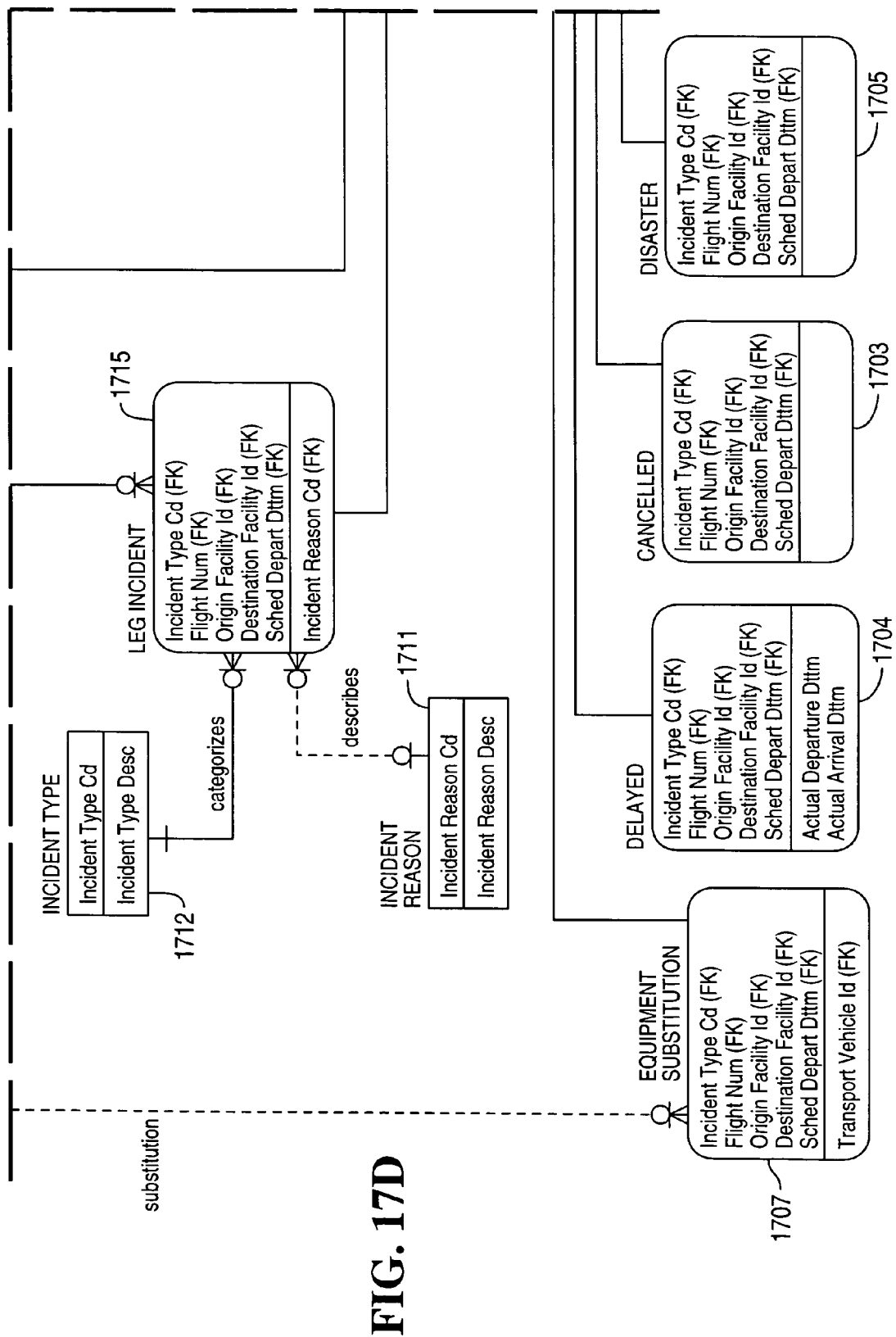
Figure 17E:
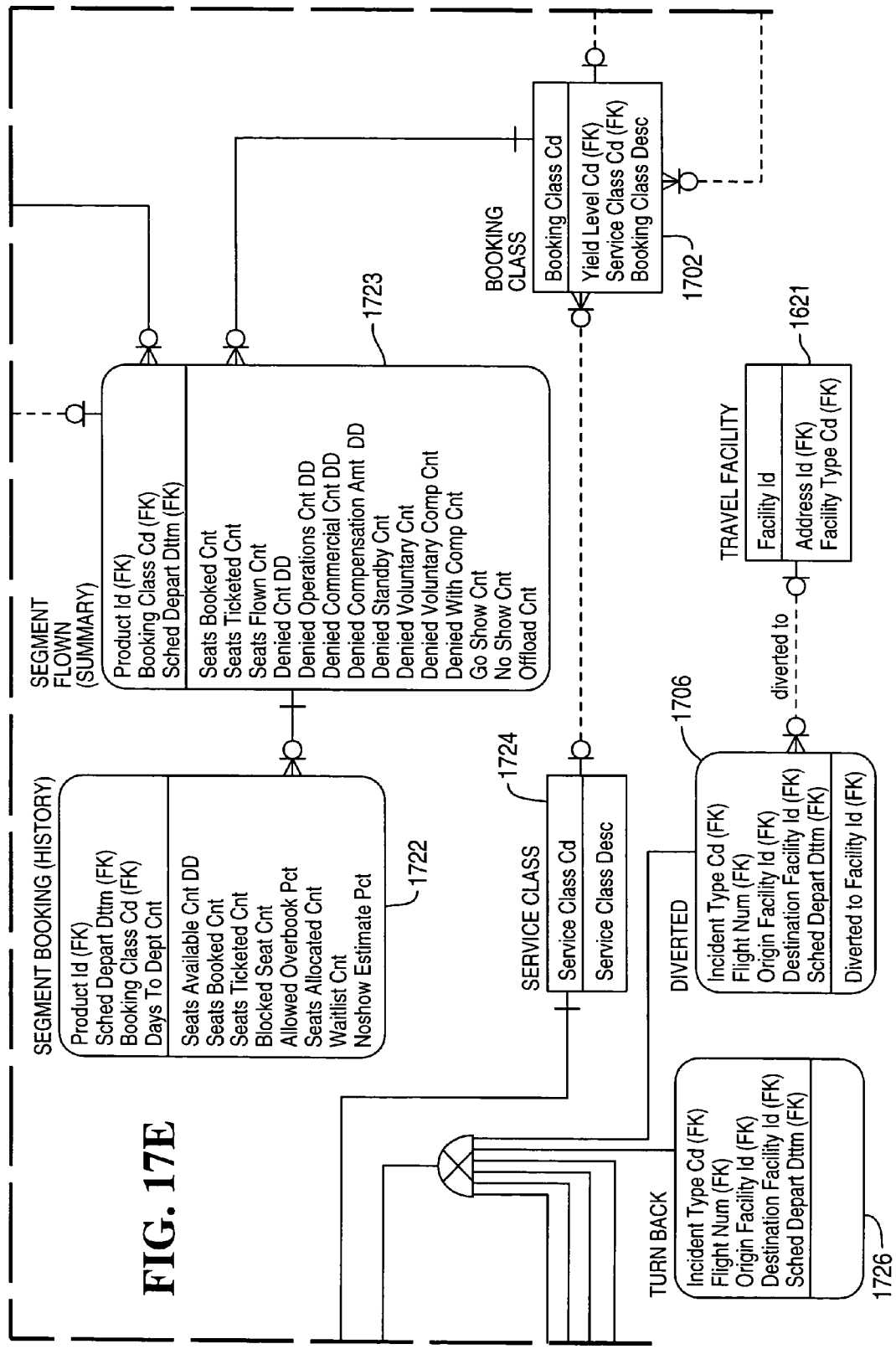
Figure 18A:
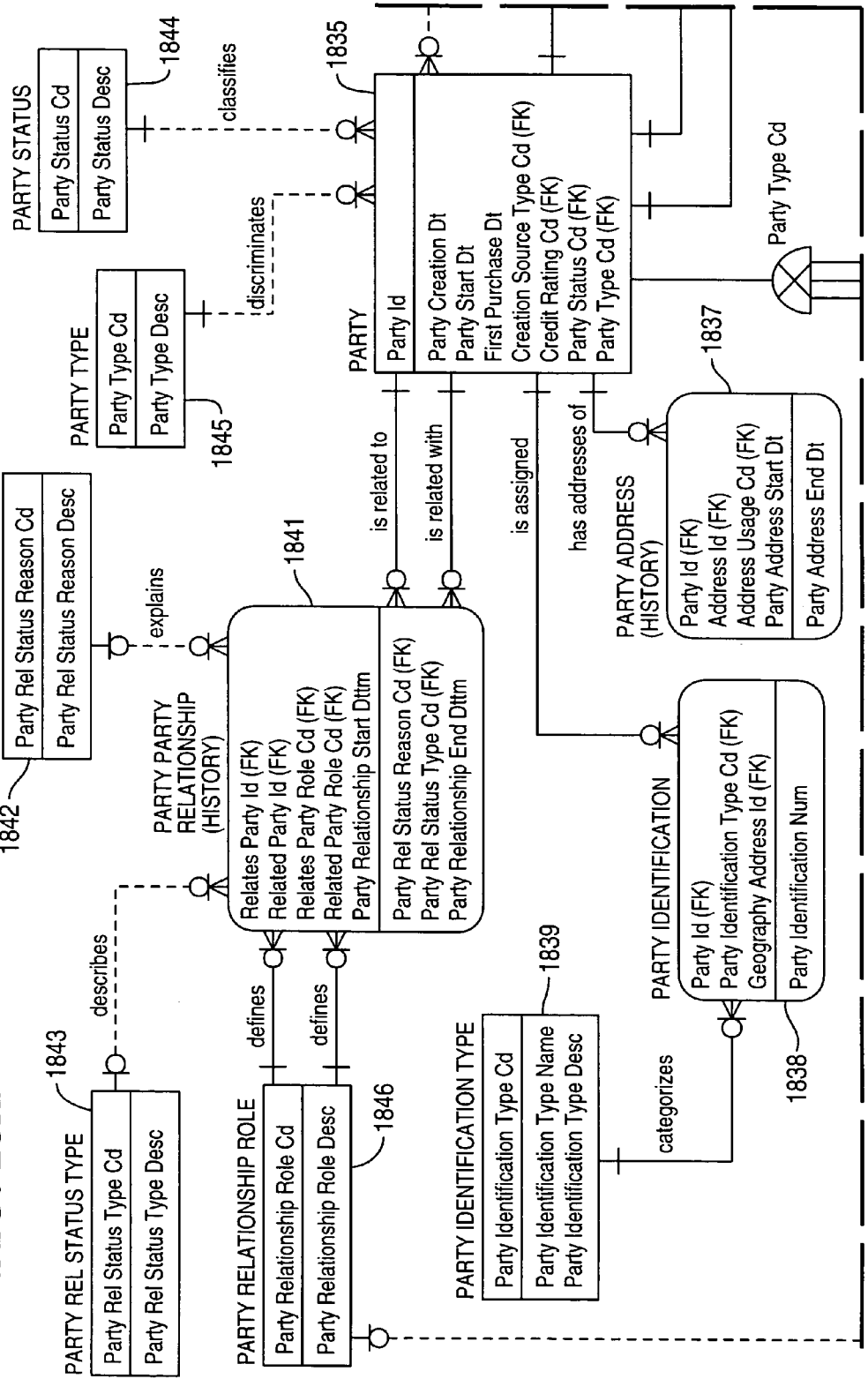
FIGS. 18A through 18H illustrate an entity-relationship diagram of the PARTY Subject Area of the logical data model in accordance with the preferred embodiment of the present invention.
Figure 18B:
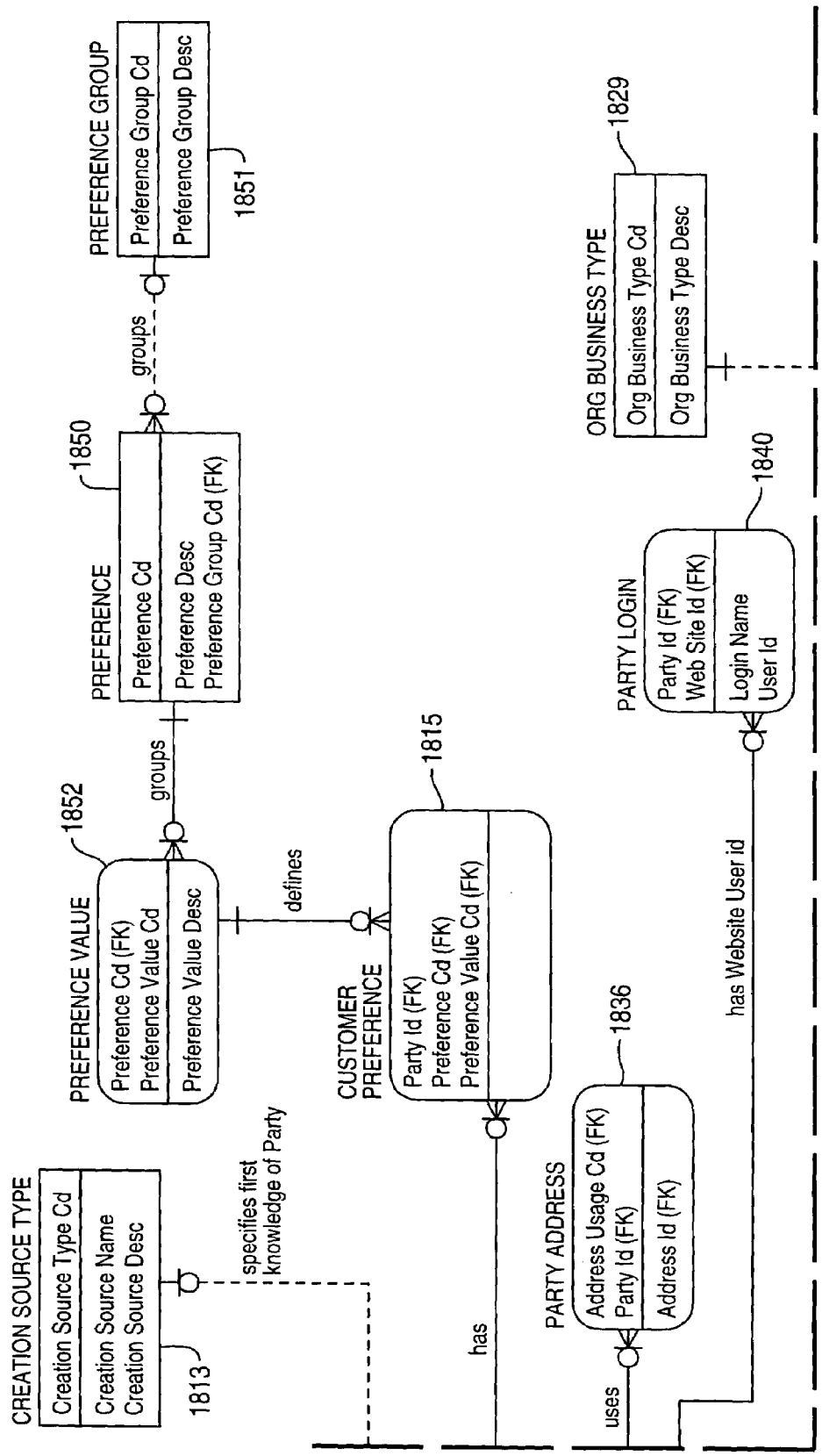
Figure 18C:
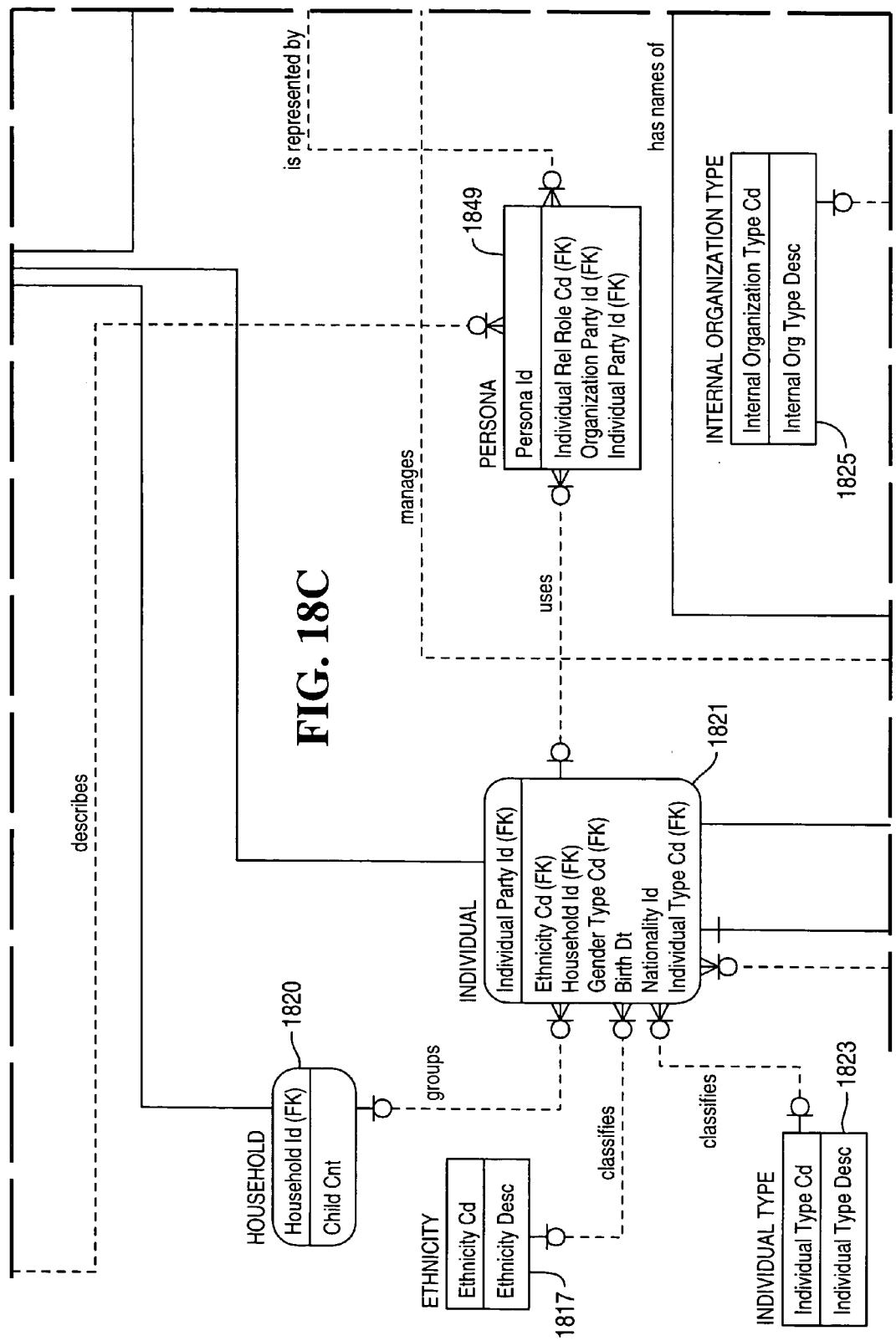
Figure 18D:
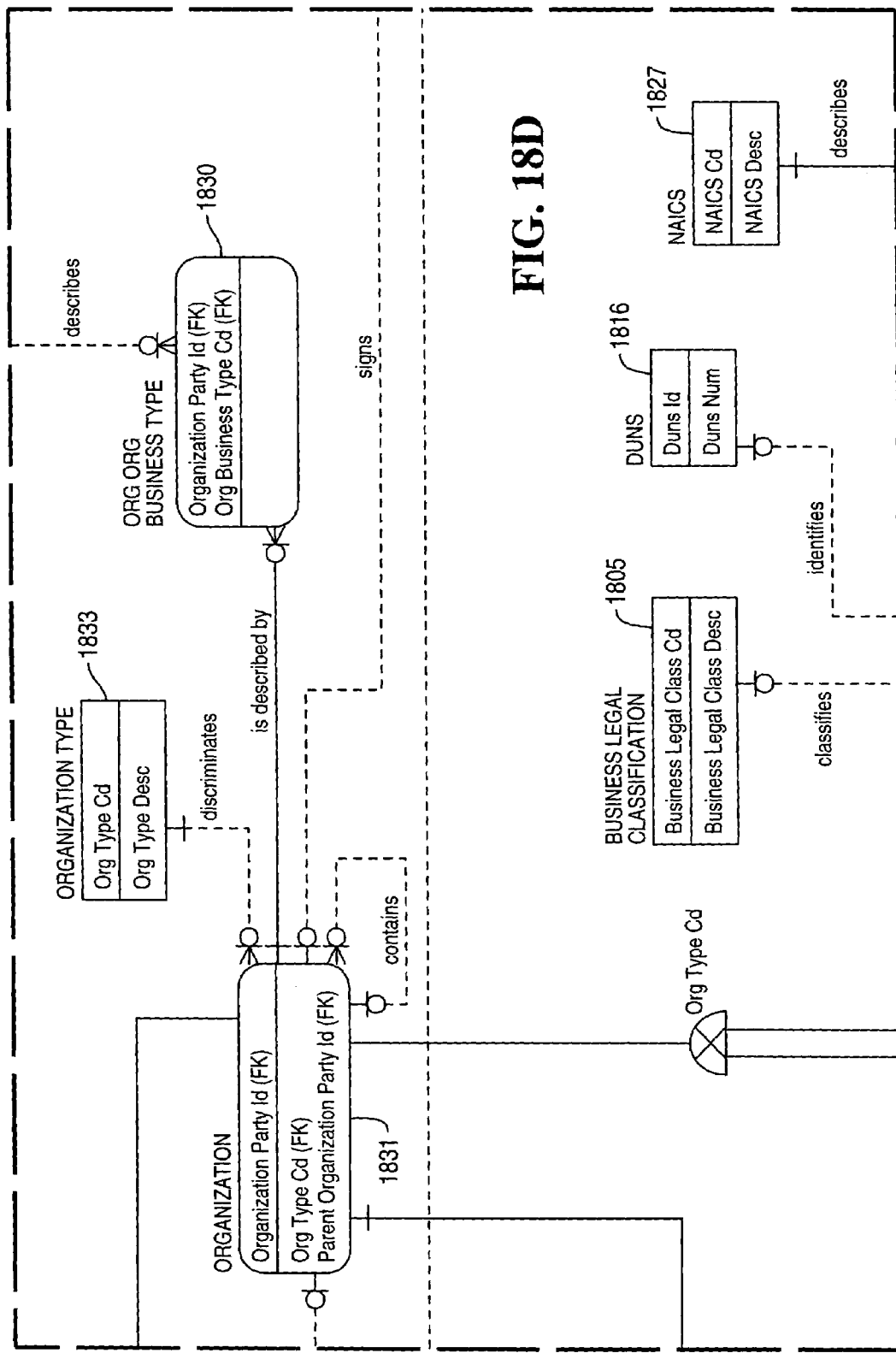
Figure 18E:
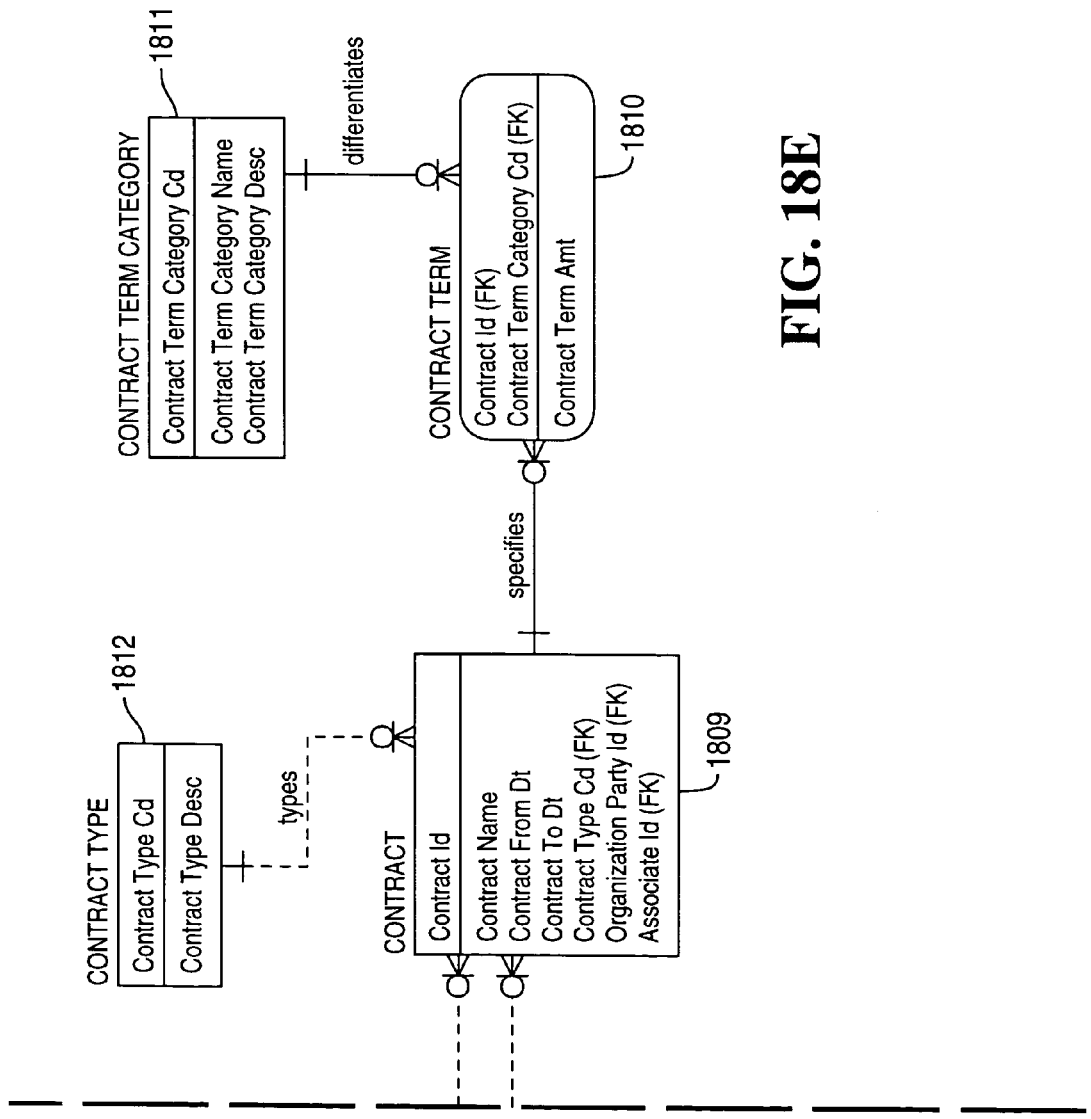
Figure 18F:
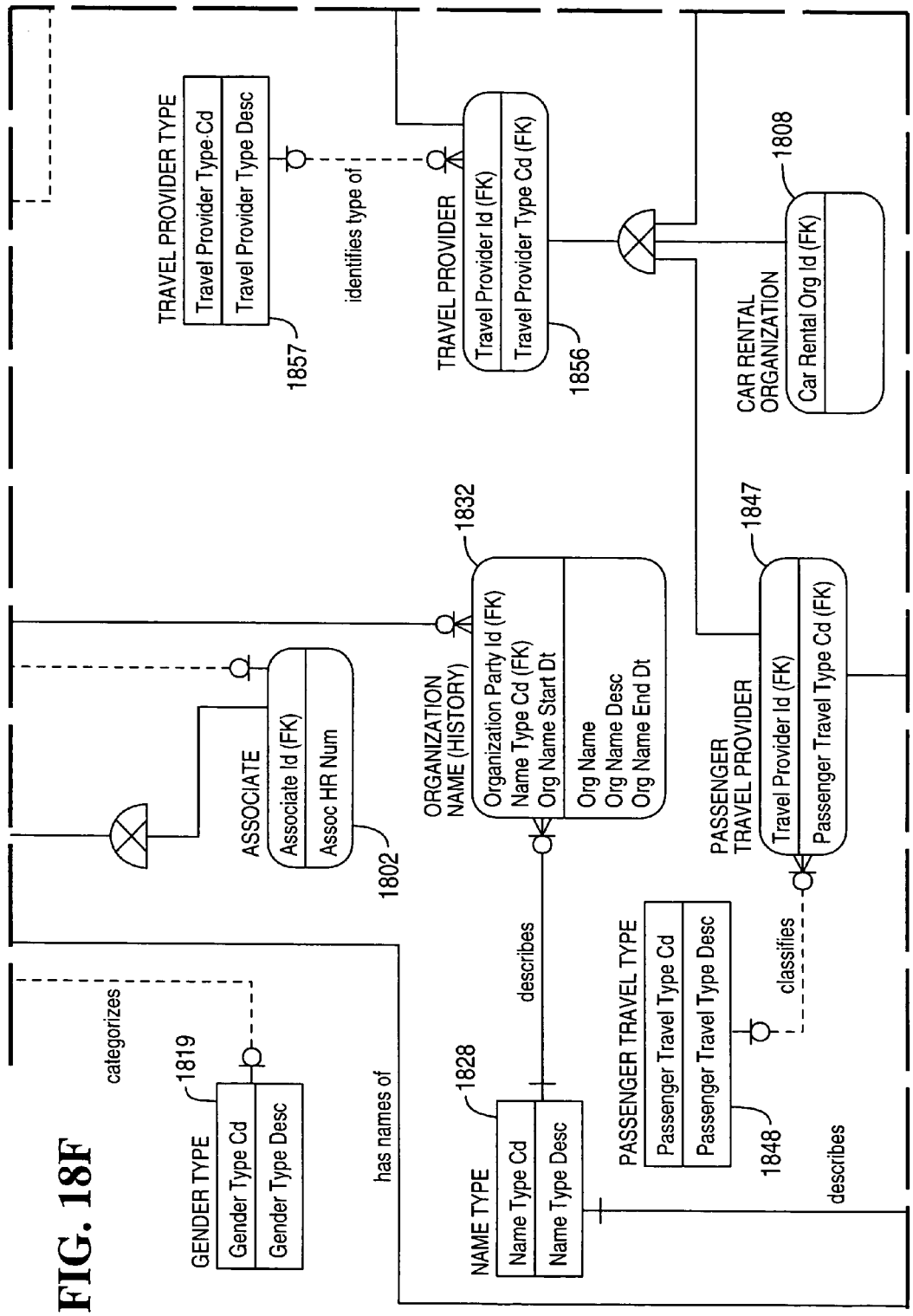
Figure 18G:
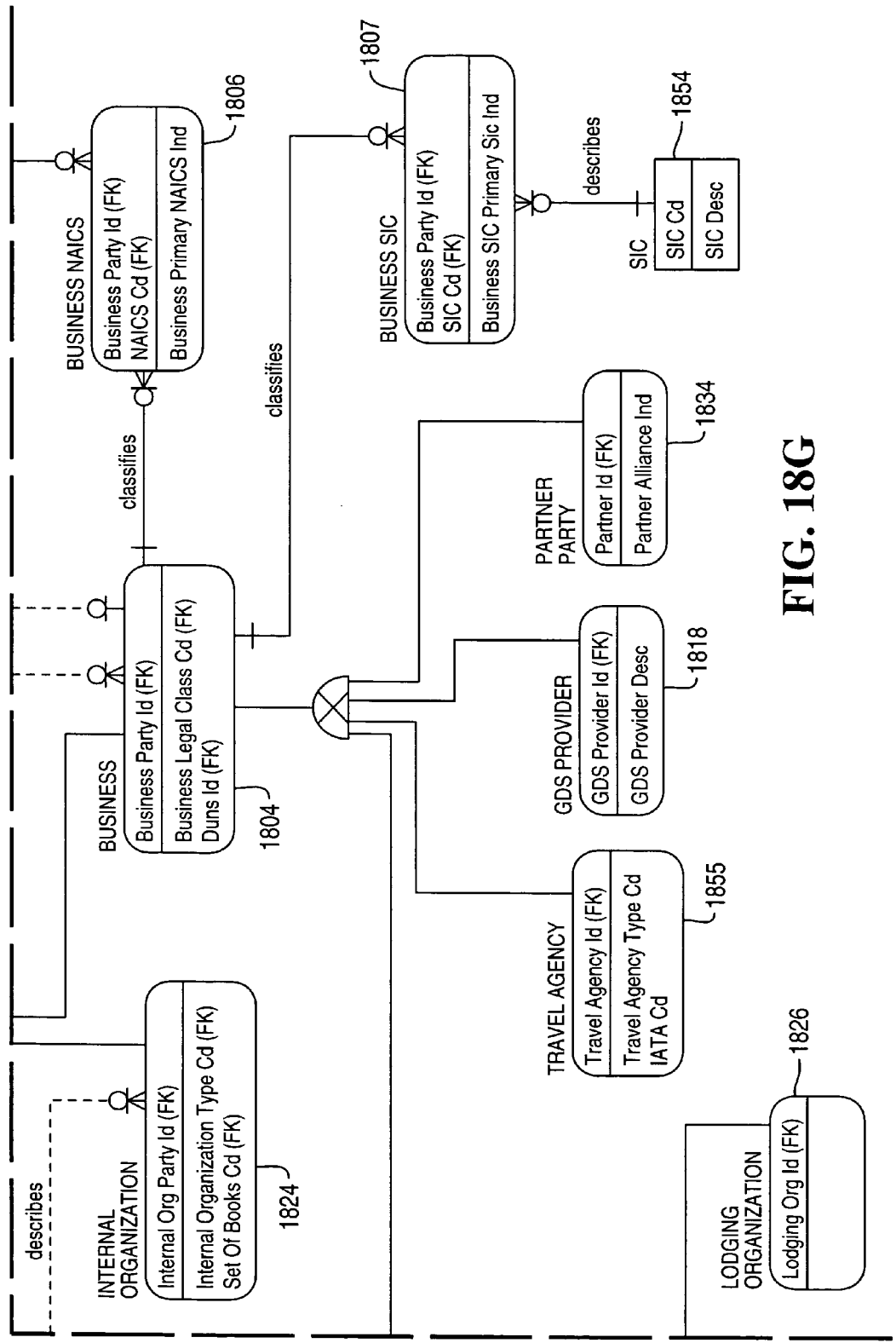
Figures 18, 18H:
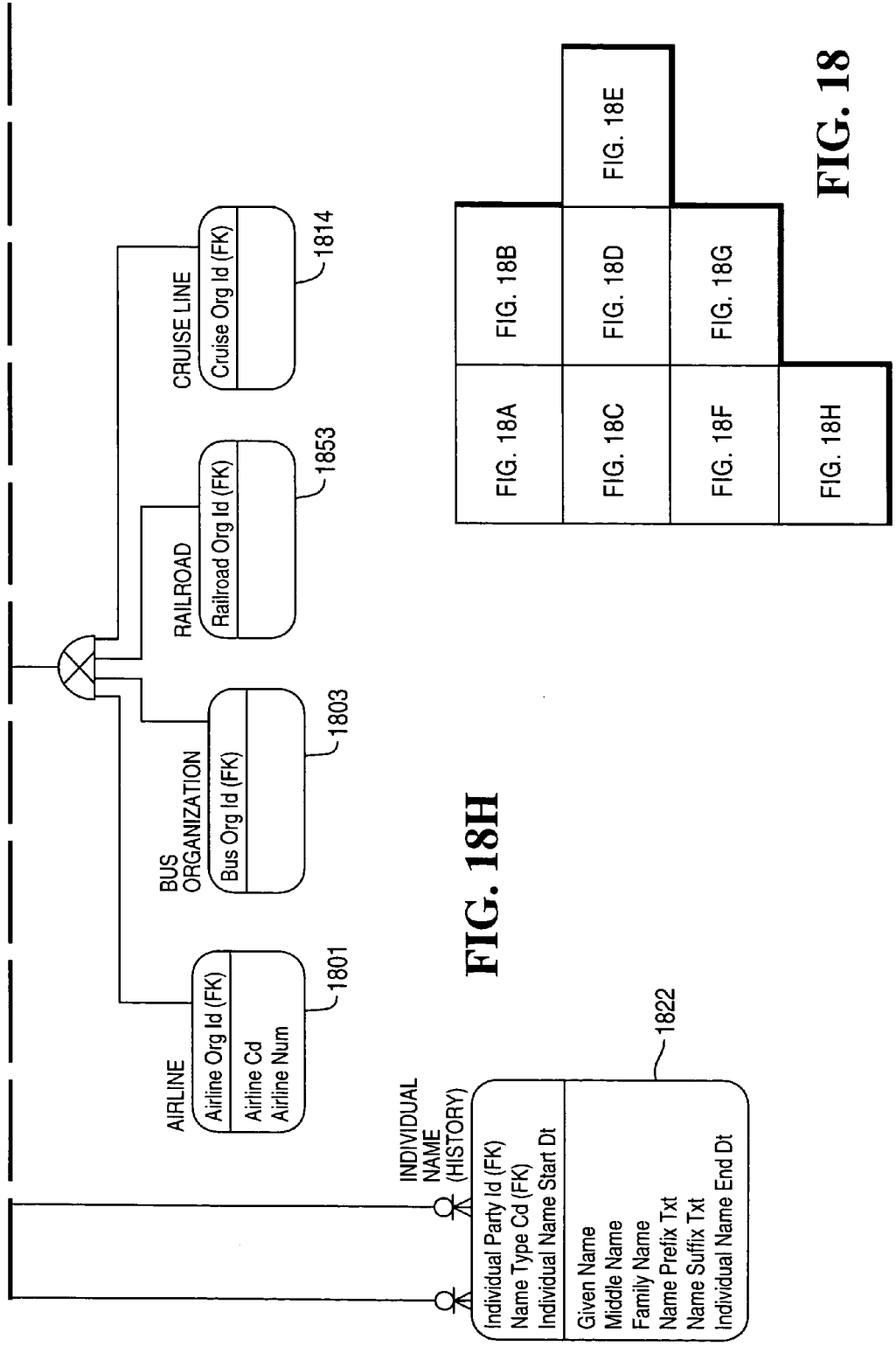
Figure 19A:
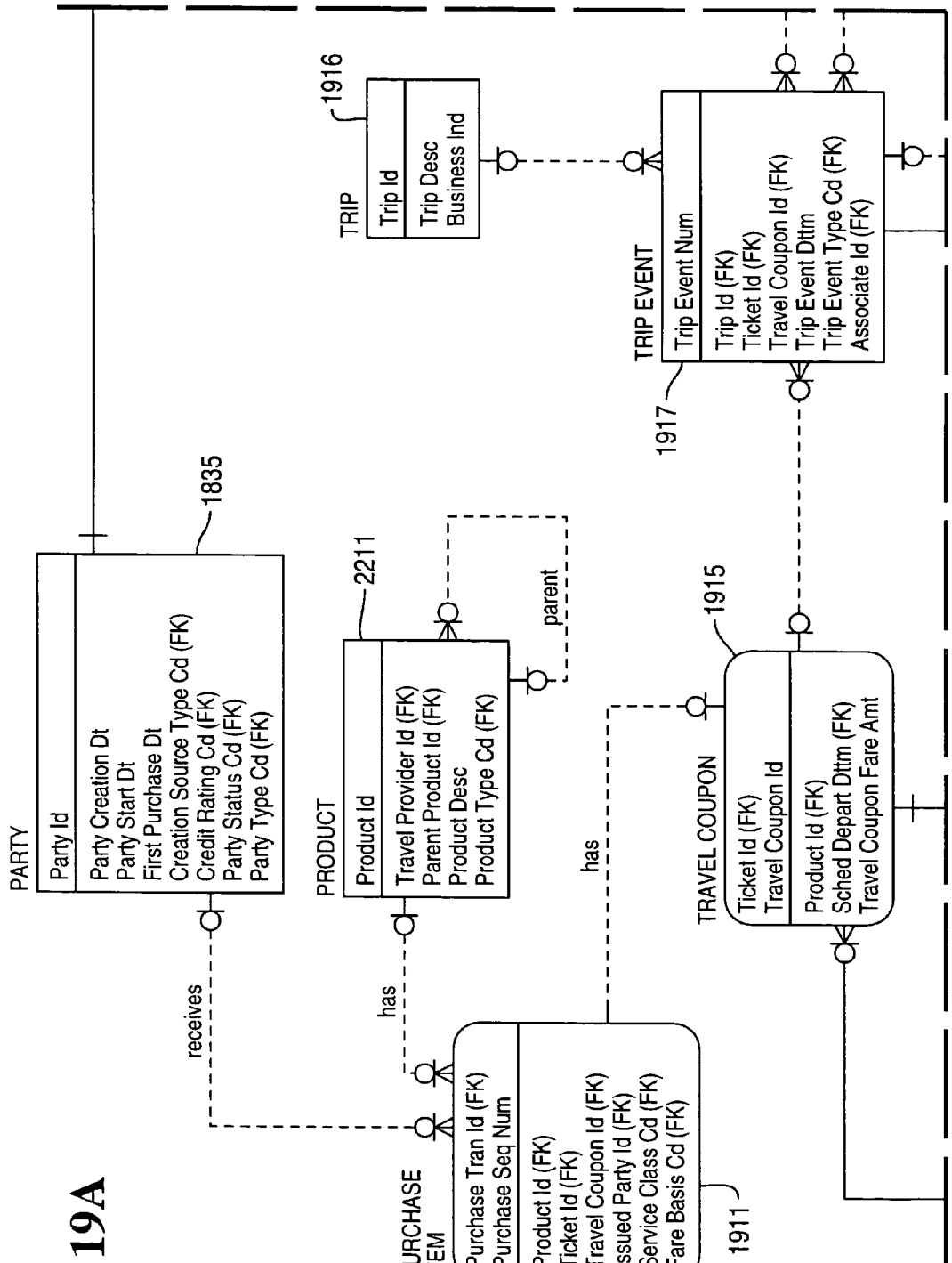
FIGS. 19A through 19D illustrate an entity-relationship diagram of the PASSENGER EN ROUTE Subject Area of the logical data model in accordance with the preferred embodiment of the present invention.
Figure 19B:
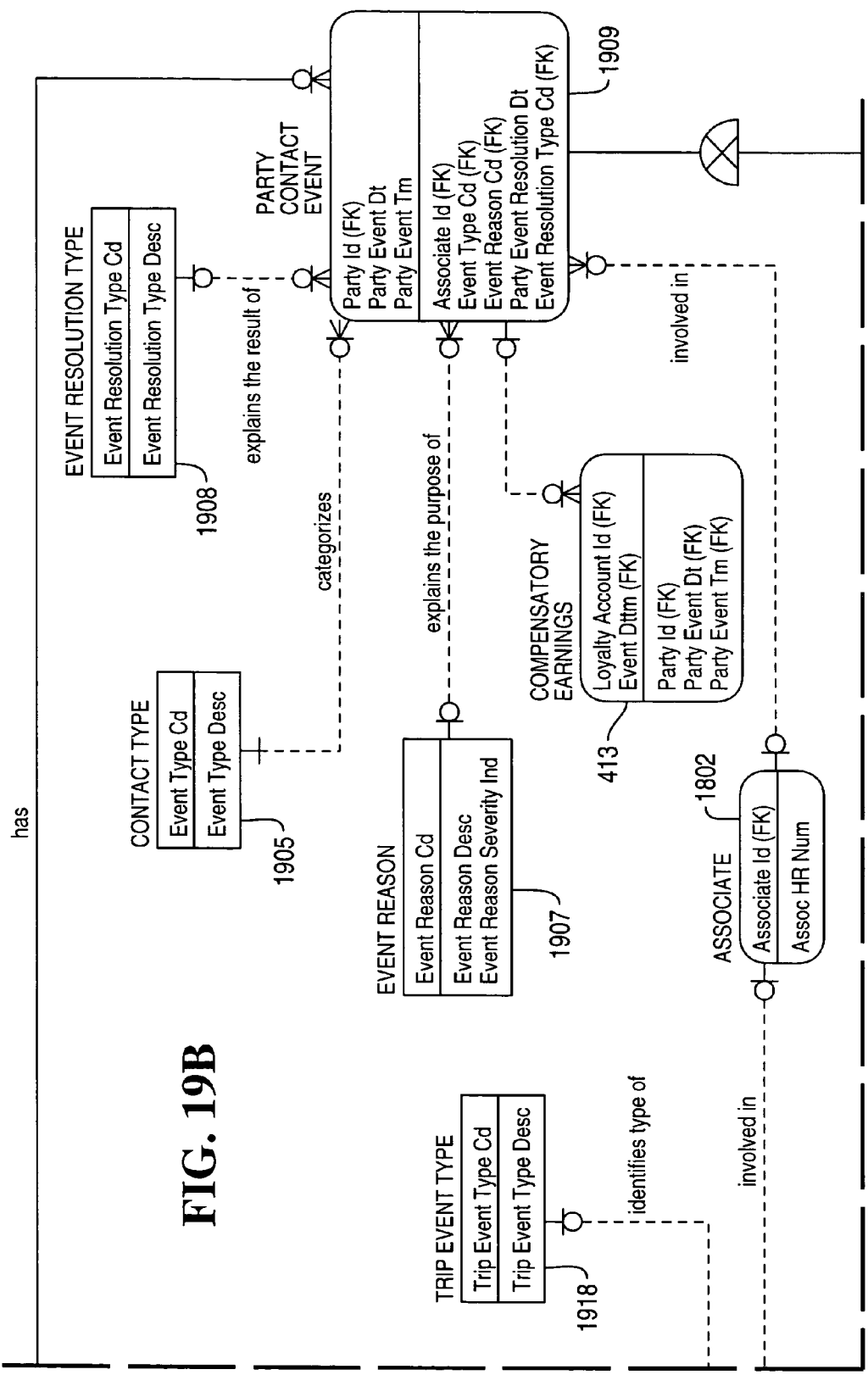
Figure 19C:
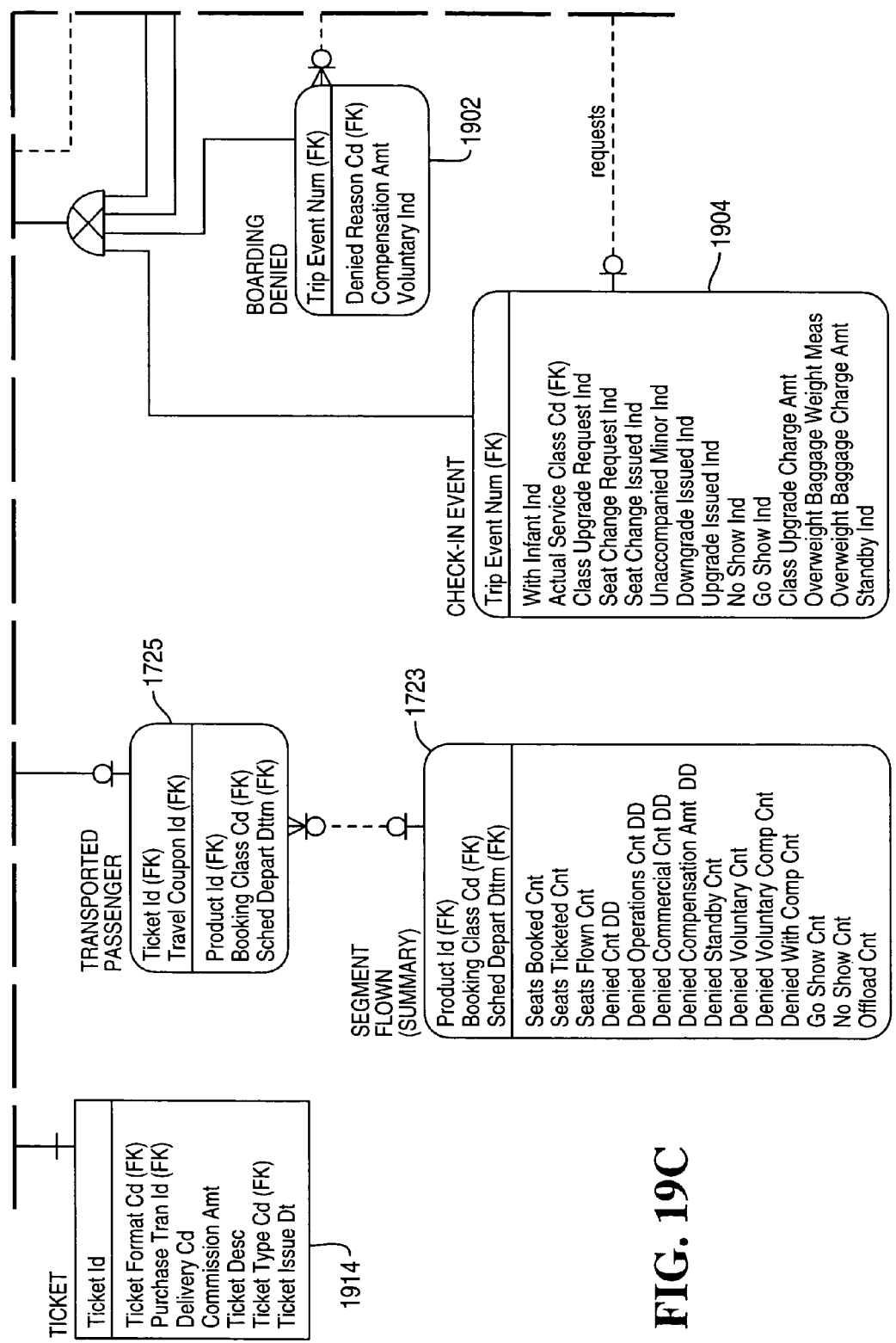
Figure 19D:
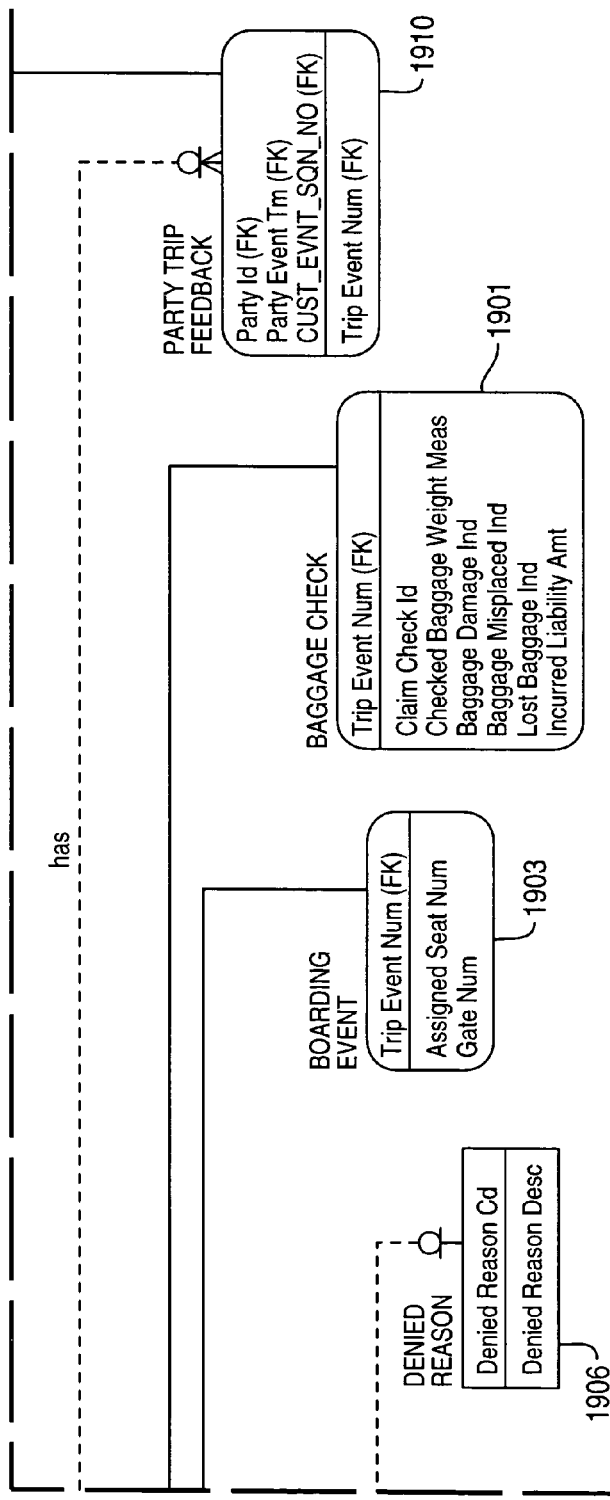
Figure 19D:
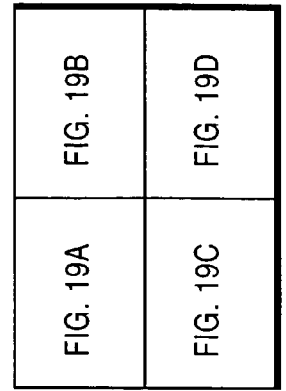

The FM REVENUE Subject Area tracks revenue, or income, detail data. The entities of the FM REVENUE Subject Area, illustrated in FIG. 13, are defined as follows:

INTEREST INCOME ACCOUNT (1301) The entity that indicates the expense account is for interest income. Interest income is received by the company from its investment in stocks and bonds.

OTHER REVENUE ACCOUNT (1302) The entity that provides details on other revenue. Other revenue is income from activities that are not in the normal course of business.

REVENUE ACCOUNT (1303) The entity that indicates a general ledger account is a revenue account. Types of revenue accounts include interest income and other revenue.

REVENUE ACCOUNT TYPE (1304) The entity that indicates the type of revenue account. Types of revenue accounts include sales revenue and other revenue.

SALES REVENUE ACCOUNT (1305) The entity that provides details on the sales revenue. Sales revenue is the primary source of revenue earned by the company from its customers.

FORECASTS and MODEL SCORES Subject Area

FIGS. 14A through 14D illustrate an entity-relationship diagram of the FORECASTS and MODEL SCORES Subject Area of the Retail Logical Data Model. The FORECASTS and MODEL SCORES Subject Area stores information concerning future estimates, projections and forecasts for orders and sales.

The entities of the FORECASTS and MODEL SCORES Subject Area are defined as follows:

ANALYTICAL MODEL (1401) Describes a process used to predict, cluster, or classify information. Typically used in Data Mining and Knowledge Discovery. Examples: Sales Forecasting, Customer Scoring and Segmentation, a model that describes the propensity of a customer to defect to another travel provider.

ANALYTICAL MODEL ALGORITHM (1402) Describes the type of algorithm used to construct the model. Example: Neural Network, Cluster, Regression.

ANALYTICAL MODEL TYPE (1403) Describes the type of model. Example: Seasonal Sales Forecast, Promotional Order Forecast, Customer Scoring, Segmentation, etc.

FORECAST BOOKING CURVE (1404) Used for future estimates, projections & forecasts for a given PRODUCT (or SEGMENT). Accommodates multiple simultaneous methods and forecast sources. Can also house the (derived) "actual" quantity to compare against "forecast". This example forecasts the Booking Curve (Reservations per Booking Class at a given checkpoint prior to departure)

FORECAST SALES (1405) Used for future estimates, projections & forecasts for a given PRODUCT (or SEGMENT). Accommodates multiple simultaneous methods and forecast sources. Can also house the (derived) "actual" quantity to compare against "forecast"

MODEL RUN (1406) Describes an actual execution of an ANALYTICAL MODEL. Example: Seasonal Item forecast for Q1 that was run on Dec. 12.

PARTY ROLE (1407) Code and description used to identify the role of the PARTY in the PARTY TRAN ROLE entity. Example: Reservationist, Traveler, Travel Requestor, etc.

GEOGRAPHY Subject Area

The GEOGRAPHY Subject Area, shown in the diagram of FIGS. 15A through 15D, contains physical address information, e.g., street number, street, city, state, country, etc.; electronic addresses, e.g., email and web addresses; and telephone contact information associated with PARTYs, LOCATIONs and TRAVEL FACILITYs.

The entities of the GEOGRAPHY Subject Area are defined as follows:

ADDRESS (1501) An ADDRESS provides a means of communications such as postal address, telephone number, or electronic address (e.g. e-mail). An ADDRESS may also represent a physical location (e.g. street, post office box, parcel of land, cell-site tower) or a geographical boundary (e.g. North East America, EMEA) for sales and marketing purposes.

ADDRESS RELATED (1502) The relationships that exist between two Addresses, as specified by Address Related Reason. For example, one Address may be an alternate for another Address.

ADDRESS RELATED REASON (1503) Domain of values indicating why one occurrence of Address has a relationship to another Address.

ADDRESS TYPE (1504) Indicates if an ADDRESS is a GEOGRAPHY, ELECTRONIC, or TELEPHONE.

ADDRESS USAGE (1505) The way an ADDRESS is used in a specific instance, usually by a PARTY. Example: GEOGRAPHY ADDRESS usage (market to, bill to, ship to, etc.) TELEPHONE ADDRESS usage (fax, voice, pager, etc.)

AREA (1506) The entity that indicates an area for a GEOGRAPHY ADDRESS. Areas can consist of multiple countries. For example: Europe, Asia, etc.

CENSUS BLOCK (1507) A grouping of ADDRESSes used by the government for census statistics. Usually a subset of POSTAL CODE. Example:

The number of 3 member HOUSEHOLDs in a small geo area according to the 1998 census data.

CITY (1508) A geographical region within a TERRITORY. Can also be a hamlet, village, township, etc. Example: Los Angeles, Dijon, etc.

COUNTRY (1509) A geo-political region with sovereign governing. Example: U.S.A., Canada, Denmark, etc.

COUNTY (1510) A geographic region within a TERRITORY. Example: Los Angeles County DWELLING TYPE (1511) Identifies a type dwelling. example: single family, multi-family, etc.

ELECTRONIC ADDRESS (1512) A non-physical/virtual ADDRESS. Could be an e-mail, ftp, URL, etc. Example: clark@kryptonite.com, ftp.att.net/bob, etc.

ELECTRONIC ADDRESS TYPE (1513) Specifies the type of ELECTRONIC ADDRESS, such as e-mail, ftp, or url.

GEOGRAPHY ADDRESS (1514) A GEOGRAPHY ADDRESS can represent a physical mailing address, asset locations, and geographical boundaries.

LOCATION ADDRESS (1515) Describes how a specific combination of ADDRESS and LOCATION is used. Example: '123 Main Street' is used by 'Call Center 23' as 'Mail To'. '310-555-2342' is used by 'Call Center 46' as 'Customer Service Fax number'

MSA (1516) Note: MSA is but one of many Geographical Classification schemes that are used in Retail, and is shown only as an example. All classifications used by an actual client should be added to the model during an actual engagement. Metropolitan Statistical Area. Predefined geographic areas for marketing use, center around large metropolitan areas. Example: Miami MSA, San Francisco MSA, etc.

POSTAL CODE (1517) A grouping of MAIL ADDRESSes assigned by the Post Office. Frequently used in marketing analysis and planning. Example: USA: 90210, Canada: G1s 1C1 U.K.: W1P 7HE TELEPHONE ADDRESS (1518) Telephone number. Could be voice, data, fax, pager.

TELEPHONE COMM TYPE XREF (1519) A cross reference of telephone numbers with the types of communications that can be directed to the telephone number (e.g. fax, voice, data).

TELEPHONE COMMUNICATION TYPE (1520) The types of communications that can be directed to a telephone number (e.g. fax, voice, data).

TERRITORY (1521) A geographic region within a COUNTRY. Can be a State, Province, etc. Example: California, Quebec, Gauteng, etc.

WORLD REGION (1522) The entity that indicates the WORLD REGION for a country. For example: APAC (Asia Pacific), EMEA (Europe Middle East Africa), etc.

LOCATION Subject Area

The LOCATION Subject Area defines direct customer interaction points and the costs associated with them. This is required to determine direct customer CHANNEL interaction and its associated costs. The corporate organization structure regarding office hierarchy is also addressed in the DISTRICT, REGION and DIVISION entities. The client's organization hierarchy must be interpreted and implemented accordingly.

The LOCATION Subject Area also deals with the TRAVEL FACILITY associated with the product or service. For example, the TRAVEL FACILITY entity has sub-types dealing with the departure or arrival TRAVEL FACILITY depending on the mode of travel selected by the TRANSPORTED PASSENGER (such as BUS DEPOT, TRAIN STATION, SHIP PORT, or AIRPORT).

The entities of the LOCATION Subject Area, illustrated in FIGS. 16A through 16D, are defined as follows:

AIRLINE HUB (1601) This entity contains capacity statistics by airline for any major airport or airline center of operations (hub).

AIRPORT (1602) The domain of locations where Air Transportation occurs, Aircraft take-off and landings and where passengers board or de-board airplanes.

BUS DEPOT (1603) The domain of locations where Bus Transportation occurs, Example: Where Buses depart and arrive and passengers board or get off buses.

CALL CENTER (1604) A type of LOCATION of the enterprise. Typically where customer service support or customer reservation is provided.

CHANNEL (1605) The various CHANNELs in which the PRODUCTS or SERVICE's are sold. LOCATIONs (facilities) belong to 1 specific CHANNEL. A specific PRODUCT or SERVICE price may vary across CHANNELs. Example: Internet, Call Center, Over the Counter (In-Person Point of Sale.)

CITY TICKET OFFICE (1606) Airline ticket office located in any given city at a location other than the airport.

DISTRICT (1607) A grouping of LOCATIONs that fall within a specific geographic area. A DISTRICT is used to organize groups of LOCATION's for the purposes of planning, reporting and analysis.

DIVISION (1608) Represents an administrative grouping of REGIONs. DIVISIONs exist to further cluster PRODUCT's or SERVICE's into groups for administrative or organizational reporting purposes. A DIVISION often represents the highest LOCATION hierarchy level in an enterprise's organization. The actual naming convention for LOCATION hierarchy may vary across organizations.

KIOSK (1609) A physical device than can be used by INDIVIDUALs for self-service applications. Example: A Self Service device at the airport where customers can perform their own check-in and obtain a boarding pass.

KIOSK TYPE (1610) This entity describes the nature of the KIOSK Example: Enabling Web Access, Enabling Airport Check-In, etc.

LOCATION (1611) A physical or virtual site which is owned or leased by a business entity to support Sales and/or Services. Example: AIRPORT, CITY OFFICE, WEB STORE, etc LOCATION OPERATING COST (1612) Denotes the planned and actual operating cost, for specific period by LOCATION.

LOCATION TRAIT (1613) A generic construct to describe characteristics of a LOCATION.

LOCATION TRAIT VALUE (1614) A cross-reference between TRAITs and LOCATIONs, describing the specific TRAITs that belongs to a LOCATION.

LOCATION TYPE (1615) Identifies the type of LOCATION. Example: KIOSK A finer level of differentiation can also be used: For example, located at a Mall, Stand Alone Center, rental office, etc OPERATING COST (1616) Denotes the types of OPERATING COSTs for a LOCATION. Example: The expenditure items can include: Rent, Service Charge, Heat and Electricity, Distribution, Repairs, Facility Maintenance and Grounds, Equipment Maintenance, Security, Cleaning, Refuse, Communication—Telephone, Mail, FedEx, Bank Charges, Stationary and Supplies, Labor.

OPERATING COST TYPE (1617) Classifies the different OPERATING COSTs into logical groupings. Example: Utilities, office-related, maintenance, etc.

RAIL STATION (1618) The domain of locations where Rail Transportation occurs, i.e., where trains depart and arrive and passengers board or get off trains.

REGION (1619) An intermediate organization grouping level within the geographic hierarchy, which groups LOCATIONs. A specific regional geographic area of the country or county.

SHIP PORT (1620) The domain of locations where Ship Transportation occurs, i.e., where Ships depart and dock and passengers board or get off ships.

TRAVEL FACILITY (1621) The domain of locations where Transportation occurs, i.e., where buses, trains or airplanes depart and arrive and passengers board or get off them.

TRAVEL FACILITY GROUP (1622) A Grouping of TRAVEL FACILITIES for Marketing or Analytical purposes. Example:—can be used to group together all the airports that are part of the "NorthEast Market", "Chicago Market", etc.—can be used to group "all the Ports that are in the Caribbean Market" for a Cruise Ship Company.

TRAVEL FACILITY GROUP XREF (1623) Maps TRAVEL FACILITIES to TRAVEL FACILITY GROUPS. A TRAVEL FACILITY can be a member of multiple TRAVEL FACILITY GROUPs.

TRAVEL FACILITY LOCATION (1624) Business location where Transportation occurs. Example: Atlanta Hartsfield AIRPORT, NY Port Authority BUS STATION, etc.

TRAVEL FACILITY TYPE (1625) A type of TRAVEL FACILITY that may be used by a passenger. Example: BUS DEPOT, RAIL STATION, AIRPORT, etc.

WEB STORE (1626) A sub-type of LOCATION. Allows the enterprise to differentiate between their web-based activities. This entity is not meant to differentiate between physical web servers (IP Addresses)—it's more of a logical/business biased concept. Example: Frequent flyer Web Store, Travel Specials Web Store, etc.

OnD PRODUCT PERFORMANCE Subject Area

The OnD PRODUCT PERFORMANCE Subject Area depicts what happens during a trip. This Subject Area closely relates to the PASSENGER EN-ROUTE Subject Area and shows what happens to a customer TRANSPORT VEHICLE once a BOARDING EVENT takes place and it leaves the departure point. Provisions have been made in this Subject Area to track various OnD PRODUCT incidents in case an irregular operation takes place for this specific OnD PRODUCT.

The entities of the OnD PRODUCT PERFORMANCE Subject Area, illustrated in FIGS. 17A through 17F, are defined as follows:

AIRLINE MARKET STATISTICS (1701) The summary information obtained from a third party concerning number of passengers flown in the specified market and average fares paid.

BOOKING CLASS (1702) A grouping of FARE BASIS codes for the purpose of accepting and controlling bookings in its reservations system. Ideally, the reservations system booking classes would have a one-to-one correspondence with the number of fare-basis codes (and price levels) on each flight, such that seat availability limits could be established for each price level. Most airline reservations systems, however, are limited in the number of bookings classes they use for any one flight, meaning that airlines must combine multiple fare-basis codes into one booking class. This problem is, of course, exacerbated by the fact that each flight also carries passengers from many different O&D markets, each with its own set of potentially different fare-basis codes.

CANCELLED (1703) A subtype entity of LEG INCIDENT entity detailing a scheduled leg that was cancelled.

DELAYED (1704) A subtype entity of LEG INCIDENT entity showing the total minutes a scheduled leg was delayed from its original schedule.

DISASTER (1705) This is a subtype entity of the LEG INCIDENT entity that describes an event that has negative results. Example: Plane Crash.

DIVERTED (1706) This is a subtype of the LEG INCIDENT entity that shows the new destination (diverted) travel facility for a LEG INCIDENT that was rerouted from its original destination.

EQUIPMENT SUBSTITUTION (1707) A subtype of the LEG INCIDENT entity that represents the equipment that was used to substitute for the scheduled equipment due to irregular operations.

FARE BASIS (1708) The domain for determining the basis that a fare will be computed on a specific travel segment/itinerary. The travel provider establishes different fare product categories, both to target specific demand segments and in response to competitive forces in the market. To do this, multiple fare-basis codes, or published fares, each with its own set of rules, effective dates, and price levels, all in the same O&D market are used. Thus, there could well be five or six different standard excursion fares in a city-pair market, differing in terms of day of week of travel, flight applicability, routing and price level. Fare-basis codes, which consist of up to eight characters and define a very specific fare product offering, but which are generally comprehensible only to the airline pricing department that uses them.

FLIGHT (1709) An aircraft carrying passengers, operated by an airline and traveling direct or non-stop from originating city to destination city.

FLIGHT PRODUCT (SEGMENT) (1710) An entity that defines a flight product between an origin and a destination that is available on a regularly scheduled basis. It will always consist of one or more contiguous LEGs within a given FLIGHT. Note: a FLIGHT PRODUCT is usually known as and referred to as a SEGMENT by airlines. Example: Penguin Airline's Flight 1101 from L.A. to N.Y.C. that departs in the morning.

INCIDENT REASON (1711) The reason description for an OnD PRODUCT INCIDENT. Example: EQUIPMENT SUBSTITUTION, DELAYED, CANCELLED, etc INCIDENT TYPE (1712) The type code assigned to an OnD PRODUCT INCIDENT. Example: 1=Equipment substitution, 2=Delayed, 3=Cancelled, etc.

LEG BOOKING (HISTORY) (1713) The history of the actual bookings for a SERVICE CLASS of a SCHEDULED LEG as they were realized, a set number of days prior to departure. This would include information on bookings, seats booked, seats ticketed, deadweight seat count, etc. Note: The "(HISTORY)" suffix indicates that some of the attributes of this entity may be derivable in some instances by looking at the actual detailed passenger check-in information, while other attributes may only be sourcable from a Revenue Management System.

LEG FLOWN (SUMMARY) (1714) The summary information of the performance of an actual scheduled OnD LEG as it was realized, i.e. (flown) by the airline. Example: Penguin Airline's Flight 1101 from L.A. to N.Y.C. that departed on Tuesday, Jan. 23, 2001 at 10:00 am. Cost per ASM—17.3 cents, etc. Note: The "(SUMMARY)" suffix indicates that some of the attributes of this entity may be derivable in some instances by looking at the actual detailed passenger reservation and check-in information, while other attributes may only be sourcable from a Revenue Management System.

LEG INCIDENT (1715) This entity relates the incidents registered during a specified LEG. Example: DELAYED, CANCELED, etc.

OnD PRODUCT (1716) A distance based travel PRODUCT that is defined by Origination and Destination (O&D), weekday of departure and time of departure.

QUALITY OF SERVICE INDEX (1717) A Civil Aeronautics Board-era basis for determining the amount and quality (presumably from the public's perspective) of airline service in a market. For each carrier in the market, take the product of the factors for each flight by that carrier, add across all flights, compare to the sum of all carriers in the market and the fraction is then the carriers "QSI share" of the market, in terms of passengers or revenue. The Basics: QSI=f(frequency, service type, aircraft type, network presence, frequent flyer program dominance) Frequency=number of flights per day (for each carrier individually) Service Type factor=1.0 nonstop (for each flight), 0.7 one-stop, 0.6 single connection, 0.55 two-stop, 0.5 double connection. Aircraft type factor=1.0, widebody jet (for each flight), 0.85, narrow-body jet, 0.8 regional jet, 0.7 large turboprop, 0.6 small turboprop. Network presence factor=typically, a sliding scale of 1.5 to 0.5 depending on the number of markets served ROUTE (1718) Indicates the series of TRAVEL FACILITYs visited by a FLIGHT. This information is technically derivable from the LEG information, but this entity allows for operations and relationships at a ROUTE level—for example we can indicate the Revenue Management Analyst responsible for the ROUTE. Example: A flight that takes of in Los Angeles, flies to Chicago, then takes off again and flies to New York would have a ROUTE of LAX-ORD-JFK SCHEDULED LEG (1719) Details the date and time that a travel provider has scheduled to provide transportation. A LEG can be scheduled for multiple dates.

SCHEDULED SEGMENT (1720) Details the date and time that a travel provider has scheduled to provide transportation. A SEGMENT can be scheduled for multiple dates.

SCHEDULED SEGMENT LEG (1721) Exists to relate SCHEDULED SEGMENTs to SCHEDULED LEGs. Each SCHEDULED SEGMENT is made up of one or more SCHEDULED LEGs.

SEGMENT BOOKING (HISTORY) (1722) The history of the actual bookings for a BOOKING CLASS of a SCHEDULED SEGMENT as they were realized, a set number of days prior to departure. This would include information on bookings, seats booked, seats available, Waitlist, etc. Note: The "(HISTORY)" suffix indicates that some of the attributes of this entity may be derivable in some instances by looking at the actual detailed passenger check-in information, while other attributes may only be sourcable from a Revenue Management System.

SEGMENT FLOWN (SUMMARY) (1723) The summary information of the performance of an actual scheduled OnD SEGMENT as it was realized, i.e. (flown) by the airline. Example: Penguin Airline's Flight 1101 from L.A. to N.Y.C. that departed on Tuesday, Jan. 23, 2001 at 10:00 am. Note: The "(SUMMARY)" suffix indicates that some of the attributes of this entity may be derivable in some instances by looking at the actual detailed passenger reservation and check-in information, while other attributes may only be sourcable from a Revenue Management System.

SERVICE CLASS (1724) The type of service requested by the passenger. Example: AIRCRAFT—First Class, Business Class, Economy Class; LODGING PROPERTY—Deluxe Room, Suite; CRUISE LINE—Steerage; RENTAL VEHICLE—Full Size, Intermediate, etc.

TRANSPORTED PASSENGER (1725) Every entry in this entity represents an actual passenger that was transported exactly one LEG. Example: On a LAX/ORD/JFK flight for a passenger flying from LAX to JFK there will be two entries.

TURN BACK (1726) Indicates a LEG INCIDENT describing a turn back and return to its Originating TRAVEL FACILITY because of some irregular operation YIELD LEVEL (1727) The level of revenue attained from sale of seats for a flight when compared to the maximum revenue that could be obtained by selling each seat for its maximum value.

PARTY Subject Area

The PARTY Subject Area, illustrated in FIGS. 18A through 18H, stores information regarding any customer, INDIVIDUAL, HOUSEHOLD, or ORGANIZATION of interest to the travel enterprise.

The entities of the PARTY Subject Area are defined as follows:

AIRLINE (1801) The domain of Air Transportation Carriers as listed with the Department of Transportation (DOT) and the International Air Transport Authority (IATA).

ASSOCIATE (1802) An individual who is employed by the ORGANIZATION.

BUS ORGANIZATION (1803) This entity reflects the domain of Bus Transportation Carriers as listed with the Department of Transportation (DOT) and the International Association of Public Transport.

BUSINESS (1804) A formal organization that is a legal entity (e.g. has a tax status with the government) consisting of one or more individuals formed for the purpose of conducting business or providing a service. This entity is a subtype to ORGANIZATION.

BUSINESS LEGAL CLASSIFICATION (1805) The domain of codes used in the legal classification of the businesses. Examples are: Inc=Incorporated, Ltd=Limited.

BUSINESS NAICS (1806) The association of a business to one or more North American Industry Classification (NAICS) codes.

BUSINESS SIC (1807) The association of a business to one or more standard industry classification (SIC) codes. A business may have multiple SIC codes with one primary classification.

CAR RENTAL ORGANIZATION (1808) This entity reflects the domain of Car Rental Agencies for both US and International locations.

CONTRACT (1809) The agreement between the Customer and an enterprise CONTRACT TERM (1810) The terms of a contract. Examples include Volume discounts, Negotiated Rates, Due Dates, etc.

CONTRACT TERM CATEGORY (1811) The domain of terms that can be used in setting up a contract.

CONTRACT TYPE (1812) This entity is a discriminator for the categories of a contract.

CREATION SOURCE TYPE (1813) An indication of how/where the first information about the existence of a Party was obtained. Examples: PL—Purchased Prospect List, WB—Web Site, CC—Customer Care Center CM—Campaign Reply, etc CRUISE LINE (1814) This entity reflects the domain of Shipboard Passenger Carriers as listed with the Department of Transportation (DOT) and the International Maritime Organization.

CUSTOMER PREFERENCE (1815) The detailed information collected about individual customer preferences. Example: Customer seating preferences, Customer preferred international and domestic destinations, Customer preferred reading material, Customer preferred on board drinks, etc.

DUNS (1816) Dun & Bradstreet information pertaining to a particular business.

ETHNICITY (1817) The ethnicity of an individual. Example: Latino, Caucasian, African American, etc.

GDS PROVIDER (1818) This entity is the domain of booking systems used by the airline industry to make airline flight reservations. Examples: SABRE, WORLDSPAN, AMADEUS, etc.

GENDER TYPE (1819) This minor entity represents the gender that an individual can have.

HOUSEHOLD (1820) This is a subtype entity to PARTY. A household is a grouping of individuals created for marketing purposes. The individuals typically live at the same address and have biological ties.

INDIVIDUAL (1821) This is a subtype entity to PARTY. This entity consists of those people that are of interest to the enterprise.

INDIVIDUAL NAME (HISTORY) (1822) This entity tracks an individual's name over time. This entity keeps track of current and prior names.

INDIVIDUAL TYPE (1823) Indicates the subtype (if applicable) of this individual. Example: Associate.

INTERNAL ORGANIZATION (1824) This is a subtype to ORGANIZATION. It is an organization that is internal to an enterprise such as a department or subsidiary.

INTERNAL ORGANIZATION TYPE (1825) The subtype discriminator for an internal organization. This minor entity identifies the type of internal organization. Examples of internal organization types include departments or divisions.

LODGING ORGANIZATION (1826) This entity reflects the domain of Lodging and Hotel owners as listed with the American Hotel and Lodging Association and its international counterparts.

NAICS (1827) The North American Industry Classification System. NAICS was developed jointly by the U.S., Canada, and Mexico to provide new comparability in statistics about business activity across North America.

NAME TYPE (1828) This minor entity identifies the different types of names that an individual or organization could have such as 'doing business as' (dba), legal name, alias, phonetics, etc.

ORG BUSINESS TYPE (1829) This entity classifies organizations into types. For businesses examples can be hospital, inpatient hospital, outpatient clinic, gas station, retail store, travel agency. For internal organizations the business types could be marketing, financial, sales etc.

ORG ORG BUSINESS TYPE (1830) This entity relates an organization to organization business types. For businesses examples can be hospital, inpatient hospital, outpatient clinic, gas station, travel agency. For internal organizations the business types could be marketing, financial, sales etc.

ORGANIZATION (1831) This is a subtype entity to PARTY. An organization is any group of individuals (or one individual) or other organizations formed for a purpose. Examples are internal organization and businesses. This definition does not include groups of individuals that form a segment.

ORGANIZATION NAME (HISTORY) (1832) This entity keeps track of organization name changes over time. It keeps the current and prior names.

ORGANIZATION TYPE (1833) The sub-type discriminator for an organization. This minor entity identifies the type of organization. Examples of organization types include businesses or internal organizations.

PARTNER PARTY (1834) The domain of companies or enterprises that can participate in Rewards programs by granting earnings externally to the company that manages the Reward Account.

PARTY (1835) A party is any individual, organization or household that is of interest to the enterprise.

PARTY ADDRESS (1836) Describes how a specific combination of ADDRESS and PARTY is used. This tends to be the 'default/primary' usage, thus only one address per usage is allowed. It can also be used to indicate the address to use for marketing to a customer. Example: '123 Main Street' is used by 'Rachel' as 'Ship To' '23 Abbey Rd' should be used to market to R. Starr '310-555-2342' is used by 'John' as 'Fax number'.

PARTY ADDRESS (HISTORY) (1837) This entity relates parties to addresses and tracks changes over time. A party can have many addresses and an address can be used by many parties.

PARTY IDENTIFICATION (1838) The numbers that may be assigned to a party by a legal jurisdiction for identification purposes, as specified by PARTY IDENTIFICATION TYPE. Example: Social Security Number, Passport Identification, Driver's License, Federal Tax Identification Number, National Identity Card Number, Etc.

PARTY IDENTIFICATION TYPE (1839) The types of legal jurisdiction identification that may be used by a party. Example: Social Security Number, Passport Identification, Driver's License, Federal Tax Identification Number, National Identity Card Number, Etc.

PARTY LOGIN (1840) This entity represents the login information of a PARTY. This entity supports tracking of a PARTY's login names for multiple web sites PARTY PARTY RELATIONSHIP (HISTORY) (1841) This entity defines the relationships between parties—individual and individual; individual and organization; organization and organization; individual and household and household and household relationships. A party can be part of many relationships. A party can have many types of relationships with another party. Examples of relationships could be employee-employer, spouse, household-member, father-son, supplier, or competitor.

PARTY REL STATUS REASON (1842) A reason why a particular Party Status Type Cd may be assigned to a party relationship.

PARTY REL STATUS TYPE (1843) The domain of classifications tracked to the relationship role for a Party. Examples: A—Active, I—Inactive, P—Prospective U=Unmarketable Customer (i.e. deceased).

PARTY SCORE (1844) A relative value, or 'score' produced by an ANALYTICAL MODEL after reviewing business information. This can provide a measure or way to group and treat PARTYs that the business interacts with. Example: Customers can be 'scored' for profitability, frequency of purchases, propensity to buy, etc. Vendors and suppliers can similarly be 'scored' PARTY TRIP FEEDBACK (1845) Feedback from a PARTY regarding an event which took place during a TRIP.

PARTY TYPE (1846) The sub-type discriminator for a party. Valid sub-type occurrences are INDIVIDUAL, ORGANIZATION and HOUSEHOLD.

PASSENGER TRAVEL PROVIDER (1847) This entity reflects the domain of PASSENGER TRAVEL PROVIDERs. Example: AIRLINE, RAILROAD, CRUISE LINE, etc.

PASSENGER TRAVEL TYPE (1848) Identifies the type of PASSENGER TRAVEL PROVIDER PERSONA (1849) The 'role' an INDIVIDUAL is playing while interacting with the enterprise. Typically in association with an ORGANIZATION. Example: Two different PERSONAe of Jill may be: Jill is ordering ITEMs in her capacity as 'owner' of 'Jill's Dog Grooming Co.', or Jill is calling about a problem with an order in her capacity as 'buyer' for AT&T.

PREFERENCE (1850) The domain of preferences used to identify personal customer preferences.

PREFERENCE GROUP (1851) The domain of groups used to collect customer preference information about a customer.

PREFERENCE VALUE (1852) The specific customer preferences that make up the CUSTOMER PREFERENCE entity.

RAILROAD (1853) This entity reflects the domain of Rail Transportation Providers as listed with the International Rail Association of Public Transport.

SIC (1854) A Standard Industry Classification is a statistical classification standard describing all establishments. It categorizes businesses by the type of business in which each they are engaged. Businesses engaged in the same activity, regardless of size or type of ownership are given the same SIC code. In the United States the SIC is maintained by the Office of Management and Budget, Executive Office of the President.

TRAVEL AGENCY (1855) Identifies each non-travel provider business used to arrange and make travel reservations, sell tickets, and distribute tickets to the designated passenger or designee.

TRAVEL PROVIDER (1856) The ORGANIZATION PARTY that supplies various types of travel and transportation PRODUCTs.

TRAVEL PROVIDER TYPE (1857) A type of TRAVEL PROVIDER that describes the kind of travel being provided. Example: PASSENGER TRAVEL PROVIDER, CAR RENTAL ORGANIZATION, LODGING ORGANIZATION.

PASSENGER EN ROUTE Subject Area

The PASSENGER EN-ROUTE Subject Area, illustrated in FIGS. 19A through 19D, deals with the pre-travel CHECK-IN EVENT and BOARDING EVENT experience while the customer is traveling. Each aspect of the en-route experience is covered by different entities.

The entities of the PASSENGER EN-ROUTE Subject Area are defined as follows:

BAGGAGE CHECK (1901) The entity that reflects the act of placing baggage in the care of the transportation provider to transport in a separate baggage compartment at the time of CHECK-IN BOARDING DENIED (1902) The entity that reflects the act of denying boarding to a passenger by a travel provider at the time of CHECK-IN BOARDING EVENT (1903) The entity that reflects the customer's act of boarding an aircraft for a specific FLIGHT SEGMENT. It follows a CHECK-IN EVENT and requires a boarding coupon. The boarding coupon contains class and seating information as well as the flight and departure information.

CHECK-IN EVENT (1904) The event when a passenger holding a TRAVEL COUPON checks in at the curb, airline or gate counter to let the airline know they are ready to travel on the scheduled flight.

CONTACT TYPE (1905) The domain of types of contact events deemed valuable enough to be retained for the life of a customer. Event types include complaints, compliments, cancellations, etc.

DENIED REASON (1906) The reason that boarding was denied to a ticketed passenger.

EVENT REASON (1907) This entity represents the domain of reasons given by the customer for the occurrence of the event. Example: Moving, Loss of service, Need Information, etc.

EVENT RESOLUTION TYPE (1908) The resolution or outcome of the customer event.

PARTY CONTACT EVENT (1909) All points of contact with each customer.

PARTY TRAN ROLE (1910) Indicates the PARTY involved in the TRANSACTION, and their ROLE. Example: for RESERVATIONS: the "taking reservation" PARTY; for PURCHASES: the "selling" PARTY, the "ticket issuing" PARTY, etc.

PURCHASE ITEM (1911) The specific items PURCHASEd as part of a TRAVEL TRANSACTION.

REQUEST TYPE (1912) The domain of special requests for the passenger Example: Special meal, Wheel chair, or Language help.

SPECIAL REQUEST (1913) Any special request made by the passenger for that travel segment, such as a special meal or wheel chair assistance. The request may be made at anytime in the Airline booking, ticketing, check-in or boarding process.

TICKET (1914) The entity that represents the actual coupon used to claim reserved service. Can be physical coupon or electronic version of same.

TRAVEL COUPON (1915) A single boarding leg of a TICKETed Itinerary for one passenger for one contiguous period of travel.

TRIP (1916) A Group of related TRAVEL TRANSACTIONs. Usually related to a specific 'Journey' made for a specific purpose. Example: A return flight to Hawaii plus a rental car reservation plus a hotel reservation.

TRIP EVENT (1917) The actual event(s) which happen during a TRIP. Example: CHECK-IN EVENT, BAGGAGE CHECK, BOARDING EVENT.

TRIPEVENT TYPE (1918) The type of a TRIP EVENT

PNR OPERATIONS Subject Area

The PNR OPERATIONS Subject Area deals with the capture of Passenger Name Record (PNR) data. This subject area maps the actual PNR data captured as part of PNR decode and allows the image of the PNR to be stored in the warehouse for later evaluation and display. Detail PNR data is used in the Revenue Management area and can be used by customer service to access PNR data for PNRs that have been deleted from the Reservations system. The bulk of the "decoded" PNR (Passenger Reservation) information is provided in a clear, relational form in the Subject Areas dealing with RESERVATIONs and PURCHASEs. This Subject Area is provided to satisfy customer requests to provide the ability to mine the "raw" source PNR data after it has been purged from the Reservation system. This will allow the retrieval of previously non-decoded information if needed.

Figure 20A:
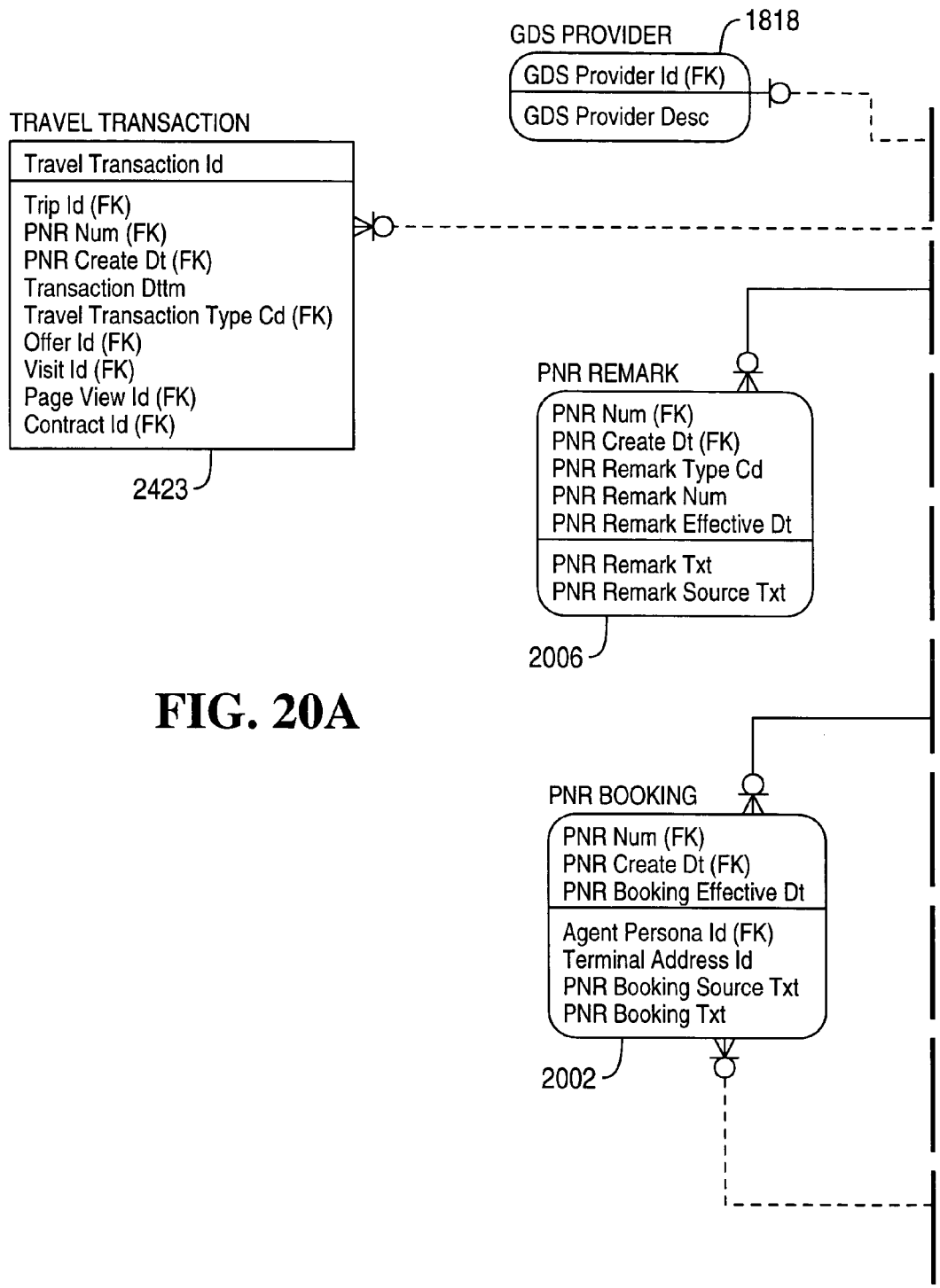
FIGS. 20A and 20B illustrate an entity-relationship diagram of the PNR OPERATIONS Subject Area of the logical data model in accordance with the preferred embodiment of the present invention.
Figure 20B:
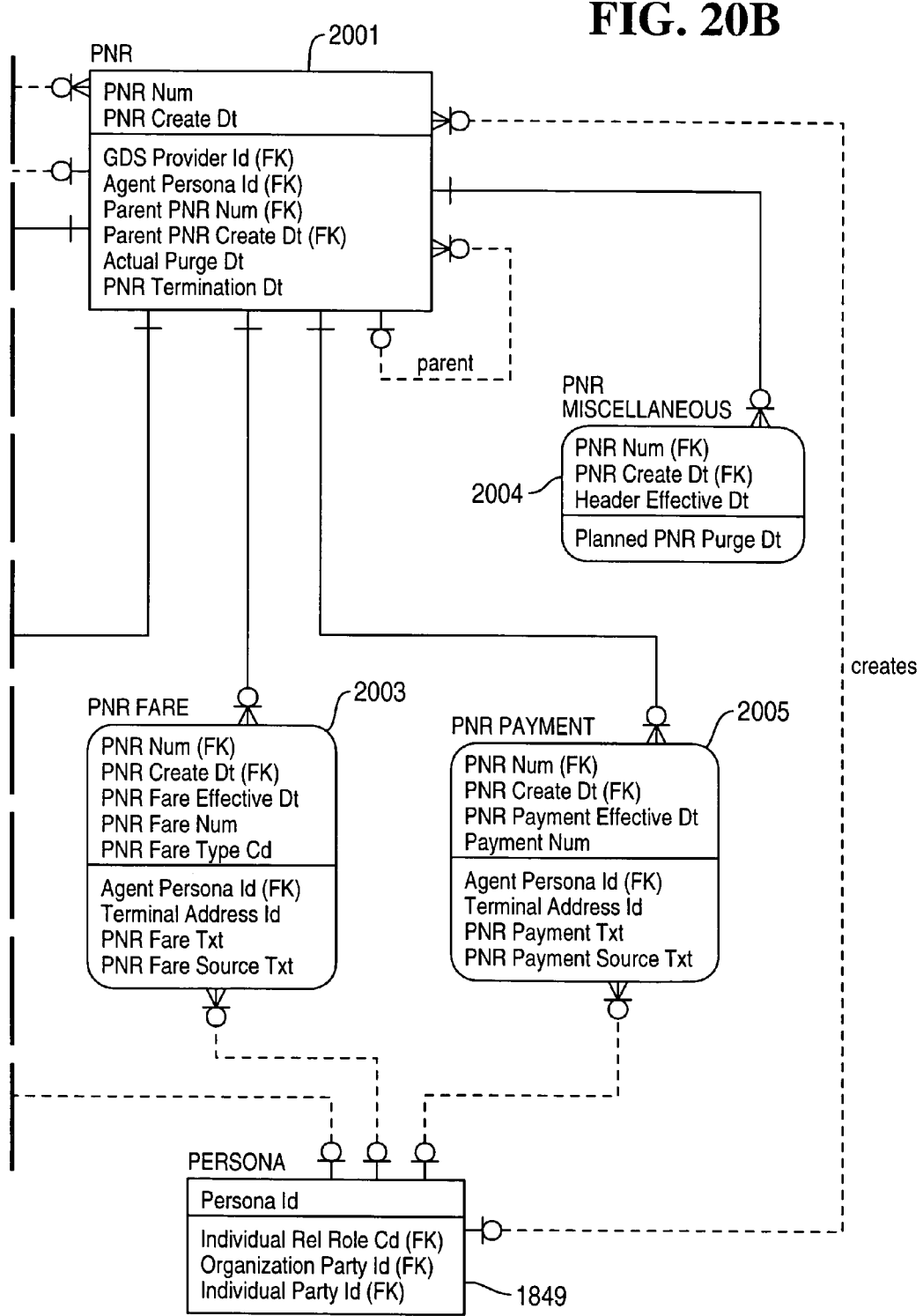

The entities of the PNR OPERATIONS Subject Area, illustrated in FIGS. 20A and 20B, are defined as follows: PNR (2001) Passenger Name Record. An identifier for a reservation. It is unique only for an unspecified period of time. At some point after the itinerary is either completed or cancelled (closed) the identifier may be reused for another reservation. Also known as PNR Locator or Record Locator.

PNR BOOKING (2002) Portion of PNR that contains the source booking information.

PNR FARE (2003) Portion of PNR that contains the source fare information.

PNR MISCELLANEOUS (2004)

PNR PAYMENT (2005) Portion of PNR that contains the source payment information.

PNR REMARK (2006) Portion of PNR that contains the source remarks information.

PRIVACY Subject Area

The Privacy Subject Area deals with the aspect of consumer privacy and a consumer's ability to "opt-in" or "opt-out" of having various personal data collected and used. This enables a consumer to "opt-out" of disclosure to third parties. Opt-out selections may include:
1. Opt-out of identifiable personal data being used to target an individual for direct marketing.
2. Opt-out of disclosure of identifiable personal data to third parties (typically also for marketing). In some cases, an opt-out may be appropriate relating to disclosure of identifiable personal data to affiliate organizations.
3. The right not to be party to an automated decision with legal or other "significant" effects (such as creditworthiness) to the individual, unless there are suitable measures to safeguard the individual's legitimate interests.
4. Notice of the "logic involved in any automatic processing."
5. Explicit opt-in for "special categories" of data.
6. Right to "rectification, erasure or blocking" of certain data.

The implications of these requirements on data mining, data warehousing, and in particular database marketing, are determined by the travel provider in accordance with local rules and regulations concerning data privacy.

Figure 21:
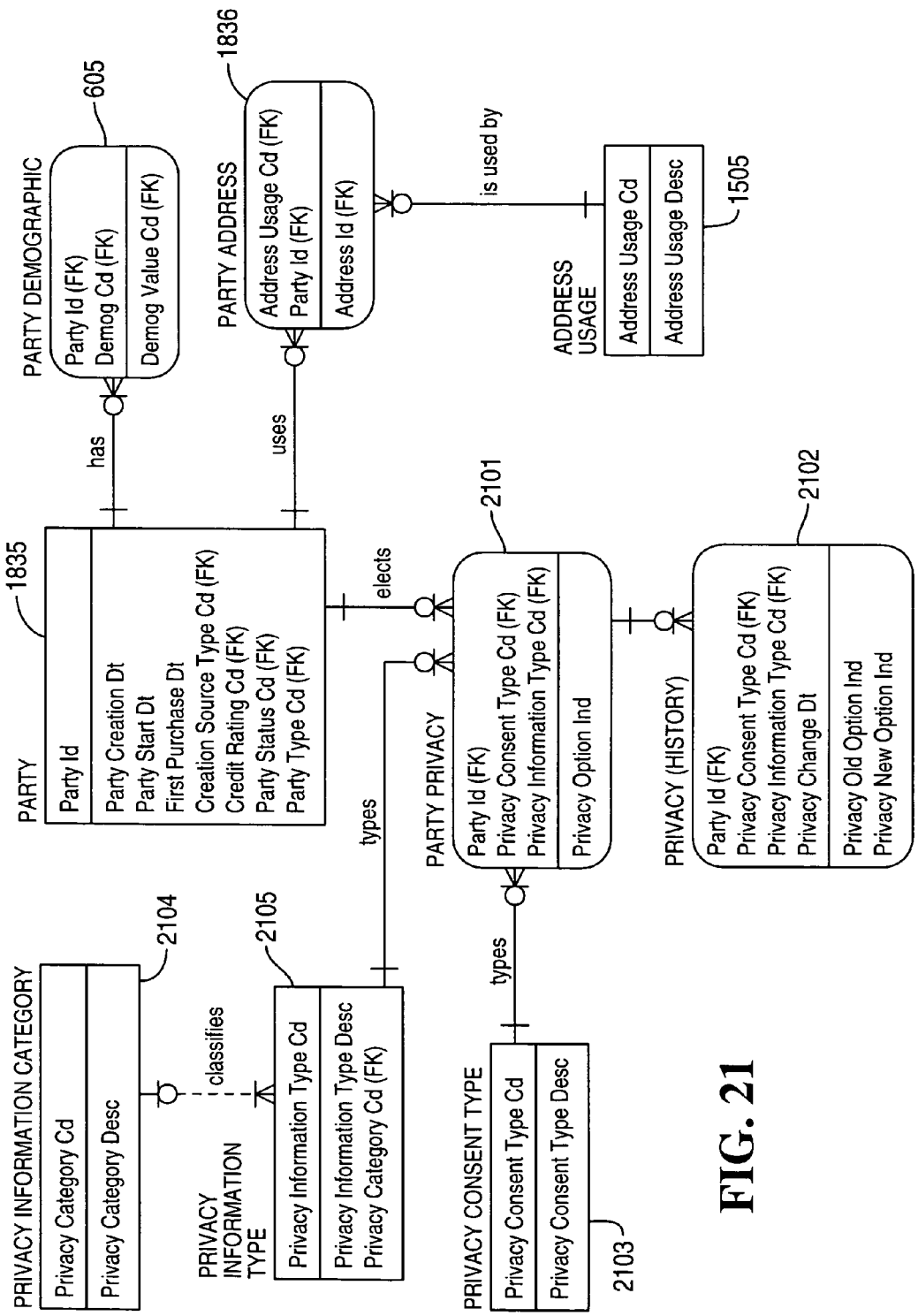
FIG. 21 illustrates an entity-relationship diagram of the PRIVACY Subject Area of the logical data model in accordance with the preferred embodiment of the present invention.
Figure 22:
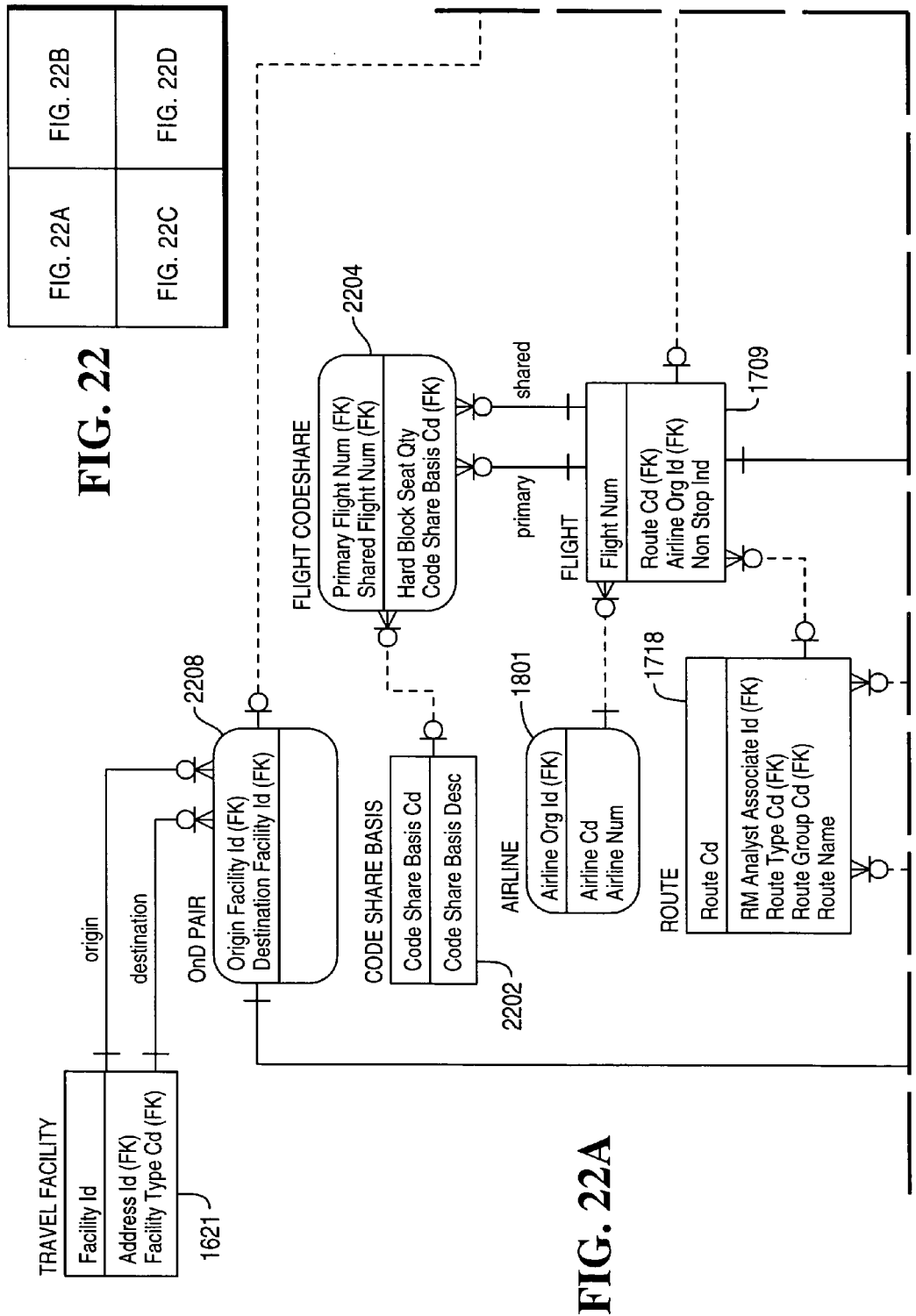
FIGS. 22A through 22D illustrate an entity-relationship diagram of the PRODUCT Subject Area of the logical data model in accordance with the preferred embodiment of the present invention.
Figure 22B:
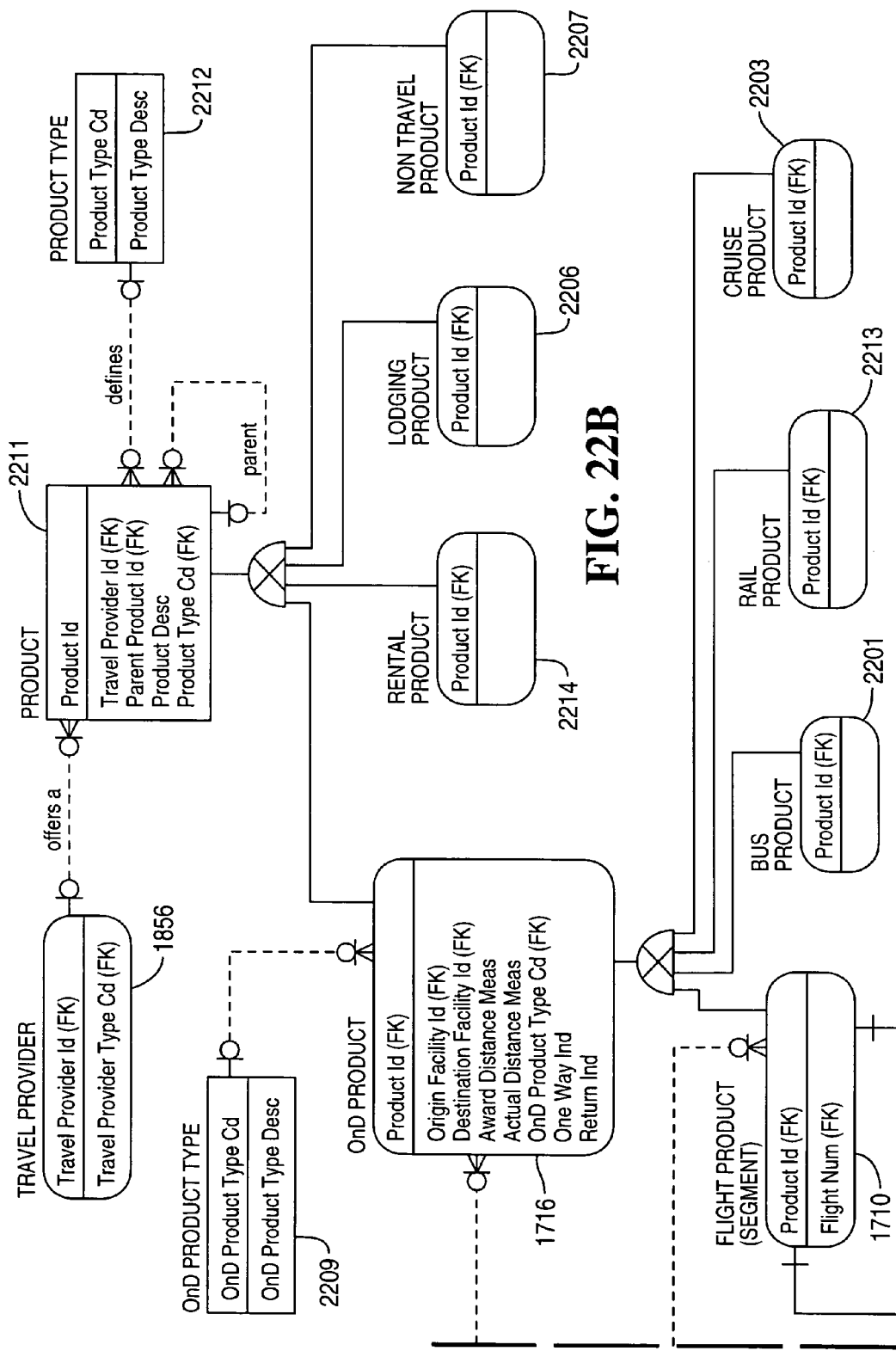
Figure 22C:
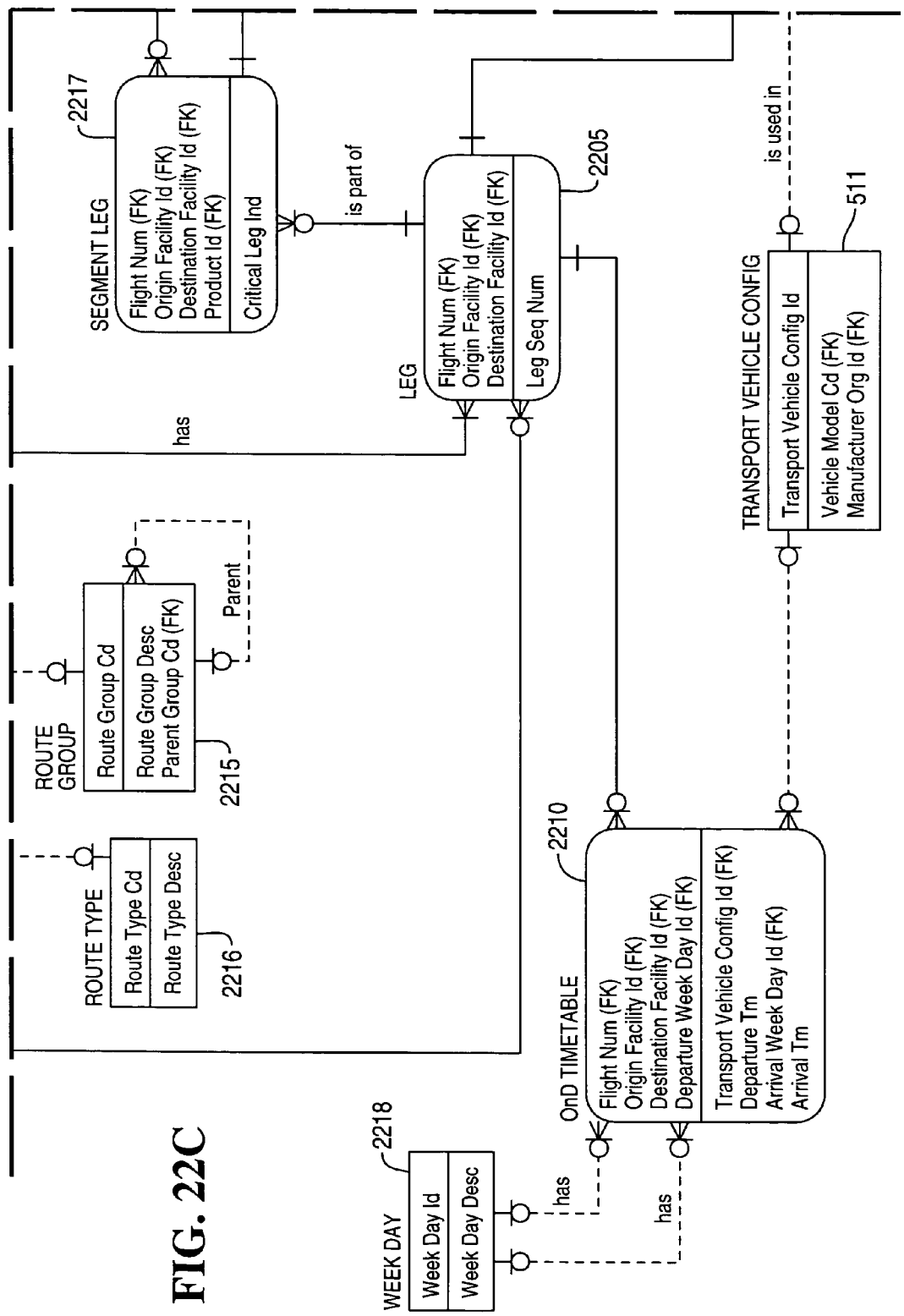
Figure 22D:
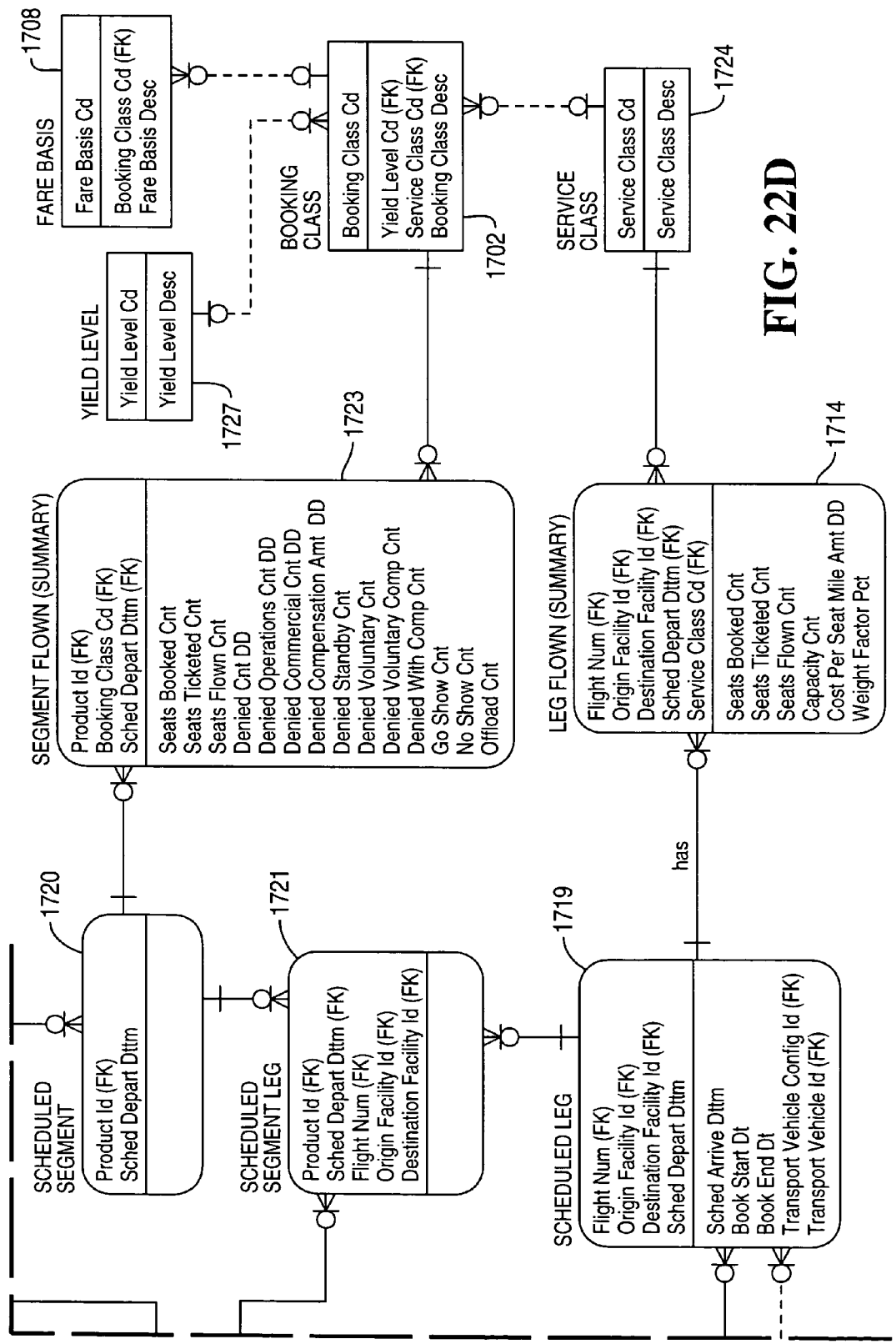
Figure 23A:
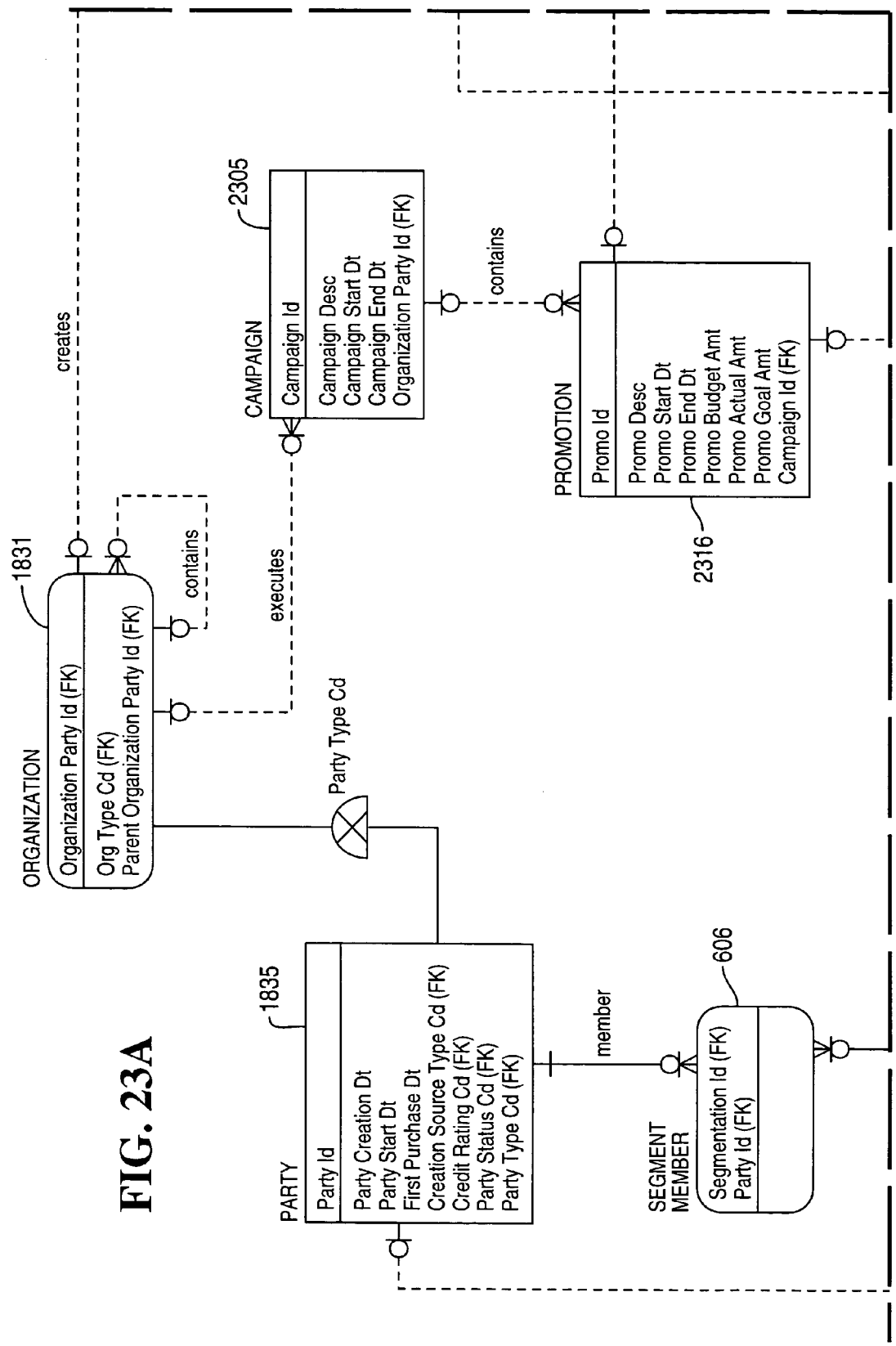
Figure 23B:
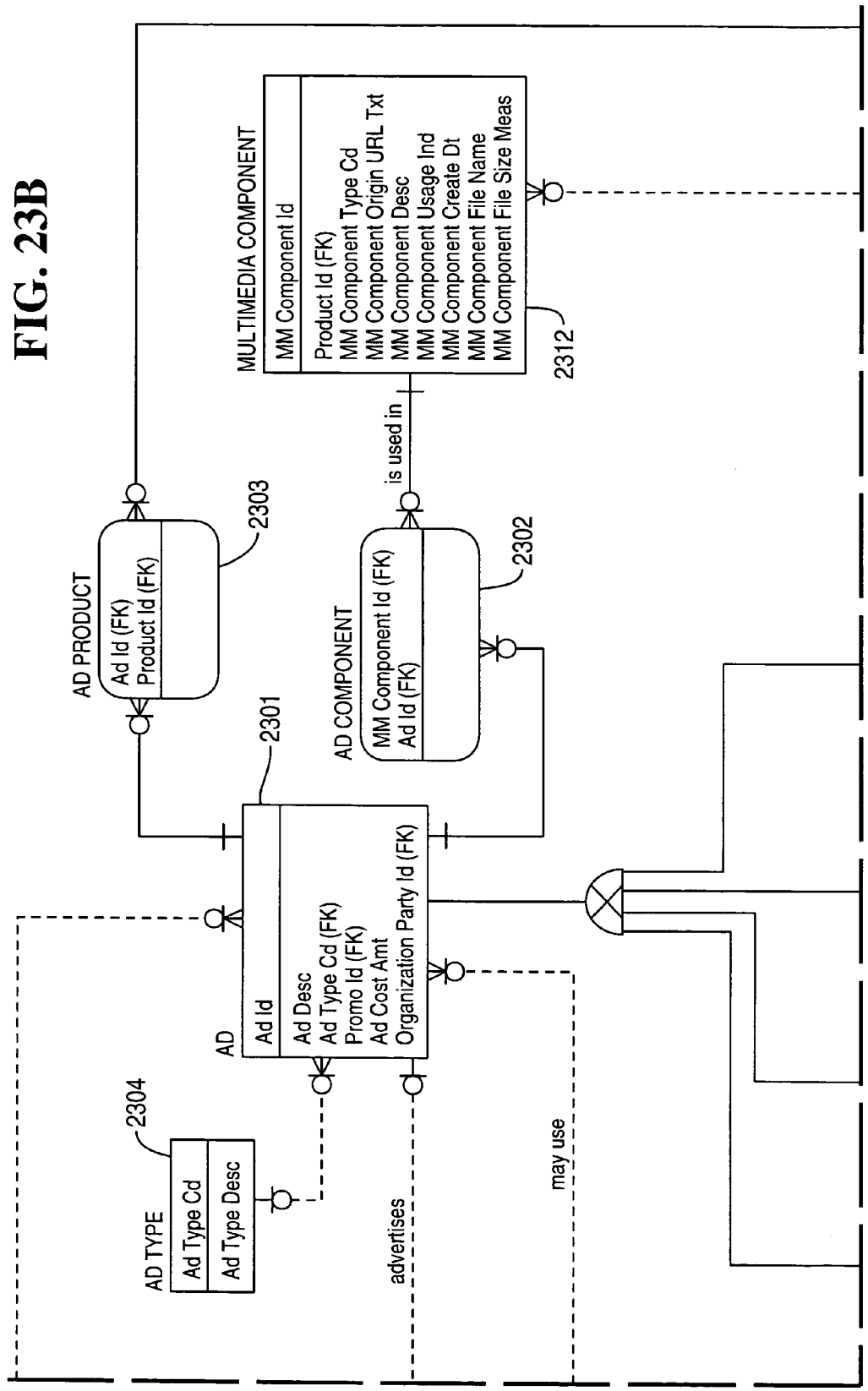
Figure 23C:
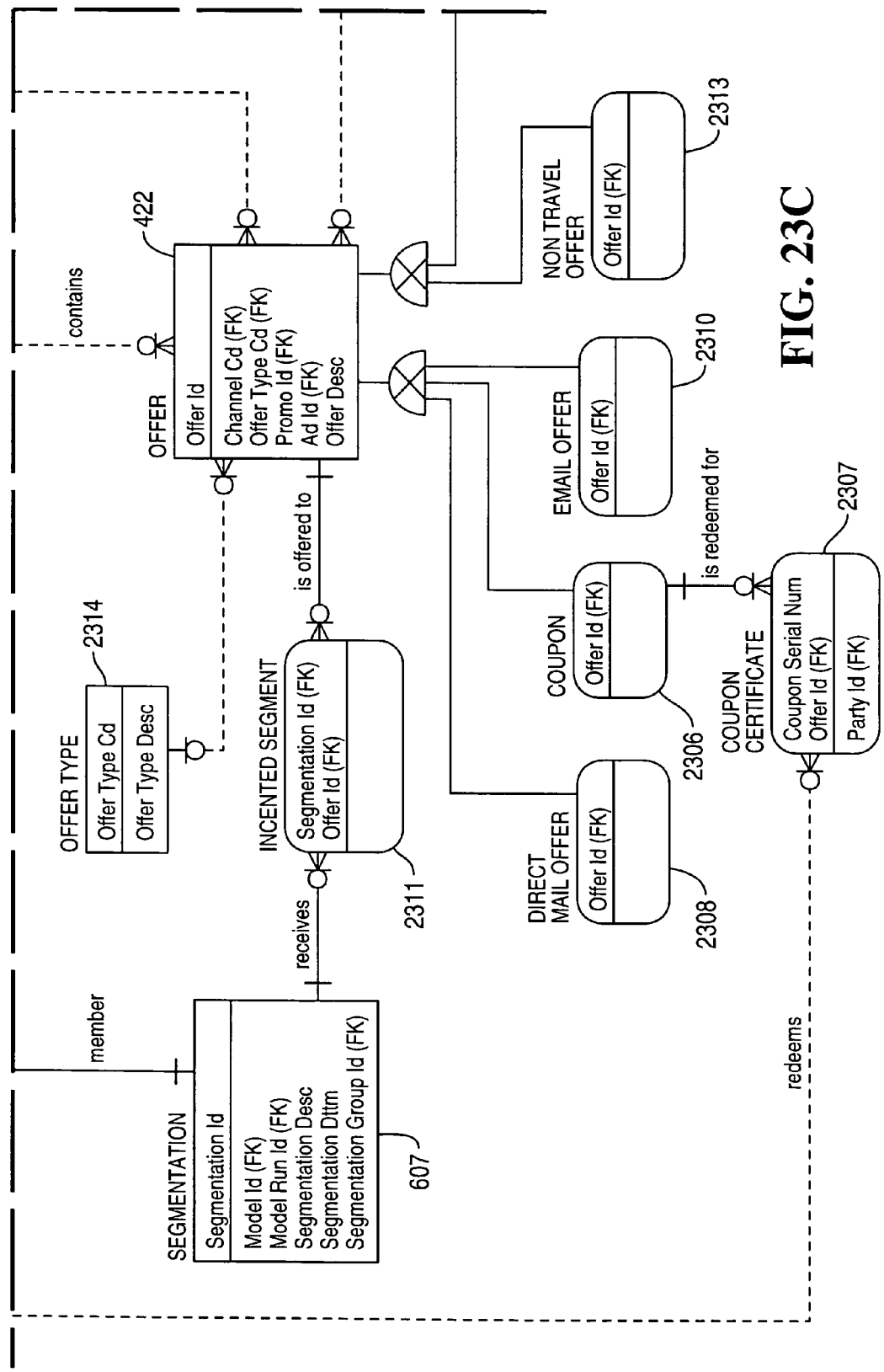
Figure 24A:
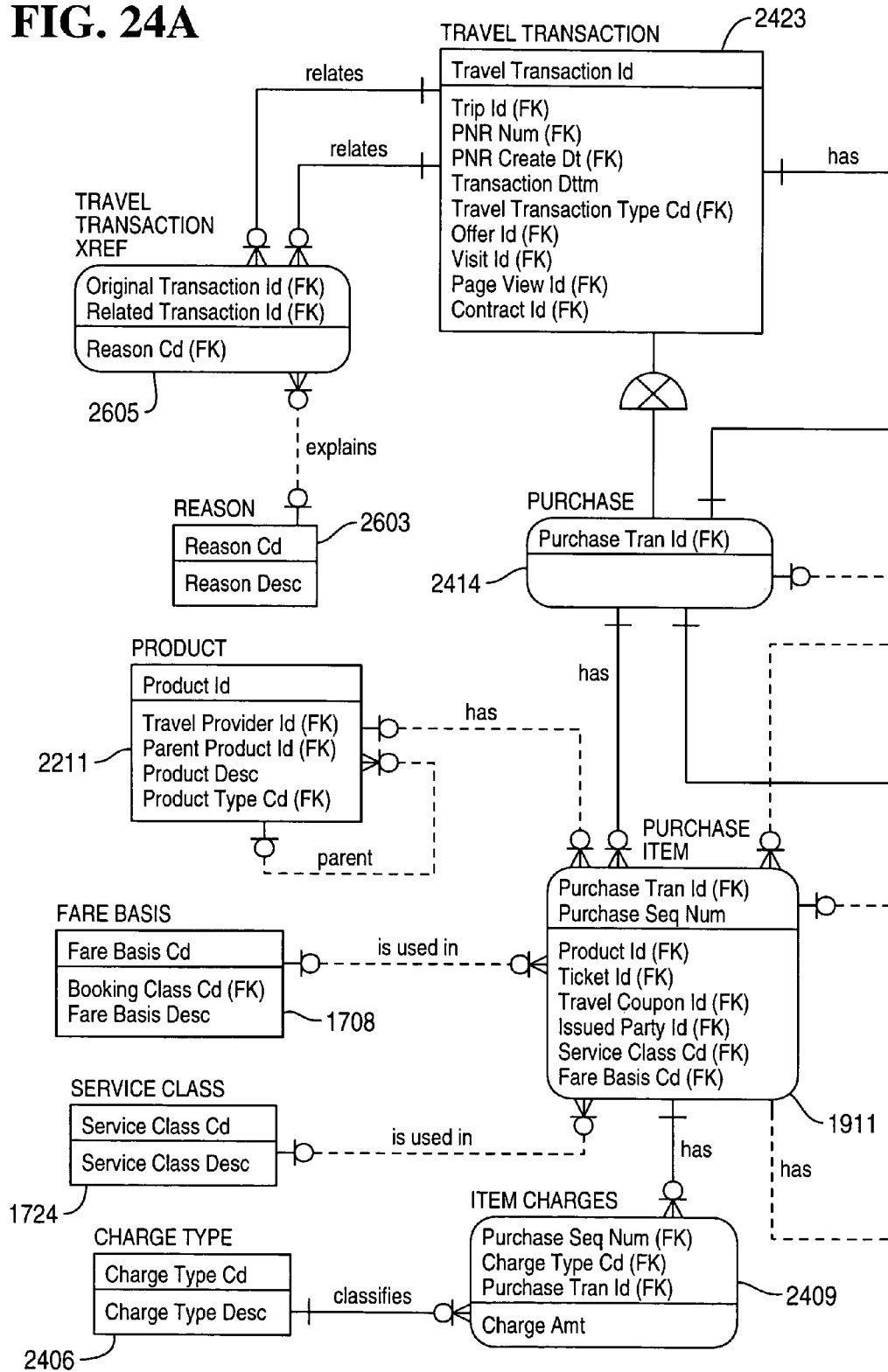
Figure 24B:
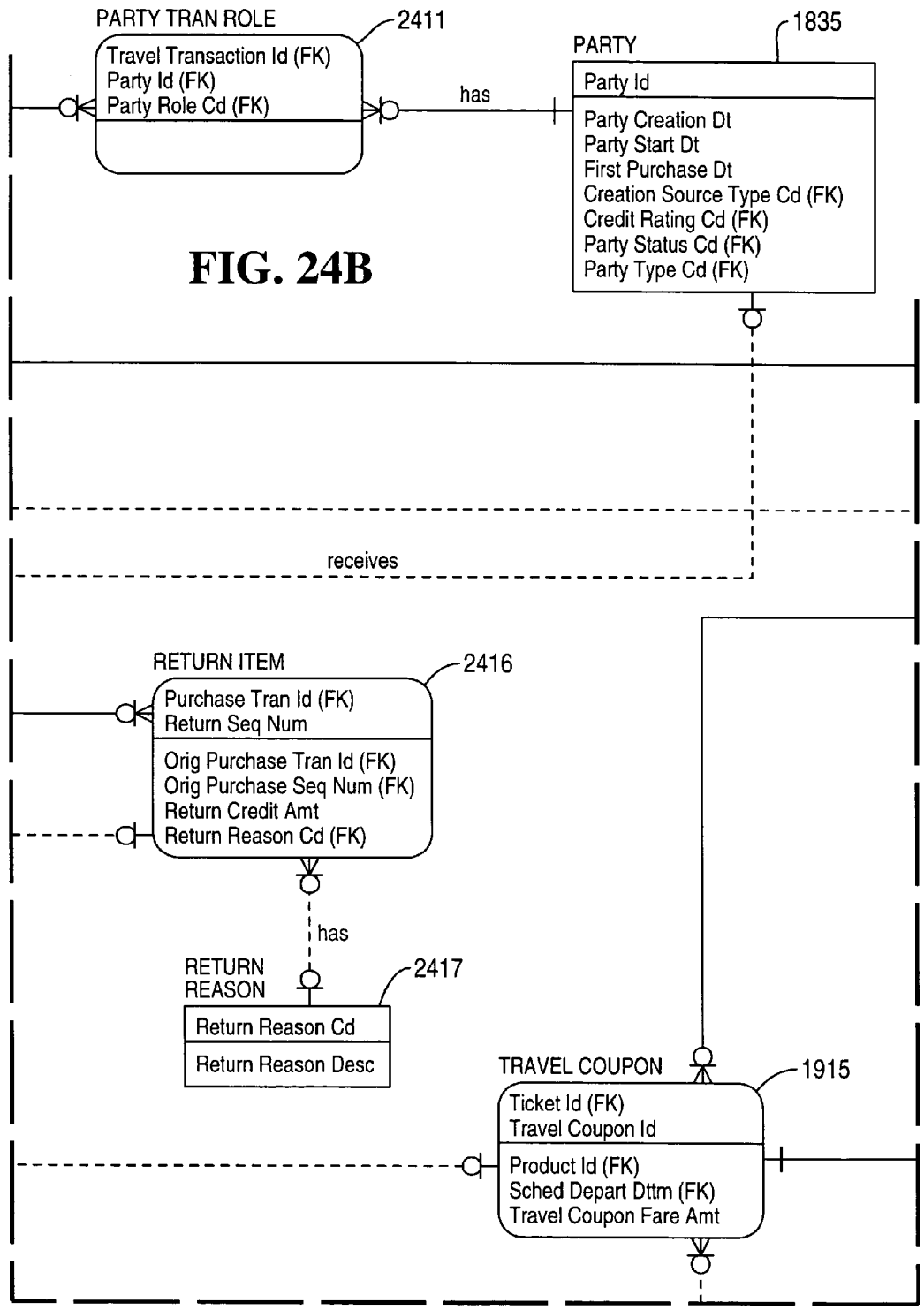
Figure 24C:
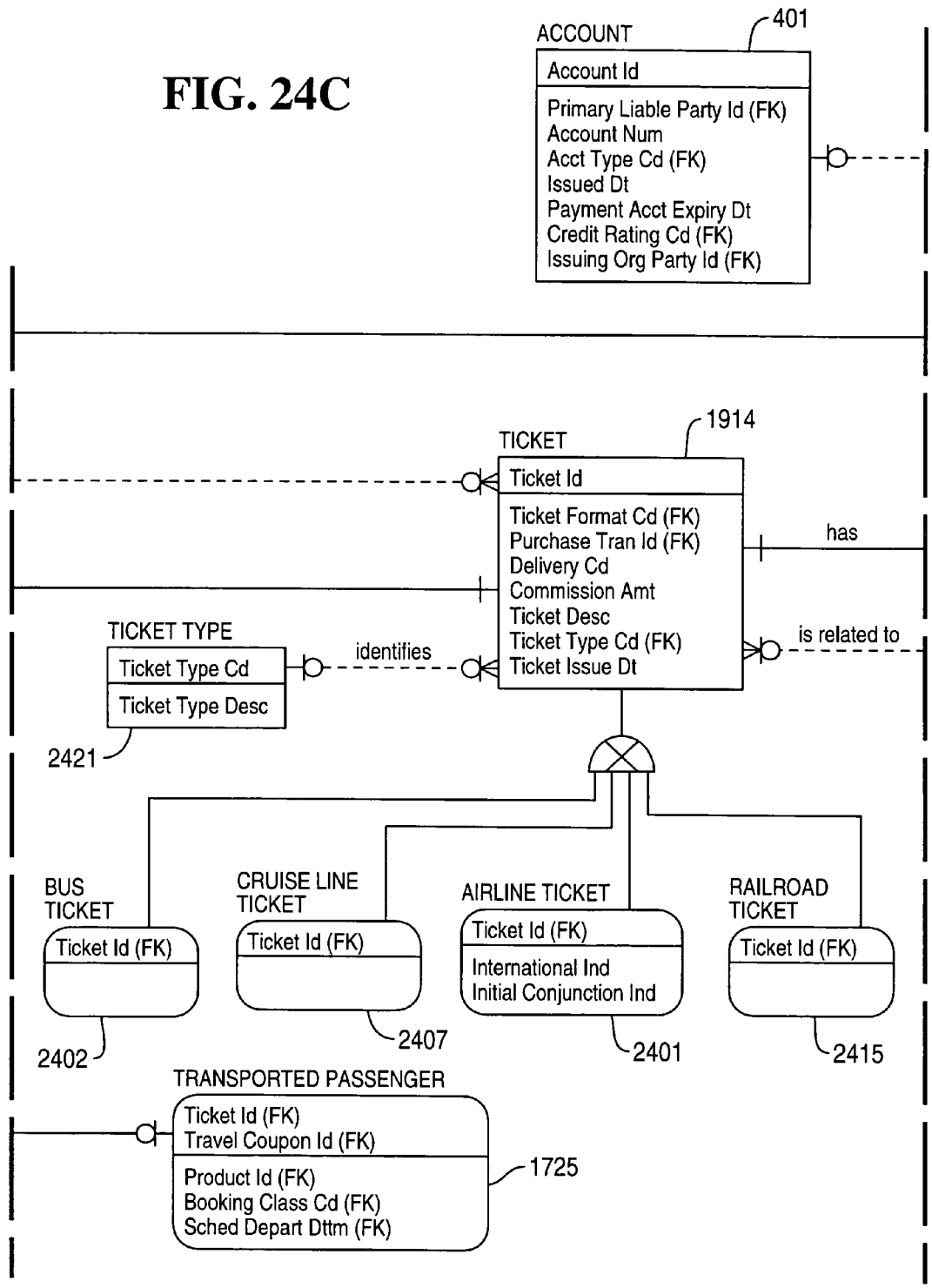
Figure 24D:
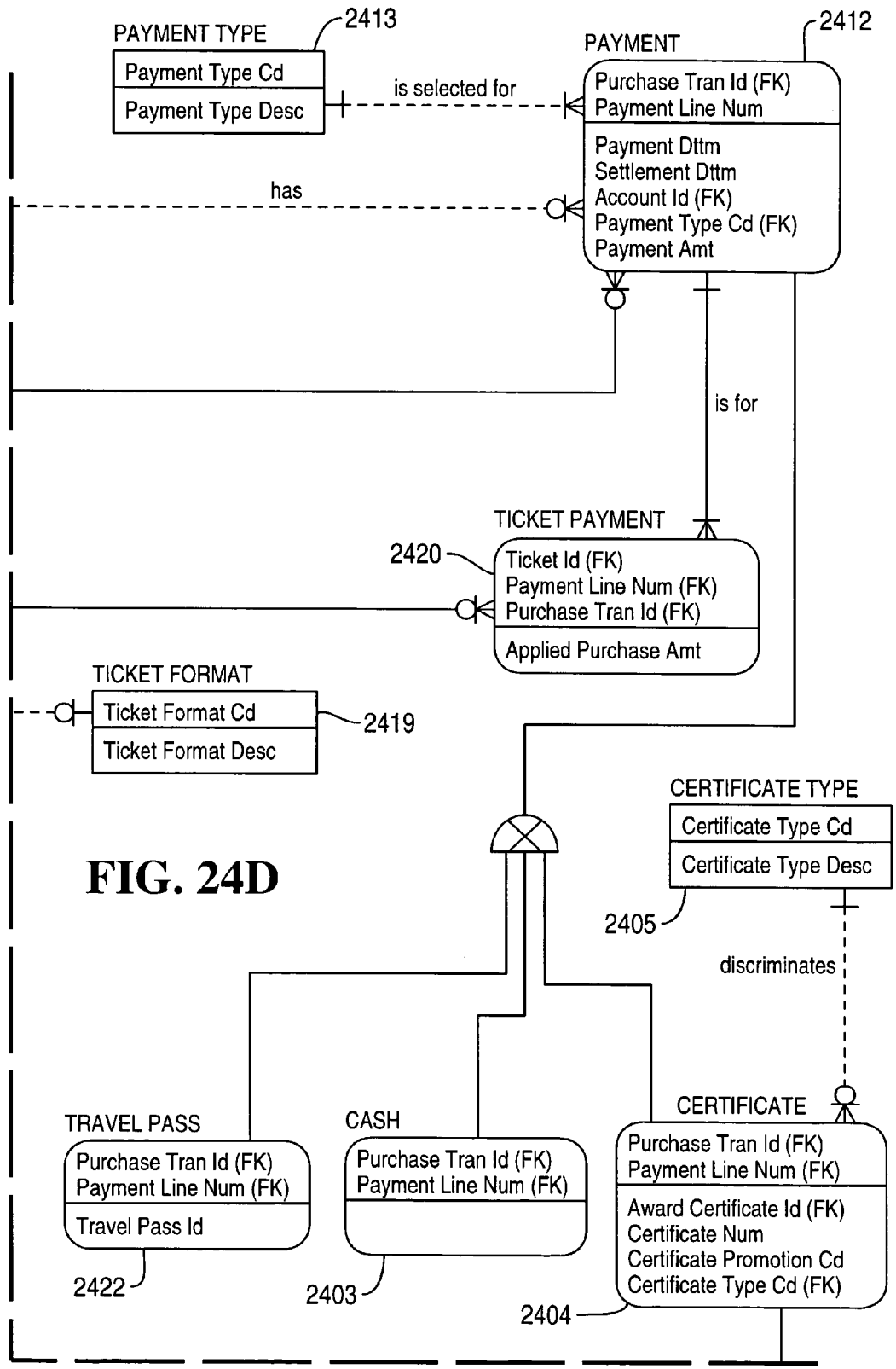
Figure 24E:
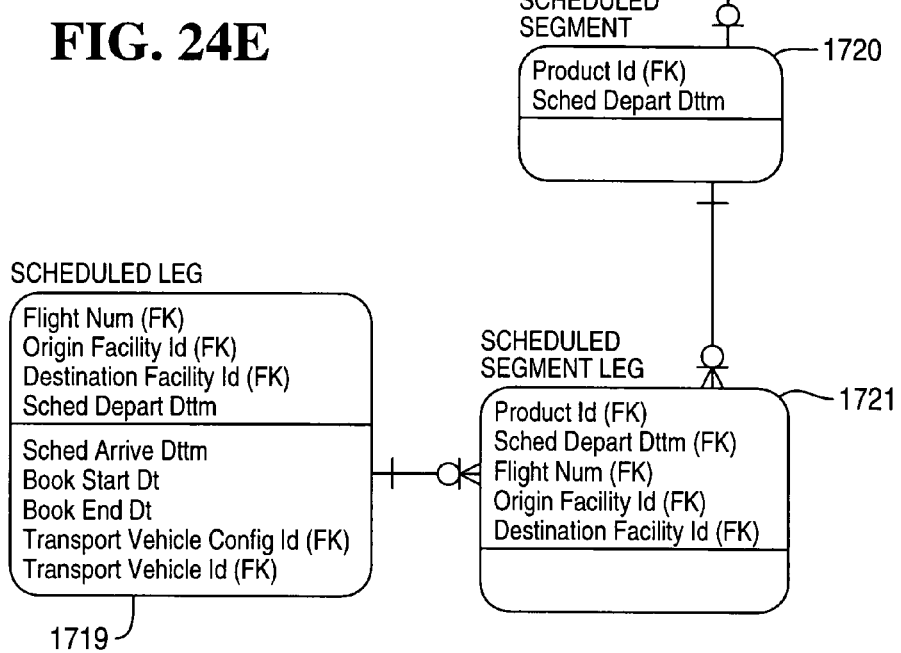
Figure 25:
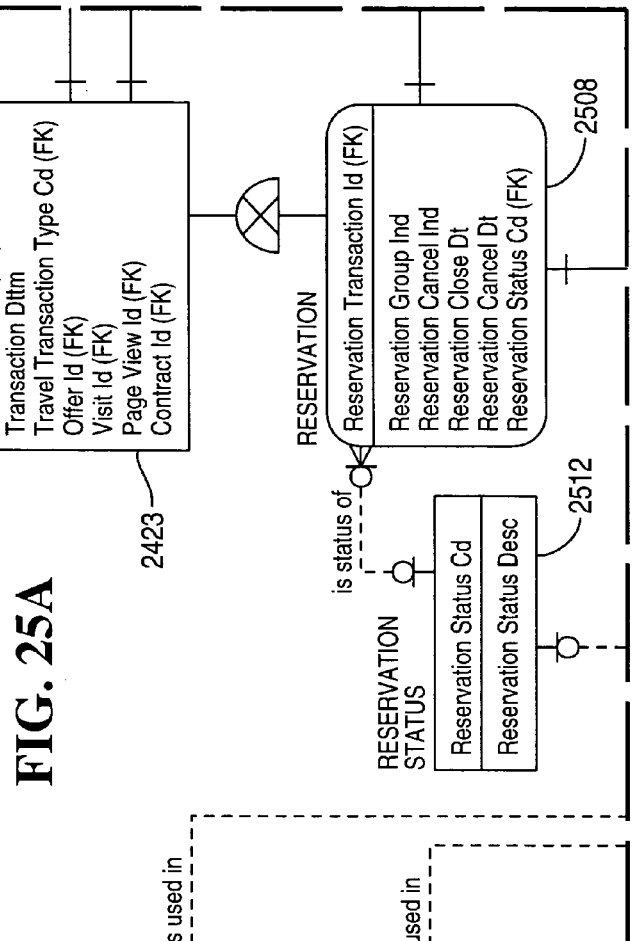
FIGS. 25A through 25D illustrate an entity-relationship diagram of the RESERVATION Subject Area of the logical data model in accordance with the preferred embodiment of the present invention.
Figure 25B:
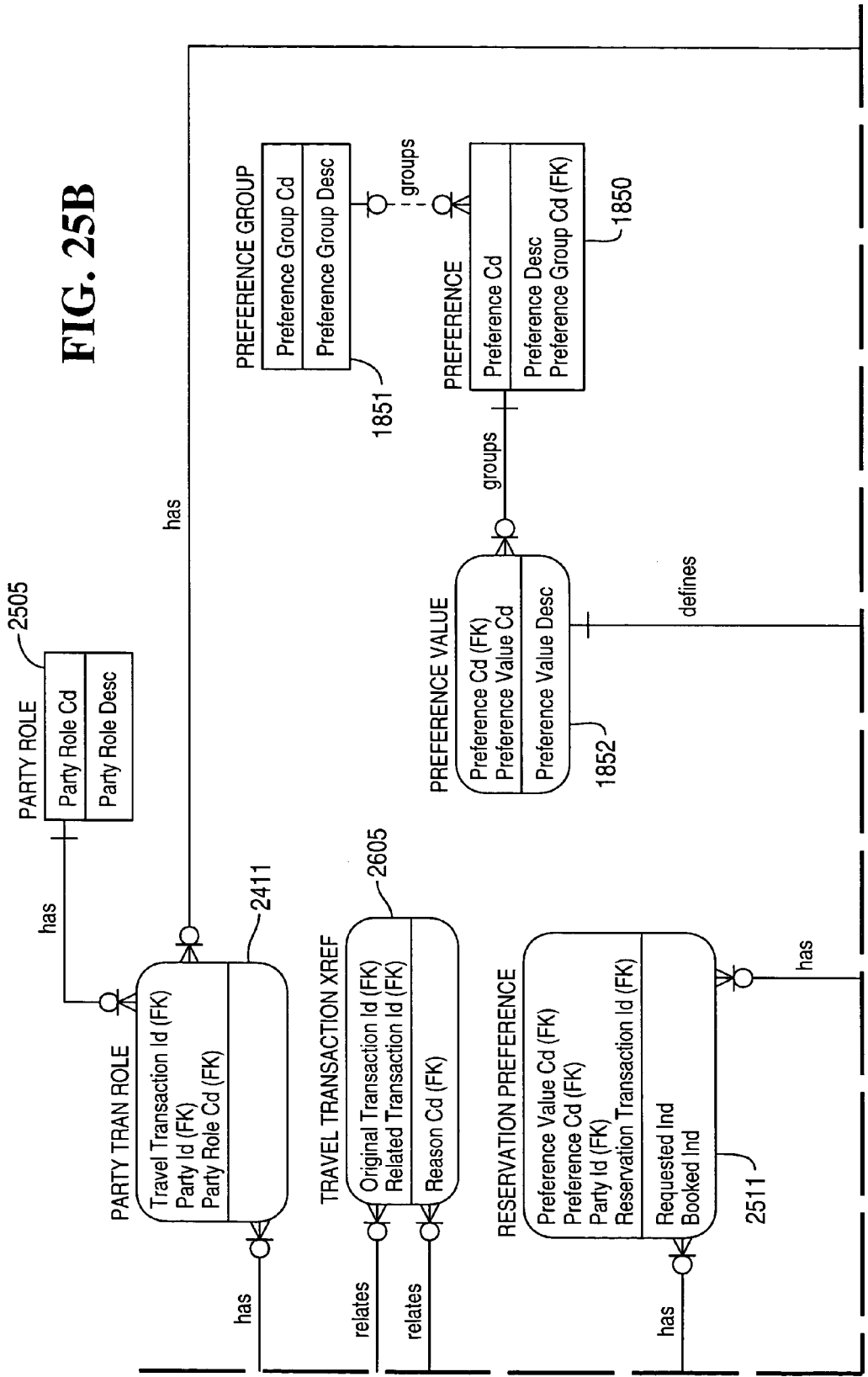
Figure 25C:
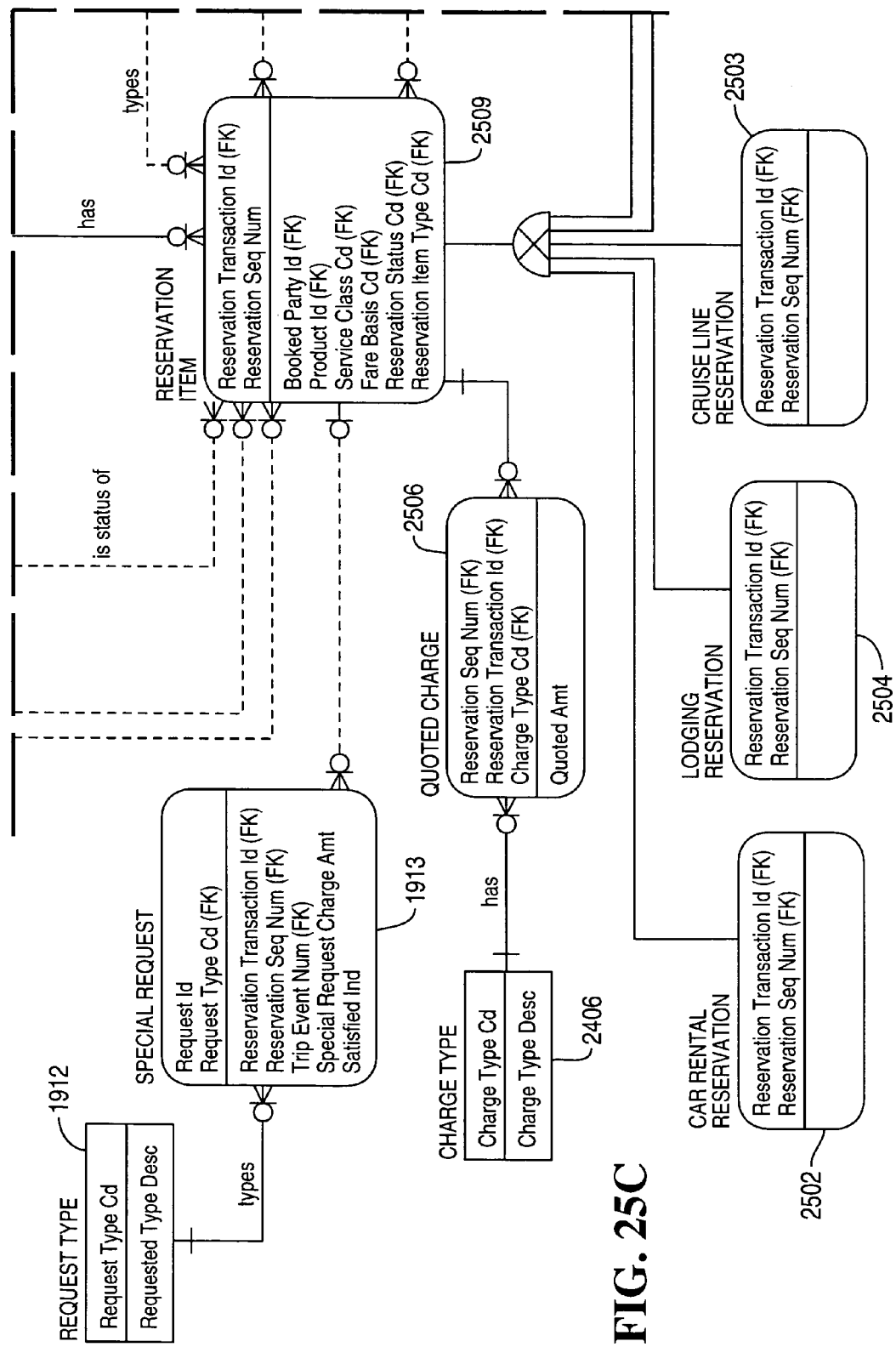
Figure 25D:
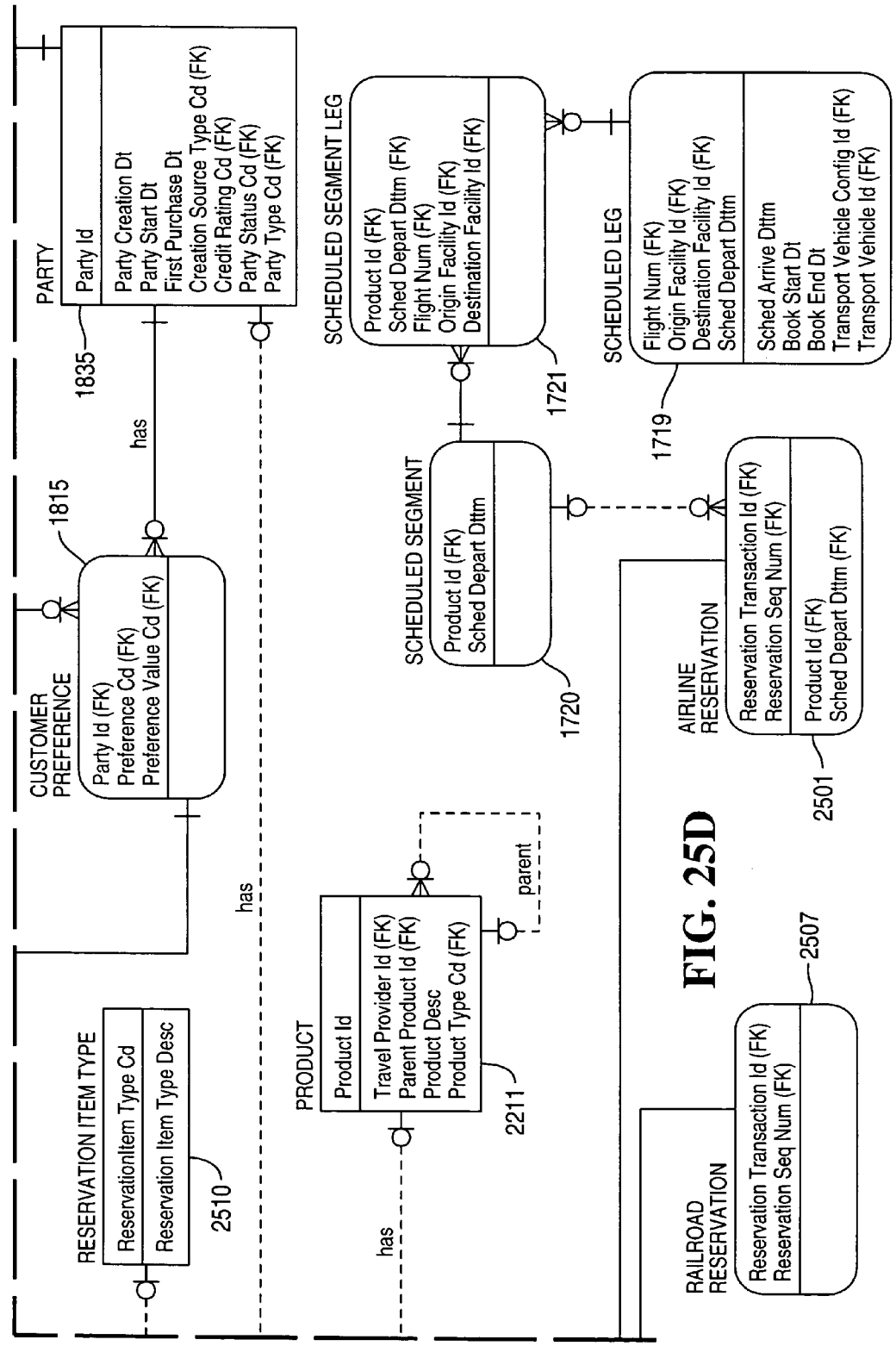
Figure 26A:
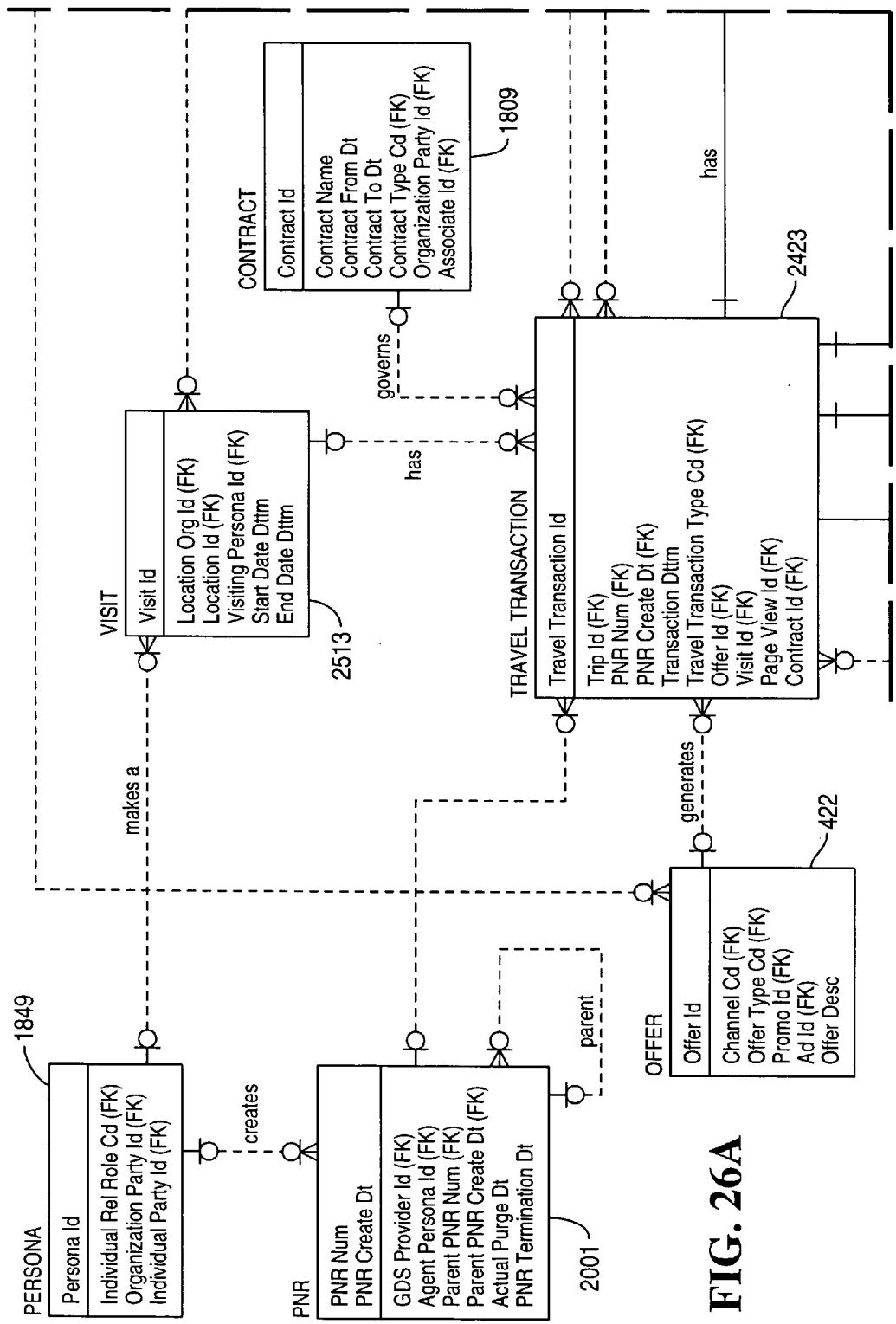
FIGS. 26A through 26D illustrate an entity-relationship diagram of the TRAVEL TRANSACTION Subject Area of the logical data model in accordance with the preferred embodiment of the present invention.
Figure 26B:
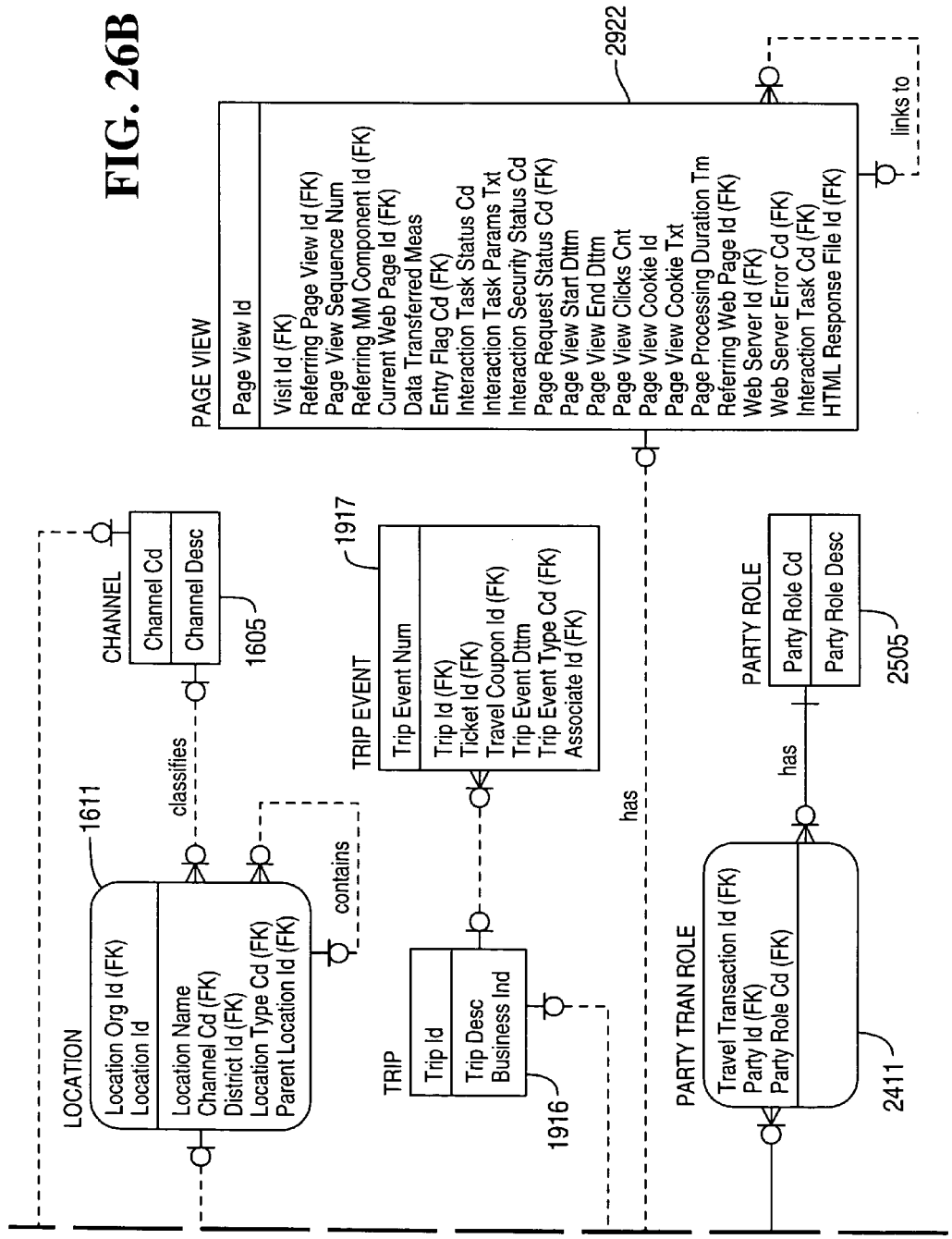
Figure 26C:
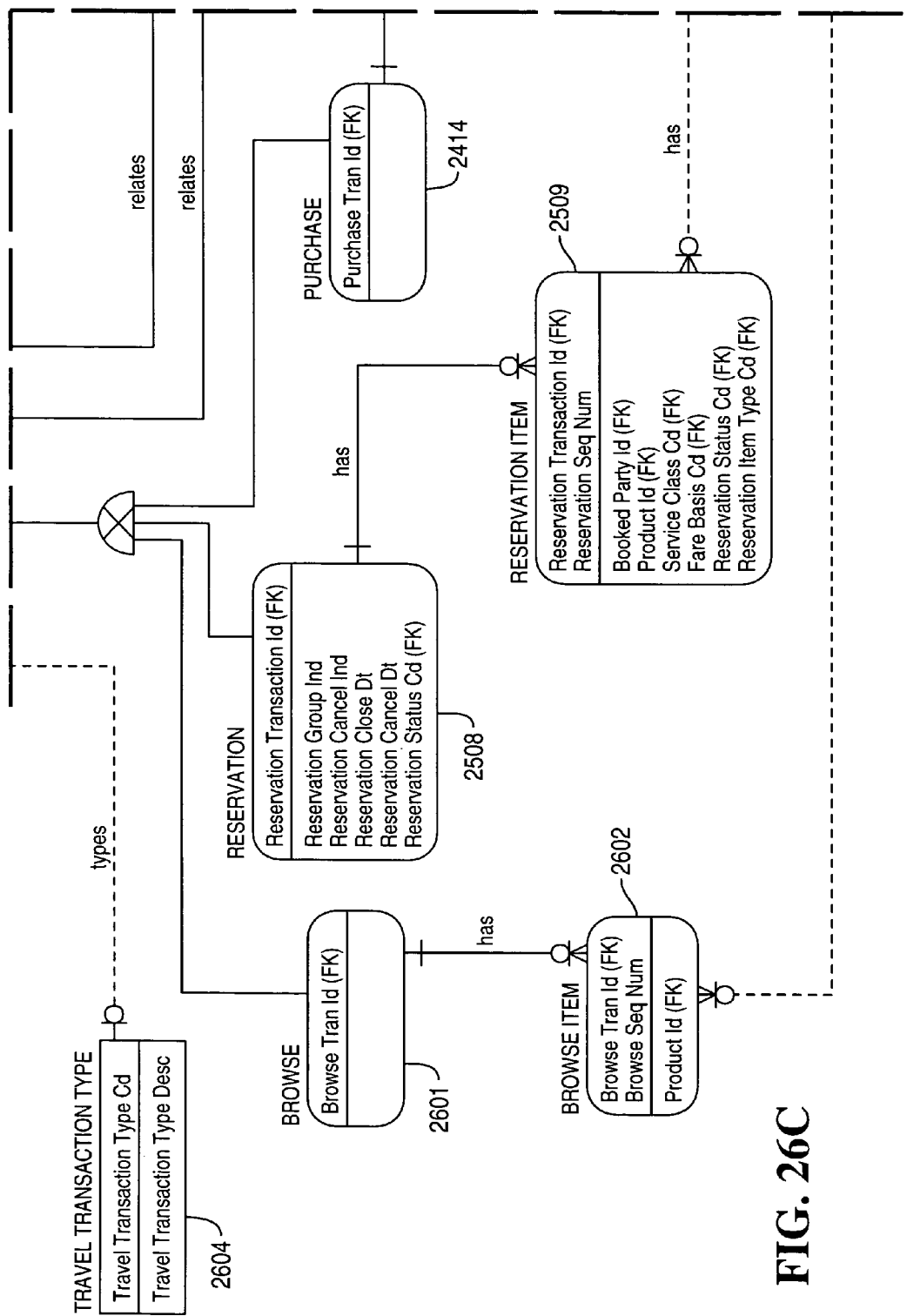
Figure 26:
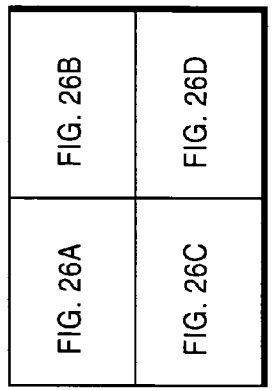
Figure 26D:
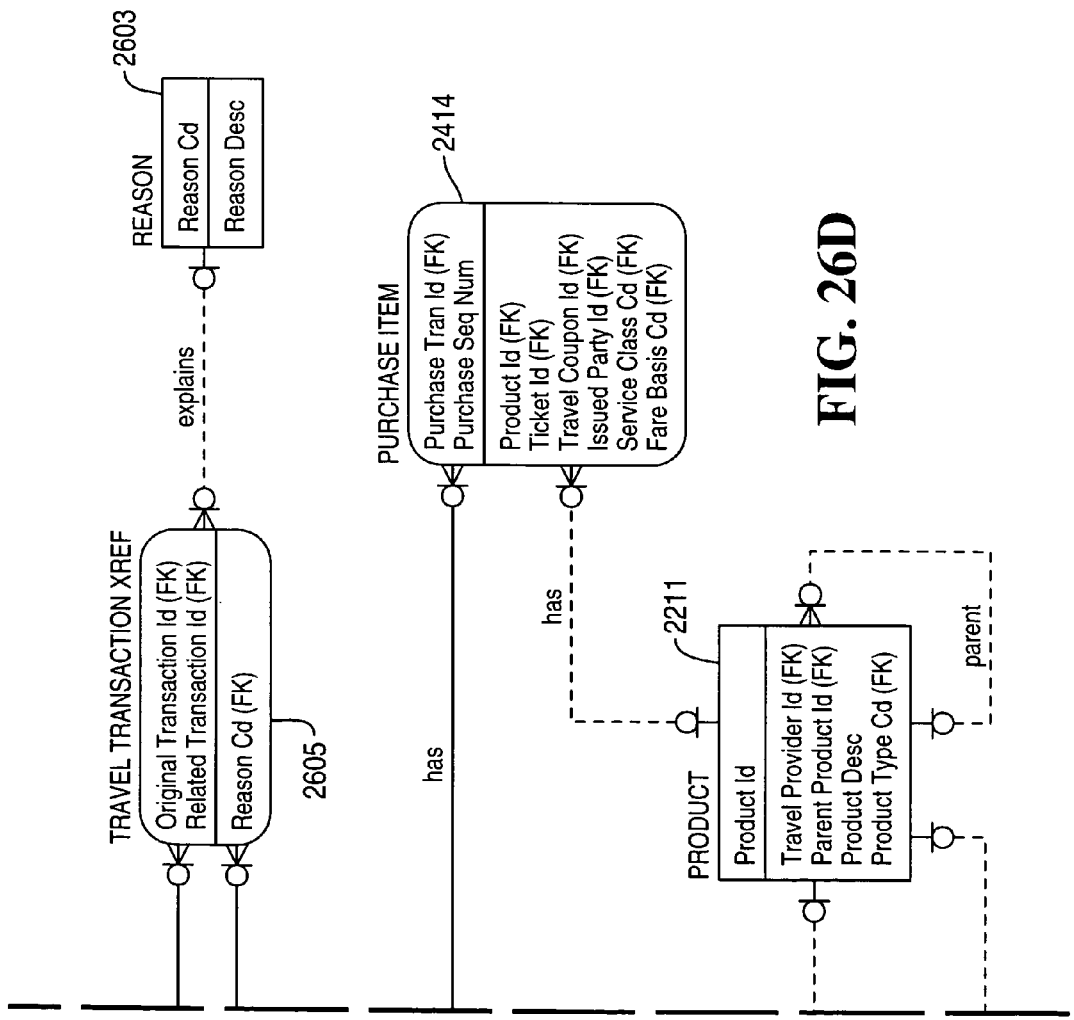
Figure 27A:
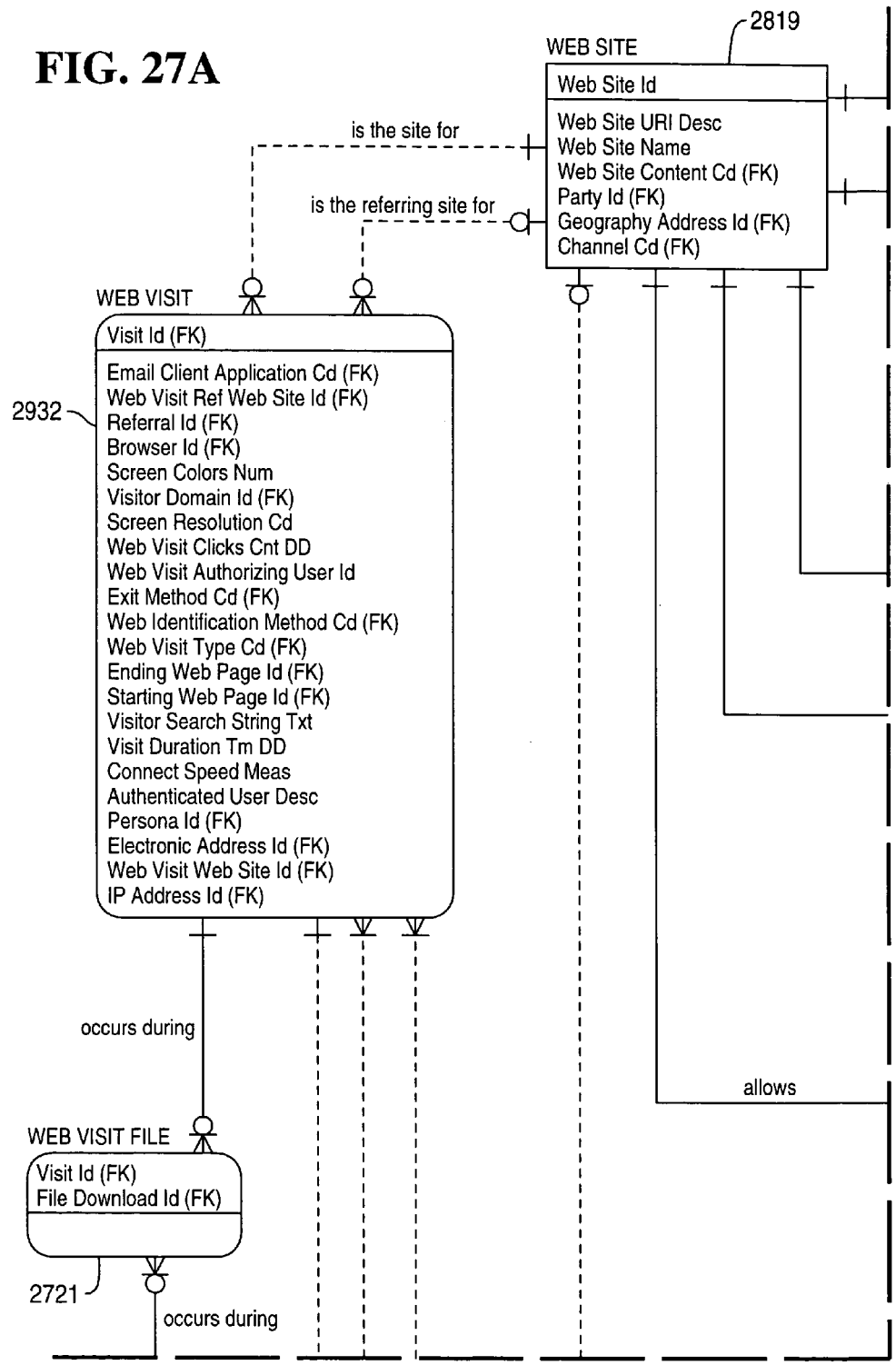
FIGS. 27A through 27F illustrate an entity-relationship diagram of the WEB OPERATIONS Subject Area of the logical data model in accordance with the preferred embodiment of the present invention.
Figure 27B:
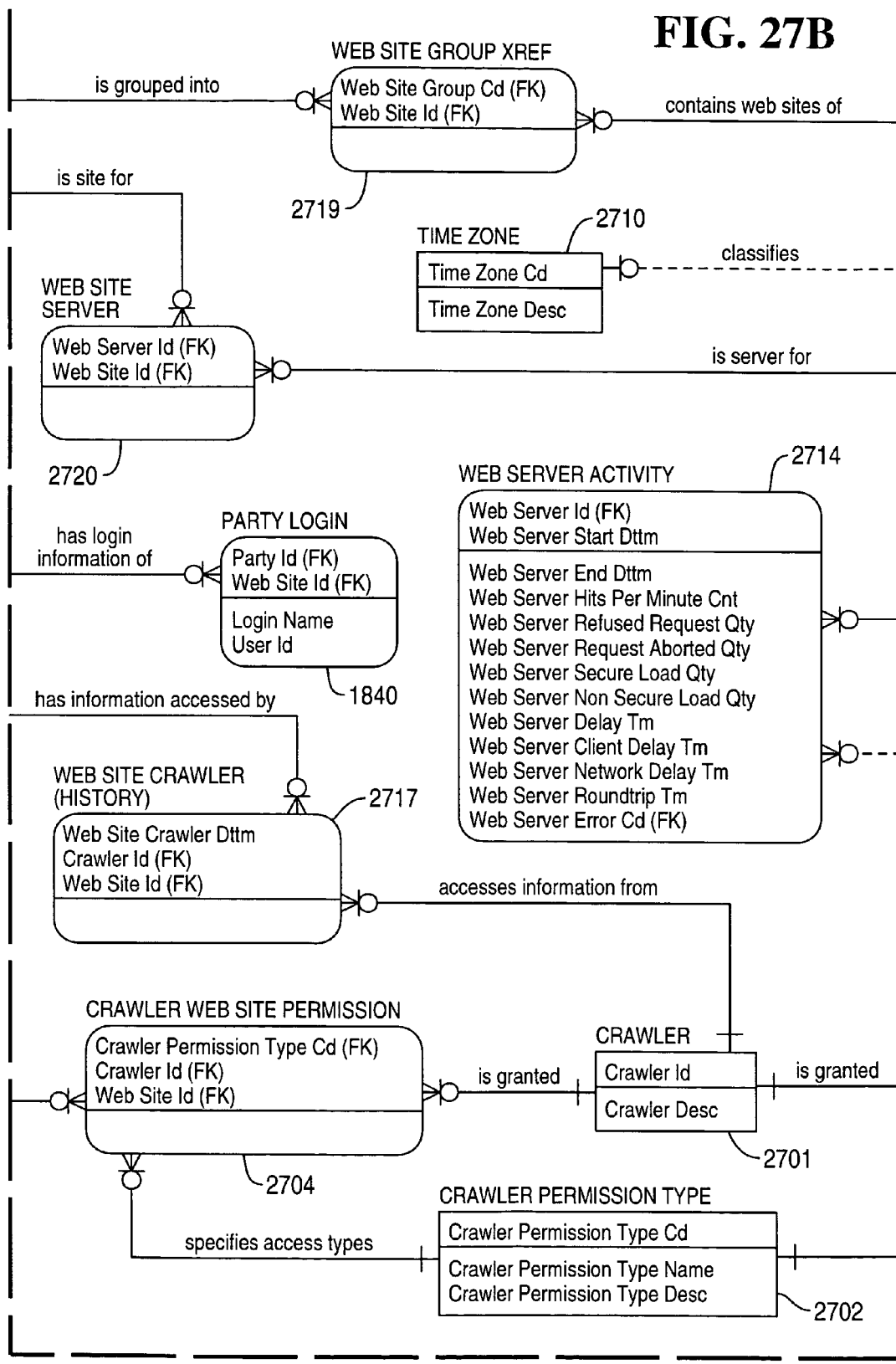
Figure 27C:
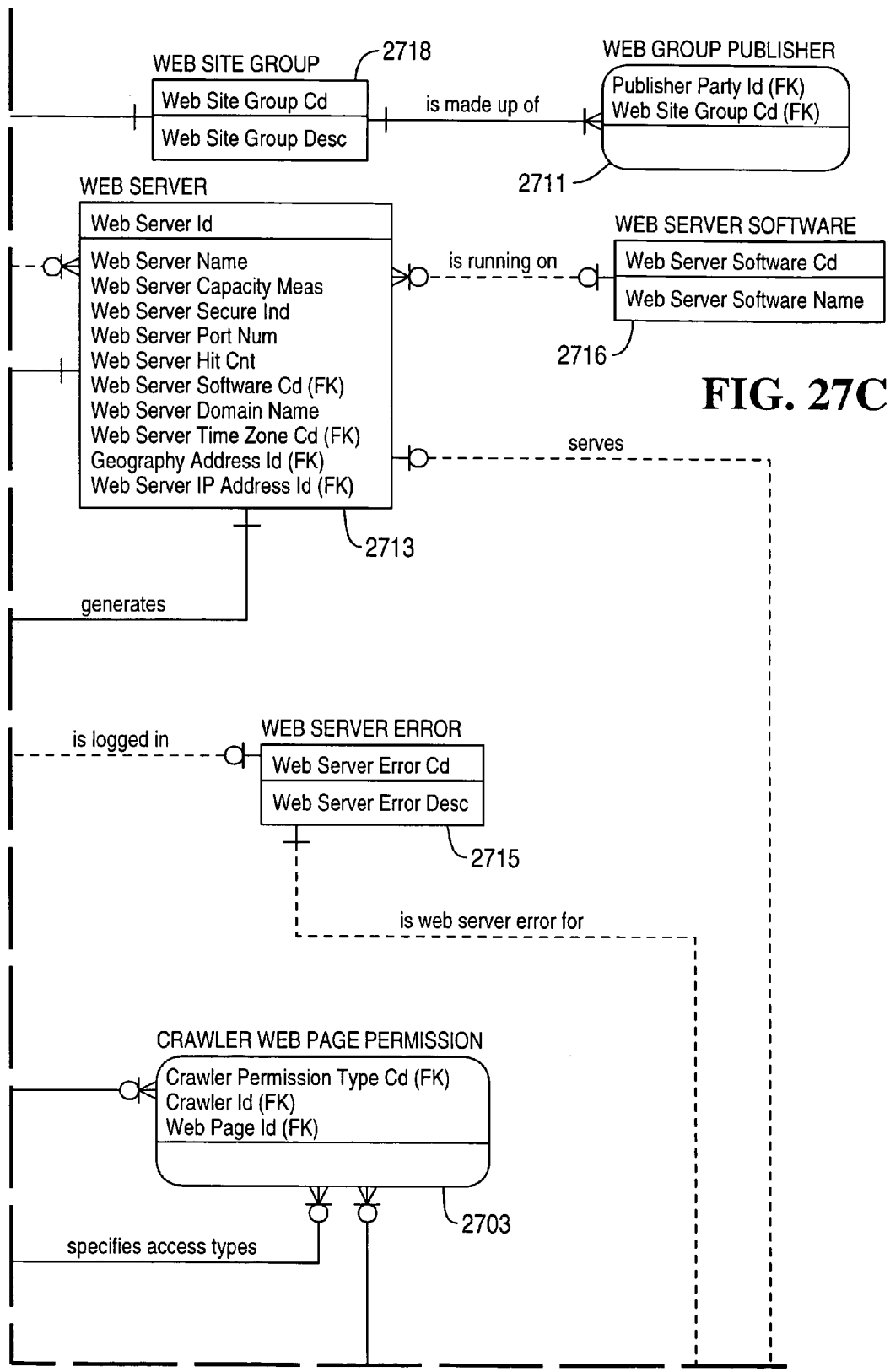
Figure 27D:
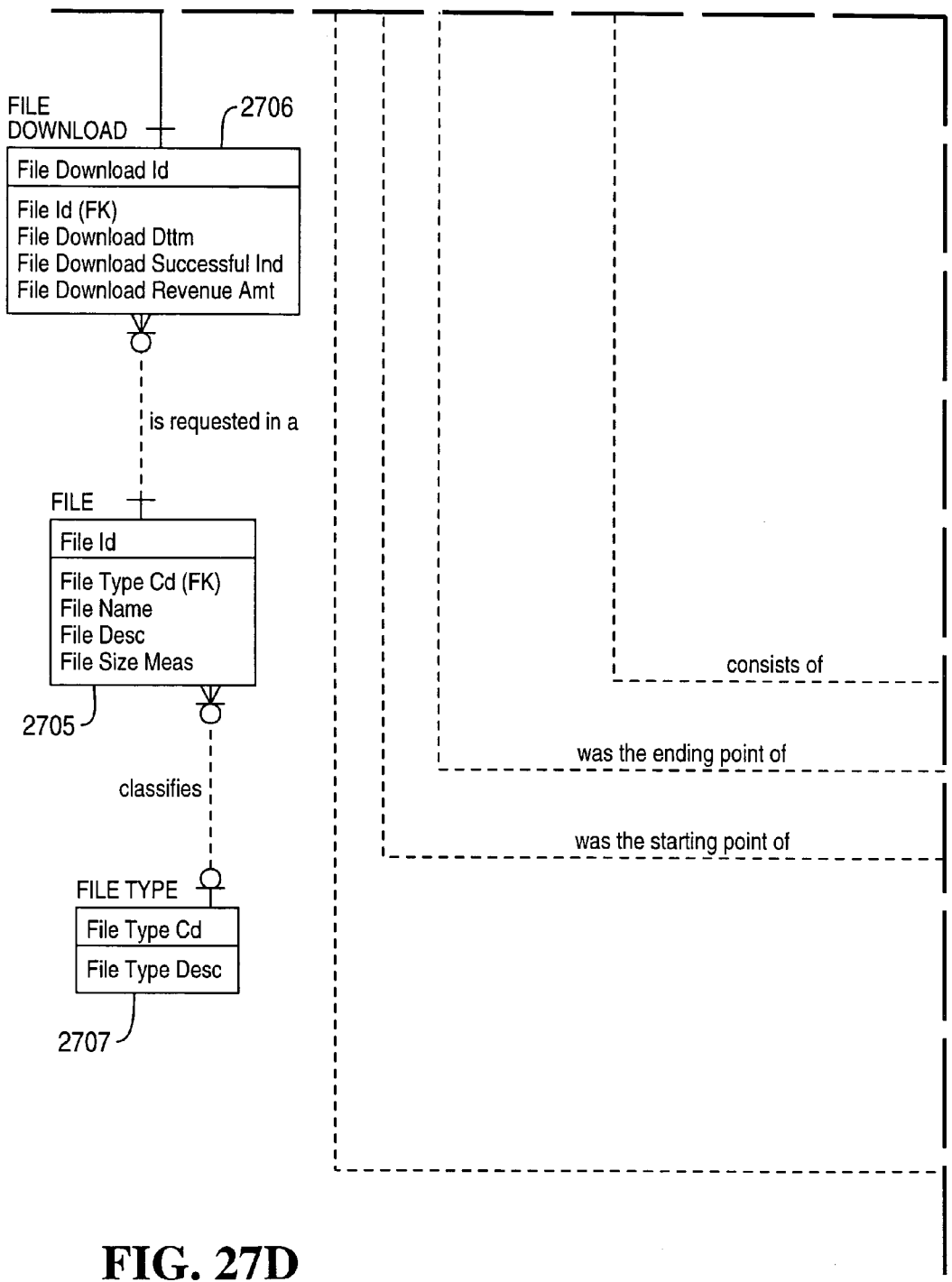
Figure 27E:
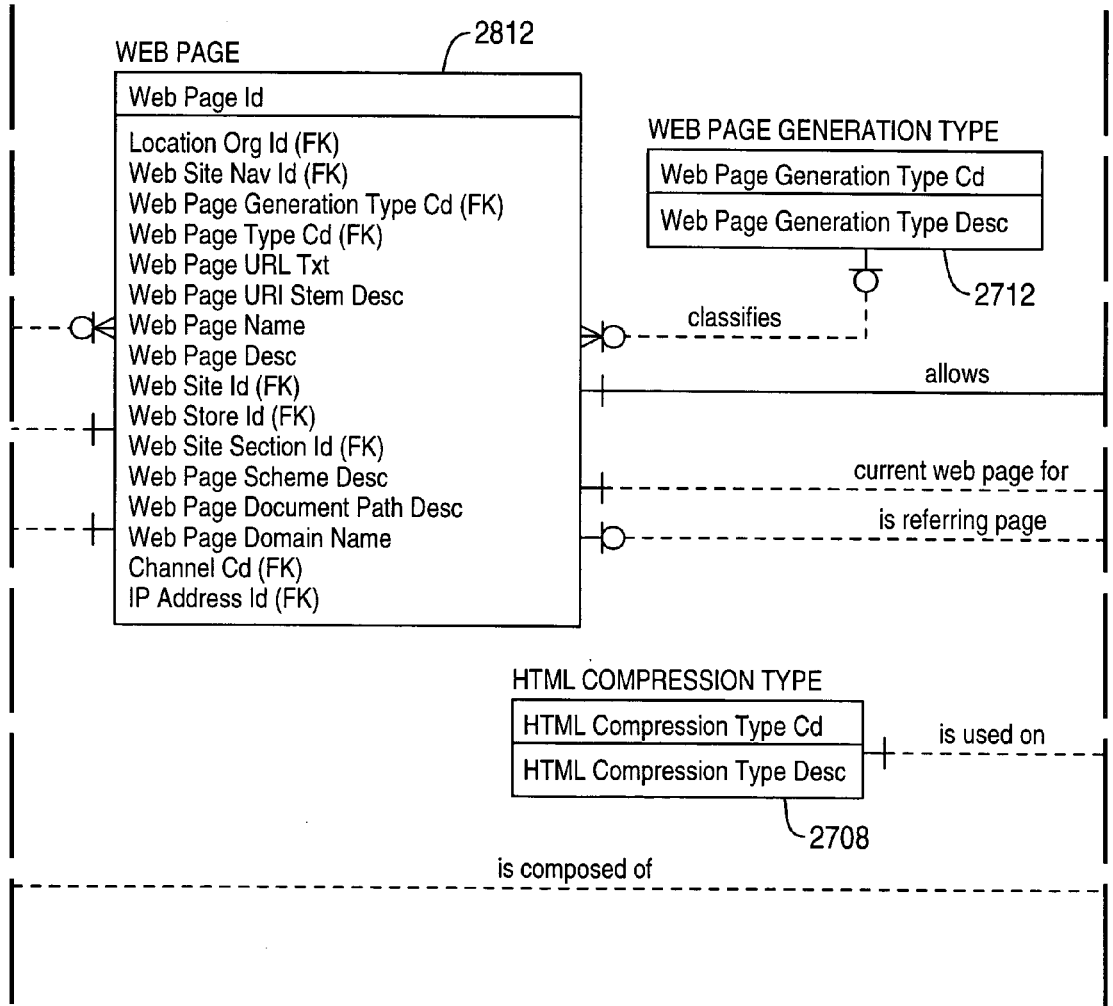
Figure 27F:
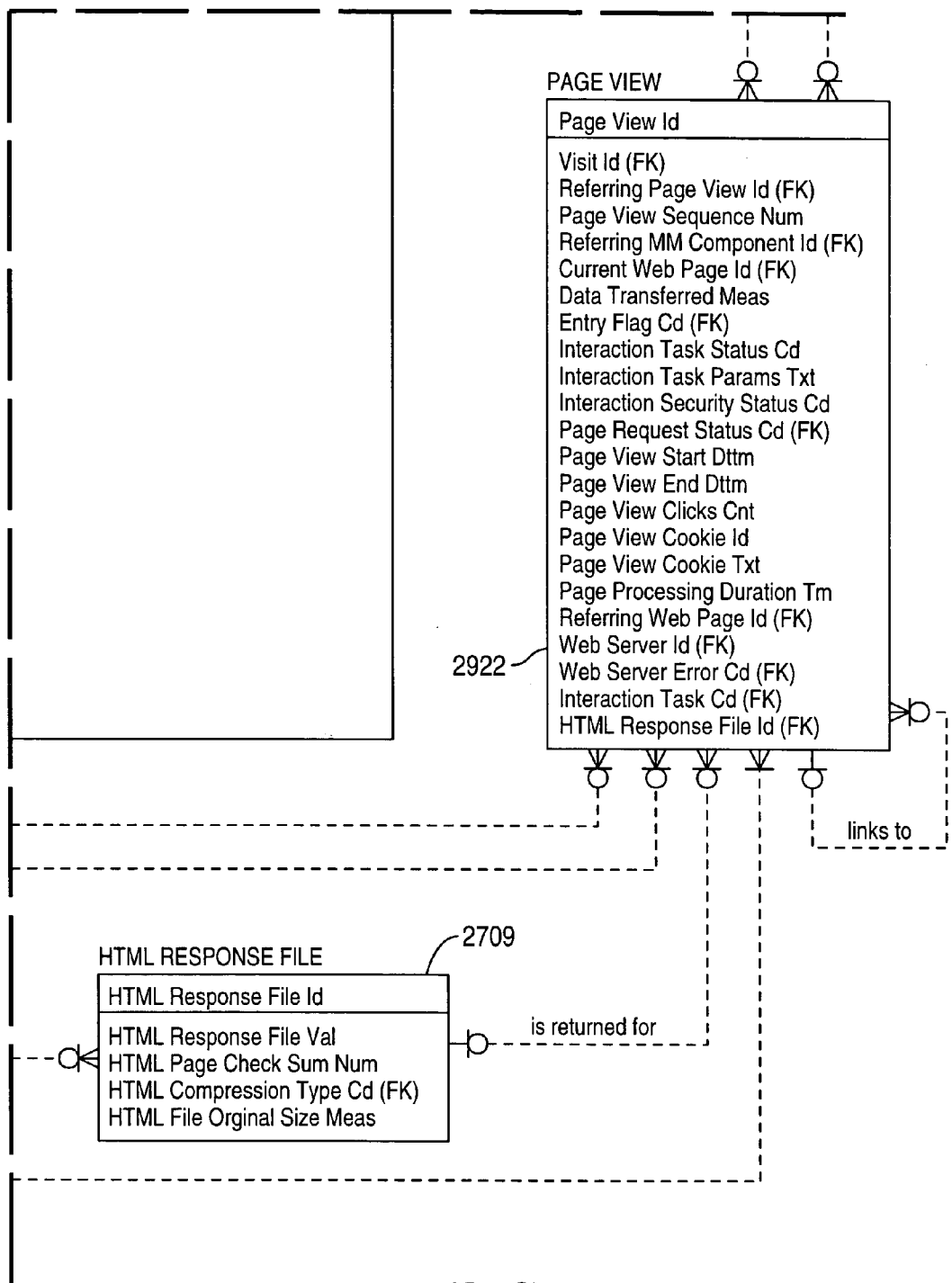
Figure 28A:
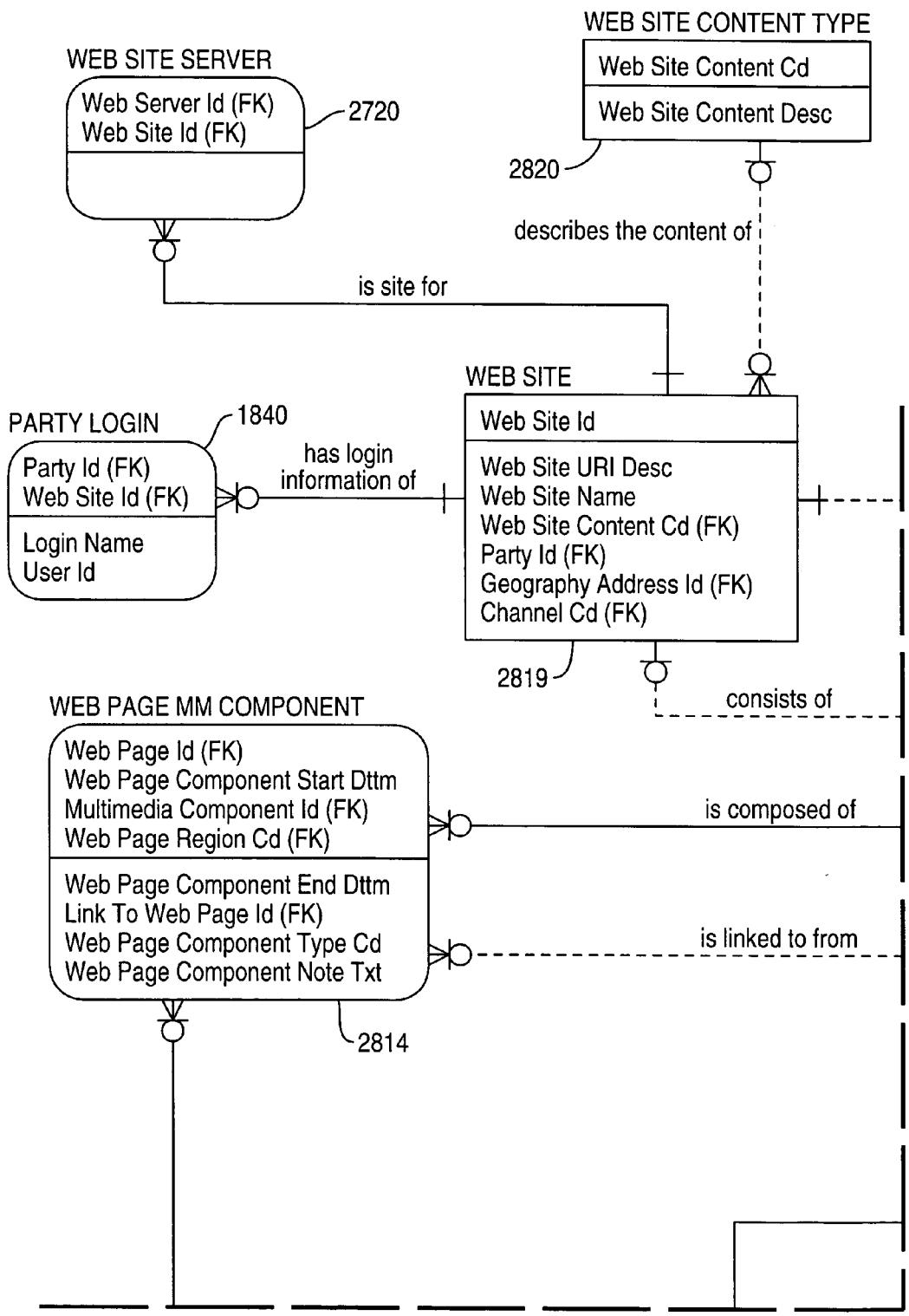
FIGS. 28A through 28F illustrate an entity-relationship diagram of the WEB SITE Subject Area of the logical data model in accordance with the preferred embodiment of the present invention.
Figure 28B:
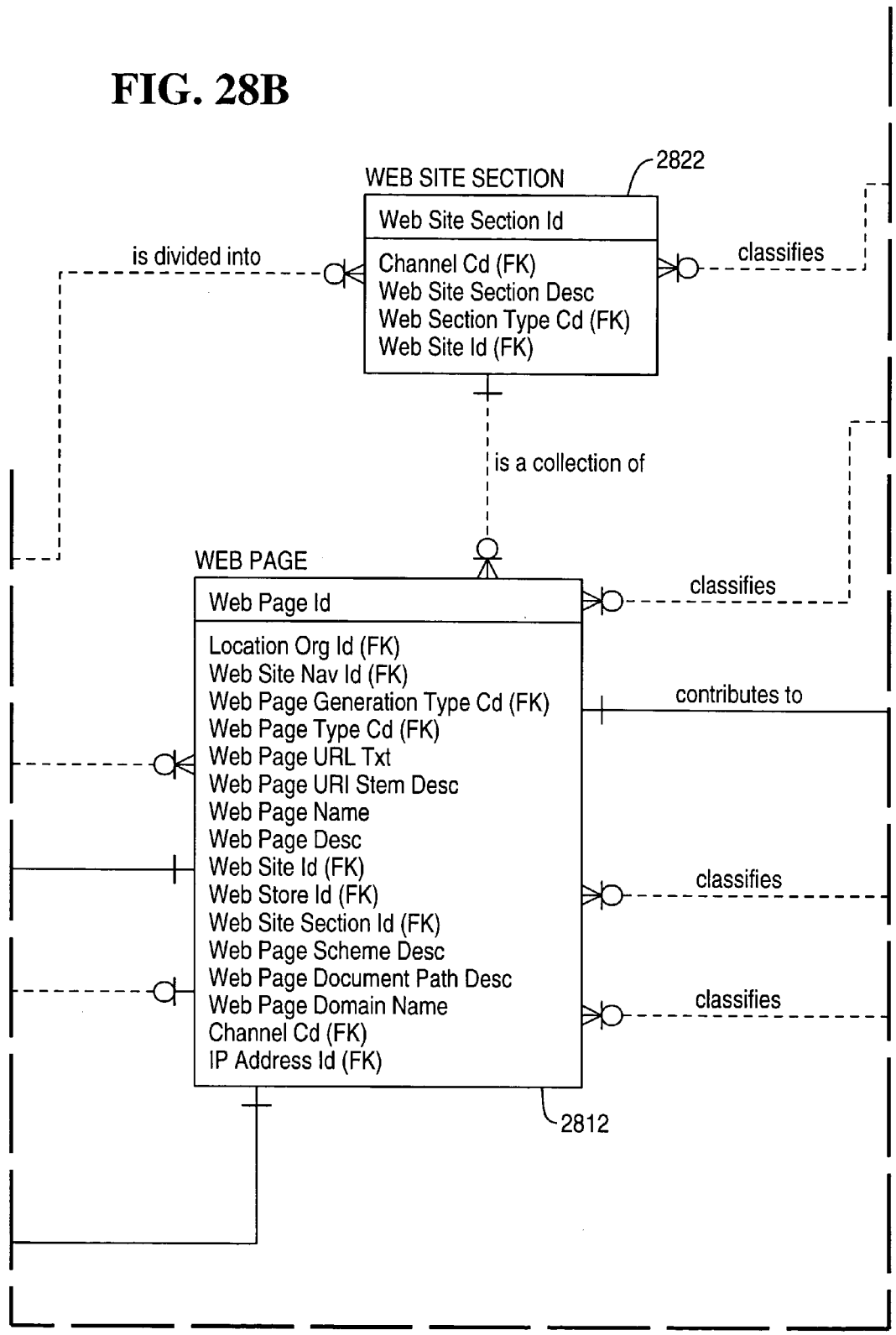
Figure 28C:
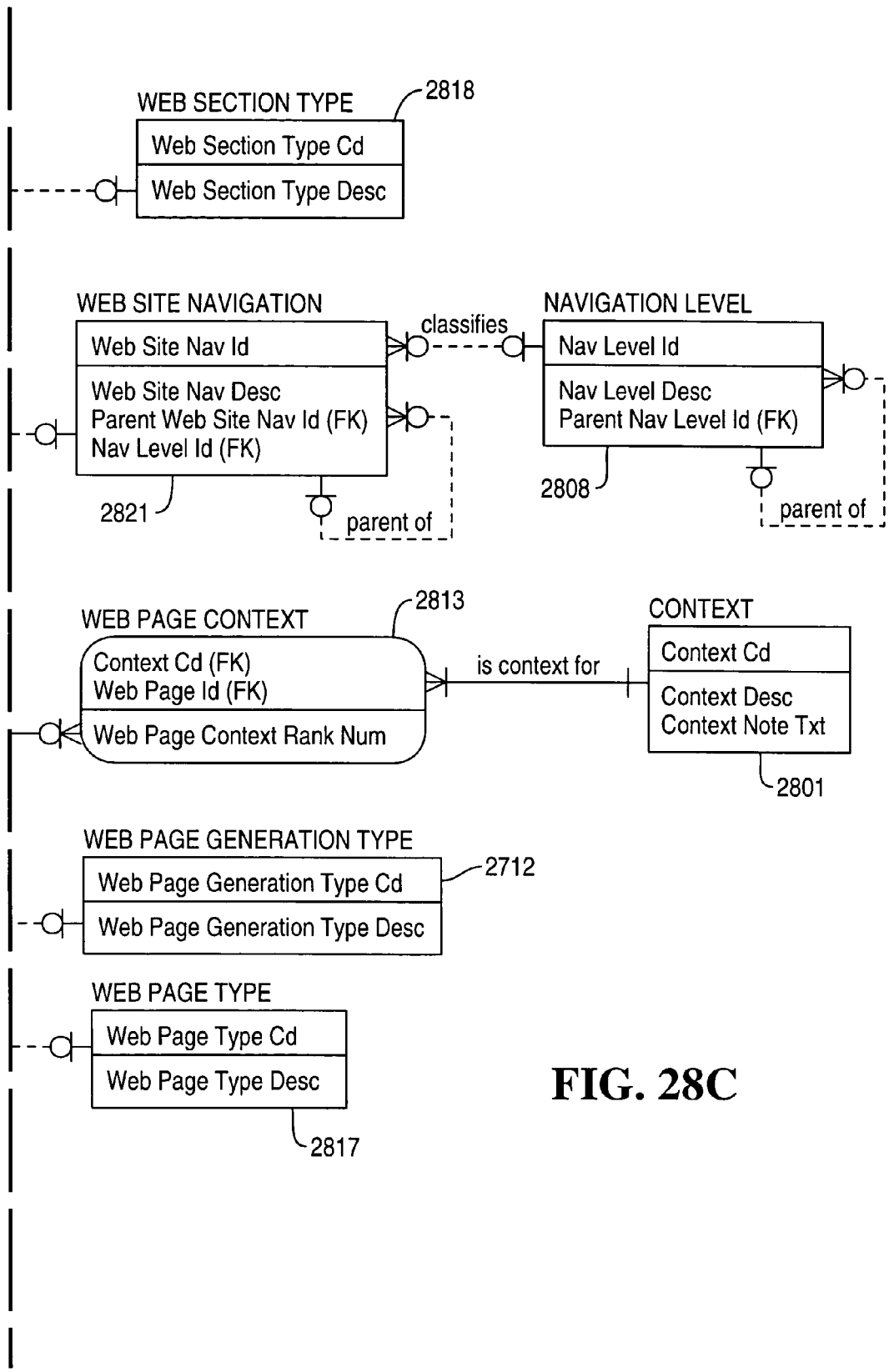
Figure 28D:
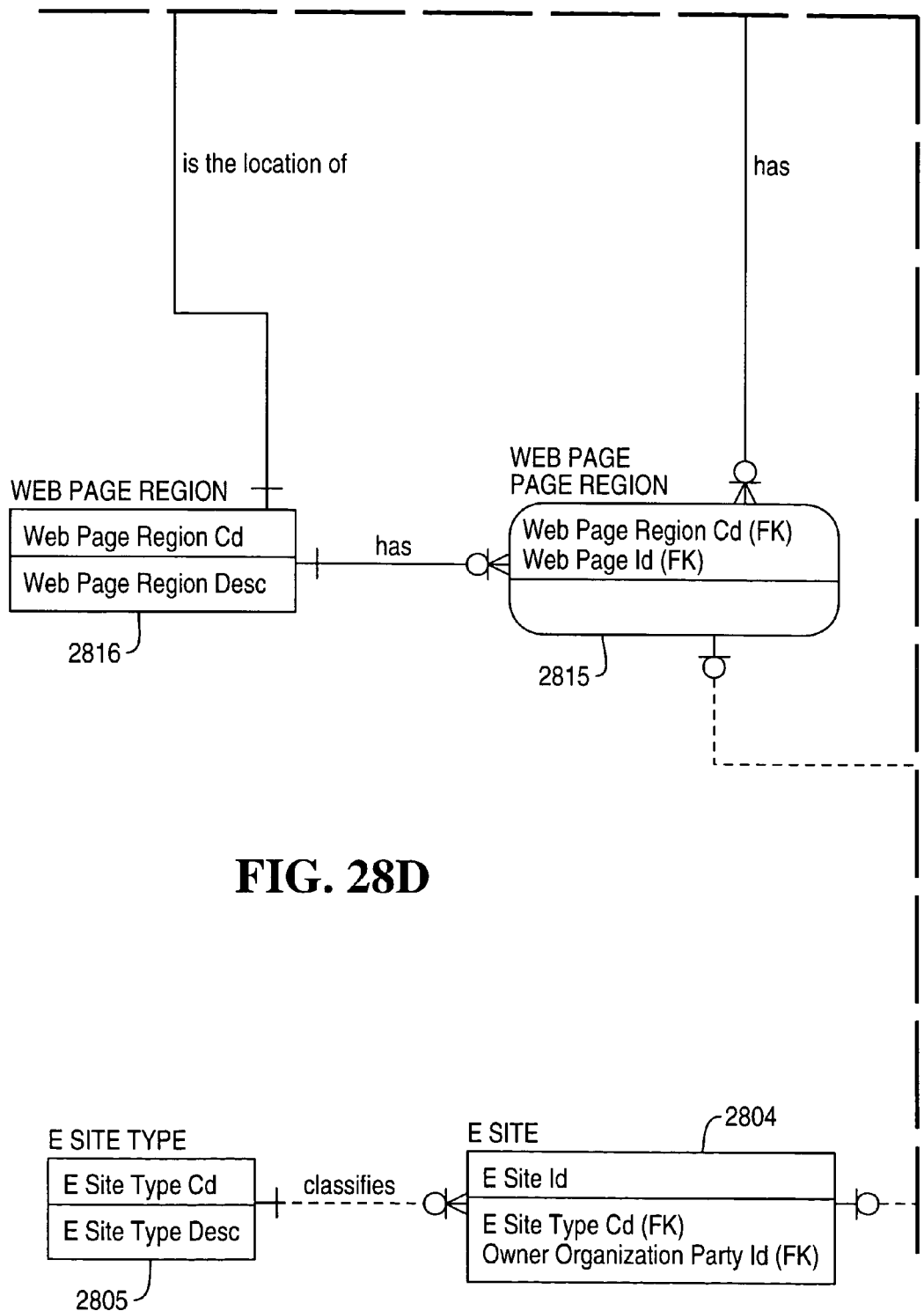
Figure 28E:
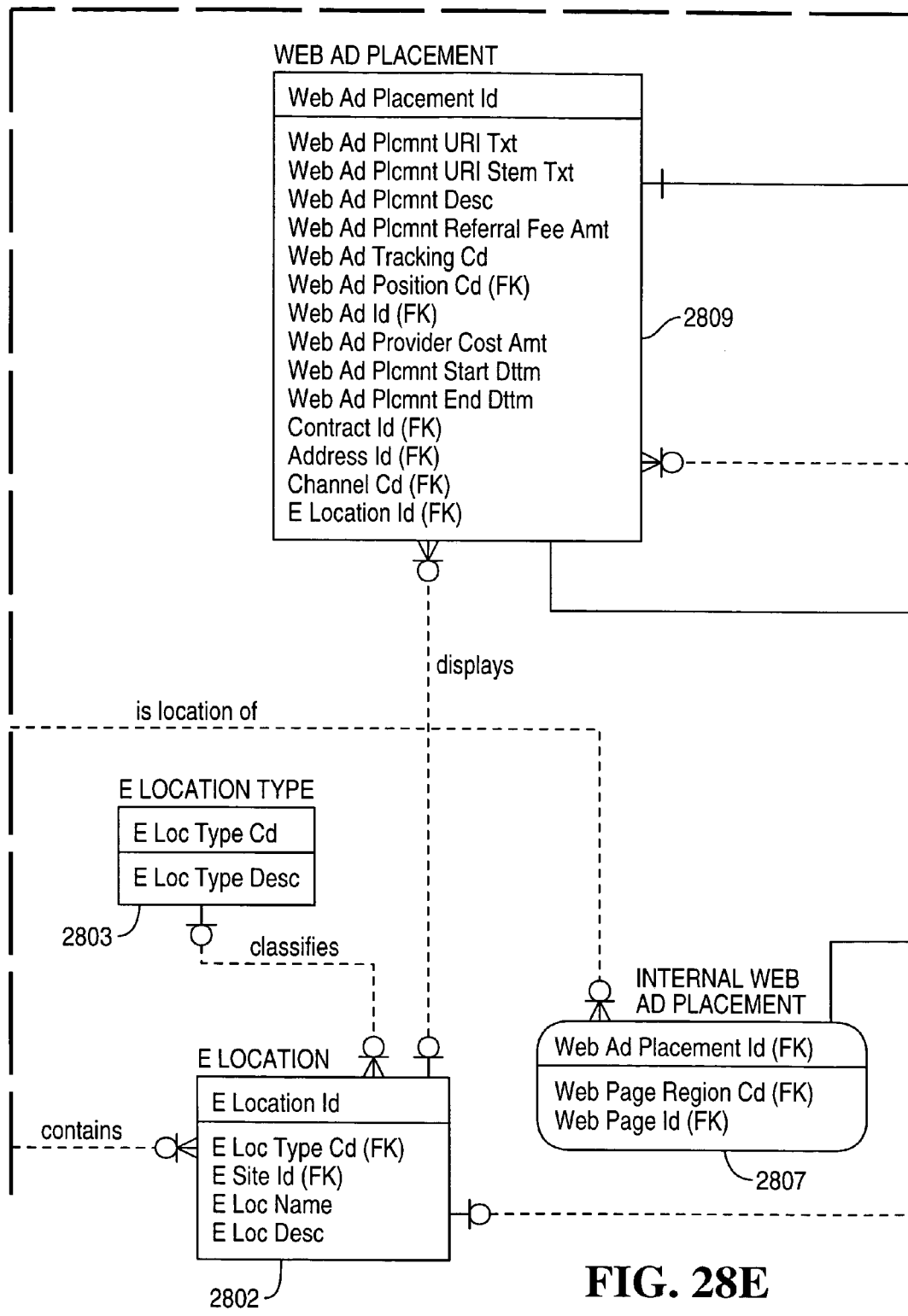
Figure 28F:
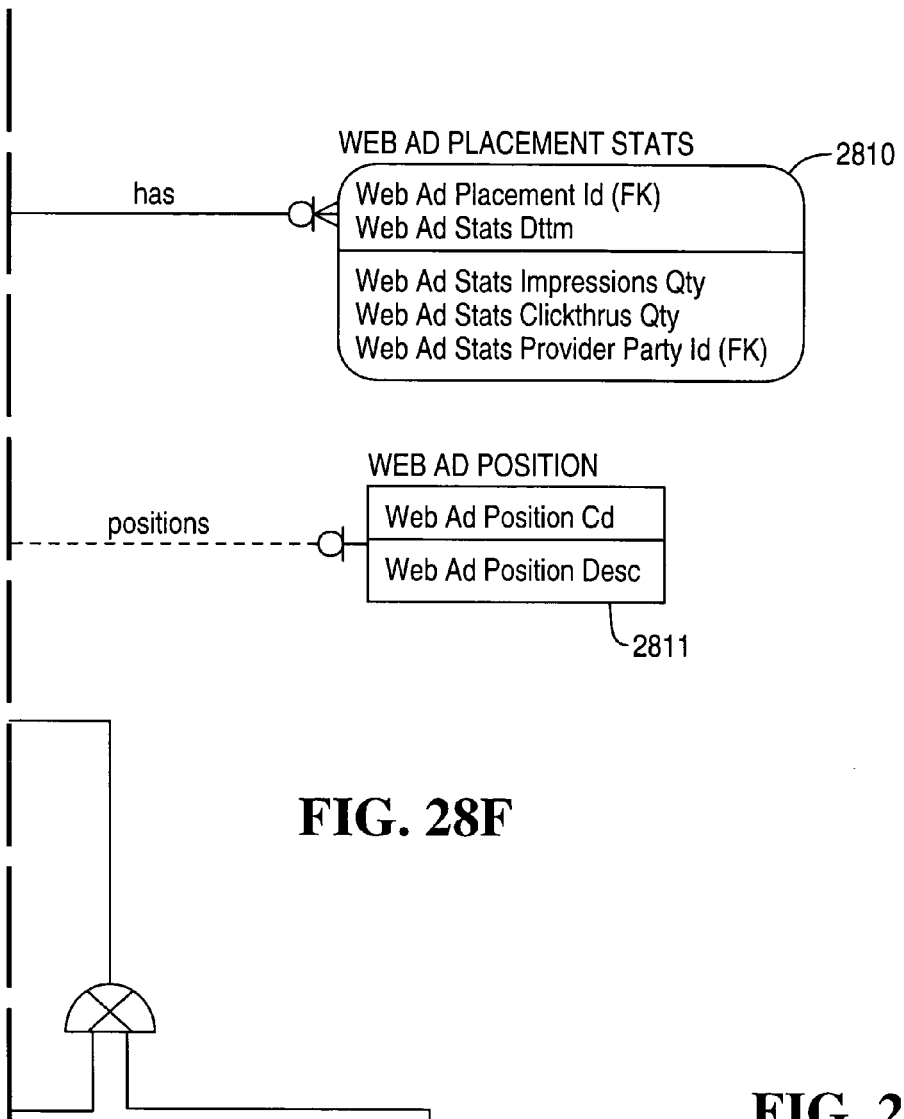
Figure 28:
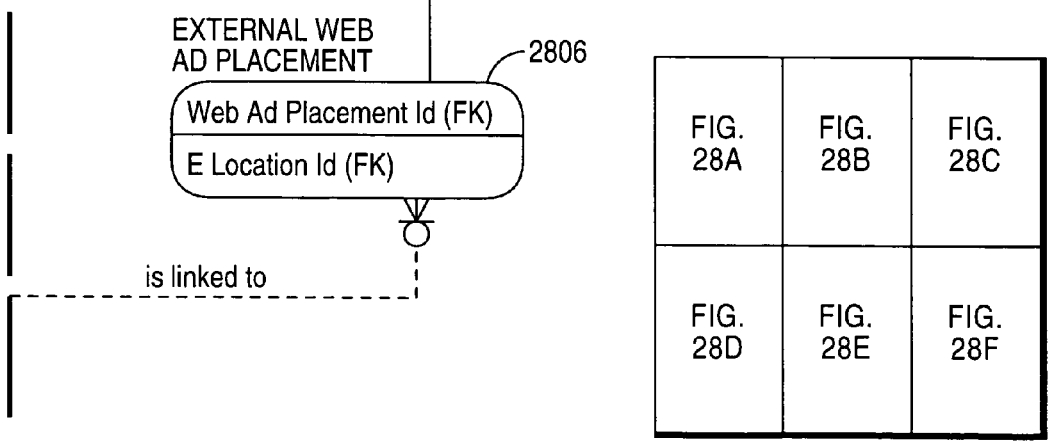
Figure 29A:
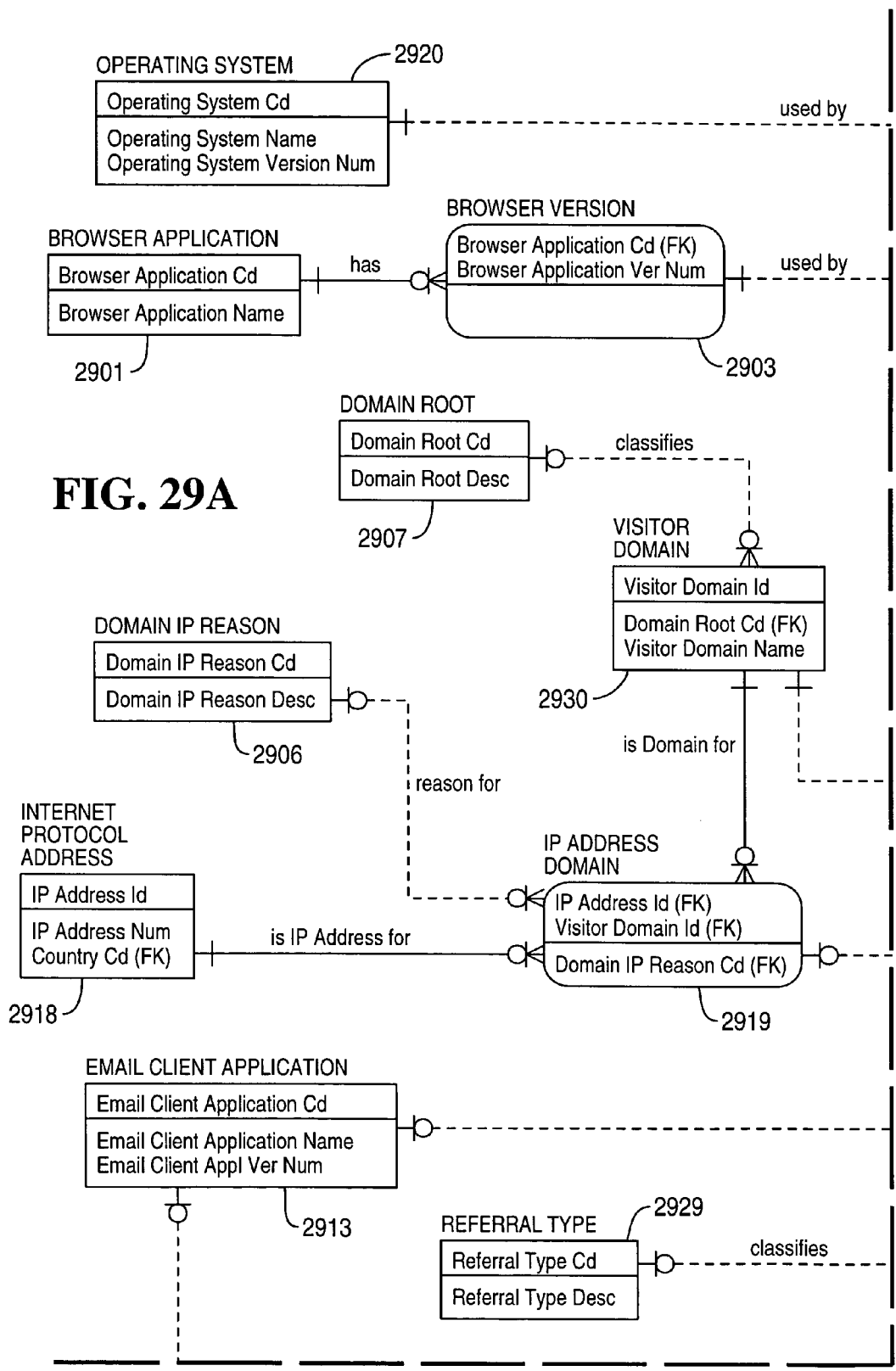
FIGS. 29A through 29G illustrate an entity-relationship diagram of the WEB VISIT Subject Area of the logical data model in accordance with the preferred embodiment of the present invention.
Figure 29B:
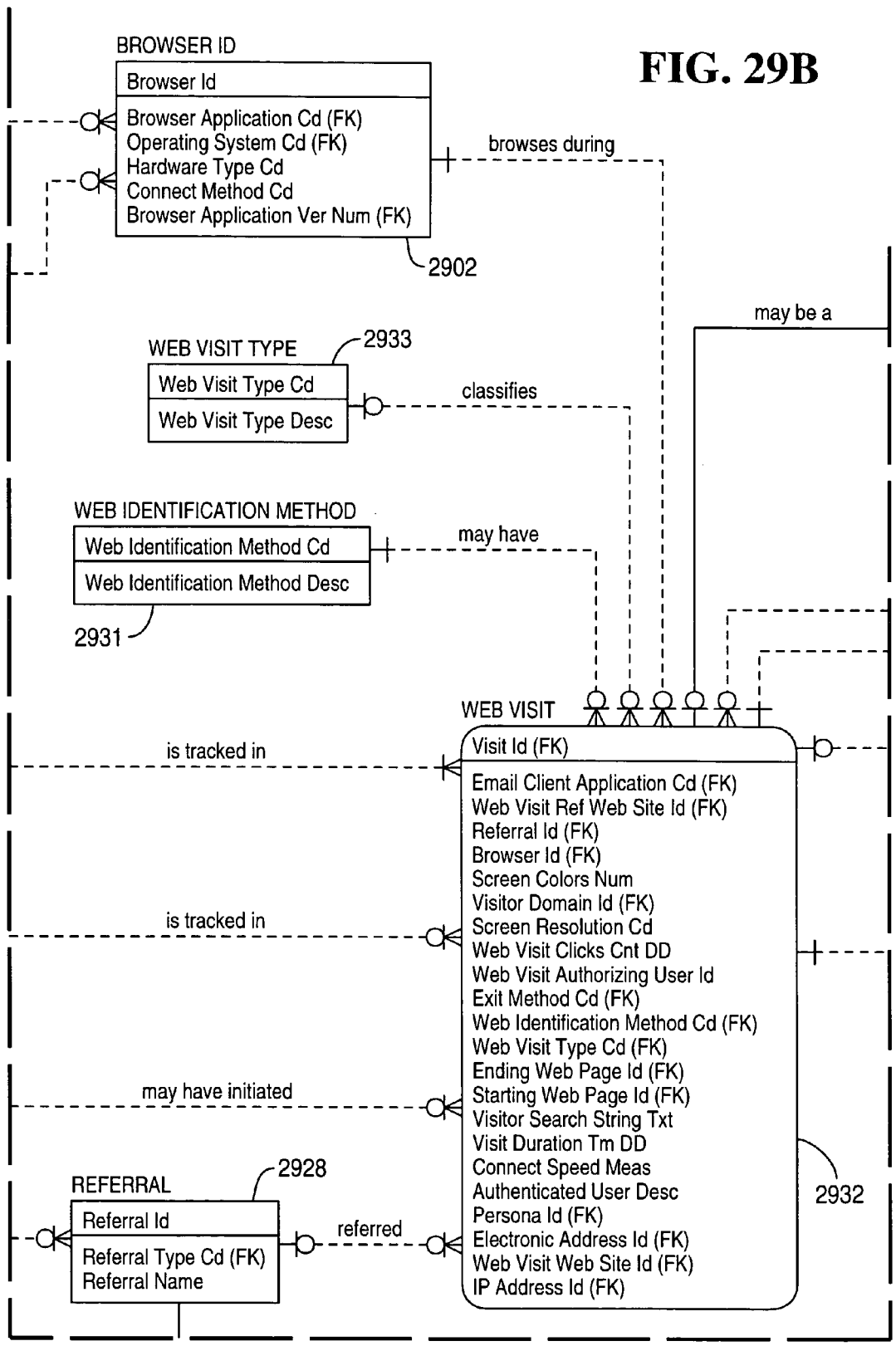
Figure 29C:
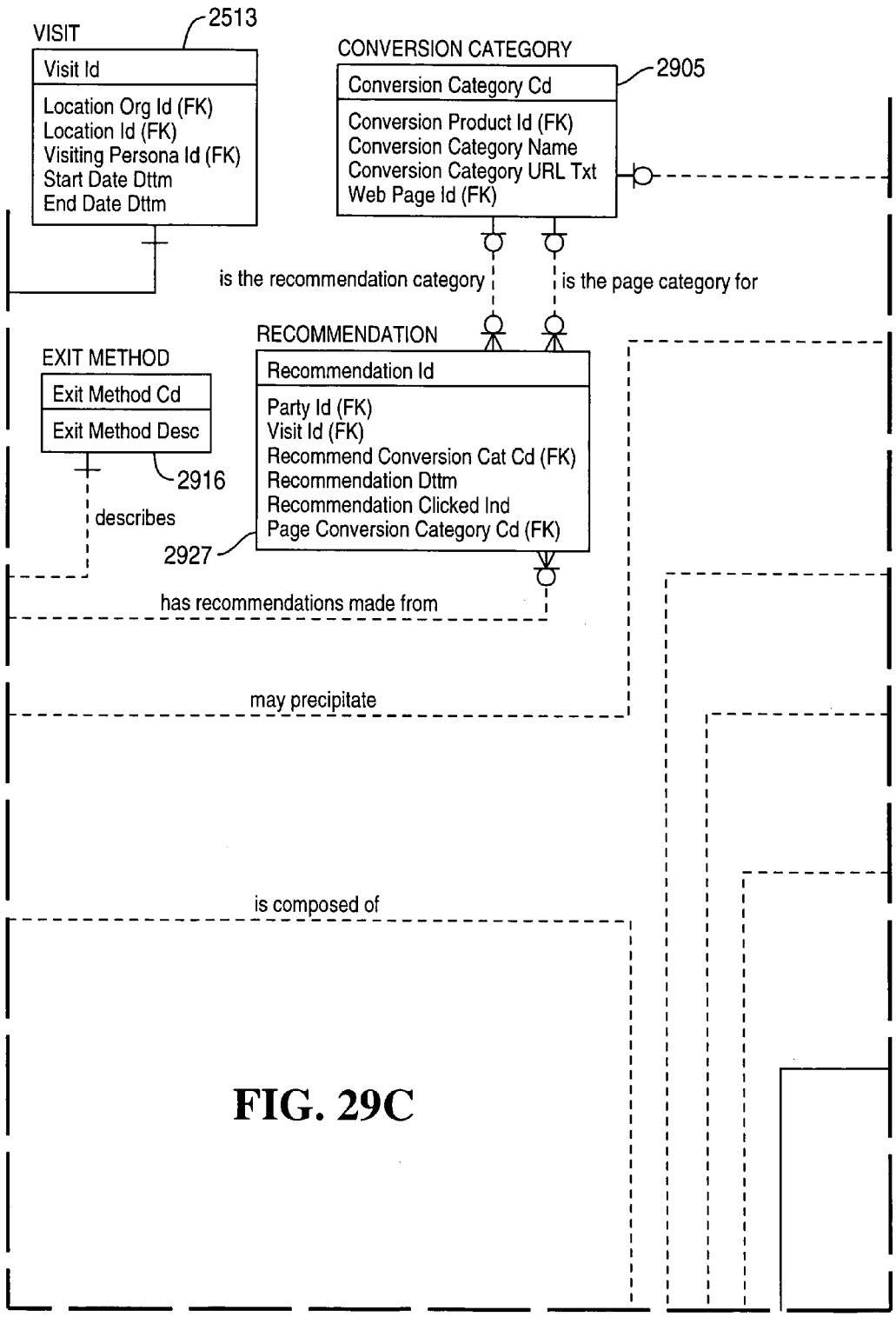
Figure 29D:
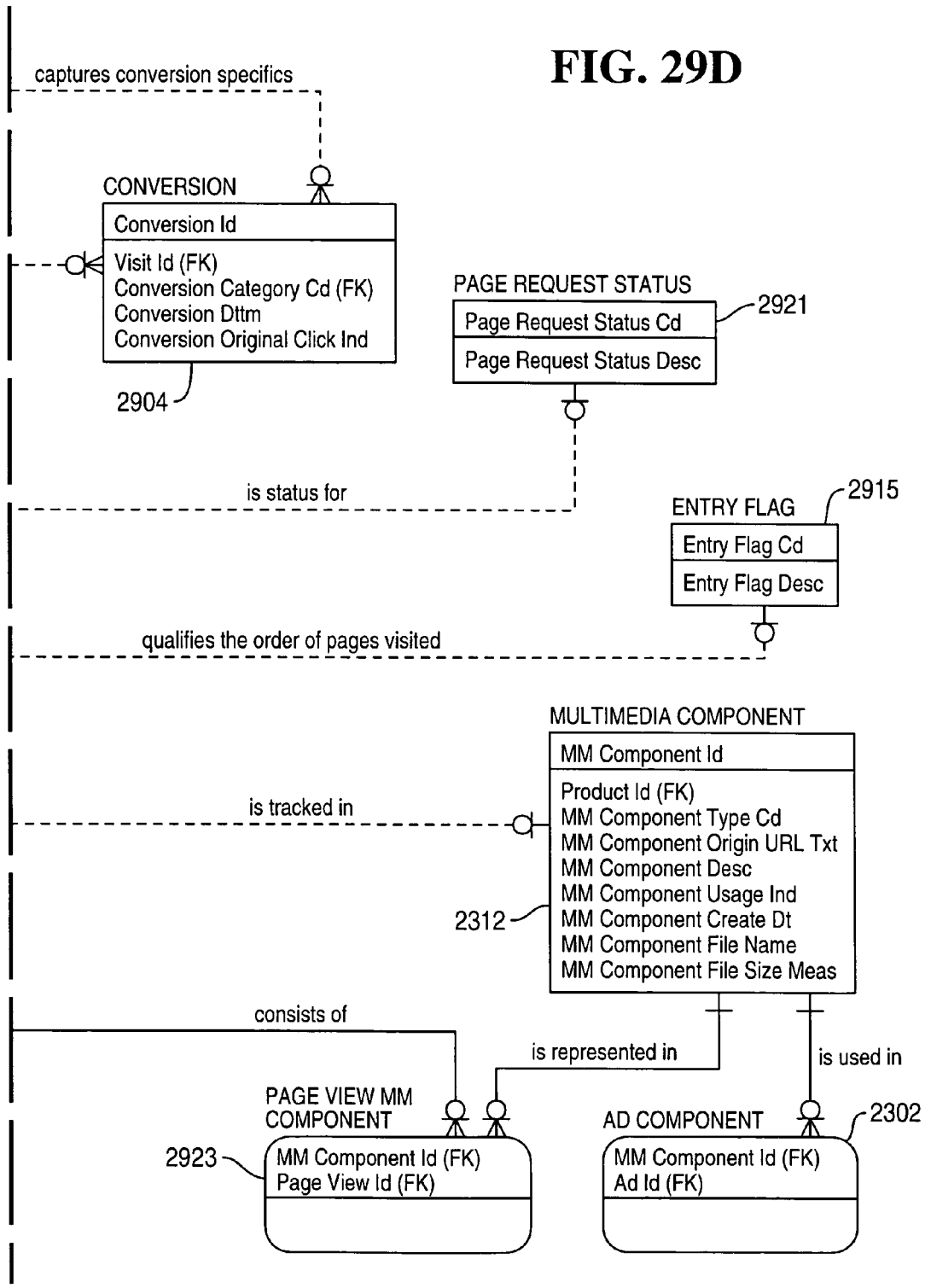
Figure 29E:
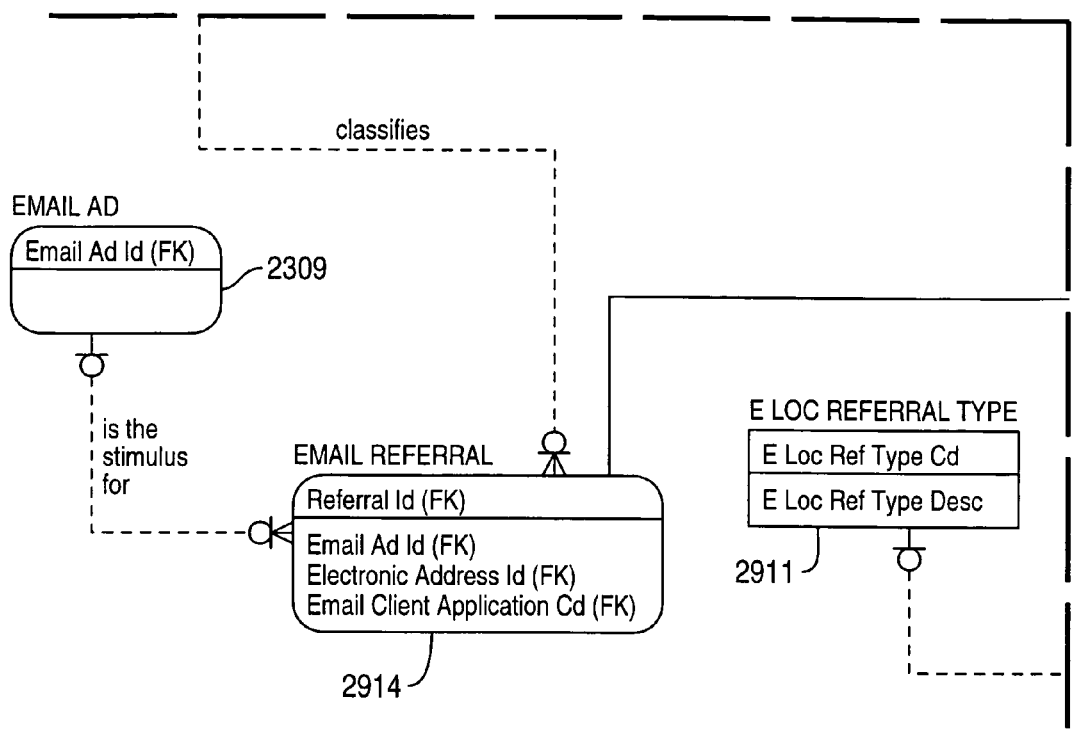
Figure 29F:
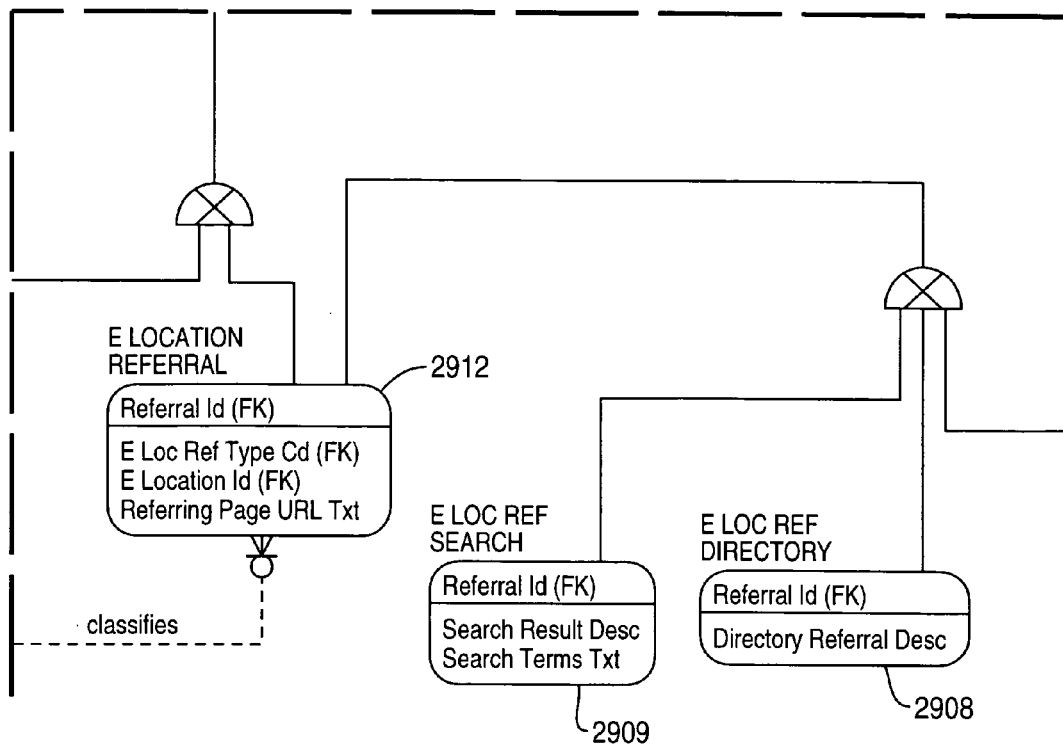
Figure 29:
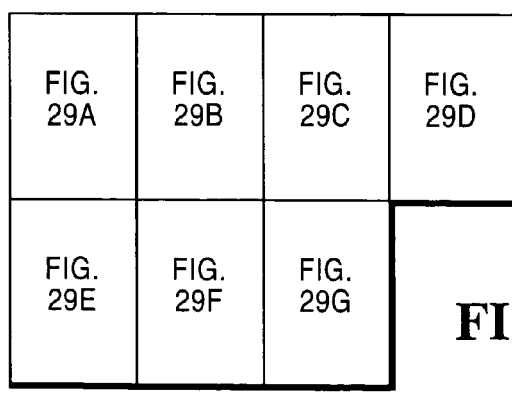
Figure 29G:
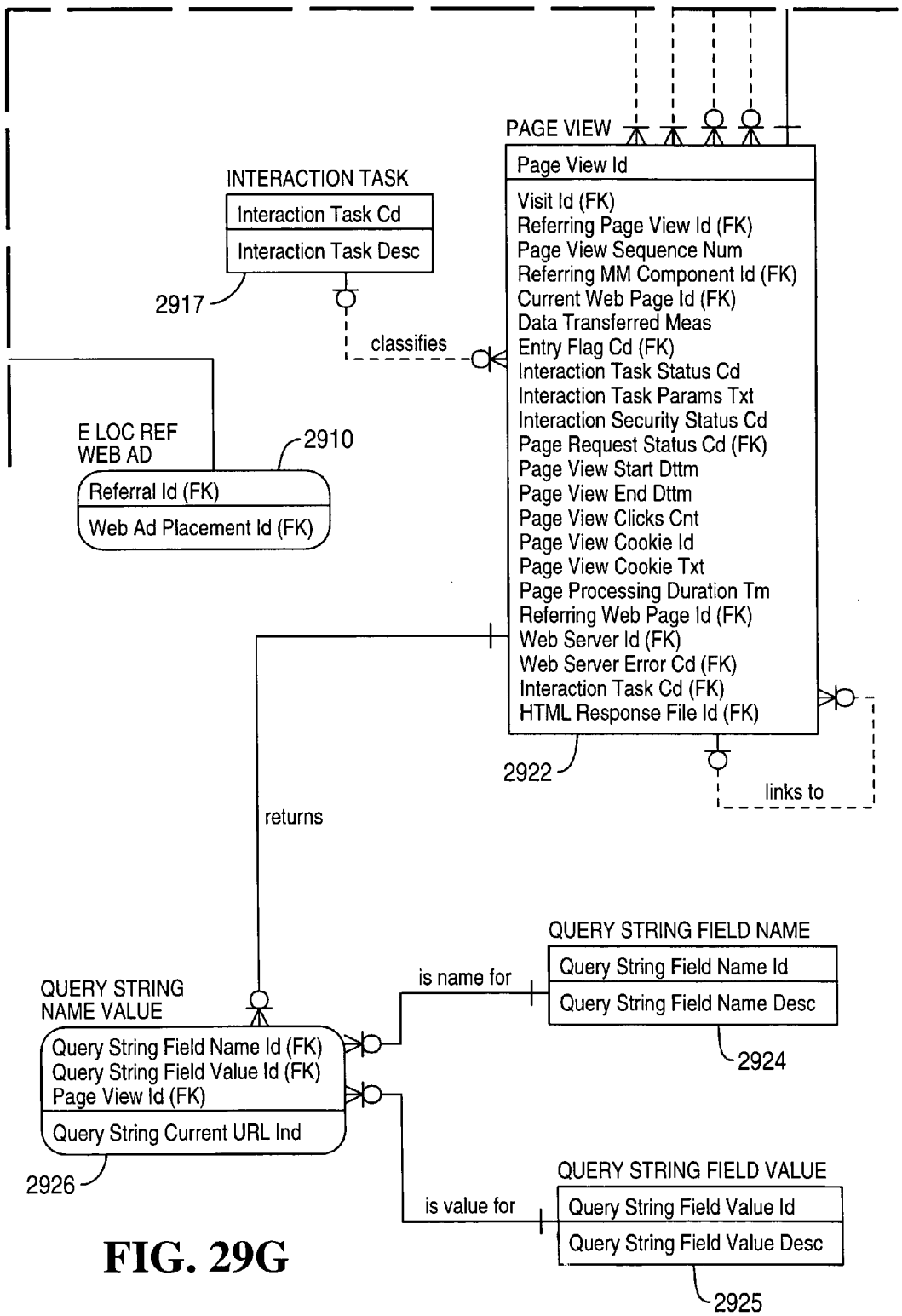

The entities of the PRIVACY Subject Area, illustrated in FIG. 21, are defined as follows:

PARTY PRIVACY (2101) A Customer's privacy preferences for the collection and use of personal data. The Privacy Information Type and Privacy Consent Type combine to indicate the category of data and consent for which the Option Indicator applies.

PRIVACY (HISTORY) (2102) A history of a customer's privacy preferences for the collection and use of personal data. The Privacy Information Type and Privacy Consent Type combine to indicate the category of data and consent for which the Option Indicator applies.

PRIVACY CONSENT TYPE (2103) The domain of values for preferred interaction methods or permitted disclosure of personal information. Examples: Direct Marketing, Third-Party Disclosure, Affiliate Disclosure.

PRIVACY INFORMATION CATEGORY (2104) The domain of values for the Categories of Privacy Data that the Customer can implicitly or explicitly opt in or out of. Example Categories are: ALL—referring to all categories of private data, NAME—referring to a Customer's name information, ADDRESS—referring to a Customer's Address information, PHONE—referring to a Customer's Phone information, DEMOGRAPHIC—referring to a Customer's Demographic information, ONLINE_CONTACT—referring to a Customer's contact information via email or web, INTERACTION DATA—referring to a Customer's web interactions, FINANCIAL ACCOUNT—referring to a Customer's Financial information, NAVIGATION DATA—referring to a Customer's navigation data over the web or call center, EMPLOYER—referring to a Customer's Employer information.

PRIVACY INFORMATION TYPE (2105) The domain of values describing personal information that the Customer can implicitly or explicitly permit or reject. Examples are: Name Type, Address Types, Phone Types, Demographic Type, Employer Type.

PRODUCT Subject Area

The PRODUCT Subject Area, illustrated in FIGS. 22A through 22D, deals with the actual travel product or services sold through the TRAVEL TRANSACTION. It deals with the TRAVEL FACILITY associated with the product or service. For example, the TRAVEL FACILITY entity has sub-types dealing with the departure or arrival TRAVEL FACILITY depending on the mode of travel selected by the TRANSPORTED PASSENGER (such as BUS DEPOT, TRAIN STATION, SHIP PORT, or AIRPORT).

The entities of the PRODUCT Subject Area are defined as follows:

BUS PRODUCT (2201) All of the published city markets providing bus transportation services by Bus Organization.

CODE SHARE BASIS (2202) Identifies the business agreement regarding fares for a codeshare flight. A codeshare is an association between one airline's scheduled flight and another airline's representation of the same flight, using different flight numbers, codeshare partnerships and agreements; where codeshare means either airline can sell and issue tickets on it's own company ticket stock.

CRUISE PRODUCT (2203) All of the published destinations and ports of call provided for sale by a particular CRUISE LINE.

FLIGHT CODESHARE (2204) This entity is an association between one airline's scheduled flight and another airline's representation of the same flight, using different flight numbers, codeshare partnerships and agreements; where codeshare means either airline can sell and issue tickets on it's own company ticket stock.

LEG (2205) This entity represents the basic building block of a single Origin and Destination pair that represents travel with no intermediate stops. Example: For an Air it would be one take off and one landing, for Rail it would be travel between two consecutive station stops.

LODGING PRODUCT (2206) The entity that represents the domain of available lodging options for a customer for the purpose of obtaining temporary lodging for a specified period of time at a predetermined rate.

NON TRAVEL PRODUCT (2207) A PRODUCT offered that does not include travel. Example: Model Planes, Coffee Mugs, Logo Clothing, etc.

OnD PAIR (2208) A pair of locations where Transportation occurs, i.e., where buses, trains or airplanes depart and arrive and passengers board or get off them.

OnD PRODUCT TYPE (2209) Identifies the type of OnD PRODUCT OnD TIMETABLE (2210) The domain of published O&D schedules for a future time period. These contain O&D, date and time for each OnD PRODUCT scheduled for operation. Example: a LA to New York flight schedule may be published for 1 year into the future PRODUCT (2211) A travel offer or item available for sale to a PARTY(s). Examples: Fly LAX-SFO morning flight, Ocean view Miami Hotel room, Jacket with Airline logo.

PRODUCT TYPE (2212) A type of PRODUCT that describes the kind being purchased. Example: OnD PRODUCT, RENTAL PRODUCT, LODGING PROPERTY, etc.

RAIL PRODUCT (2213) All of the published O&D destinations provided for sale by a particular RAILROAD.

RENTAL PRODUCT (2214) A domain of rental vehicles that customers can rent for temporary use.

ROUTE GROUP (2215) A Way to group related ROUTEs together. Note that ROUTE GROUP can also contain ROUTE GROUPs, thus creating a hierarchy. Example: all "Trans Atlantic" routes can be collected into a ROUTE GROUP, than can then again be part of a larger "International" ROUTE GROUP.

ROUTE TYPE (2216) This identifies a ROUTE TYPE, i.e. "short haul" or "long haul"

SEGMENT LEG (2217) This entity cross references the LEGs (basic building blocks) that make up an OnD PRODUCT. An OnD PRODUCT can consist of one or more LEGs. Example: LA-NY product can consist of a LA-Chicago product plus a Chicago-NY product.

WEEK DAY (2218) The domain of each day of the week that represents MONDAY, TUESDAY, WEDNESDAY, THURSDAY, FRIDAY, SATURDAY, & SUNDAY.

PROMOTION Subject Area

The PROMOTION Subject Area contains information about the various travel promotion opportunities that travel companies make available to their customers. Each promotion has one or more corresponding OFFERs that feature everything from non-travel merchandise to trips and trip upgrades and awards. Often these are used in conjunction with specific CRM (Customer Relationship Management) offers to highly targeted SEGMENTs of their customer base.

The entities of the PROMOTION Subject Area, illustrated in FIGS. 23A through 23D, are defined as follows:

AD (2301) A marketing message aimed at a segment of consumers. Usually mentions specific products or services. Can be placed in magazines, on web pages, television, etc.

AD COMPONENT (2302) An associative entity that tracks MULTIMEDIA COMPONENTs involved in the creation of an AD AD PRODUCT (2303) An AD defined for specific product area.

AD TYPE (2304) Indicates the subtype of the AD. Example: Radio, TV, Web, etc.

CAMPAIGN (2305) A marketing effort with a specific start and end date. Typically a large effort, that can consist of multiple PROMOTIONs. The goal of a CAMPAIGN is usually to enhance the image of the enterprise, and/or drive more business and/or obtain more customers Example: American Airlines launches a 3-month CAMPAIGN to build brand awareness. They create several consumer oriented PROMOTIONs and TV ADs to support the CAMPAIGN.

COUPON (2306) An internal type of OFFER. It needs to be shown or 'redeemed' (physically or virtually) to receive the mentioned incentive. Can be serialized to track individual instances. Example: A printed offer that can be cut out and shown to a travel agent, or an insert in the Sunday Paper, or a code e-mailed to an INDIVIDUAL.

COUPON CERTIFICATE (2307) A specific instance of a COUPON that is trackable through a unique number. The intent is to provide targeted INDIVIDUALs with trackable COUPONs to be able to identify the customer at redemption time (even if the redemption transaction is cash) Example: A direct mail piece with a specific OFFER, containing a barcode with a unique code, or an individualized e-mail code.

DIRECT MAIL OFFER (2308) An OFFER that is sent through the postal service

EMAIL AD (2309) An AD that can be delivered to a consumer via e-mail.

EMAIL OFFER (2310) An OFFER that is sent via email

INCENTED SEGMENT (2311) A mapping of a group of SEGMENTs to a specific OFFER. An OFFER can be made to more than one SEGMENT. Example: All customers whose travel went down over 50% over the last 6 months are offered 10% off the next time they travel.

MULTIMEDIA COMPONENT (2312) MULTIMEDIA COMPONENT refers to various multimedia elements that can be use to construct a WEB PAGE, AD, catalog, etc. Example: Image files, urls, html pages, etc.

NON TRAVEL OFFER (2313) An OFFER that provides an incentive to a customer, that does not include travel. Example: flight bags, golf balls, etc.

OFFER TYPE (2314) Indicates the subtype of the OFFER. Example: TRAVEL OFFER, EMAIL OFFER, etc.

PRINT AD (2315) An ad in a newspaper or a magazine. Additional sub-types of ADs can be created as needed—for instance: BILLBOARD AD, RADIO AD, etc.

PROMOTION (2316) A narrowly defined marketing effort designed for a specific purpose. Can be part of a larger CAMPAIGN. It has a specific start and end date. A PROMOTION can contain multiple OFFERS and ADs. Example: A PROMOTION is created to drive Delta's Atlanta to Salt lake service during December 2001. It consists of 2 OFFERS (one for free airport limousine service, and one for 10% off flights booked in October 2001) AND 2 ADs: a TV AD and a BANNER AD placed on selected websites.

TRAVEL OFFER (2317) An OFFER involving a specific market (O&D pair) or product (O&D pair on a given day and time) usually during a specific time period. Example: Product: Fly LAX-SFO, Monday through Thursday, during January 2002 and get 10% off. Market: Fly LAX-ATL during December 2001 and get a companion ticket for 50% off.

TRAVEL OFFER XREF (2318) A mapping of which products/markets are involved in a specific OFFER. A product/market can participate in an OFFER in 2 ways: a.) you have to travel to receive an incentive (fly to Alaska to receive . . . ) and/or b.) forms part of the incentive (get a ticket to SFO for 50%) NOTE: Attributes can be added to spell out the exact details of the market/product/OFFER relationship.

TV AD (2319) An AD designed to be shown on television. Usually 30 seconds in length.

WEB AD (2320) A marketing message targeted for specific set of consumers on a web page Example: 'Fly AMERICAN banner ad' on www.yahoo.com WEB AD TYPE (2321) A classification scheme used to organize WEB ADs. The classification can be used to provide summary information about the performance of various WEB ADs. For example—premium banner ad, discounted banner ad, keyword related banner ad. It could also provide information about whether the ad is static or dynamic (for example—general rotation) OR specify if it is a brand awareness ad versus an information ad WEB BANNER AD (2322) Marketing messages containing a mix of images and text that is usually hosted by a third party ORGANIZATION on a WEB PAGE. Example: A Fly AeroMexico ad with an AeroMexico logo that links to its web site.

WEB TEXT AD (2323) Marketing messages using text descriptions intended for placement on a WEB PAGE. Example: A text message saying 'Fly Lufthansa' that is linked to its web site.

PURCHASE Subject Area

The PURCHASE Subject Area, illustrated in FIGS. 24A through 24F, represents the PAYMENT options associated with a PURCHASE as part of the TRAVEL TRANSACTION. It details all purchased goods and ticket information.

The entities of the PURCHASE Subject Area are defined as follows:

AIRLINE TICKET (2401) This entity represents the Ticket issued to a passenger for the purpose of boarding a Revenue Flight between cities.

BUS TICKET (2402) This entity represents the Ticket issued to a passenger for the purpose of boarding.

CASH (2403) A sub-type of payment that records information when cash is used.

CERTIFICATE (2404) This entity is a sub-type of payment and represents a method of payment for the acquisition of a Ticket.

CERTIFICATE TYPE (2405) The domain for the types of redemption certificates used to purchase a Ticket such as when a flight is overbooked and you give up your confirmed seat in lieu of a Free Ticket. Example: Mileage Redemption, Free Ticket,etc CHARGE TYPE (2406) A type of charge or quote component for a PRODUCT. Example: Transfer Fee, Landing Tax, Airline Fare, Meal ticket, surcharge for bringing a pet, etc.

CRUISE LINE TICKET (2407) This entity represents the Ticket issued to a passenger for the purpose of boarding a specified cruise ship in order to sail to a specified destination.

FREE CERTIFICATE (2408) A sub-type of CERTIFICATE that identifies a certificate issued by an airline to be used to receive a free airline ticket. Example: Certificate for free round trip to any U.S. City awarded to a passenger who was bumped from a flight.

ITEM CHARGES (2409) Specifies the component amounts that make up the total price charged for a PRODUCT. Example: Transfer Fee, Landing Tax, Airline Fare, Meal ticket, etc.

NON REVENUE (2410) A subtype of CERTIFICATE that describes the travel vouchers associated with ASSOCIATE travel for the airline. This may include company and non-company business.

PARTY STATUS (2411) An overall classification status for a PARTY. Example:—inactive—do not do business with etc.

PAYMENT (2412) The methods by which a Ticket is purchased and paid for as well as tracking changes and reimbursements/refunds.

PAYMENT TYPE (2413) The domain of Payment Methods used to transact the purchase of a Ticket. Example: Cash, Credit Card, Airline Ticket Coupons, Corporate Air Travel Pass, etc PURCHASE (2414) A sub-type of the TRAVEL TRANSACTION entity that represents the Item(s) or Service(s) bought and paid for by the PARTY.

RAILROAD TICKET (2415) This entity represents the Ticket issued to a passenger for the purpose of boarding a passenger train between City Markets.

RETURN ITEM (2416) A specific PURCHASE ITEM returned by the PARTY.

RETURN REASON (2417) The reason code associated with a RETURNed ITEM. Example: Business Trip Cancelled, Changed Mind, Illness, etc.

TICKET AWARD CERTIFICATE (2418) A sub-type of CERTIFICATE that contains information about a certificate received as a result of redeemed mileage from a frequent traveler account.

TICKET FORMAT (2419) This entity is the domain of values used to discriminate different Ticket types. Examples: ATB2(a magnetic strip ticket that is issued by IATA), E-Ticket and Manual.

TICKET PAYMENT (2420) The methods by which a TICKET is purchased and paid for as well as tracking changes and reimbursements/refunds.

TICKET TYPE (2421) A sub-type of TICKET that contains information about the type of TICKET purchased. Example: BUS TICKET, CRUISE LINE TICKET, AIRLINE TICKET, etc.

TRAVEL PASS (2422) A sub-type of Ticket Purchase that records information when a Travel Pass is used.

TRAVEL TRANSACTION (2423) An entity which represents a travel transaction which can contain the RESERVATION and PURCHASE of travel PRODUCTs. Our current convention is to create a new transaction for each TRIP.

RESERVATION Subject Area

The RESERVATION Subject Area, illustrated in FIGS. 25A through 25D deals with making reservations for travel. The RESERVATION is held until PAYMENT is made or it expires. The model supports CAR RENTAL RESERVATIONs, RAILROAD RESERVATIONs, CRUISE LINE RESERVATIONs, LODGING RESERVATIONs and AIRLINE RESERVATIONs.

entities of the RESERVATION Subject Area are defined as follows:

AIRLINE RESERVATION (2501) This entity represents the intention (reservation) made by a passenger to purchase an airline ticket for the purpose of boarding a Revenue Flight between City Markets.

CAR RENTAL RESERVATION (2502) This entity represents the intention (reservation) made by a customer to rent a passenger vehicle or truck for a specified period in a designated market.

CRUISE LINE RESERVATION (2503) This entity represents the intention (reservation) made by a passenger to purchase a cruise for the purpose of boarding a ship and sailing to a specified destination.

LODGING RESERVATION (2504) This entity represents the intention (reservation) made by a customer to make a visit to a HOTEL for the purpose of obtaining temporary lodging for a specified period of time at a predetermined rate.

PARTYRELATIONSHIP ROLE (2505) Indicates the relationship of one party to another party Examples: Manager, Employer, Employee, Campaign Vendor, Customer, Reseller, Dealer, Product Manager, Account Executive.

QUOTED CHARGE (2506) Shows the various PRODUCT or fare component amounts that make up a quote that was given during a RESERVATION. Example: Breaks down the total fare into it's components: Transfer Fee, Landing Tax, Airline Fare, Meal ticket, etc.

RAILROAD RESERVATION (2507) This entity represents the intention (reservation) made by a passenger to purchase a railroad ticket for the purpose of boarding a passenger train between City Markets.

RESERVATION (2508) The sub-type of the TRAVEL TRANSACTION entity that represents the domain of requests for a specific itinerary associated with a TRAVEL TRANSACTION. Examples: Hotel Reservation, Airline Reservation, Rental Car Reservation.

RESERVATION ITEM (2509) The specific items reserved as part of a TRAVEL TRANSACTION.

RESERVATION ITEM TYPE (2510) Identifies the type of RESERVATION ITEM. Examples: Car Rental, Lodging, Air, etc.

RESERVATION PREFERENCE (2511) Ties the CUSTOMER PREFERENCEs as stored in their personal profile to a specific RESERVATION.

RESERVATION STATUS (2512) The domain of status types for a specific itinerary item associated with booked RESERVATIONs. Status conditions include: Open, Closed, Cancelled.

VISIT (2513) A period of time that a PERSONA spends at a LOCATION. Example: Rachel visited our web site today from 12:32 through 13:47. John spent 17 minutes today on the phone with our CALL CENTER, making reservations.

TRAVEL TRANSACTION Subject Area

This Subject Area represents the actual transaction with the customer for a travel package or service. Within the subject area, a VISIT reflects a customer's interaction with the TRAVEL PROVIDER. It can reflect a web site visit, a call to a Reservation Center, or a physical visit to a City Ticket Office or Airport Ticket Office. The PARTY TRAN ROLE is introduced to identify a PARTYs role in the transaction. This could be the person making the reservation, the travel agent they are using, the party paying for the trip, or the person(s) taking the trip.

The entities of the TRAVEL TRANSACTION Subject Area, illustrated in FIGS. 26A through 26D, are defined as follows:

BROWSE (2601) A type of TRAVEL TRANSACTION that captures what PRODUCTs have been looked at but not reserved or purchased.

BROWSE ITEM (2602) The specific items viewed as part of a BROWSE session by a customer.

REASON (2603) This entity indicates the reason why two (or more) TRAVEL TRANSACTIONs are related. Examples: a reservation gets cancelled and replaced by a different reservation, a browsing transaction results in a reservation and or an issued ticket, etc.

TRAVEL TRANSACTION TYPE (2604) Identifies the type of TRAVEL TRANSACTION. Example: Browse, Reservation, Purchase.

TRAVEL TRANSACTION XREF (2605) Cross reference entity to allow TRAVEL TRANSACTION to be related to each other. This can be used to related similar transactions (several RESERVATION transactions) or different transactions (relating RESERVATIONs to PURCHASEs, etc.)

WEB OPERATIONS Subject Area

FIGS. 27A through 27F illustrate an entity-relationship diagram of the WEB OPERATIONS Subject Area of the Travel Logical Data Model. It contains entities that model performance characteristics of a WEB SERVER associated with a WEB VISIT.

The entities included within the WEB OPERATIONS Subject Area are defined as follows:

CRAWLER (2701) Contains a list of Crawler sites that have visited the Web Site of the business entity. A Crawler is a program search engine that takes information from a Web Site.

CRAWLER PERMISSION TYPE (2702) Codes used to specify the type of permission that a Crawler is allowed when accessing a Web Site or Web Page.

CRAWLER WEB PAGE PERMISSION (2703) The access rights granted to a Crawler for a specified Web Page.

CRAWLER WEB SITE PERMISSION (2704) The access rights granted to a Crawler for a specified Web Site.

FILE (2705) Represents an electronic file (song.mp3, document. pdf, etc.)

In data processing, a related collection of records. For example, the records on each of your customers could be placed in a file. In turn, each record would consist of fields for individual data items, such as customer name, customer number, customer address, and so forth.

FILE DOWNLOAD (2706) Tracks information on Files that were downloaded from a Web Site. For example, an MP3 site would keep records on what songs were downloaded.

FILE TYPE (2707) Information stored on the types of Files, usually broken down by extension. Examples are ".mp3",".exe", and ".pdf". Alternatively, files could be associated with known file types such as MP3 file, application, or Adobe Acrobat document.

HTML COMPRESSION TYPE (2708) The type of compression that may be applied to an HTML Response File.

HTML RESPONSE FILE (2709) The actual HTML file that is returned to the user as a result of a click. It is possible that the HTML returned could be larger than the maximum size allowed for a single row in Teradata, in that case this entity could not be used as is to store that information. The HTML Response File table was added to support interface with a web site replay product from TeaLeaf. They capture a visitor's session and provide the capability of replaying the session. They do it by building a blob (large data block) and storing it in the database.

TIME ZONE (2710) The time zone for particular locations around the world. Data may be simple or complex. Often only an offset from Coordinated Universal Time (UTC) or Greenwich Mean Time (GMT) is recorded. Los Angeles' time zone would thus be shown as GMT-0700 (Greenwich Mean Time minus 7 hours). Honolulu, Hi. as GMT-1000 (minus 10 hours). Indicators for usage of Standard or Daylight time (along with other appropriate attributes such as City and State for the U.S) and data for Longitude and Latitude may also be added to this entity if, and as, needed.

WEB GROUP PUBLISHER (2711) A cross reference of the actual PUBLISHERs contained in a specific WEB SITE GROUP.

WEB PAGE GENERATION TYPE (2712) This entity is used to classify the method involved in generating a web page. Example: Static versus dynamic page WEB SERVER (2713) Provides summary information about the physical server devices servicing a WEB VISIT.

WEB SERVER ACTIVITY (2714) Provides operational metrics for Web Server.

WEB SERVER ERROR (2715) An entity used to provide information about WEB SERVER errors WEB SERVER SOFTWARE (2716) Captures information about the software being utilized by the Web Server. (Apache, IIS, etc)

WEB SITE CRAWLER (HISTORY) (2717) A history of the Web Sites that have been accessed by specified Crawlers.

WEB SITE GROUP (2718) This entity groups web sites into classifications such as a Computer and Technology web site, Cooking web site, Astronomy web site, etc. A web site can be in many groups and a group contains many web sites. Also known as Network. One example of a group is a group of Publisher sites that an Ad or Campaign is run on. Ad Networks commonly have predefined Networks that Advertisers can choose to run their ads on. Examples include a Computers & Technology Network that would include all of the Computer & Technology related sites the Ad Network has space on or a Sports Network that includes all of the Sports related sites the Ad Network has.

WEB SITE GROUP XREF (2719) This entity groups web sites into classifications such as a Computer and Technology web site, Cooking web site, Astronomy web site, etc. A web site can be in many groups and a group contains many web sites.

WEB SITE SERVER (2720) Associates the Web Sites that are supported by a Web Server.

WEB VISIT FILE (2721) This associative table stores all the Files downloaded during a Web Visit.

WEB SITE Subject Area

The WEB SITE Subject Area models the specifics about a travel provider's web site. It contains information about WEB PAGEs (PAGE COMPONENTs and WEB ADs), and information about WEB AD PLACEMENT.

The entities of the WEB SITE Subject Area, illustrated in FIGS. 28A through 28F, are defined as follows:

CONTEXT (2801) Contains the business intent represented by web pages.

E LOCATION (2802) An entity used to describe an internet location within an E SITE. Example: the/clothing/women's section in a proprietary system (such as AOL) or shopping.yahoo.com/Computers (on yahoo)

E LOCATION TYPE (2803) An entity used to classify E LOCATIONs. This is similar to the WEB PAGE TYPE entity that classifies WEB PAGEs, the only difference being that WEB PAGEs refer to internal pages of an Enterprise and the E LOCATION refers to external web pages (Yahoo) or proprietary systems (AOL) For example: Home page, Category page, Products page, Order page, Help page, Search page E SITE (2804) An electronic site refers to an external web site such as www.yahoo.com or a proprietary site developed for subscribers such as the AOL system E SITE TYPE (2805) An entity used for classifying different types of web sites such as portals, aggregators, ISPs, etc.

EXTERNAL WEB AD PLACEMENT (2806) The specifics of where and when a specific external WEB AD will be displayed. These are ads that are placed on an externally-owned web site. Example: Banner Ad #232 (with the animated Poodle) will be displayed on the AOL 'Pets' area during January 2000.

INTERNAL WEB AD PLACEMENT (2807) The specifics of where and when a specific internal WEB AD will be displayed. These are ads that are placed on an Enterprise-owned web site. Example: Banner Ad #232 (with the animated Poodle) will be displayed on the AOL 'Pets' area during January 2000.

NAVIGATION LEVEL (2808) Used to construct a hierarchical structure of the web site. Each level points to the next higher level hierarchical navigation levels the user can access from this WEB PAGE. NOTE: It is only intended to be used by high level navigational type pages. This allows the Enterprise to set up a Navigation Structure that makes it simple for users to "drill down" from general to specific information/ITEMs. Example: Department Level, Product Category Level, Product Sub Category Level, etc.

WEB AD PLACEMENT (2809) The specifics of where and when a specific WEB AD will be displayed. Example: Banner Ad #232 (with the animated Poodle) will be displayed on the AOL 'Pets' area during January 2000.

WEB AD PLACEMENT STATS (2810) Provides statistics about web ads that are useful in measuring their effectiveness. These values are usually collected by the ad-agency. For example, banner ad 'blue sweater' on mysite.com has 100 impressions, 20 clickthroughs over the last month.

WEB AD POSITION (2811) An entity that tracks difference places used in placing a WEB AD on a given WEB PAGE. For example, lower right hand corner, top middle, middle-left, etc WEB PAGE (2812) A collection of multimedia components displayed to visitors via use of a web browsing application during visits to a WEB SITE. A WEB PAGE can contain product information, marketing information, customer service information. It can also allow for interaction, in the form of the creation of shopping carts, orders, etc. These pages are owned by the Enterprise. E SITE models external web pages. Example: A DVD Movies category page may consist of a group of images, text about the quality of the clothing, and information about a current sale.

WEB PAGE CONTEXT (2813) Links the Context for which the Web Page is being rendered.

WEB PAGE MM COMPONENT (2814) An associative entity that tracks various components appearing on a WEB PAGE.

WEB PAGE PAGE REGION (2815) Associates all of the possible Web Page Regions a Web Page may have. These regions include descriptors such as "Top Right", "Lower Left", "Center Left" and other positional descriptors, as needed.

WEB PAGE REGION (2816) This entity represents areas in which a WEB PAGE may be divided, examples include (TOP, BOTTOM, TOP-LEFT).

WEB PAGE TYPE (2817) This entity categorizes the WEB PAGEs according to business rules For example: Home page, Category page, Products page, Order page, Help page, Search page WEB SECTION TYPE (2818) This entity represents a classification of the content for a WEB SITE SECTION similar to sections of a newspaper. A WEB SITE may be divided into several sections based on the content of the pages one section may be sports related content while another may be finance related.

WEB SITE (2819) This entity represents a collection of Enterprise-owned WEB PAGES under a single domain name. External web sites are found under E SITE.

WEB SITE CONTENT TYPE (2820) This entity represents a classification of the content of a WEB SITE possible SITE CONTENT TYPEs include Sports, News, Portal, etc.

WEB SITE NAVIGATION (2821) Provides the site map independent of the fact that the pages that form this structure may change over time. For example, "Blue suede shoes" page could be part of the "Elvis collection" class hierarchy or the "Men's Shoes" class hierarchy. And over time "Blue suede shoes" could also be part of the "What's hot" class hierarchy. The web site navigation entity provides a way of showing these changes over time.

WEB SITE SECTION (2822) This entity represents divisions of a WEB SITE such as Yahoo Sports or Yahoo Finance in order to divide large WEB SITES into smaller divisions of related WEB PAGES that contain similar content WEB VISIT Subject Area The WEB VISIT Subject Area, illustrated in FIGS. 29A through 29G, models the life of a WEB VISIT. It contains information on where a visitor came from (REFERRAL), what they looked at (PAGE VIEW) and what actions they took (INTERACTION TASK).

BROWSER APPLICATION (2901) Web browser application being used. Microsoft Internet Explorer, WebTV, Netscape Navigator, etc.

BROWSER ID (2902) Defines a specific instance of an unique Web Browsing Application on a specific computer. Example: "John's copy of Microsoft 5.0 I.E. Browser on his iBook laptop computer."

BROWSER VERSION (2903) Type of web browser application and version being used. Examples: Microsoft Internet Explorer 5.0, WebTV 1.0, Netscape Navigator 6.0, etc.

CONVERSION (2904) Represents the successful result of a recommendation provided by a recommendation engine such as that provided by BeFree. A recommendation is considered successful if a user clicks on the recommendation. A purchase need not be made in order for a recommendation to be considered a Conversion. (Analyst Note: the Recommendation Engine will most likely populate this information. The information in this entity is very similar to Ad Response, however since they represent information from 2 different business functions and data sources, the LDM team has decided to represent both entities.) (Analyst Note: This table is present to support integration with recommendation engines and does not imply this solution functions as a recommendation engine). The information contained in this entity is derivable and is provided to support various 3rd party E-Commerce applications.

CONVERSION CATEGORY (2905) Contains information concerning the linkage between recommended Offerings and the Web Page that the Offering was displayed on.

DOMAIN IP REASON (2906) Specifies the type of relationship that may exist between an IP Address and a Domain. Examples: IP Address of linking Server, Valid IP Addresses for a Domain.

DOMAIN ROOT (2907) The extension name of the domain server. Examples: .com, .net, org.

E LOC REF DIRECTORY (2908) Information about an internet directory listing that a customer used for accessing a WEB SITE. Example: For instance a customer could access yahoo and then go to the 'business section' and then to 'wholesalers' to finally select 'Wholesaler A'. The corresponding directory listing information will be www.yahoo.com/business/wholesalers/

E LOC REF SEARCH (2909) An entity used to capture the outcome of an internet search that was in turn used by a customer to access a web site Example: if you conduct search on yahoo for blue sweaters, the search term gets embedded in the new url created (www.yahoo.com/?p=blue+sweaters). If the search results in an Enterprise's page, then the referral url will have the search information in it.

E LOC REF WEB AD (2910) An entity used to capture information about WEB ADs that were used by customers to access the web site. The entity also has information relevant to WEB ADs such as start and end dates and cost information E LOC REFERRAL TYPE (2911) An entity used for classifying E LOCATION referrals into various sub-types such as Searches, Web Ads, Directories, etc.

E LOCATION REFERRAL (2912) An entity used to track E LOCATIONs that provide different referral mechanisms such as banner ads, directory listing, etc to a customer for accessing a web site Example: an electronic location could be a web site such as www.yahoo.com or a location within a proprietary web browsing system such as AOL. Note that with proprietary systems, we may not get a finer granularity of information as compared to web pages EMAIL CLIENT APPLICATION (2913) Represents the email application used by a client to read and send email, such as Microsoft Outlook Express 5.0.

EMAIL REFERRAL (2914) This entity is used to capture information about any uniform resource link embedded in emails that were used to access a web site. Email referrals could be due to PROMOTIONs, WEB ADs or other methods.

ENTRY FLAG (2915) Describes the order of the pages viewed during a web visit: Examples: First Page, Exit Page, Intermediate Page.

EXIT METHOD (2916) The methods by which the user may leave a Web Site. This would have the value 'timeout' for most Web Visits but other values could be defined for explicit actions that result in a user exiting the Web Site such as clicking a logout button.

INTERACTION TASK (2917) Entity used for capturing information about individual web activity performed. These could range from basket selecting a travel destination, deleting an item, etc. The exact range of tasks that can be captured depends on the capabilities of the commerce server Example: Select seat choice, delete rental car from the shopping cart, place an order, etc INTERNET PROTOCOL ADDRESS (2918) IP addresses are assigned to every computer or device on a TCP/IP network such as the internet. They may be assigned statically, where a computer/device is assigned an IP Address and it will always use that address. They may also be assigned dynamically where at the point a computer connects to a network, it is assigned an IP Address from the pool of addresses available from that provider. This entity is differentiated from ELECTRONIC ADDRESS (Geography SSA) which may not have IP Address detail but will likely have an e-mail User Name. Customers wishing to do so may make this entity a subtype of ELECTRONIC ADDRESS.

IP ADDRESS DOMAIN (2919) The domains that are associated with an Internet Protocol Address, as specified by Domain IP Reason. (NOTE: This is an associative entity used to resolve the M:M relationships between Internet Protocol Address and Visitor Domain.)

OPERATING SYSTEM (2920) The computer operating system being used by a Web Visitor. Example: Mac OS X, Linux, Windows 2000, etc.

PAGE REQUEST STATUS (2921) The status code of the page request. Examples include 200, 404, 401

PAGE VIEW (2922) Page view stores the information about the actual WEB PAGEs displayed to an individual during a given WEB VISIT. For example: home page→product page→casual wear→blue sweater. Along with this chain of pages visited information about bytes transferred, the time stamp when the page was viewed and a host of other details are stored.

PAGE VIEW MM COMPONENT (2923) Lists all the Components downloaded during a Page View. This relates a request for a Web Page document with the images and other Components that are requested to render the Web Page. Each entry equates to an HTTP request for a non Web Page document, identified by the extension of the file requested (pg, gif, etc.)

QUERY STRING FIELD NAME (2924) The domain of parameter names that may appear in the Query String of the URL for a Web Page. Examples: First name, Site, Location.

QUERY STRING FIELD VALUE (2925) The domain of parameter values that may appear in the Query String of the URL for a Web Page.

QUERY STRING NAME VALUE (2926) Stores the relationship between Page Views, Query String Field Names and Query String Field Values. It holds the set of name-value pairs from the query string of the URL that is associated with this Page View. The query string is the component of the URL that follows the document path. It begins with a question mark and consists of any number of sets of name-value pairs (?param1=value1&param2=value2 . . . paramn=valuen). The name-value pairs often include things such as search parameters. This entity can be used to store both the parameters for the current URL as well as the referring URL, Query String Current URL Ind is used to distinguish between the two URLs.

RECOMMENDATION (2927) Contains a record for each recommendation that was made by the recommendation engine. (This table is present to support integration with recommendation engines and does not imply that internal functions will serve as a recommendation engine). The information contained in this entity is derivable and is provided to support various 3rd party E-Commerce applications.

REFERRAL (2928) Referral is used to capture information about a customer's previous browsing history—prior to making a WEB VISIT. As part of customer's previous history only the immediate previous uniform resource link (uri) information is preserved. For example if a customer browsed aol→yahoo→clothing>women's clothing . . . , then the referral information will carry information about yahoo since that was the site browsed immediately prior to the web site. A customer could also use an email or directly access the web site by using a bookmark/favorites list.

REFERRAL TYPE (2929) An entity used for classifying referrals into various sub-types such as EMAIL referrals, E LOCATION referrals, etc.

VISITOR DOMAIN (2930) This entity stores information about domain from which customers access the Enterprise's web site. The domain is usually looked up by using or translating the IP Address into the domain name. The domain can have several components, e.g. top level (edu=education, corn=commercial, net=network), as well as a name (acme, ucla, at&t), and country (uk, de, fr, it, etc). (This is useful in providing summary level information about various access points for customers such as internet service providers, public access terminals, companies, universities, government sites, etc. The information can be useful in selecting advertisements and designing promotions. Example: if the visitor domain is www.uc.edu, then we can infer it is an individual from the University of Cincinnati and further the individual is from an educational domain. Similarly if the visitor's domain is www.acme.com, then its an individual associated with the Acme company, while mediaone.net would indicate the visitor's ISP.

WEB IDENTIFICATION METHOD (2931) The means by which a Party is identified for a Web Visit. There are three possible values: IP address, cookie, and registered.

WEB VISIT (2932) A VISIT during which an internet WEB SITE is accessed by an individual using the world wide web. Subtype of VISIT WEB VISIT TYPE (2933) This entity represents a classification of the result derived from a WEB VISIT. Possible values include Browse, 1st Purchase, Repeat Purchase, etc.

A listing of all the attributes included within the entities shown in FIGS. 4 through 29, together with a brief descriptions of each attribute, is provided in Appendix A.

Revenue Management

The Travel Logical Data Model described above supports revenue management solutions, such as NCR Corporation's Teradata Revenue Management Intelligence (RMI) solution. The RMI solution provides an Airline or other travel provider with the ability to increase revenues by achieving optimal passenger and revenue mix on each flight through investigative analysis of Passenger Name Record (PNR), booking, ticketing/TCN, inventory, schedule, authorization adjustment and flown/ticket lift data. It improves the management of inventory, pricing and demand forecasting through forecast accuracy and revenue management performance measures. The solution further protects revenue and inventory through the identification of fraudulent and improper booking and ticketing activity.

Figure 30:
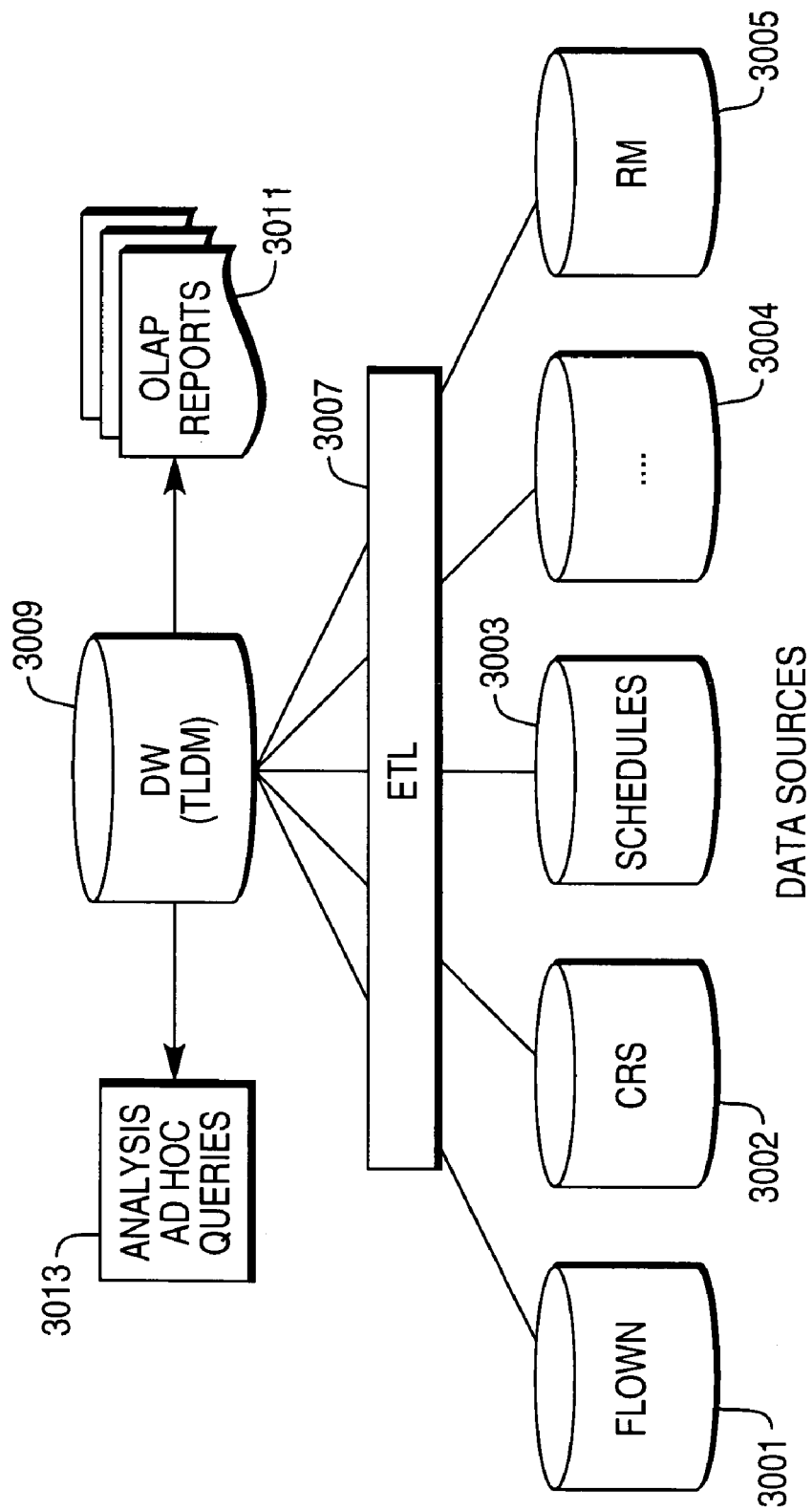
FIG. 30 is a high level illustration of the Revenue Management Intelligence (RMI) solution architecture, in accordance with the present invention.

FIG. 30 provides a high level illustration of the Revenue Management Intelligence (RMI) solution architecture. The RMI solution focuses on four key functional areas: Investigative Analysis, Revenue Management Performance, Revenue Protection and Forecast Accuracy.

The data sources 3001 through 3005 at the bottom of FIG. 30 represent the typical source systems used for analyzing passenger demand and supply data. A key data source is the Customer Reservation System (CRS) data 3002 that typically contains booking data extracted at various checkpoints for flights across various booking classes and compartments/cabins. Additional data is output from a typical revenue management engine such as PROS from PROS Revenue Management, Inc. and SABRE from Sabre Airline Solutions. Through an Extraction, Transformation and Load (ETL) 3007 process, information required from data sources 3001 through 3005 is loaded into the travel data warehouse 3009. Once the data is loaded into the warehouse (the physical database prepared using the Travel LDM), the functional areas can be analyzed using OLAP reports 3011 or Ad-hoc queries 3013.

Revenue Management Questions

The following are real world examples of Revenue Management (RM) questions that can be answered by the system described above.

RM Base Questions:

These base questions deal with fundamental RM issues defined in conjunction with a major international airline.

1. When did different booking classes close across various flight numbers by date and checkpoint (i.e., # of days before departure)? Display flight number, day of week, departure date, segment and checkpoint of closure by booking class and sub-class (i.e., class by point of sale).
2. What are the seats booked (i.e. reservation made, may or may not be ticketed) at (right before) departure for a given booking class or class of service by flight number, segment and day of week? For a given range of flight numbers and departure dates and booking class/class of service, display the number of seats booked by flight number, segment, booking class, sub-class, the week-from date and then the seats booked by day of week. Provide a total for each flight number across each week-from date for each day of the week
3. What are the seats sold by flight number or segment, by class of service or fare basis, date range, franchise, leg, checkpoint, point of sale, seat factor (seats sold/capacity), last year, this year? Display departures, arrivals, class, sub-class, number of seats sold for the month and total number of seats sold.
4. What are the denied boardings/downgrades by RM analysts grouping (each RM analysis has a group of flights or a geographic territory of flights to manage) for a given date range? For a given date range, RM analysts and carrier, display the date, segment, carrier, flight number, class of service, number of downgrades (voluntary and involuntary) and number of denied boardings (voluntary and involuntary), and reason (operational (due to weather or mechanical failure) or commercial (due to over booking)), denied boarding compensation, currency, and comments.
5. What flights in the entire network are overbooked? Given a date range and RM analysts grouping, O&D Pair and flight number; display by number of seats sold, overbooked, flight number, departure date, leg and cabin. Also, by area (city, RM analysts, etc).
6. What are the RPK's/RPM's, ASK's/ASM's and seat factor by RM analysts grouping/region/segment, brand, date, flight number, premium/non (class of service), yield (high/med/low based on booking class); this week compared to last week, this week last year and last week to last week last year; last 4 weeks.
7. Closed Flight Seat Factor—Given month, region or Segment or flight numbers or range of flight numbers, class of service, day of week; display flight number, day of week, departure date, leg, capacity, total value of passenger, total value of seat factor, YTD seat factor, month & year summary of number of flights operated, number of flights closed, number of flights closed percentage and Closed Flight Seat Factor.
8. Under-Protection—Given month, region or Segment or flight numbers or range of flight numbers, class of service, day of week; display number of flights operated w/seat factor of 90%+, number of flights under protected, number of flights under protected percentage, average for city, region, grand average.
9. Over-Protection—Given month, region or Segment or flight numbers or range of flight numbers, class of service, day of week; display number of flights operated, number of flights closed, number of flights over protected, number of flights over protected percentage, average for city, region, grand average.
10. Future Inventory split by leg vs. last year leg and segment vs. last year segment.
11. Inventory history for a specified flight, segment, date range and day of week. For a given flight number and/or segment and/or control city, for a specified date range for day of week (or all) for a number of booking classes and class of service and by status, and for specified ranges for seats available, seats booked and days to departure, display positive definition, versus, seats sold, seats available, status, days to departure by flight number, segment, departure date, day of week, class of service and booking class, sub-class.
12. Leg departure history and last season leg departure history. For a specified flight number, and/or leg and/or control city, and for a specified date range, day of week (or all), compartments and a seat factor range between two figures; display capacity, seats sold, passenger and seat factor by departure date, day of week and compartment for the specified flight number and leg. Further analysis provides details on no shows and no show percentage by segment and class (seats sold, passengers, no show passengers and no show passenger percentage.) Also shows total no shows, off loads and passengers from first, club desk and economy for each day in the date range specified.
13. Total RPKs/RPMs and ASKs/ASMs for the next 6 weeks to 2 decimal places.
14. Detailed Forward booked RPKs/RPMs and Summarized forward ASKs/ASMs for i) this week this year, ii) this week last year, iii) last week this year and iv) last week last year.
15. For flights where business class is on sale, summarize seats sold and seats available (include and exclude adjustments).
16. List characteristics for a specific flight: i.e. bookings by checkpoint, number of passengers traveled, no-shows, go-shows, upgrades, downgrades, seat factor, closure details, (plus benefit, revenue and average yield, if possible). Sorted by leg and class.
17. Value of overbooking, i.e. marginal value if bookings capped to capacity. Available by route, flight Number, cabin, day of week and date range.

RM—Flight Exceptions:

This set of analytics is designed to identify flight exceptions or anomalies that need to be manually reviewed by a Revenue Management analyst. The analytics support drill down and drill across to allow the analyst to look at the data in a variety of views. They can be executed for a particular departure date or a range of departure dates. The requests can be for all segments, all O&Ds, all O&Ds for a particular market and/or region, all O&Ds with a particular origin, or all O&Ds for a particular destination. Each request can also support a specified number of days out from departure.

All of the following questions are concerned with summing the number of bookings and/or revenue for some unit (a specific O&D, for example) and comparing the bookings and/or revenue of that unit to the average bookings and/or revenue of all like units over some time-based filter criteria. This means that drill down and drill across is critical since it is impossible to create just one view that satisfies any one requirement, because the analyst must specify the filter criteria over which to calculate the averages.

1. Identify all O&D paths (all nonstop segments from the Origin to the Destination) where the current number of bookings varies significantly from the historic averages.
2. Identify all nonstop segments where the proportion of current bookings (by booking class) for each O&D path over the nonstop segments varies significantly from the historic averages.
3. Identify all fare classes within all segments where the proportion of bookings for each O&D path over the nonstop segments varies significantly from the historic averages.
4. Identify all nonstop segments where the proportion of current bookings for each traffic type (i.e. origin, through, connect) varies significantly from the historic averages.
5. Identify all O&D paths where the number of current bookings for each product type (vacation club, conventions, groups, etc.) varies significantly from the historic averages.
6. Identify all classes within all O&D paths where the proportion of current bookings by ticketing status (ticketed, under ticket time limit, non-ticketed, etc.) varies significantly from the historic averages.
7. Identify all classes within all O&D paths where the number of current bookings for each product type varies significantly from the historic averages.
8. Identify all classes within all O&D paths where variance by proportion of current bookings by fare class varies significantly from the historic averages.
9. Identify all fare classes within all O&D paths where the variance by proportion of current bookings by ticketing status varies significantly from the historic averages.
10. Identify all O&D paths where the current allocated revenue (based on an average fare calculated by the revenue numbers included in the bookings totals) for the compartment (fare class groupings) varies significantly from the historic averages.
11. For a particular departure date and days out from departure, calculate the percent difference between the number of bookings and the historic average number of bookings.
12. For a particular departure date, calculate the percent difference between the actual show rate and the historic average show rate.

RM—Show rate analysis:

This set of analytics is used to perform show rate analyses. They are designed to answer questions about how actual show rates compare to projected show rates. These analytics can be for an entire departure date, a departure time, a flight, or for a specific market, origin, or destination within a particular departure date.

Questions 1, 3 and 5 are concerned with calculating the show rate at one departure date for some unit (a specific O&D path, for example) and comparing the show rate of that unit to the actual or average show rate of all like units over some filter criteria. This being the case, it is impossible to create just one view that satisfies any one requirement, because it is up to the person writing the query to specify the filter criteria over which to calculate the show rates. However, views can be defined as a common base for constructing queries of the type required. This can be presented as drill down or drill across analytics.

1. For a particular departure date, calculate the percent difference between the actual show rate and the historic average show rate.
2. For a particular departure date and days out from departure, calculate the percent difference between the number of bookings for the particular departure date and the number of bookings on a comparison departure date (and days out). This would typically be used to determine the year over year change in bookings. It can also be used to compare bookings for different days of the week.
3. For a particular departure date, calculate the percent difference between the actual show rate and the actual show rate on a comparison departure date. This would typically be used to determine the year over year change in show rate. It can also be used to compare show rates for different days of the week.
4. For a particular departure date and days out, calculate the percent difference between the average number of current bookings for the particular departure date and the average number of bookings on a comparison departure date (and days out). This query can be used to identify year over year or day of week changes in bookings.
5. For a particular departure date, calculate the percent difference between the average show rate and the average show rate on a comparison departure date. This query can be used to identify year over year or day of week changes in show rates.
6. Calculate the projected show rate for each class based on the number of bookings by ticketing status (physical vs. e-ticket) within the class and the average show rate for each ticketing status within the class. Identify all segments or O&D paths where the actual show rate varied significantly from the projected show rate.
7. Calculate the projected show rate for each class of each segment based on the number of bookings within the class for each O&D path over the nonstop segment and the average show rate for the class and the O&D path. Identify all segments where the actual show rate varied significantly from the projected show rate.
8. For each flight, compare the actual show rate for each product type (by booking class) to the market average show rate for each product type. Identify all flights where the actual show rate varied significantly from the market average show rate.
9. Calculate the projected show rate for each class of each nonstop segment based on the number of bookings within the class for each product type within the class and the average show rate for each Product type within the class. Identify all nonstop segments or O&D paths where the actual show rate varied significantly from the projected show rate.
10. Calculate the projected show rate for each class based on the number of bookings by fare code within the class and the average show rate for each fare code within the class. Identify all nonstop segments or itinerary O&Ds where the actual show rate varied significantly from the projected show rate.
11. Calculate the projected show rate for each fare code based on the number of bookings by ticketing status (i.e. is it ticketed?) within the fare code and the average show rate for each ticketing status within the fare code. Identify all nonstop segments or O&D paths where the actual show rate varied significantly from the projected show rate.

RM—Specific Segment or Market O&D Information:

This set of analytics is designed to display information about specific segments or market O&Ds. If the request is information for a segment, then the entire set of O&D paths over the segment will be displayed. If the information is for a market O&D, then the entire set of O&D paths within the market O&D will be displayed.

1. Display all O&D paths (over the nonstop segment or within the market) with compartment bookings (fare class groupings) and historical average compartment bookings. This test is broken down into two parts:
2. Display all the O&D paths (over the nonstop segment or within the market) with compartment bookings
3. Display average compartment bookings.
4. Display all O&D paths with the bookings by traffic type and average bookings by traffic type.
5. Display all the O&D paths with the bookings by Product type, average bookings by Product type, and average market show rate for the Product type.
6. Display all O&D paths with the total expected fare value and historical average fare value.
7. Display all O&D paths with the current bookings by class, average bookings by class, and average show rate for the class.
8. Display all O&D paths with the current bookings by ticketing status within class, average bookings by ticketing status within class, and average show rate for each ticketing status for the class.
9. Display all O&D paths with the current bookings by Product type within class, average bookings by Product type within class, and average market show rate for each Product type.
10. Display all O&D paths with the expected fare value by class and the historic average fare value by class.
11. Display all O&D paths with the current bookings by fare basis code within class, average bookings by fare basis code within class, and average show rate for each fare code within the class.
12. Display all the O&D paths with the current bookings by ticketing status within fare code, average bookings by ticketing status within fare code, and average show rate for each ticketing status within the fare code.

RM—Revenue Recovery Questions:

Revenue recovery questions deal with fraud and other illegal practices. Corporate Security teams that are proactive with the use of warehouse data have identified a number of illegal activities that can affect the Enterprise. Some examples of abuse are:

1. Are travel agencies illegally blocking seat inventory?
2. Is a particular passenger or company making multiple fraudulent lost Baggage claims?
3. Is an individual, company or a travel agency guilty of Frequent Flyer Account redemption abuse?
4. Better understanding "Group Booking Activity" is a completely unexpected benefit from the warehouse environment. A Group Booking is required for groups of 10 or more passengers. The essence of the application is to sort by booking agent (i.e. same IATA #) and then query for all groups of less than 10, that are booked by the same agency to the same destination. If these sub-groups add up to 10 or more the group rules apply.

CONCLUSION

The Figures and description of the invention provided above reveal a flexible relational data model for a travel or transportation enterprise. The Travel Logical Data Model design enables the capturing of detail data concerning customers of a travel provider, products and services provided by the travel provider, customer transactions with the travel provider, and customer purchases of products and services from the travel provider. The travel provider can be an airline, a car rental agency, a cruise line, a lodging provider; a travel agency; a bus line or a passenger rail service provider. The Teradata Travel Logical Data Model is a comprehensive and flexible blueprint of how to organize data within a data warehouse to support business insight and intelligence. It provides the structure to address the business questions needed to manage multiple business areas for all of the travel industry segments.

The Teradata Travel Logical Data Model supports Revenue Management applications, providing an Airline or other travel provider with the ability to increase revenues by achieving optimal passenger and revenue mix on each flight through investigative analysis of Passenger Name Records, booking, ticketing/TCN, inventory, schedule, authorization adjustment and flown/ticket lift data. Revenue Management applications supported by the Travel LDM can improve the management of inventory, pricing and demand forecasting through forecast accuracy and revenue management performance measures, and protect revenue and inventory through the identification of fraudulent and improper booking and ticketing activity.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX A

| | | Attribute Definitions | | |
|---|---|---|---|---|
| Entity Name | Attribute Name | Attribute Definition | PK | FK |
| ACCOUNT | Account Id | A sequence of digits used to identify an account established for a PARTY for the purpose of rendering bills and receiving payments. May also be used to make company offerings or track the use of a LOYALTY ACCOUNT. | Yes | No |
| ACCOUNT | Account Num | The actual account number created by the (3rd party) issuer of the PAYMENT ACCOUNT. Not used as a PK, since it's beyond the enterprises' control. | No | No |

APPENDIX A-continued

Attribute Definitions

| Entity Name | Attribute Name | Attribute Definition | PK | FK |
|---|---|---|---|---|
| ACCOUNT | Acct Type Cd | The unique identifier for an instance of the ACCOUNT TYPE entity. | No | Yes |
| ACCOUNT | Credit Rating Cd | A code that classifies the credit rating level for this PARTY. Example: 1 = Excellent, 2 = Good, 3 = Slow Pay, 4 = Poor, etc. | No | Yes |
| ACCOUNT | Issued Dt | Date on which an ACCOUNT was established. | No | No |
| ACCOUNT | Issuing Org Party Id | The unique identifier for an instance of the PARTY entity. | No | Yes |
| ACCOUNT | Payment Acct Expiry Dt | The date on which a PAYMENT ACCOUNT expires. Typically used for CREDIT CARDS, etc. | No | No |
| ACCOUNT | Primary Liable Party Id | The unique identifier for an individual. | No | Yes |
| ACCOUNT BALANCE (HISTORY) | Balance Effective Dt | The calendar day that the change in an Account Balance (a transaction) occurs. | Yes | No |
| ACCOUNT BALANCE (HISTORY) | Lifetime Expired Qty | The number of units expired from a LOYALTY ACCOUNT | No | No |
| ACCOUNT BALANCE (HISTORY) | Lifetime Purged Qty | The number of units purged from a LOYALTY ACCOUNT | No | No |
| ACCOUNT BALANCE (HISTORY) | Lifetime Voided Qty | The number of units voided from a LOYALTY ACCOUNT | No | No |
| ACCOUNT BALANCE (HISTORY) | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| ACCOUNT BALANCE (HISTORY) | Maint Cur Status Qty | The total number of miles or kilometers needed to maintain the current account level status. | No | No |
| ACCOUNT BALANCE (HISTORY) | Non Qualifying Current Bal Qty | The non-qualifying new current balance of points the customer has available after this update of their award program is applied. | No | No |
| ACCOUNT BALANCE (HISTORY) | Non Qualifying Life Accrue Qty | Keeps track of the balance of the lifetime non-qualifying points earned by a customer. | No | No |
| ACCOUNT BALANCE (HISTORY) | Non Qualifying YTD Balance Qty | The balance of non-qualifying base points or rewards at the point in time that the transaction is posted. | No | No |
| ACCOUNT BALANCE (HISTORY) | Previous Balance Qty | The balance of points the PARTY had available prior to this update of their award program. | No | No |
| ACCOUNT BALANCE (HISTORY) | Qualifying Current Balance Qty | The qualifying new current balance of points the customer has available after this update of their award program is applied. | No | No |
| ACCOUNT BALANCE (HISTORY) | Qualifying Life Accrue Qty | Keeps track of the balance of the lifetime qualifying points earned by a customer. | No | No |
| ACCOUNT BALANCE (HISTORY) | Qualifying YTD Balance Qty | The balance of qualifying base points or rewards at the point in time that the transaction is posted. These points are taken in consideration by the AIRLINE to attain the next upper account level. | No | No |
| ACCOUNT EARNINGS | Account Earnings Qualifying Id | ACCOUNT EARNINGS earned through either PARTNER EARNINGs or DIRECT EARNINGs. Based on the rules of the LOYALTY ACCOUNT, the ACCOUNT EARNINGS are either Qualifying or Non Qualifying for a specific level or program. | No | No |
| ACCOUNT EARNINGS | Base Qty | Number of base account units that count towards award earnings | No | No |
| ACCOUNT EARNINGS | Bonus Qty | Number of bonus account units that count towards award earnings, and awarded in addition to Base units. Usually awarded as a multiplier for advanced loyalty level customers. | No | No |
| ACCOUNT EARNINGS | Event Dttm | The date and time that a loyalty event occurred | Yes | Yes |
| ACCOUNT EARNINGS | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| ACCOUNT EARNINGS | Offer Id | The unique identifier for an instance of the OFFER entity. Identifies the promotional OFFER that was responsible for the ACCOUNT EARNINGs. Example: Customer received 1,000 promotional bonus points for flying a newly promoted route. | No | Yes |
| ACCOUNT EARNINGS | Qualifying Qty | Number of account units that count towards qualifying events | No | No |
| ACCOUNT LEVEL | Level Qualifying Desc | A brief explanation of the reward level. Example: "25,000 paid flight miles" | No | No |

APPENDIX A-continued

Attribute Definitions

| Entity Name | Attribute Name | Attribute Definition | PK | FK |
|---|---|---|---|---|
| ACCOUNT LEVEL | Loyalty Level Cd | A unique number assigned to a specific award level used to promote and encourage product usage (utilization). | Yes | No |
| ACCOUNT LEVEL | Loyalty Level Name | A brief textual description of the award level Example: Gold, Silver, Bronze. | No | No |
| ACCOUNT LEVEL | Loyalty Program Id | A unique code assigned to an award program when implemented. | Yes | Yes |
| ACCOUNT REDEMPTION | Account Redemption Qty DD | The total amount of points redeemed since the last update of the customers award program. This is a DERIVED DATA (DD) element. | No | No |
| ACCOUNT REDEMPTION | Event Dttm | The date and time that a loyalty event occurred | Yes | Yes |
| ACCOUNT REDEMPTION | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| ACCOUNT REDEMPTION | Points Redeemed Qty | The actual number of points required for this specific instance of an ACCOUNT REDEMPTION activity. | No | No |
| ACCOUNT TYPE | Acct Type Cd | The unique identifier for an instance of the ACCOUNT TYPE entity. | Yes | No |
| ACCOUNT TYPE | Acct Type Desc | Text that describes an instance of the ACCOUNT TYPE entity. | No | No |
| ACCOUNTS PAYABLE | Acct Payable GL Acct Num | The unique Chart of Account code for the GL ACCOUNT. | Yes | Yes |
| ACCOUNTS RECEIVABLE | GL Account Num | The unique Chart of Account code for the GL ACCOUNT. | Yes | Yes |
| ACCRUED LIABILITY ACCOUNT | GL Account Num | The unique Chart of Account code for the GL ACCOUNT. | Yes | Yes |
| AD | Ad Cost Amt | The actual cost of an AD. | No | No |
| AD | Ad Desc | Textual description that provides summary information about the AD. Example: NCR logo with a white background and the message 'Transforming transactions into relationships'. | No | No |
| AD | Ad Id | The unique identifier for an instance of the AD entity. | Yes | No |
| AD | Ad Type Cd | An attribute used to classify an AD. | No | Yes |
| AD | Organization Party Id | The unique identifier for an instance of the PARTY entity. | No | Yes |
| AD | Promo Id | The unique identifier for an instance of the PROMOTION entity. | No | Yes |
| AD COMPONENT | Ad Id | The unique identifier for an instance of the AD entity. | Yes | Yes |
| AD COMPONENT | MM Component Id | System generated number for identifying a component. If source database has a unique identifier, the same can be substituted here. | Yes | Yes |
| AD PRODUCT | Ad Id | The unique identifier for an instance of the AD entity. | Yes | Yes |
| AD PRODUCT | Product Id | The unique identifier for an instance of the PRODUCT entity | Yes | Yes |
| AD TYPE | Ad Type Cd | An attribute used to classify an AD. | Yes | No |
| AD TYPE | Ad Type Desc | Textual description that provides summary information about the AD. Example: NCR logo with a white background and the message 'Transforming transactions into relationships'. | No | No |
| ADDRESS | Address Id | A number used to uniquely identify an ADDRESS. | Yes | No |
| ADDRESS | Address Type Cd | A code that uniquely identifies the type of an ADDRESS. | No | Yes |
| ADDRESS DEMOGRAPHIC | Country Cd | The unique code assigned to the GEOGRAPHY AREA. | Yes | Yes |
| ADDRESS DEMOGRAPHIC | Demog Cd | The unique identifier for an instance of the DEMOGRAPHIC entity. | Yes | Yes |
| ADDRESS DEMOGRAPHIC | Demog Value Cd | A code referencing a specific DEMOGRAPHIC VALUE for a given demographic code. | No | Yes |
| ADDRESS DEMOGRAPHIC | Postal Cd | An identifier for an instance of the POSTAL CODE entity. | Yes | Yes |
| ADDRESS RELATED | Address Related Reason Cd | A code which designates why one occurrence of Address has a relationship to another Address, such as "A" (is alternate address for). | No | Yes |
| ADDRESS RELATED | Related Address Id | A number used to uniquely identify the related ADDRESS. | Yes | Yes |
| ADDRESS RELATED | Relates Address Id | A number used to uniquely identify an ADDRESS. | Yes | Yes |

APPENDIX A-continued

Attribute Definitions

| Entity Name | Attribute Name | Attribute Definition | PK | FK |
|---|---|---|---|---|
| ADDRESS RELATED REASON | Address Related Reason Cd | A code which uniquely identifies the Address Related Reason. | Yes | No |
| ADDRESS RELATED REASON | Address Related Reason Desc | A textual description of why two Addresses are, or were at one time, associated. | No | No |
| ADDRESS RELATED REASON | Address Related Reason Name | The name assigned to an Address Related Reason. | No | No |
| ADDRESS TYPE | Address Type Cd | A code that uniquely identifies the type of an ADDRESS. | Yes | No |
| ADDRESS TYPE | Address Type Desc | A description that describes the type of an ADDRESS. | No | No |
| ADDRESS USAGE | Address Usage Cd | The unique identifier for an instance of the ADDRESS USAGE entity. | Yes | No |
| ADDRESS USAGE | Address Usage Desc | Text that describes an instance of the ADDRESS USAGE entity. Example: market to, bill to, ship to, etc | No | No |
| AIRCRAFT | Aircraft Tail Num | The actual Tail Number identification of a specific airplane | No | No |
| AIRCRAFT | Transport Vehicle Id | A sequence of digits used to identify an ASSET. | Yes | Yes |
| AIRLINE | Airline Cd | A two letter alphabetic code assigned to each AIRLINE by IATA. Example: DL, AA, NW, CO, etc. | No | No |
| AIRLINE | Airline Num | The numeric identifier assigned to each airline. It is the same number printed on each airlines respective ticket stock. Examples: '001', '006' | No | No |
| AIRLINE | Airline Org Id | The unique identifier for an organization. | Yes | Yes |
| AIRLINE HUB | Airline Org Id | The unique identifier for an organization. | Yes | Yes |
| AIRLINE HUB | Enplanement Capacity Qty | The maximum number of passengers possible to fly from this AIRLINE HUB. | No | No |
| AIRLINE HUB | Facility Id | A unique number assigned to a TRAVEL FACILITY to give it a unique identity. | Yes | Yes |
| AIRLINE HUB | Flight Capacity Qty | The maximum number of daily departing flights capable from this AIRLINE HUB. | No | No |
| AIRLINE MARKET STATISTICS | Adjusted Passenger Cnt | The total number of passengers flown for the specified period adjusted to exclude frequent flyer and free passengers | No | No |
| AIRLINE MARKET STATISTICS | Adjusted Revenue Amt | The sum of all revenue collected from flown passengers for the specified period adjusted to exclude frequent flyer and free passengers. | No | No |
| AIRLINE MARKET STATISTICS | Airline Org Id | The unique identifier for an organization. | Yes | Yes |
| AIRLINE MARKET STATISTICS | ASM/K Cnt | Available Seat Mile/Kilometers = Total Miles (Kilometers) flown * Total Seats (empty and filled) on Flights | No | No |
| AIRLINE MARKET STATISTICS | Average Fare Amt | The average Fare paid by all flown passengers for the specified period adjusted to exclude frequent flyer and free passengers. | No | No |
| AIRLINE MARKET STATISTICS | Market Statistic Effective Dt | The calendar day that the statistics has been accumulated and effective. Note: The Effective date and End Date indicate a span of time and, together, specify a time period over which the statistics were collected. | Yes | No |
| AIRLINE MARKET STATISTICS | Market Statistic End Dt | The calendar day that the statistics are no longer relevant. Note: The Effective date and End Date indicate a span of time and, together, specify a time period over which the statistics were collected | No | No |
| AIRLINE MARKET STATISTICS | Product Id | The unique identifier for an instance of the PRODUCT entity | Yes | Yes |
| AIRLINE MARKET STATISTICS | RASM/K Amt | Revenue per Available Seat Mile/Kilometer Total Revenue for flown flights divided by ASM/K, expressed as an amount. | No | No |
| AIRLINE RESERVATION | Product Id | The unique identifier for an instance of the PRODUCT entity | No | Yes |
| AIRLINE RESERVATION | Reservation Seq Num | This attribute identifies a specific RESERVATION ITEM. | Yes | Yes |
| AIRLINE RESERVATION | Reservation Transaction Id | A unique identifier for this TRAVEL TRANSACTION. | Yes | Yes |
| AIRLINE RESERVATION | Sched Depart Dttm | The scheduled departure date and time. | No | Yes |
| AIRLINE TICKET | Initial Conjunction Ind | Indicates if the Ticket is the first ticket in a conjunction ticket series. | No | No |
| AIRLINE TICKET | International Ind | Indicates if the flight will fly domestically (within the country of origin) or Internationally (destination is another country other than point of origin). | No | No |

APPENDIX A-continued

Attribute Definitions

| Entity Name | Attribute Name | Attribute Definition | PK | FK |
|---|---|---|---|---|
| AIRLINE TICKET | Ticket Id | A unique identifier for a TICKET. | Yes | Yes |
| AIRPORT | Airport Cd | The International three letter alphabetic code assigned to each airport. Example: ATL, SFO, NEW, etc. | No | No |
| AIRPORT | Airport Elevation Qty | A physical height measured above sea-level for an airport. In the US this measurement is typically in feet, such as 5000 feet above sea-level. In the rest of the world it is measured in meters. | No | No |
| AIRPORT | Airport Name | The official title or Department of Transportation (DOT) name given to an airport Example: John F. Kennedy International, Hartsfield International, Heathrow International, Charles De Gaulle International, etc. | No | No |
| AIRPORT | Facility Id | A unique number assigned to a TRAVEL FACILITY to give it a unique identity. | Yes | Yes |
| AIRPORT LOUNGE AWARD | Award Certificate Id | The identifier of a certificate awarded to a customer account. | Yes | Yes |
| AMORTIZATION METHOD | Amortization Method Cd | A unique code for the amortization method. Examples may be; cash basis (no amortization), straight line, declining balance or interest method. A = cash basis (assumed that there should not be an entry specifying cash) B = straight line C = double declining balance D = interest method | Yes | No |
| AMORTIZATION METHOD | Amortization Method Desc | A description of the code. | No | No |
| ANALYTICAL MODEL | Model Algorithm Id | The unique identifier for an instance of the ANALYTICAL MODEL ALGORITHM entity. | No | Yes |
| ANALYTICAL MODEL | Model Desc | A description of the model. Example: Propensity of a Customer to buy Item x if Item y has already been bought; Forecast for seasonal travel, etc. | No | No |
| ANALYTICAL MODEL | Model Id | The unique identifier for an instance of the ANALYTICAL MODEL entity. | Yes | No |
| ANALYTICAL MODEL | Model Name | The name assigned to this model. | No | No |
| ANALYTICAL MODEL | Model Purpose Desc | Describes the purpose of the model. Example: To help predict which customers may defect. | No | No |
| ANALYTICAL MODEL | Model Score Ind | Yes/No indicator if scores were also output as a result of the model. | No | No |
| ANALYTICAL MODEL | Model Source Party Id | The unique identifier for an instance of the PARTY entity. | No | Yes |
| ANALYTICAL MODEL | Model Status Ind | Used to indicate the current status of the model, if required. (CRM 4.0 uses this attribute) | No | No |
| ANALYTICAL MODEL | Model Type Id | The unique identifier for an instance of the ANALYTICAL MODEL TYPE entity. | No | Yes |
| ANALYTICAL MODEL ALGORITHM | Model Algorithm Desc | A Description of the algorithm used. Example: Linear Regression, Business Rules, etc. | No | No |
| ANALYTICAL MODEL ALGORITHM | Model Algorithm Id | The unique identifier for an instance of the ANALYTICAL MODEL ALGORITHM entity. | Yes | No |
| ANALYTICAL MODEL TYPE | Model Type Desc | Describes the type of model. Example: Forecast, Scoring, Segmentation, etc. | No | No |
| ANALYTICAL MODEL TYPE | Model Type Id | The unique identifier for an instance of the ANALYTICAL MODEL TYPE entity. | Yes | No |
| AREA | Geography Area Cd | The unique code assigned to the AREA. | Yes | No |
| AREA | Geography Area Desc | The description of the AREA. | No | No |
| AREA | World Region Cd | A number used to uniquely identify a WORLD REGION. | No | Yes |
| ASSET | Asset Desc | The description of an ASSET. Example: Boeing 737 model 300, Universal Load Device for a Boeing 757, Standard box car, Ford Taurus, etc. | No | No |
| ASSET | Asset Id | A sequence of digits used to identify an ASSET. | Yes | No |
| ASSET | Asset Type CD | A code that uniquely identifies an ASSET. Example: 1 = RENTAL VEHICLE, 2 = LODGING PROPERTY, 3 = PASSENGER VEHICLE, etc. | No | Yes |
| ASSET ACCOUNT | Asset Account Desc | The description of the ASSET ACCOUNT. | No | No |
| ASSET ACCOUNT | Asset Account Name | The name assigned to the ASSET ACCOUNT. | No | No |
| ASSET ACCOUNT | Asset Acct Type Cd | The unique code assigned to the ASSET ACCOUNT type. | No | Yes |
| ASSET ACCOUNT | GL Account Num | The unique Chart of Account code for the GL ACCOUNT. | Yes | Yes |
| ASSET ACCOUNT TYPE | Asset Acct Type Cd | The unique code assigned to the ASSET ACCOUNT type. | Yes | No |

APPENDIX A-continued

Attribute Definitions

| Entity Name | Attribute Name | Attribute Definition | PK | FK |
|---|---|---|---|---|
| ASSET ACCOUNT TYPE | Asset Acct Type Desc | The description of ASSET ACCOUNT type. | No | No |
| ASSET TYPE | Asset Type CD | A code that uniquely identifies an ASSET. Example: 1 = RENTAL VEHICLE, 2 = LODGING PROPERTY, 3 = PASSENGER VEHICLE, etc. | Yes | No |
| ASSET TYPE | Asset Type Desc | Textual description of an ASSET. Example: RENTAL VEHICLE, LODGING PROPERTY, PASSENGER VEHICLE, etc. | No | No |
| ASSOCIATE | Assoc HR Num | The associate number that was assigned to an ASSOCIATE by the enterprises HR Department. | No | No |
| ASSOCIATE | Associate Id | The unique identifier for an instance of the PARTY entity. | Yes | Yes |
| AVAILABLE CASH ACCOUNT | GL Account Num | The unique Chart of Account code for the GL ACCOUNT. | Yes | Yes |
| AWARD | Award Cd | A code that uniquely identifies an AWARD CERTIFICATE. Example: 1 = AIRPORT LOUNGE AWARD, 2 = UPGRADE AWARD, 3 = TICKET AWARD, etc. | Yes | No |
| AWARD | Award Desc | Textual description of an AWARD CERTIFICATE. Example: AIRPORT LOUNGE AWARD, UPGRADE AWARD, TICKET AWARD, etc. | No | No |
| AWARD CERTIFICATE | Award Cd | A code that uniquely identifies an AWARD CERTIFICATE. Example: 1 = AIRPORT LOUNGE AWARD, 2 = UPGRADE AWARD, 3 = TICKET AWARD, etc. | No | Yes |
| AWARD CERTIFICATE | Award Certificate Id | The identifier of a certificate awarded to a customer account. | Yes | No |
| AWARD CERTIFICATE | Award Type Cd | A unique identifier of the type of award earned and requested by the account owner. Example: D111. | No | Yes |
| AWARD CERTIFICATE | Event Dttm | The date and time that a loyalty event occurred | No | Yes |
| AWARD CERTIFICATE | Loyalty Account Id | A sequence of digits used to identify an account established for a PARTY for the purpose of rendering bills and receiving payments. May also be used to make company offerings or track the use of a LOYALTY ACCOUNT. | No | Yes |
| AWARD CERTIFICATE | Offer Id | The unique identifier for an instance of the OFFER entity. Identifies the promotional OFFER that was responsible for the ACCOUNT AWARD CERTIFICATE EARNINGs. Example: Customer received a free companion ticket for flying a newly promoted route a certain number of times. | No | Yes |
| AWARD TYPE | Award Type Cd | A unique identifier of the type of award earned and requested by the account owner. Example: D111. | Yes | No |
| AWARD TYPE | Award Type Desc | A brief explanation of the type of award earned and requested by the account owner. Example: "First Class Round Trip between US and Europe" | No | No |
| BAGGAGE CHECK | Baggage Damage Ind | Indicates if the checked baggage/luggage incurred damage while being handled by TRAVEL PROVIDER personal or machinery. | No | No |
| BAGGAGE CHECK | Baggage Misplaced Ind | Indicates if the checked item was temporarily lost or misplaced, but later recovered. | No | No |
| BAGGAGE CHECK | Checked Baggage Weight Meas | The amount of weight associated with the baggage item(s). | No | No |
| BAGGAGE CHECK | Claim Check Id | The claim check number assigned to an item of baggage/luggage at check-in. | No | No |
| BAGGAGE CHECK | Incurred Liability Amt | Indicates the monetary amount of loss incurred by the customer related to lost or damaged baggage/luggage. | No | No |
| BAGGAGE CHECK | Lost Baggage Ind | Indicates if the checked item was permanently lost by the airline. | No | No |
| BAGGAGE CHECK | Trip Event Num | A unique number assigned to an EN ROUTE EVENT entity. | Yes | Yes |
| BENEFITS EXPENSE | Benefit Amt | The monetary amount given to EMPLOYEEs for benefits. | No | No |
| BENEFITS EXPENSE | Benefit Hours Qty | The number of benefit hours. | No | No |
| BENEFITS EXPENSE | GL Account Num | The unique Chart of Account code for the GL ACCOUNT. | Yes | Yes |

APPENDIX A-continued

Attribute Definitions

| Entity Name | Attribute Name | Attribute Definition | PK | FK |
| --- | --- | --- | --- | --- |
| BENEFITS EXPENSE | Internal Org Party Id | The unique identifier for an internal organization. | Yes | Yes |
| BENEFITS EXPENSE | Labor Type Cd | The unique code assigned to the labor type. (e.g. that labor performed by employees or contractors) | Yes | Yes |
| BOARDING DENIED | Compensation Amt | A monetary amount paid to compensate a passenger. | No | No |
| BOARDING DENIED | Denied Reason Cd | Code associated with a Denied Boarding, i.e. 1 = Mechanical, 2 = Overbooked, etc. | No | Yes |
| BOARDING DENIED | Trip Event Num | A unique number assigned to an EN ROUTE EVENT entity. | Yes | Yes |
| BOARDING DENIED | Voluntary Ind | Indicates if a denied boarding was voluntary or non-voluntary | No | No |
| BOARDING EVENT | Assigned Seat Num | The seat number assigned to every single passenger. | No | No |
| BOARDING EVENT | Gate Num | The airport terminal gate at which a PARTY is suppose to board the aircraft. This is associated with the BOARDING EVENT entity and is determined by the scheduled flight printed on the purchased TRAVEL COUPON. | No | No |
| BOARDING EVENT | Trip Event Num | A unique number assigned to an EN ROUTE EVENT entity. | Yes | Yes |
| BOOKING CLASS | Booking Class Cd | The booking class code associated with this particular booking (i.e. F, Y, M, etc.). | Yes | No |
| BOOKING CLASS | Booking Class Desc | | No | No |
| BOOKING CLASS | Service Class Cd | The unique identifier of a specific CLASS OF SERVICE offered by a TRAVEL PROVIDER. Example: A (First Class), B (Business Class) or C (Economy Class). | No | Yes |
| BOOKING CLASS | Yield Level Cd | A unique code that identifies the yield level (i.e. 0 - Low, 1 - Medium, 2 - High). | No | Yes |
| BROWSE | Browse Tran Id | A unique identifier for this TRAVEL TRANSACTION. | Yes | Yes |
| BROWSE ITEM | Browse Seq Num | This attribute identifies a specific BROWSE ITEM. | Yes | No |
| BROWSE ITEM | Browse Tran Id | A unique identifier for this TRAVEL TRANSACTION Browse Visit. | Yes | Yes |
| BROWSE ITEM | Product Id | The unique identifier for an instance of the PROCUCT entity | No | Yes |
| BROWSER APPLICATION | Browser Application Cd | Uniquely identifies the type of web browser application being used. | Yes | No |
| BROWSER APPLICATION | Browser Application Name | The Name of the Web Browser application. | No | No |
| BROWSER ID | Browser Application Cd | Uniquely identifies the type of web browser application being used. | No | Yes |
| BROWSER ID | Browser Application Ver Num | The release version of the web browser application being used. | No | Yes |
| BROWSER ID | Browser Id | The unique identifier for this specific web browser installed on this specific piece of hardware. Probably a cookie ID. | Yes | No |
| BROWSER ID | Connect Method Cd | The technology used to connect to the internet. | No | No |
| BROWSER ID | Hardware Type Cd | Code that identifies the type of computer hardware being used | No | No |
| BROWSER ID | Operating System Cd | Code that identifies the computer operating system being used | No | Yes |
| BROWSER VERSION | Browser Application Cd | Uniquely identifies the type of web browser application being used. | Yes | Yes |
| BROWSER VERSION | Browser Application Ver Num | The release version of the web browser application being used. | Yes | No |
| BUS | Transport Vehicle Id | A sequence of digits used to identify an ASSET. | Yes | Yes |
| BUS DEPOT | Facility Id | A unique number assigned to a TRAVEL FACILITY to give it a unique identity. | Yes | Yes |
| BUS ORGANIZATION | Bus Org Id | The unique identifier for an organization. | Yes | Yes |
| BUS PRODUCT | Product Id | The unique identifier for an instance of the PRODUCT entity | Yes | Yes |
| BUS TICKET | Ticket Id | A unique identifier for a TICKET. | Yes | Yes |
| BUSINESS | Business Legal Class Cd | A code representing the type of business from a legal perspective such as: 1 = Sole proprietor 2 = Partnership 3 = Limited Partnership 4 = Master limited Partnerships 5 = Corporation 6 = Subchapter 7 = S-Corporation 8 = Non-Profit 9 = Trusts | No | Yes |

APPENDIX A-continued

Attribute Definitions

| Entity Name | Attribute Name | Attribute Definition | PK | FK |
|---|---|---|---|---|
| BUSINESS | Business Party Id | The unique identifier for any business that is of interest to the enterprise. A business is a is a legal entity consisting of one or more individuals formed for the purpose of conducting business or providing a service. | Yes | Yes |
| BUSINESS | Duns Id | Dun & Bradstreet information pertaining to a particular business. | No | Yes |
| BUSINESS LEGAL CLASSIFICATION | Business Legal Class Cd | A code representing the type of business from a legal perspective such as: 1 = Sole proprietor 2 = Partnership 3 = Limited Partnership 4 = Master limited Partnerships 5 = Corporation 6 = Subchapter 7 = S-Corporation 8 = Non-Profit 9 = Trusts | Yes | No |
| BUSINESS LEGAL CLASSIFICATION | Business Legal Class Desc | A textual description of a legal classification for a business. | No | No |
| BUSINESS NAICS | Business Party Id | The unique identifier for any business that is of interest to the enterprise. A business is a is a legal entity consisting of one or more individuals formed for the purpose of conducting business or providing a service. | Yes | Yes |
| BUSINESS NAICS | Business Primary NAICS Ind | The indicator for whether or not the NAICS code for the business is the primary NAICS code. | No | No |
| BUSINESS NAICS | NAICS Cd | A six digit code for the North American Industry Classification System. NAICS was developed jointly by the U.S., Canada, and Mexico to provide new comparability in statistics about business activity across North America. | Yes | Yes |
| BUSINESS SIC | Business Party Id | The unique identifier for any business that is of interest to the enterprise. A business is a is a legal entity consisting of one or more individuals formed for the purpose of conducting business or providing a service. | Yes | Yes |
| BUSINESS SIC | Business SIC Primary Sic Ind | The indicator for whether or not the SIC code for the business is the primary SIC code. | No | No |
| BUSINESS SIC | SIC Cd | A code for the Standard Industry Classification which is a method for classifying businesses by the type of business they are active in, such as services or manufacturing. | Yes | Yes |
| CALL CENTER | Call Ctr Loc Id | System generated number used to identify a LOCATION. | Yes | Yes |
| CALL CENTER | Location Org Id | The unique identifier for an organization. | Yes | Yes |
| CAMPAIGN | Campaign Desc | Text that describes an instance of the CAMPAIGN entity. | No | No |
| CAMPAIGN | Campaign End Dt | Date on which a CAMPAIGN ends. | No | No |
| CAMPAIGN | Campaign Id | The unique identifier for an instance of the CAMPAIGN entity. | Yes | No |
| CAMPAIGN | Campaign Start Dt | The date on which a CAMPAIGN starts. | No | No |
| CAMPAIGN | Organization Party Id | The unique identifier for an instance of the PARTY entity. | No | Yes |
| CANCELLED | Destination Facility Id | A unique number assigned to a TRAVEL FACILITY to give it a unique identity. | Yes | Yes |
| CANCELLED | Flight Num | A unique identifier assigned to a Flight scheduled for generating revenue and utilized by the general public. | Yes | Yes |
| CANCELLED | Incident Type Cd | Defines code assigned to every single incident that may occur. Examples: 1 = Flight delayed, 2 = Flight cancelled, 3 = Flight diverted, etc. | Yes | Yes |
| CANCELLED | Origin Facility Id | A unique number assigned to a TRAVEL FACILITY to give it a unique identity. | Yes | Yes |
| CANCELLED | Sched Depart Dtt6m | The scheduled departure date and time. Yes | Yes | |
| CAR RENTAL ORGANIZATION | Car Rental Org Id | The unique identifier for an organization. | Yes | Yes |
| CAR RENTAL RESERVATION | Reservation Seq Num | This attribute identifies a specific RESERVATION ITEM. | Yes | Yes |
| CAR RENTAL RESERVATION | Reservation Transaction Id | A unique identifier for this TRAVEL TRANSACTION. | Yes | Yes |
| CASH | Payment Line Num | This attribute associates a specific PAYMENT with a specific PURCHASE ITEM. | Yes | Yes |
| CASH | Purchase Tran Id | A unique identifier for this TRAVEL TRANSACTION. | Yes | Yes |
| CENSUS BLOCK | Census Block Cd | The unique identifier for an instance of the CENSUS BLOCK entity. | Yes | No |
| CENSUS BLOCK | Country Cd | The unique code for an instance of the COUNTRY entity. | No | Yes |

APPENDIX A-continued

Attribute Definitions

| Entity Name | Attribute Name | Attribute Definition | PK | FK |
|---|---|---|---|---|
| CENSUS BLOCK | Postal Cd | An code for an instance of the POSTAL CODE entity. | No | Yes |
| CERTIFICATE | Award Certificate Id | A unique identifier of a Ticket used to transport a passenger by air. | No | Yes |
| CERTIFICATE | Certificate Num | The serial number of the certificate given by and airline to a customer for the purpose of obtaining a Ticket. | No | No |
| CERTIFICATE | Certificate Promotion Cd | A code used to describe the program under which the certificate is being redeemed. | No | No |
| CERTIFICATE | Certificate Type Cd | The domain of identifiers for discriminating the type of CERTIFICATE used for PAYMENT. | No | Yes |
| CERTIFICATE | Payment Line Num | This attribute associates a specific PAYMENT with a specific PURCHASE ITEM. | Yes | Yes |
| CERTIFICATE | Purchase Tran Id | A unique identifier for this TRAVEL TRANSACTION. | Yes | Yes |
| CERTIFICATE TYPE | Certificate Type Cd | The domain of identifiers for discriminating the type of CERTIFICATE used for PAYMENT. | Yes | No |
| CERTIFICATE TYPE | Certificate Type Desc | A brief explanation of the type of CERTIFICATE used for PAYMENT. | No | No |
| CHANNEL | Channel Cd | The unique identifier for an instance of the CHANNEL entity. | Yes | No |
| CHANNEL | Channel Desc | Description of a CHANNEL used. | No | No |
| CHARGE TYPE | Charge Type Cd | Identifies a unique occurrence of CHARGE TYPE | Yes | No |
| CHARGE TYPE | Charge Type Desc | A tbrief description of a type of charge or quote component for a PRODUCT. Example: Transfer Fee, Landing Tax, Airline Fare, Meal ticket, surcharge for bringing a pet, etc. | No | No |
| CHARITY DONATION | Award Certificate Id | The identifier of a certificate awarded to a customer account. | Yes | Yes |
| CHECK-IN EVENT | Actual Service Class Cd | The unique identifier of a specific SERVICE CLASS offered by a TRAVEL PROVIDER. Example: A (First Class), B (Business Class) or C (Economy Class). This is the actual Service Class that was given to the passenger (may be different than what was booked/ticketed) | No | Yes |
| CHECK-IN EVENT | Class Upgrade Charge Amt | The monetary amount charged to a ticketed PARTY when requesting and giving a class upgrade. | No | No |
| CHECK-IN EVENT | Class Upgrade Request Ind | A PARTY has requested a service class upgrade at checking in. | No | No |
| CHECK-IN EVENT | Downgrade Issued Ind | A checked PARTY was downgraded from an otherwise confirmed class/cabin level. | No | No |
| CHECK-IN EVENT | Go Show Ind | Indicates a passenger who showed up just before flight departure with no previous booking and purchased tickets | No | No |
| CHECK-IN EVENT | No Show Ind | An indication of a passenger that does not board a flight after they had already checked into the airport or gate. | No | No |
| CHECK-IN EVENT | Overweight Baggage Charge Amt | The monetary amount charged to a ticketed PARTY for the overweight limit portion of their checked baggage/luggage. | No | No |
| CHECK-IN EVENT | Overweight Baggage Weight Meas | Indicates by how much, if any, of the total luggage weight is over the allowable limit. | No No | |
| CHECK-IN EVENT | Seat Change Issued Ind | An indication that a passenger was able to change a seat assignment at check-in. | No | No |
| CHECK-IN EVENT | Seat Change Request Ind | An indication that a passenger at check-in requested a seat assignment change. | No | No |
| CHECK-IN EVENT | Standby Ind | Indicates if the passenger had to standby for this segment. | No | No |
| CHECK-IN EVENT | Trip Event Num | A unique number assigned to an EN ROUTE EVENT entity. | Yes | Yes |
| CHECK-IN EVENT | Unaccompanied Minor Ind | An indicator that an unaccompanied minor has checked-in. | No | No |
| CHECK-IN EVENT | Upgrade Issued Ind | An indication that a checked passenger was given a cabin/class upgrade. | No | No |
| CHECK-IN EVENT | With Infant Ind | An indication that the PARTY checked in with a child or infant that will be occupying the same seat. | No | No |
| CHECKING ACCOUNT | Account Id | A sequence of digits used to identify an account established for a PARTY for the purpose of rendering bills and receiving payments. May also be used to make company offerings or track the use of a LOYALTY ACCOUNT. | Yes | Yes |

APPENDIX A-continued

Attribute Definitions

| Entity Name | Attribute Name | Attribute Definition | PK | FK |
|---|---|---|---|---|
| CITY | City Cd | The unique code for an instance of the CITY entity. | Yes | No |
| CITY | City Name | The name of a CITY, village, town, etc. | No | No |
| CITY | County Cd | The unique code for an instance of the COUNTY entity. | No | Yes |
| CITY | Territory Cd | The unique code for an instance of the TERRITORY entity. | No | Yes |
| CITY TICKET OFFICE | City Ticket Off Id | System generated number used to identify a LOCATION. | Yes | Yes |
| CITY TICKET OFFICE | Location Org Id | The unique identifier for an organization. | Yes | Yes |
| CODE SHARE BASIS | Code Share Basis Cd | A code which represents the fare basis for a Code Share flight. | Yes | No |
| CODE SHARE BASIS | Code Share Basis Desc | A textual description of the fare basis for a Code Share flight. | No | No |
| COMMON STOCK ACCOUNT | Common Shares Outstanding Qty | The number of outstanding COMMON STOCK shares of a CORPORATION. | No | No |
| COMMON STOCK ACCOUNT | Common Stock Account Type Cd | The unique code assigned to the COMMON STOCK ACCOUNT type. Types of common stock include voting stock and non-voting stock. | No | Yes |
| COMMON STOCK ACCOUNT | Common Stock Par Value Amt | The assigned monetary value used to compute the accounting value of common shares on a company's balance sheet. | No | No |
| COMMON STOCK ACCOUNT | GL Account Num | The unique Chart of Account code for the GL ACCOUNT. | Yes | Yes |
| COMMON STOCK ACCOUNT | Total Auth Common Shares Qty | The maximum number of common shares that a corporation may create. | No | No |
| COMMON STOCK ACCOUNT TYPE | Common Stock Account Type Cd | The unique code assigned to the COMMON STOCK ACCOUNT type. Types of common stock include voting stock and non-voting stock. | Yes | No |
| COMMON STOCK ACCOUNT TYPE | Common Stock Account Type Desc | The description of the COMMON STOCK ACCOUNT type. | No | No |
| COMPENSATORY EARNINGS | Event Dttm | The date and time that a loyalty event occurred | Yes | Yes |
| COMPENSATORY EARNINGS | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| COMPENSATORY EARNINGS | Party Event Dt | The date on which the customer event occurs or recorded. | No | Yes |
| COMPENSATORY EARNINGS | Party Event Tm | The time of day that a customer event occurred or was recorded. | No | Yes |
| COMPENSATORY EARNINGS | Party Id | The unique identifier for an instance of the PARTY entity. | No | Yes |
| CONTACT TYPE | Event Type Cd | The categorization of the type of customer event. Example: 1 = Complaint, 2 = Happy Call, 3 = Change Address | Yes | No |
| CONTACT TYPE | Event Type Desc | A textual description of the categorization of a customer event. Example: Customer Complaint, Customer Happy Call. | No | No |
| CONTEXT | Context Cd | Unique identifier for the business intent represented by Web Pages. | Yes | No |
| CONTEXT | Context Desc | A textual description of the Context. | No | No |
| CONTEXT | Context Note Txt | Additional facts about a Context. | No | No |
| CONTRACT | Associate Id | The unique identifier for an instance of the PARTY entity. | No | Yes |
| CONTRACT | Contract From Dt | This attribute is the calendar day on which a legal agreement becomes effective. | No | No |
| CONTRACT | Contract Id | This attribute is the identifier for a contract agreement. | Yes | No |
| CONTRACT | Contract Name | This attribute is a name or title assigned to the contract by the sales representative to aid in recall and support of the customer. | No | No |
| CONTRACT | Contract To Dt | The last calendar day on which a legal agreement is effective. | No | No |
| CONTRACT | Contract Type Cd | The unique identifier for an instance of the CONTRACT TYPE entity. | No | Yes |
| CONTRACT | Organization Party Id | The unique identifier for an instance of the PARTY entity. | No | Yes |
| CONTRACT TERM | Contract Id | This attribute is the identifier for a contract agreement. | Yes | Yes |
| CONTRACT TERM | Contract Term Amt | This attribute is the actual value of the contract term as defined by the Contract Term Category. | No | No |

APPENDIX A-continued

Attribute Definitions

| Entity Name | Attribute Name | Attribute Definition | PK | FK |
|---|---|---|---|---|
| CONTRACT TERM | Contract Term Category Cd | This attribute is an identifier of the domain of contract terms or parameter types used in establishing a contract. | Yes | Yes |
| CONTRACT TERM CATEGORY | Contract Term Category Cd | This attribute is an identifier of the domain of contract terms or parameter types used in establishing a contract. | Yes | No |
| CONTRACT TERM CATEGORY | Contract Term Category Desc | This attribute is a brief description of the domain of contract terms or parameter types used in establishing a contract. | No | No |
| CONTRACT TERM CATEGORY | Contract Term Category Name | This attribute is the name of the domain of contract terms or parameter types used in establishing a contract. Examples: Minimum Monthly Revenue Amount Minimum Travel Segment Count Discount Percentage etc. | No | No |
| CONTRACT TYPE | Contract Type Cd | The unique identifier for an instance of the CONTRACT TYPE entity. | Yes | No |
| CONTRACT TYPE | Contract Type Desc | This attribute is a description of the discriminator used to distinguish contracts Example: Agency Contract, Corporate Contract, Reseller Contract, Equipment Contract | No | No |
| CONVERSION | Conversion Category Cd | Unique identifier for information concerning the linkage between recommended Offerings and the Web Page that the Offering was displayed on. Source-> Recommendation DB. | No | Yes |
| CONVERSION | Conversion Dttm | The date and time on which a Conversion occurred. | No | No |
| CONVERSION | Conversion Id | Unique identifier for successful recommendations provided by a recommendation engine such as that provided by BeFree. A recommendation is considered successful if a user clicks on the recommendation. A purchase need not be made in order for a recommendation to be considered a Conversion. | Yes | No |
| CONVERSION | Conversion Original Click Ind | Designates if the user clicked on the Recommendation when it was originally displayed or if the user came back at a subsequent time. 0 - No, 1 - yes. | No | No |
| CONVERSION | Visit Id | The unique identifier for an instance of the VISIT entity. | No | Yes |
| CONVERSION CATEGORY | Conversion Category Cd | Unique identifier for information concerning the linkage between recommended Offerings and the Web Page that the Offering was displayed on. Source-> Recommendation DB. | Yes | No |
| CONVERSION CATEGORY | Conversion Category Name | The name assigned to a Conversion Category. | No | No |
| CONVERSION CATEGORY | Conversion Category URL Txt | The Internet or Web Address where the Conversion Category appeared. This typically is composed of four parts: A protocol name (a protocol is a set of rules and standards that enable computers to exchange information). The location of the site. The name of the organization that maintains the site. A suffix that identifies the kind of organization it is (such as .com for a commercial organization). For example, the address http://www.microsoft.com/ provides the following information: http: This Web server uses Hypertext Transfer Protocol (HTTP). www: This site is on the World Wide Web. Microsoft The Web server is at Microsoft Corporation. com: This is a commercial institution. When you are viewing a Web page, the page address appears in the Address bar in Internet Explorer. | No | No |
| CONVERSION CATEGORY | Conversion Product Id | A unique identifier for a grouping of one or more products and the corresponding price plan, rate structure or unit charge that may marketed by the organization for the purpose of generating revenue. A product is what a customer purchases or subscribes to. | No | Yes |
| CONVERSION CATEGORY | Web Page Id | The unique identifier of a particular WEB PAGE instance. | No | Yes |
| COST OF SALES ACCOUNT | Cost Of Sales Amt | The monetary amount of a COST OF SALES account. | No | No |
| COST OF SALES | GL Account Num | The unique Chart of Account code for the GL | Yes | Yes |

APPENDIX A-continued

Attribute Definitions

| Entity Name | Attribute Name | Attribute Definition | PK | FK |
|---|---|---|---|---|
| ACCOUNT COUNTRY | Country Cd | ACCOUNT. The unique code for an instance of the COUNTRY entity. | Yes | No |
| COUNTRY | Country Name | The name of a COUNTRY | No | No |
| COUNTRY | Geography Area Cd | The unique code assigned to the GEOGRAPHY AREA. | No | Yes |
| COUNTY | County Cd | The unique code for an instance of the COUNTY entity. | Yes | No |
| COUNTY | County Name | The name of a COUNTY. | No | No |
| COUNTY | Territory Cd | The unique code for an instance of the TERRITORY entity. | No | Yes |
| COUPON | Offer Id | The unique identifier for an instance of the OFFER entity. | Yes | Yes |
| COUPON CERTIFICATE | Coupon Serial Num | The actual serial number appearing on an issued COUPON. | Yes | No |
| COUPON CERTIFICATE | Offer Id | The unique identifier for an instance of the OFFER entity. | Yes | Yes |
| COUPON CERTIFICATE | Party Id | The unique identifier for an instance of the PARTY entity. | No | Yes |
| CRAWLER | Crawler Desc | Describes specifics about a Crawler. | No | No |
| CRAWLER | Crawler Id | Unique identifier assigned to a specific program search engine that takes information from a Web Site. | Yes | No |
| CRAWLER PERMISSION TYPE | Crawler Permission Type Cd | Uniquely identifies the type of permission that a Crawler is allowed when accessing a Web Site or Web Page. | Yes | No |
| CRAWLER PERMISSION TYPE | Crawler Permission Type Desc | A textual description for a Crawler Permission Type. | No | No |
| CRAWLER PERMISSION TYPE | Crawler Permission Type Name | The name assigned to a Crawler Permission Type. | No | No |
| CRAWLER WEB PAGE PERMISSION | Crawler Id | Unique identifier assigned to a specific program search engine that takes information from a Web Site. | Yes | Yes |
| CRAWLER WEB PAGE PERMISSION | Crawler Permission Type Cd | Uniquely identifies the type of permission that a Crawler is allowed when accessing a Web Site or Web Page. | Yes | Yes |
| CRAWLER WEB PAGE PERMISSION | Web Page Id | The unique identifier of a particular WEB PAGE instance. | Yes | Yes |
| CRAWLER WEB SITE PERMISSION | Crawler Id | Unique identifier assigned to a specific program search engine that takes information from a Web Site. | Yes | Yes |
| CRAWLER WEB SITE PERMISSION | Crawler Permission Type Cd | Uniquely identifies the type of permission that a Crawler is allowed when accessing a Web Site or Web Page. | Yes | Yes |
| CRAWLER WEB SITE PERMISSION | Web Site Id | A unique identifier for the web site. | Yes | Yes |
| CREATION SOURCE TYPE | Creation Source Desc | A textual description of a Creation Source Cd. | No | No |
| CREATION SOURCE TYPE | Creation Source Name | The name assigned to a Creation Source Cd. Examples: Purchased Prospect List, Website, Customer Care Center Campaign Reply. | No | No |
| CREATION SOURCE TYPE | Creation Source Type Cd | A code used to uniquely identify how/where the first information about the existence of a Party was obtained. Examples: PL - Purchased Prospect List, WB - Web Site, CC - Customer Care Center, CM - Campaign Reply. | Yes | No |
| CREDIT CARD | Account Id | A sequence of digits used to identify an account established for a PARTY for the purpose of rendering bills and receiving payments. May also be used to make company offerings or track the use of a LOYALTY ACCOUNT. | Yes | Yes |
| CREDIT CARD | Credit Card Type Cd | A code indicating the type of CREDIT CARD. | No | No |
| CREDIT CARD | Premium Level Cd | A code that indicates the level of the CREDIT CARD being used. Example: 1 - Standard, 2 - Gold, 3 - Platnium. | No | No |
| CREDIT RATING | Credit Rating Cd | A code that classifies the credit rating level for this PARTY. Example: 1 = Excellent, 2 = Good, 3 = Slow Pay, 4 = Poor, etc. | Yes | No |
| CREDIT RATING | Credit Rating Desc | Text that describes an instance of the CREDIT RATING entity. Example: Excellent, Good, Slow Pay, Poor, etc. | No | No |
| CRUISE LINE | Cruise Org Id | The unique identifier for an organization. | Yes | Yes |
| CRUISE LINE RESERVATION | Reservation Seq Num | This attribute identifies a specific RESERVATION ITEM. | Yes | Yes |

APPENDIX A-continued

Attribute Definitions

| Entity Name | Attribute Name | Attribute Definition | PK | FK |
| --- | --- | --- | --- | --- |
| CRUISE LINE RESERVATION | Reservation Transaction Id | A unique identifier for this TRAVEL TRANSACTION. | Yes | Yes |
| CRUISE LINE TICKET | Ticket Id | A unique identifier for a TICKET. | Yes | Yes |
| CRUISE PRODUCT | Product Id | The unique identifier for an instance of the PRODUCT entity | Yes | Yes |
| CRUISE SHIP | Transport Vehicle Id | A sequence of digits used to identify an ASSET. | Yes | Yes |
| CURRENT ASSET ACCOUNT | Current Asset Acct Amt | The monetary amount of current ASSETs. | No | No |
| CURRENT ASSET ACCOUNT | Current Asset Acct Type Cd | The unique code assigned to the current ASSET type. Examples may be available cash, prepaid expenses, inventory, accounts receivable, or securities. | No | Yes |
| CURRENT ASSET ACCOUNT | GL Account Num | The unique Chart of Account code for the GL ACCOUNT. | Yes | Yes |
| CURRENT ASSET ACCOUNT TYPE | Current Asset Acct Type Cd | The unique code assigned to the current ASSET type. Examples may be available cash, prepaid expenses, inventory, accounts receivable, or securities. | Yes | No |
| CURRENT ASSET ACCOUNT TYPE | Current Asset Acct Type Desc | A description of the CURRENT ASSET type. | No | No |
| CURRENT LIABILITY ACCOUNT | Current Liab Acct Type Cd | The unique code assigned to the current LIABILITY account type. Examples may be accrued liability, deferred revenue, short-term debt, current long-term debt, income taxes and accounts payable. | No | Yes |
| CURRENT LIABILITY ACCOUNT | Current Liability Amt | The monetary amount of current LIABILITY account. | No | No |
| CURRENT LIABILITY ACCOUNT | GL Account Num | The unique Chart of Account code for the GL ACCOUNT. | Yes | Yes |
| CURRENT LIABILITY ACCOUNT TYPE | Current Liab Acct Type Cd | The unique code assigned to the current LIABILITY account type. Examples may be accrued liability, deferred revenue, short-term debt, current long-term debt, income taxes and accounts payable. | Yes | No |
| CURRENT LIABILITY ACCOUNT TYPE | Current Liab Acct Type Desc | The description of the current LIABILITY account type. | No | No |
| CURRENT LONG TERM DEBT ACCOUNT | GL Account Num | The unique Chart of Account code for the GL ACCOUNT. | Yes | Yes |
| CUSTOMER PREFERENCE | Party Id | The unique identifier for an instance of the PARTY entity. | Yes | Yes |
| CUSTOMER PREFERENCE | Preference Cd | The identifier for a personal customer preference. Example: 104 - seat type preference 194 - smoking preference 345 - language preference etc | Yes | Yes |
| CUSTOMER PREFERENCE | Preference Value Cd | A code that indicates the preference for this PARTY. Example: 1 = Smoking, 2 = No Smoking | Yes | Yes |
| DEFERRED CHARGE ACCOUNT | GL Account Num | The unique Chart of Account code for the GL ACCOUNT. | Yes | Yes |
| DEFERRED INCOME TAX ACCOUNT | GL Account Num | The unique Chart of Account code for the GL ACCOUNT. | Yes | Yes |
| DEFERRED REVENUE ACCOUNT | GL Account Num | The unique Chart of Account code for the GL ACCOUNT. | Yes | Yes |
| DELAYED | Actual Arrival Dttm | The date and wall clock time of the actual arrival time at the destination location | No | No |
| DELAYED | Actual Departure Dttm | The date and wall clock time of the actual departure of the travel vehicle at its originating location. | No | No |
| DELAYED | Destination Facility Id | A unique number assigned to a TRAVEL FACILITY to give it a unique identity. | Yes | Yes |
| DELAYED | Flight Num | A unique identifier assigned to a Flight scheduled for generating revenue and utilized by the general public. | Yes | Yes |
| DELAYED | Incident Type Cd | Defines code assigned to every single incident that may occur. Examples: 1 = Flight delayed, 2 = Flight cancelled, 3 = Flight diverted, etc. | Yes | Yes |
| DELAYED | Origin Facility Id | A unique number assigned to a TRAVEL FACILITY to give it a unique identity. | Yes | Yes |
| DELAYED | Sched Depart Dttm | The scheduled departure date and time. | Yes | Yes |
| DEMOGRAPHIC | Demog Cd | The unique identifier for an instance of the DEMOGRAPHIC entity. | Yes | No |
| DEMOGRAPHIC | Demog Desc | Text that describes an instance of the DEMOGRAPHIC entity. | No | No |

APPENDIX A-continued

Attribute Definitions

| Entity Name | Attribute Name | Attribute Definition | PK | FK |
| --- | --- | --- | --- | --- |
| DEMOGRAPHIC | Demog Group Cd | The unique identifier for an instance of the DEMOGRAPHIC GROUP entity. | No | Yes |
| DEMOGRAPHIC | Organization Party Id | The unique identifier for an instance of the PARTY entity. | No | Yes |
| DEMOGRAPHIC GROUP | Demog Group Cd | The unique identifier for an instance of the DEMOGRAPHIC GROUP entity. | Yes | No |
| DEMOGRAPHIC GROUP | Demog Group Desc | Text that describes an instance of the DEMOGRAPHIC GROUP entity. | No | No |
| DEMOGRAPHIC VALUE | Demog Cd | The unique identifier for an instance of the DEMOGRAPHIC entity. | Yes | Yes |
| DEMOGRAPHIC VALUE | Demog Range Begin Val | The start value for a DEMOGRAPHIC VALUE that consists of a range. | No | No |
| DEMOGRAPHIC VALUE | Demog Range End Val | The ending value for a DEMOGRAPHIC VALUE that consists of a range. | No | No |
| DEMOGRAPHIC VALUE | Demog Val | The actual value of a DEMOGRAPHIC VALUE. | No | No |
| DEMOGRAPHIC VALUE | Demog Value Cd | A code referencing a specific DEMOGRAPHIC VALUE for a given demographic code. | Yes | No |
| DENIED REASON | Denied Reason Cd | Code associated with a Denied Boarding, i.e. 1 = Mechanical, 2 = Overbooked, etc. | Yes | No |
| DENIED REASON | Denied Reason Desc | Boarding Denied description associated with each Denied Reason Cd such as Mechanical or Weather | No | No |
| DEPRECIABLE ASSET ACCOUNT | GL Account Num | The unique Chart of Account code for the GL ACCOUNT. | Yes | Yes |
| DEPRECIABLE ASSET ACCT PAYABLE | Acct Payable GL Acct Num | The unique Chart of Account code for the GL ACCOUNT. | Yes | Yes |
| DEPRECIABLE ASSET ACCT PAYABLE | GL Account Num | The unique Chart of Account code for the GL ACCOUNT. | Yes | Yes |
| DIRECT EARNINGS | Event Dttm | The date and time that a loyalty event occurred | Yes | Yes |
| DIRECT EARNINGS | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| DIRECT EARNINGS | Trip Event Num | A unique number assigned to an EN ROUTE EVENT entity. | No | Yes |
| DIRECT MAIL OFFER | Offer Id | The unique identifier for an instance of the OFFER entity. | Yes | Yes |
| DISASTER | Destination Facility Id | A unique number assigned to a TRAVEL FACILITY to give it a unique identity. | Yes | Yes |
| DISASTER | Flight Num | A unique identifier assigned to a Flight scheduled for generating revenue and utilized by the general public. | Yes | Yes |
| DISASTER | Incident Type Cd | Defines code assigned to every single incident that may occur. Examples: 1 = Flight delayed, 2 = Flight cancelled, 3 = Flight diverted, etc. | Yes | Yes |
| DISASTER | Origin Facility Id | A unique number assigned to a TRAVEL FACILITY to give it a unique identity. | Yes | Yes |
| DISASTER | Sched Depart Dttm | The scheduled departure date and time. | Yes | Yes |
| DISTRICT | Dist Name | The name of the DISTRICT. | No | No |
| DISTRICT | District Id | System generated number used to identify a DISTRICT. | Yes | No |
| DISTRICT | Region Id | System generated number used to identify a REGION. | No | Yes |
| DIVERTED | Destination Facility Id | A unique number assigned to a TRAVEL FACILITY to give it a unique identity. | Yes | Yes |
| DIVERTED | Diverted to Facility Id | A unique number assigned to a TRAVEL FACILITY to give it a unique identity. | No | Yes |
| DIVERTED | Flight Num | A unique identifier assigned to a Flight scheduled for generating revenue and utilized by the general public. | Yes | Yes |
| DIVERTED | Incident Type Cd | Defines code assigned to every single incident that may occur. Examples: 1 = Flight delayed, 2 = Flight cancelled, 3 = Flight diverted, etc. | Yes | Yes |
| DIVERTED | Origin Facility Id | A unique number assigned to a TRAVEL FACILITY to give it a unique identity. | Yes | Yes |
| DIVERTED | Sched Depart Dttm | The scheduled departure date and time. | Yes | Yes |
| DIVIDEND EQUITY ACCOUNT | Dividend Equity Acct Type Cd | The unique code assigned to the DIVIDEND EQUITY ACCOUNT type. Types of dividend equities are common stock and preferred stock. | No | Yes |

APPENDIX A-continued

Attribute Definitions

| Entity Name | Attribute Name | Attribute Definition | PK | FK |
|---|---|---|---|---|
| DIVIDEND EQUITY ACCOUNT | Dividend Equity Amt | The monetary amount distributed to the shareholders of an enterprise. The distribution of dividends usually occurs at a fixed time period. | No | No |
| DIVIDEND EQUITY ACCOUNT | GL Account Num | The unique Chart of Account code for the GL ACCOUNT. | Yes | Yes |
| DIVIDEND EQUITY ACCOUNT TYPE | Dividend Equity Acct Type Cd | The unique code assigned to the DIVIDEND EQUITY ACCOUNT type. Types of dividend equities are common stock and preferred stock. | Yes | No |
| DIVIDEND EQUITY ACCOUNT TYPE | Dividend Equity Acct Type Desc | The description of the DIVIDEND EQUITY ACCOUNT type. | No | No |
| DIVISION | Division Id | System generated number used to identify a DIVISION. | Yes | No |
| DIVISION | Division Name | The name of the DIVISION. | No | No |
| DIVISION | Organization Party Id | The unique identifier for an organization. | No | Yes |
| DOMAIN IP REASON | Domain IP Reason Cd | Specifies the type of relationship that may exist between an IP Address and a Domain. Examples: 1 = IP Address of linking Server, 2 = Valid IP Addresses for a Domain. | Yes | No |
| DOMAIN IP REASON | Domain IP Reason Desc | A textual description of the IP reason. | No | No |
| DOMAIN ROOT | Domain Root Cd | A unique identifier for the root name of the domain server. Examples: 11 - .com, 12 - .net, 13 - .org. Source-> Web Log | Yes | No |
| DOMAIN ROOT | Domain Root Cd | A unique identifier for the root name of the domain server. Examples: 11 - .com, 12 - .net, 13 - .org. Source-> Web Log | Yes | No |
| DOMAIN ROOT | Domain Root Desc | A textual description of a Domain Root Examples: .com, .net, .org. | No | No |
| DOMAIN ROOT | Domain Root Desc | A textual description of a Domain Root Examples: .com, .net, .org. | No | No |
| DUNS | Duns Id | Dun & Bradstreet information pertaining to a particular business. | Yes | No |
| DUNS | Duns Num | A number assigned by Dun & Bradstreet and known as the Data Universal Numbering System (DUNS). It uses a unique 9-digit number to identify a specific business location, access it in the D&B information base and link it to parent companies, subsidiaries and branches throughout the life of the business. The United Nations and the U.S. government have endorsed D&B's Number as a global business identifier for electronic commerce including Electronic Data Interchange (EDI) transactions. | No | No |
| DWELLING TYPE | Dwelling Type Cd | A code that uniquely identifies the DWELLING TYPE. | Yes | No |
| DWELLING TYPE | Dwelling Type Desc | A description of the Dwelling Type Code. | No | No |
| E LOC REF DIRECTORY | Directory Referral Desc | Textual description of the directory referral. If this attribute is identical to referral url, then it could be removed from the model | No | No |
| E LOC REF DIRECTORY | Referral Id | A coding method for classifying a REFERRAL. | Yes | Yes |
| E LOC REF SEARCH | Referral Id | A coding method for classifying a REFERRAL. | Yes | Yes |
| E LOC REF SEARCH | Search Result Desc | Textual description of a search result. For example product search, service search, etc. This information can be populated if it could be parsed from the search result url. | No | No |
| E LOC REF SEARCH | Search Terms Txt | The terms used in performing search | No | No |
| E LOC REF WEB AD | Referral Id | A coding method for classifying a REFERRAL. | Yes | Yes |
| E LOC REF WEB AD | Web Ad Placement Id | The unique identifier that identifies a particular instance of WEB AD PLACEMENT. | No | Yes |
| E LOC REFERRAL TYPE | E Loc Ref Type Cd | A coding method for classifying an E LOC REFERRAL TYPE. | Yes | No |
| E LOC REFERRAL TYPE | E Loc Ref Type Desc | Classifies E LOCATION referrals into various sub-types such as Searches, Web Ads, Directories, etc. | No | No |
| E LOCATION | E Loc Desc | The description of this particular E LOCATION. | No | No |
| E LOCATION | E Loc Name | The name given to this particular E LOCATION. | No | No |
| E LOCATION | E Loc Type Cd | A coding method for classifying an E LOCATION. | No | Yes |
| E LOCATION | E Location Id | Unique value that identifies this particular E LOCATION. | Yes | No |
| E LOCATION | E Site Id | Unique value that identifies a particular E SITE. | No | Yes |
| E LOCATION REFERRAL | E Loc Ref Type Cd | A coding method for classifying an E LOC REFERRAL TYPE. | No | Yes |
| E LOCATION | E Location Id | Unique value that identifies this particular E | No | Yes |

APPENDIX A-continued

Attribute Definitions

| Entity Name | Attribute Name | Attribute Definition | PK | FK |
|---|---|---|---|---|
| REFERRAL | | LOCATION. | | |
| E LOCATION REFERRAL | Referral Id | A coding method for classifying a REFERRAL. | Yes | Yes |
| E LOCATION REFERRAL | Referring Page URL Txt | The uniform resource locator associated with an E LOCATION. | No | No |
| E LOCATION TYPE | E Loc Type Cd | A coding method for classifying an E LOCATION. | Yes | No |
| E LOCATION TYPE | E Loc Type Desc | Textual description of an E LOCATION TYPE. | No | No |
| E SITE | E Site Id | Unique value that identifies a particular E SITE. | Yes | No |
| E SITE | E Site Type Cd | A code used for classifying E SITEs. | No | Yes |
| E SITE | Owner Organization Party Id | The unique identifier for an instance of the ORGANIZATION entity. Identifies the E SITE owner. | No | Yes |
| E SITE TYPE | E Site Type Cd | A code used for classifying E SITEs. | Yes | No |
| E SITE TYPE | E Site Type Desc | Textual description of the classification of an E SITE. Example: portal, service provider, aggregator. | No | No |
| ELECTRONIC ADDRESS | Domain Root Cd | A unique identifier for the root name of the domain server. Examples: 11 - .com, 12 - .net, 13 - .org. Source-> Web Log | No | Yes |
| ELECTRONIC ADDRESS | Electronic Address Domain Name | The name of the InterNic domain registered. Examples: aol, microsoft, earthlink, etc. | No | No |
| ELECTRONIC ADDRESS | Electronic Address Id | A number used to uniquely identify an ELECTRONIC ADDRESS. | Yes | Yes |
| ELECTRONIC ADDRESS | Electronic Address Txt | The textual part of the email address before the @ symbol | No | No |
| ELECTRONIC ADDRESS | Electronic Address Type Cd | A code that uniquely identifies the ELECTRONIC ADDRESS TYPE. | No | Yes |
| ELECTRONIC ADDRESS | Email Text Format Ind | Indicates that emails send to this email address should be in text format (not html format) | No | No |
| ELECTRONIC ADDRESS TYPE | Electronic Address Type Cd | A code that uniquely identifies the ELECTRONIC ADDRESS TYPE. | Yes | No |
| ELECTRONIC ADDRESS TYPE | Electronic Address Type Desc | A description of the ELECTRONIC ADDRESS TYPE. | No | No |
| EMAIL AD | Email Ad Id | The unique identifier for an instance of the AD entity. | Yes | Yes |
| EMAIL CLIENT APPLICATION | Email Client Appl Ver Num | The version of the Email Client Application, 4.0, 5.0, etc. | No | No |
| EMAIL CLIENT APPLICATION | Email Client Application Cd | A unique identifier for the email application used by a client to read and send email, such as Microsoft Outlook Express 5.0. Source-> Email application log file. | Yes | No |
| EMAIL CLIENT APPLICATION | Email Client Application Name | The name of the Email Client Application such as Microsoft Outlook Express. | No | No |
| EMAIL OFFER | Offer Id | The unique identifier for an instance of the OFFER entity. | Yes | Yes |
| EMAIL REFERRAL | Electronic Address Id | A number used to uniquely identify an ELECTRONIC ADDRESS. | No | Yes |
| EMAIL REFERRAL | Email Ad Id | The unique identifier for an instance of the AD entity. | No | Yes |
| EMAIL REFERRAL | Email Client Application Cd | A unique identifier for the email application used by a client to read and send email, such as Microsoft Outlook Express 5.0. Source-> Email application log file. | No | Yes |
| EMAIL REFERRAL | Referral Id | A coding method for classifying a REFERRAL. | Yes | Yes |
| ENTRY FLAG | Entry Flag Cd | Uniquely identifies the order of the pages viewed during a Web visit. Examples: 21 - First Page, 22 - Exit Page, 23 - Intermediate Page. Source-> Web Log | Yes | No |
| ENTRY FLAG | Entry Flag Desc | A textual description for an Entry Flag. Examples: First Page, Exit Page, Intermediate Page. | No | No |
| EQUIPMENT ACCOUNT | Equipment Asset Model Num | The number of the ASSET model. | No | No |
| EQUIPMENT ACCOUNT | Equipment Asset Serial Num | The serial number of the ASSET. | No | No |
| EQUIPMENT ACCOUNT | GL Account Num | The unique Chart of Account code for the GL ACCOUNT. | Yes | Yes |
| EQUIPMENT SUBSTITUTION | Destination Facility Id | A unique number assigned to a TRAVEL FACILITY to give it a unique identity. | Yes | Yes |
| EQUIPMENT SUBSTITUTION | Flight Num | A unique identifier assigned to a Flight scheduled for generating revenue and utilized by the general public. | Yes | Yes |

APPENDIX A-continued

Attribute Definitions

| Entity Name | Attribute Name | Attribute Definition | PK | FK |
| --- | --- | --- | --- | --- |
| EQUIPMENT SUBSTITUTION | Incident Type Cd | Defines code assigned to every single incident that may occur. Examples: 1 = Flight delayed, 2 = Flight cancelled, 3 = Flight diverted, etc. | Yes | Yes |
| EQUIPMENT SUBSTITUTION | Origin Facility Id | A unique number assigned to a TRAVEL FACILITY to give it a unique identity. | Yes | Yes |
| EQUIPMENT SUBSTITUTION | Sched Depart Dttm | The scheduled departure date and time. | Yes | Yes |
| EQUIPMENT SUBSTITUTION | Transport Vehicle Id | A sequence of digits used to identify an ASSET. | No | Yes |
| EQUITY ACCOUNT | Equity Acct Amt DD | The derived monetary amount of an EQUITY ACCOUNT. | No | No |
| EQUITY ACCOUNT | Equity Acct Desc | The description of the EQUITY ACCOUNT. | No | No |
| EQUITY ACCOUNT | Equity Acct Name | The name assigned to the EQUITY ACCOUNT. | No | No |
| EQUITY ACCOUNT | Equity Acct Type Cd | The unique code assigned to the DIVIDEND EQUITY type. Types of equity accounts include dividend equity and non-dividend equity. | No | Yes |
| EQUITY ACCOUNT | GL Account Num | The unique Chart of Account code for the GL ACCOUNT. | Yes | Yes |
| EQUITY ACCOUNT TYPE | Equity Acct Type Cd | The unique code assigned to the DIVIDEND EQUITY type. Types of equity accounts include dividend equity and non-dividend equity. | Yes | No |
| EQUITY ACCOUNT TYPE | Equity Acct Type Desc | The description of the DIVIDEND EQUITY type. | No | No |
| EQUITY SURPLUS ACCOUNT | GL Account Num | The unique Chart of Account code for the GL ACCOUNT. | Yes | Yes |
| ETHNICITY | Ethnicity Cd | A unique identifier for an individual's ethnicity. Example: 1 = Caucasian, 1 = Latino, 3 = African American, etc. | Yes | No |
| ETHNICITY | Ethnicity Desc | A description of the individual's ethnicity. Example: 1 = Caucasian, 1 = Latino, 3 = African American, etc | No | No |
| EVENT REASON | Event Reason Cd | This attribute is a categorization of the type of reason for an ENROUTE EVENT. Example: 1 = Poor Service, 2 = Flight Delay, 3 = Moving, 4 = Competitor Offer, 5 = Equipment Problem, 6 = Quality, etc | Yes | No |
| EVENT REASON | Event Reason Desc | This attribute is a textual description of the reason for the occurrence of an ENROUTE EVENT. Example: Poor Service, Competitor Offer Equipment Problem, etc | No | No |
| EVENT REASON | Event Reason Severity Ind | A specific event is considered severe. Example: N = No - Event Not Severe (default) Y = Yes - Event Is Severe | No | No |
| EVENT RESOLUTION TYPE | Event Resolution Type Cd | A code that represents a resolution type used to resolve a specific customer event. | Yes | No |
| EVENT RESOLUTION TYPE | Event Resolution Type Desc | A brief description of the resolution type used to resolve a specific customer account event. Examples are: "Credited Customer Account", "Debited Customer Account" and "Gave Customer Discount" | No | No |
| EXCHANGE AWARD | Award Certificate Id | The identifier of a certificate awarded to a customer account. | Yes | Yes |
| EXIT METHOD | Exit Method Cd | Unique identifier for the methods by which a user may leave a Web Site. This would have the value 'timeout' for most Web Visits but other values could be defined for explicit actions that result in a user exiting the Web Site such as clicking a logout button. Source-> Information generated during web log transformation or from Operational DB. | Yes | No |
| EXIT METHOD | Exit Method Desc | A textual description for an Exit Method. Examples: Timeout, SignOut. | No | No |
| EXPENSE ACCOUNT | Expense Acct Amt DD | The derived amount of an EXPENSE ACCOUNT. | No | No |
| EXPENSE ACCOUNT | Expense Acct Desc | The description of the EXPENSE ACCOUNT. | No | No |
| EXPENSE ACCOUNT | Expense Acct Type Cd | The unique code assigned to the EXPENSE ACCOUNT type. Types of expense accounts include operating expense, interest expense and other expense. | No | Yes |
| EXPENSE ACCOUNT | GL Account Num | The unique Chart of Account code for the GL ACCOUNT. | Yes | Yes |
| EXPENSE ACCOUNT TYPE | Expense Acct Type Cd | The unique code assigned to the EXPENSE ACCOUNT type. Types of expense accounts include operating expense, interest expense and other expense. | Yes | No |

APPENDIX A-continued

Attribute Definitions

| Entity Name | Attribute Name | Attribute Definition | PK | FK |
|---|---|---|---|---|
| EXPENSE ACCOUNT TYPE | Expense Acct Type Desc | The description of the EXPENSE ACCOUNT type. | No | No |
| EXTERNAL WEB AD PLACEMENT | E Location Id | Unique value that identifies this particular E LOCATION. | No | Yes |
| EXTERNAL WEB AD PLACEMENT | Web Ad Placement Id | The unique identifier that identifies a particular instance of WEB AD PLACEMENT. | Yes | Yes |
| FACILITY OP EXPENSE ACCOUNT | GL Account Num | The unique Chart of Account code for the GL ACCOUNT. | Yes | Yes |
| FARE BASIS | Booking Class Cd | The booking class code associated with this particular booking (i.e. F, Y, M, etc.). | No | Yes |
| FARE BASIS | Fare Basis Cd | The unique codes used to determine the basis of the Fare charged to PARTYs for the purchase of an OnD PRODUCT. | Yes | No |
| FARE BASIS | Fare Basis Desc | A brief explanation of the basis of the Fare charged to the PARTY for the purchase of a OnD PRODUCT. | No | No |
| FILE | File Desc | A textual description of the File. | No | No |
| FILE | File Id | A unique identifier for a related collection of records. For example, the records on each customer could be placed in a file. In turn, each record would consist of fields for individual data items, such as customer name, customer number, customer address, and so forth. | Yes | No |
| FILE | File Name | The name of the File (song.mp3, program.exe). | No | No |
| FILE | File Size Meas | The size of the File. Examples: 1.4 Megabytes, 15 Kilobytes, 256 bytes. | No | No |
| FILE | File Type Cd | A unique identifier for a type of File, usually broken down by extension. Examples are ".mp3", ".exe", and ".pdf". Alternatively, files could be associated with known file types such as MP3 file, application, or Adobe Acrobat document. Source-> FTP server log or operational DB | No | Yes |
| FILE DOWNLOAD | File Download Dttm | The date and time on which a File Download occurred. | No | No |
| FILE DOWNLOAD | File Download Id | A unique identifier for Files that were downloaded from a Web Site. For example, an MP3 site would keep records on what songs were downloaded. | Yes | No |
| FILE DOWNLOAD | File Download Revenue Amt | The amount charged for a File Download. | No | No |
| FILE DOWNLOAD | File Download Successful Ind | Designates the status of the File Download. Possible values include 'completed' or 'failed'. | No | No |
| FILE DOWNLOAD | File Id | A unique identifier for a related collection of records. For example, the records on each customer could be placed in a file. In turn, each record would consist of fields for individual data items, such as customer name, customer number, customer address, and so forth. | No | Yes |
| FILE TYPE | File Type Cd | A unique identifier for a type of File, usually broken down by extension. Examples are ".mp3", ".exe", and ".pdf". Alternatively, files could be associated with known file types such as MP3 file, application, or Adobe Acrobat document. Source-> FTP server log or operational DB | Yes | No |
| FILE TYPE | File Type Desc | A textual description for a File Type. | No | No |
| FINANCIAL PLAN | Financial Plan Desc | The description of the FINANCIAL PLAN. | No | No |
| FINANCIAL PLAN | Financial Plan End Dt | The FINANCIAL PLAN's end date. | No | No |
| FINANCIAL PLAN | Financial Plan Id | The unique identifier assigned to the FINANCIAL PLAN. | Yes | No |
| FINANCIAL PLAN | Financial Plan Name | The name assigned to the FINANCIAL PLAN. | No | No |
| FINANCIAL PLAN | Financial Plan Revision Dt | The FINANCIAL PLAN revision date. | No | No |
| FINANCIAL PLAN | Financial Plan Revision Num | The revision number of the FINANCIAL PLAN. | No | No |
| FINANCIAL PLAN | Financial Plan Start Dt | The FINANCIAL PLAN's start date. | No | No |
| FINANCIAL PLAN | Financial Plan Status Cd | The unique code assigned to the FINANCIAL PLAN status. | No | Yes |
| FINANCIAL PLAN STATUS | Financial Plan Status Cd | The unique code assigned to the FINANCIAL PLAN status. | Yes | No |
| FINANCIAL PLAN STATUS | Financial Plan Status Desc | The description of the FINANCIAL PLAN status. | No | No |
| FIXED ASSET | Fixed Asset Acct Type | The unique code assigned to the fixed ASSET | No | Yes |

APPENDIX A-continued

Attribute Definitions

| Entity Name | Attribute Name | Attribute Definition | PK | FK |
|---|---|---|---|---|
| ACCOUNT | Cd | GL Account type. Examples may be depreciable asset account or non-depreciable asset account. | | |
| FIXED ASSET ACCOUNT | Fixed Asset Amt DD | The derived monetary amount of a FIXED ASSET ACCOUNT. | No | No |
| FIXED ASSET ACCOUNT | GL Account Num | The unique Chart of Account code for the GL ACCOUNT. | Yes | Yes |
| FIXED ASSET ACCOUNT TYPE | Fixed Asset Acct Type Cd | The unique code assigned to the fixed ASSET GL Account type. Examples may be depreciable asset account or non-depreciable asset account. | Yes | No |
| FIXED ASSET ACCOUNT TYPE | Fixed Asset Acct Type Desc | The description of the fixed ASSET type. | No | No |
| FLIGHT | Airline Org Id | The unique identifier for an organization. | No | Yes |
| FLIGHT | Flight Num | A unique identifier assigned to a Flight scheduled for generating revenue and utilized by the general public. | Yes | No |
| FLIGHT | Non Stop Ind | An indicator which signifies that a FLIGHT makes no intermediary stops between Origin and Destination points. | No | No |
| FLIGHT | Route Cd | The unique code assigned to a route managed by a RM Analyst. | No | Yes |
| FLIGHT CODESHARE | Code Share Basis Cd | A code which represents the fare basis for a Code Share flight. | No | Yes |
| FLIGHT CODESHARE | Hard Block Seat Qty | The number of seats blocked out by a specific airline participating in a codeshare flight. | No | No |
| FLIGHT CODESHARE | Primary Flight Num | A unique identifier assigned to a Flight scheduled for generating revenue and utilized by the general public. This is the Flight Num assigned by the operating carrier. | Yes | Yes |
| FLIGHT CODESHARE | Shared Flight Num | A unique identifier assigned to a Flight scheduled for generating revenue and utilized by the general public. This is the Flight Num assigned by the code share carrier but not operating the flight. | Yes | Yes |
| FLIGHT PRODUCT (SEGMENT) | Flight Num | A unique identifier assigned to a Flight scheduled for generating revenue and utilized by the general public. | No | Yes |
| FLIGHT PRODUCT (SEGMENT) | Product Id | The unique identifier for an instance of the PRODUCT entity | Yes | Yes |
| FORECAST BOOKING CURVE | Booking Class Cd | The booking class code associated with this particular booking (i.e. F, Y, M, etc.). | Yes | Yes |
| FORECAST BOOKING CURVE | Days To Dept Cnt | A designated point in time across the booking history of a flight at which key metrics for a flight are recorded. Usually a flight is made available for booking by the inventory system 365 days in advance. As the flight departure date nears, the metrics are recorded more frequently and they are spaced further apart during the early part of a flight's booking life. | Yes | Yes |
| FORECAST BOOKING CURVE | Forecast Revenue Amt | The amount of PRODUCT revenue forecasted. | No | No |
| FORECAST BOOKING CURVE | Forecast Seats Available Cnt | The number of available seats forecasted. | No | No |
| FORECAST BOOKING CURVE | Forecast Seats Booked Cnt | The number of booked seats forecasted. | No | No |
| FORECAST BOOKING CURVE | Model Id | The unique identifier for an instance of the ANALYTICAL MODEL entity. | Yes | Yes |
| FORECAST BOOKING CURVE | Model Run Id | An identifier (or sequential number) that uniquely describes this particular run of the ANALYTICAL MODEL. | Yes | Yes |
| FORECAST BOOKING CURVE | Product Id | The unique identifier for an instance of the PRODUCT entity | Yes | Yes |
| FORECAST BOOKING CURVE | Sched Depart Dttm | The scheduled departure date and time. | Yes | Yes |
| FORECAST SALES | Actual Qty DD | The actual quantity of PRODUCTs. This is a DERIVED DATA (DD) element. The actual atomic level information is in the PURCHASE Subject Area. | No | No |
| FORECAST SALES | Actual Qty DD | The actual quantity of PRODUCTs. This is a DERIVED DATA (DD) element. The actual atomic level information is in the PURCHASE Subject Area. | No | No |
| FORECAST SALES | Actual Revenue Amt DD | The actual amount of revenue received for PRODUCTs. This is a DERIVED DATA (DD) element. The actual atomic level information is in the PURCHASE subject area. | No | No |

APPENDIX A-continued

Attribute Definitions

| Entity Name | Attribute Name | Attribute Definition | PK | FK |
|---|---|---|---|---|
| FORECAST SALES | Actual Revenue Amt DD | The actual amount of revenue received for PRODUCTs. This is a DERIVED DATA (DD) element. The actual atomic level information is in the PURCHASE subject area. | No | No |
| FORECAST SALES | Booking Class Cd | | Yes | No |
| FORECAST SALES | Booking Class Cd | The booking class code associated with this particular booking (i.e. F, Y, M, etc.). | Yes | Yes |
| FORECAST SALES | Forecast Qty | The quantity of PRODUCTs forecasted. | No | No |
| FORECAST SALES | Forecast Qty | The quantity of PRODUCTs forecasted. | No | No |
| FORECAST SALES | Forecast Revenue Amt | The amount of PRODUCT revenue forecasted. | No | No |
| FORECAST SALES | Forecast Revenue Amt | The amount of PRODUCT revenue forecasted. | No | No |
| FORECAST SALES | Model Id | The unique identifier for an instance of the ANALYTICAL MODEL entity. | Yes | No |
| FORECAST SALES | Model Id | The unique identifier for an instance of the ANALYTICAL MODEL entity. | Yes | Yes |
| FORECAST SALES | Model Run Id | An identifier (or sequential number) that uniquely describes this particular run of the ANALYTICAL MODEL. | Yes | Yes |
| FORECAST SALES | Model Run Id | An identifier (or sequential number) that uniquely describes this particular run of the ANALYTICAL MODEL. | Yes | No |
| FORECAST SALES | Period End Dt | The End Date of a specific time period. | Yes | No |
| FORECAST SALES | Period End Dt | The End Date of a specific time period. | Yes | No |
| FORECAST SALES | Period Start Dt | | No | No |
| FORECAST SALES | Period Start Dt | The Start Date of a specific time period | No | No |
| FORECAST SALES | Product Id | The unique identifier for an instance of the PRODUCT entity | Yes | Yes |
| FORECAST SALES | Product Id | The unique identifier for an instance of the PRODUCT entity | Yes | No |
| FOREIGN CURRENCY ADJ ACCOUNT | Foreign Currency Adj Amt | The monetary amount of a gain or loss resulting from a translation of one CURRENCY into another. | No | No |
| FOREIGN CURRENCY ADJ ACCOUNT | GL Account Num | The unique Chart of Account code for the GL ACCOUNT. | Yes | Yes |
| FREE CERTIFICATE | Payment Line Num | This attribute associates a specific PAYMENT with a specific PURCHASE ITEM. | Yes | Yes |
| FREE CERTIFICATE | Purchase Tran Id | A unique identifier for this TRAVEL TRANSACTION. | Yes | Yes |
| GDS PROVIDER | GDS Provider Desc | This attribute is a brief description of each Computer Reservation System (CRS). | No | No |
| GDS PROVIDER | GDS Provider Id | The unique identifier for an organization. | Yes | Yes |
| GENDER TYPE | Gender Type Cd | This is the unique code for the gender types. | Yes | No |
| GENDER TYPE | Gender Type Desc | A description of the code. | No | No |
| GENERAL AND ADMIN ACCOUNT | GL Account Num | The unique Chart of Account code for the GL ACCOUNT. | Yes | Yes |
| GEOGRAPHY ADDRESS | Address Line 1 Txt | The first line of text containing all or part of a physical site address excluding city name, state, and postal (zip) code or country. This line typically contains Recipient Name or Business Name, and may include formal titles like Mr., Mrs., Dr., Rev. | No | No |
| GEOGRAPHY ADDRESS | Address Line 2 Txt | The second line of text containing all or part of a physical site address excluding city name, state, and postal (zip) code or country. This line typically contains additional recipient information such as "in care of" (c/o), department names or "Attention:" names. | No | No |
| GEOGRAPHY ADDRESS | Address Line 3 Txt | The third line of text containing all or part of a physical site address excluding city name, state, and postal (zip) code or country. This line typically contains street numbers and street names. (Street, Avenue, Road, Boulevard, Parkway, Highway, etc) | No | No |
| GEOGRAPHY ADDRESS | Address Line 4 Txt | The fourth line of text containing all or part of a physical site address excluding city name, state, and postal (zip) code or country. This line typically contains additional location numbers such as apartment numbers or business suite numbers. | No | No |
| GEOGRAPHY ADDRESS | Carrier Route Txt | A text string representing Mail Carrier Route Numbers or identifiers for aiding in the distribution of mail. Used primarily in rural regions. | No | No |
| GEOGRAPHY ADDRESS | Census Block Cd | The unique identifier for an instance of the CENSUS BLOCK entity. | No | Yes |

APPENDIX A-continued

Attribute Definitions

| Entity Name | Attribute Name | Attribute Definition | PK | FK |
|---|---|---|---|---|
| GEOGRAPHY ADDRESS | City Cd | The unique identifier for an instance of the CITY entity. | No | Yes |
| GEOGRAPHY ADDRESS | Country Cd | The unique identifier for an instance of the COUNTRY entity. | No | Yes |
| GEOGRAPHY ADDRESS | Dwelling Type Cd | A unique code that identifies a DWELLING TYPE. | No | Yes |
| GEOGRAPHY ADDRESS | Geography Address Id | A number used to uniquely identify a GEOGRAPHY ADDRESS. | Yes | Yes |
| GEOGRAPHY ADDRESS | Latitude Meas | The navigational coordinate represented by the address and recorded as an angular distance (degrees) north or south of the earth's equator. | No | No |
| GEOGRAPHY ADDRESS | Longitude Meas | The navigational coordinate measured as a meridian that passes through each of the earth's poles (N/S) and the physical site represented by the address. It is recorded as an angular distance (degrees), as measured from the zero or prime meridian that passes from the north and south poles through Greenwich, England. | No | No |
| GEOGRAPHY ADDRESS | Postal Cd | An identifier for an instance of the POSTAL CODE entity. | No | Yes |
| GEOGRAPHY ADDRESS | Territory Cd | The unique identifier for an instance of the TERRITORY entity. | No | Yes |
| GL ACCOUNT | GL Account Desc | The description for the GL ACCOUNT. | No | No |
| GL ACCOUNT | GL Account End Dt | The end date for a GL ACCOUNT. | No | No |
| GL ACCOUNT | GL Account Name | The name assigned to the GL ACCOUNT. | No | No |
| GL ACCOUNT | GL Account Num | The unique Chart of Account code for the GL ACCOUNT. | Yes | No |
| GL ACCOUNT | GL Account Start Dt | The start date for a GL ACCOUNT. | No | No |
| GL ACCOUNT | GL Account Type Cd | The unique code used as a sub-type discriminator to classify the GL ACCOUNT type. | No | Yes |
| GL ACCOUNT | Parent GL Account Num | The unique Chart of Account code for the GL ACCOUNT. | No | Yes |
| GL ACCOUNT BALANCE | Financial Plan End Bal Amt | The monetary amount of the planned balance for the account at the end of the accounting period. | No | No |
| GL ACCOUNT BALANCE | Financial Plan Id | The unique identifier assigned to the FINANCIAL PLAN. | Yes | Yes |
| GL ACCOUNT BALANCE | Financial Plan Start Bal Amt | The monetary amount of the planned balance for the account at the start of the accounting period. | No | No |
| GL ACCOUNT BALANCE | GL Account Balance End Dt | The end date for the GL ACCOUNT balance. | No | No |
| GL ACCOUNT BALANCE | GL Account Balance Start Dt | The start date for the GL ACCOUNT balance. | Yes | No |
| GL ACCOUNT BALANCE | GL Account End Balance Amt | The monetary amount of the actual balance for the account at the end of the accounting period. | No | No |
| GL ACCOUNT BALANCE | GL Account Num | The unique Chart of Account code for the GL ACCOUNT. | Yes | Yes |
| GL ACCOUNT BALANCE | GL Account Start Balance Amt | The monetary amount of the actual balance for the account at the start of the accounting period. | No | No |
| GL ACCOUNT BALANCE | Internal Org Party Id | The unique identifier for an internal organization. | No | Yes |
| GL ACCOUNT INTERNAL ORG | GL Account Internal Org Dt | The calendar date that associates the GL Account and the Internal Organization. | Yes | No |
| GL ACCOUNT INTERNAL ORG | GL Account Num | The unique Chart of Account code for the GL ACCOUNT. | Yes | Yes |
| GL ACCOUNT INTERNAL ORG | GL Acct Internal Org Type Cd | The code assigned to the GL ACCOUNT INTERNAL ORG type. | No | Yes |
| GL ACCOUNT INTERNAL ORG | Internal Org Party Id | The unique identifier for an internal organization. | Yes | Yes |
| GL ACCOUNT INTERNAL ORG TYPE | GL Acct Internal Org Type Cd | The code assigned to the GL ACCOUNT INTERNAL ORG type. | Yes | No |
| GL ACCOUNT INTERNAL ORG TYPE | GL Acct Internal Org Type Desc | The description of the GL ACCOUNT INTERNAL ORG type. | No | No |
| GL ACCOUNT TYPE | GL Account Type Cd | The unique code used as a sub-type discriminator to classify the GL ACCOUNT type. | Yes | No |
| GL ACCOUNT TYPE | GL Account Type Desc | The description of the GL Account Type. | No | No |
| GL BATCH | Accounting Dt | The calendar date that is in use within a company. | No | No |
| GL BATCH | GL Batch Creation Dt | The creation date for the GENERAL LEDGER BATCH. | No | No |
| GL BATCH | GL Batch Desc | The description of the GENERAL LEDGER BATCH. | No | No |
| GL BATCH | GL Batch Name | The name assigned to the GENERAL LEDGER BATCH. | No | No |

APPENDIX A-continued

Attribute Definitions

| Entity Name | Attribute Name | Attribute Definition | PK | FK |
|---|---|---|---|---|
| GL BATCH | GL Batch Num | The unique identifier for the GENERAL LEDGER BATCH. | Yes | No |
| GL BATCH | GL Batch Posted Dt | The posted date for the GENERAL LEDGER BATCH. | No | No |
| GL BATCH | GL Batch Type Cd | The unique code assigned to the GENERAL LEDGER BATCH type. Possible examples may be AP = Batch from accounts payable, AR = batch from accounts receivable, etc. | No | Yes |
| GL BATCH | GL Posting Status Cd | The unique code assigned to the GENERAL LEDGER BATCH status. Possible examples may be P = Posted (ready to be entered in the general ledger), N = Do not post, etc. | No | Yes |
| GL BATCH | Set Of Books Cd | The unique identifier for the SET OF BOOKS. | No | Yes |
| GL BATCH TYPE | GL Batch Type Cd | The unique code assigned to the GENERAL LEDGER BATCH type. Possible examples may be AP = Batch from accounts payable, AR = batch from accounts receivable, etc. | Yes | No |
| GL BATCH TYPE | GL Batch Type Desc | The description of the GENERAL LEDGER BATCH type. | No | No |
| GL BATCH TYPE | GL Batch Type Name | The name assigned to the GENERAL LEDGER BATCH type. | No | No |
| GL POSTING STATUS | GL Posting Status Cd | The unique code assigned to the GENERAL LEDGER BATCH status. Possible examples may be P = Posted (ready to be entered in the general ledger), N = Do not post, etc. | Yes | No |
| GL POSTING STATUS | GL Posting Status Desc | The description of the GENERAL LEDGER BATCH posting status. | No | No |
| GOODWILL ACCOUNT | GL Account Num | The unique Chart of Account code for the GL ACCOUNT. | Yes | Yes |
| HOUSEHOLD | Child Cnt | The number of children in a HOUSEHOLD. | No | No |
| HOUSEHOLD | Household Id | The unique identifier for a household. | Yes | Yes |
| HTML COMPRESSION TYPE | HTML Compression Type Cd | Uniquely identifies the types of compression that may be applied to an HTML Response File. | Yes | No |
| HTML COMPRESSION TYPE | HTML Compression Type Desc | A description of the type of compression applied. | No | No |
| HTML RESPONSE FILE | HTML Compression Type Cd | Uniquely identifies the types of compression that may be applied to an HTML Response File. | No | Yes |
| HTML RESPONSE FILE | HTML File Orginal Size Meas | The original size of the HTML Response File. | No | No |
| HTML RESPONSE FILE | HTML Page Check Sum Num | Used to insure the validity of the HTML Response File's information after it gets stored. | No | No |
| HTML RESPONSE FILE | HTML Response File Id | A unique identifier for the actual HTML file that is returned to the user as a result of a click. It is possible that the HTML returned could be larger than the maximum size allowed for a single row in Teradata, in that case this entity could not be used as is to store that information. Source-> Operational DB or Log File | Yes | No |
| HTML RESPONSE FILE | HTML Response File Val | The actual code, from the body of the HTML file, rendered onto a user's browser as a result of a click on a Web Site. This is a placeholder for the response file. When created this should be created as a Blob using the BlobSrvr. | No | No |
| INCENTED SEGMENT | Offer Id | The unique identifier for an instance of the OFFER entity. | Yes | Yes |
| INCENTED SEGMENT | Segmentation Id | The unique identifier for an instance of the SEGMENT entity. | Yes | Yes |
| INCIDENT REASON | Incident Reason Cd | The code assigned to every single reason that corresponds to every incident that may occur during a flight. Example: flight delayed due to weather, flight diverted because of closed airport, etc. | Yes | No |
| INCIDENT REASON | Incident Reason Desc | A textual description of each incident reason. Example: Closed airport, Weather conditions, etc. | No | No |
| INCIDENT TYPE | Incident Type Cd | Defines code assigned to every single incident that may occur. Examples: 1 = Flight delayed, 2 = Flight cancelled, 3 = Flight diverted, etc. | Yes | No |
| INCIDENT TYPE | Incident Type Desc | A textual description of each OnD PRODUCT INCIDENT type. Examples are: Cancelled, Delayed, Diverted, Equipment Substitution, etc. | No | No |
| INCOME TAX PAYABLE ACCOUNT | GL Account Num | The unique Chart of Account code for the GL ACCOUNT. | Yes | Yes |
| INDIVIDUAL | Birth Dt | The date of birth of this individual. | No | No |

APPENDIX A-continued

Attribute Definitions

| Entity Name | Attribute Name | Attribute Definition | PK | FK |
|---|---|---|---|---|
| INDIVIDUAL | Ethnicity Cd | A code used to identify an INDIVIDUAL's ethnicity. | No | Yes |
| INDIVIDUAL | Gender Type Cd | This is the unique code for the gender types. | No | Yes |
| INDIVIDUAL | Household Id | The unique identifier for a household. | No | Yes |
| INDIVIDUAL | Individual Party Id | The unique identifier for an individual. | Yes | Yes |
| INDIVIDUAL | Individual Type Cd | A code that uniquely identifies the INDIVIDUAL TYPE. Example: 1 = Customer, 2 = Prospect, 3 = Associate, etc. | No | Yes |
| INDIVIDUAL | Nationality Id | An identifier that uniquely describes an INDIVIDUAL PARTY's nationality | No | No |
| INDIVIDUAL NAME (HISTORY) | Family Name | The family name of the individual. | No | No |
| INDIVIDUAL NAME (HISTORY) | Given Name | The given name of the individual. | No | No |
| INDIVIDUAL NAME (HISTORY) | Individual Name End Dt | The date this name ceased to be used by this individual. | No | No |
| INDIVIDUAL NAME (HISTORY) | Individual Name Start Dt | The date the individual's name changed or became effective. | Yes | No |
| INDIVIDUAL NAME (HISTORY) | Individual Party Id | The unique identifier for an individual. | Yes | Yes |
| INDIVIDUAL NAME (HISTORY) | Middle Name | The middle name of the individual. | No | No |
| INDIVIDUAL NAME (HISTORY) | Name Prefix Txt | The name prefix such as Dr., Rev. | No | No |
| INDIVIDUAL NAME (HISTORY) | Name Suffix Txt | The name suffix such as Senior, Junior, III. | No | No |
| INDIVIDUAL NAME (HISTORY) | Name Type Cd | A unique code for the type of name for this individual could have such as 'doing business as' (dba), legal name, alias, phonetics, etc. | Yes | Yes |
| INDIVIDUAL TYPE | Individual Type Cd | A code that uniquely identifies the INDIVIDUAL TYPE. Example: 1 = Customer, 2 = Prospect, 3 = Associate, etc. | Yes | No |
| INDIVIDUAL TYPE | Individual Type Desc | Describes the subtype (if applicable) of this PARTY INDIVIDUAL. Example: Associate. | No | No |
| INTANGIBLE ASSET ACCOUNT | Amortization Amt | The monetary amount reducing the value of an ASSET. | No | No |
| INTANGIBLE ASSET ACCOUNT | Amortization Method Cd | A unique code for the amortization method. Examples may be; cash basis (no amortization), straight line, declining balance or interest method. A = cash basis (assumed that there should not be an entry specifying cash) B = straight line C = double declining balance D = interest method | No | Yes |
| INTANGIBLE ASSET ACCOUNT | GL Account Num | The unique Chart of Account code for the GL ACCOUNT. | Yes | Yes |
| INTANGIBLE ASSET ACCOUNT | Intangible Asset Acct Cd | The unique code assigned to the intangible ASSET account type. For example: patent or goodwill. | No | Yes |
| INTANGIBLE ASSET ACCT TYPE | Intangible Asset Acct Cd | The unique code assigned to the intangible ASSET account type. For example: patent or goodwill. | Yes | No |
| INTANGIBLE ASSET ACCT TYPE | Intangible Asset Acct Desc | The description of the intangible ASSET account type. | No | No |
| INTERACTION TASK | Interaction Task Cd | Coding scheme for identifying an interaction task | Yes | No |
| INTERACTION TASK | Interaction Task Desc | Textual description of interaction task code - For instance, Add item to basket, Delete item from basket, Purchase, etc | No | No |
| INTEREST EXPENSE ACCOUNT | GL Account Num | The unique Chart of Account code for the GL ACCOUNT. | Yes | Yes |
| INTEREST EXPENSE ACCOUNT | Interest Expense Amt | The monetary amount of interest EXPENSE. | No | No |
| INTEREST INCOME ACCOUNT | GL Account Num | The unique Chart of Account code for the GL ACCOUNT. | Yes | Yes |
| INTEREST INCOME ACCOUNT | Interest Income Amt | The monetary amount received as payment from an investment. | No | No |
| INTERNAL ORGANIZATION | Internal Org Party Id | The unique identifier for an internal organization. | Yes | Yes |
| INTERNAL ORGANIZATION | Internal Organization Type Cd | A unique code used to identify the sub-type discriminator for an internal organization. Valid sub-type occurrences could be department or division. | No | Yes |
| INTERNAL ORGANIZATION | Set Of Books Cd | The unique identifier for the SET OF BOOKS. | No | Yes |
| INTERNAL ORGANIZATION TYPE | Internal Org Type Desc | A description of the code. | No | No |

APPENDIX A-continued

Attribute Definitions

| Entity Name | Attribute Name | Attribute Definition | PK | FK |
|---|---|---|---|---|
| INTERNAL ORGANIZATION TYPE | Internal Organization Type Cd | A unique code used to identify the sub-type discriminator for an internal organization. Valid sub-type occurrences could be department or division. | Yes | No |
| INTERNAL WEB AD PLACEMENT | Web Ad Placement Id | The unique identifier that identifies a particular instance of WEB AD PLACEMENT. | Yes | Yes |
| INTERNAL WEB AD PLACEMENT | Web Page Id | The unique identifier of a particular WEB PAGE instance. | No | Yes |
| INTERNAL WEB AD PLACEMENT | Web Page Region Cd | The identifier for the web page region. | No | Yes |
| INTERNET PROTOCOL ADDRESS | Country Cd | The unique code for an instance of the COUNTRY entity. | No | Yes |
| INTERNET PROTOCOL ADDRESS | IP Address Id | Unique identifier for Internet Protocol Addresses. Example: 5534113 | Yes | No |
| INTERNET PROTOCOL ADDRESS | IP Address Num | IP addresses are assigned to every computer or device on a TCP/IP network such as the internet. They may be assigned statically, where a computer/device is assigned an IP Address and it will always use that address. They may also be assigned dynamically where at the point a computer connects to a network; it is assigned an IP Address from the pool of addresses available from that provider. Example: 113 = 103.24.59.221. weblog->webserver_ip | No | No |
| INVESTMENT ASSET ACCOUNT | GL Account Num | The unique Chart of Account code for the GL ACCOUNT. | Yes | Yes |
| IP ADDRESS DOMAIN | Domain IP Reason Cd | Specifies the type of relationship that may exist between an IP Address and a Domain. Examples: 1 = IP Address of linking Server, 2 = Valid IP Addresses for a Domain. | No | Yes |
| IP ADDRESS DOMAIN | IP Address Id | Unique identifier for Internet Protocol Addresses. Example: 5534113 | Yes | Yes |
| IP ADDRESS DOMAIN | Visitor Domain Id | Number used to identify the internet domain of a customer computer used for accessing the organization's web site | Yes | Yes |
| ITEM CHARGES | Charge Amt | Amount charged for a specific component of a PRODUCT. | No | No |
| ITEM CHARGES | Charge Type Cd | Identifies a unique occurrence of CHARGE TYPE | Yes | Yes |
| ITEM CHARGES | Purchase Seq Num | An identifier for a specific PURCHASE ITEM entity. | Yes | Yes |
| ITEM CHARGES | Purchase Tran Id | A unique identifier for this TRAVEL TRANSACTION. | Yes | Yes |
| JOURNAL ENTRY HEADER | Accounting Period Dt | The calendar date that identifies the JOURNAL ENTRY header accounting period date. | No | No |
| JOURNAL ENTRY HEADER | GL Batch Num | The unique identifier for the GENERAL LEDGER BATCH. | No | Yes |
| JOURNAL ENTRY HEADER | Journal Entry Desc | The description of the JOURNAL ENTRY header. | No | No |
| JOURNAL ENTRY HEADER | Journal Entry Header Conv Dt | The JOURNAL ENTRY header conversion date. | No | No |
| JOURNAL ENTRY HEADER | Journal Entry Header Create Dt | The JOURNAL ENTRY header creation date. | No | No |
| JOURNAL ENTRY HEADER | Journal Entry Header Id | The unique identifier for the JOURNAL ENTRY header. | Yes | No |
| JOURNAL ENTRY HEADER | Journal Entry Header Posted Dt | The JOURNAL ENTRY header posted date. | No | No |
| JOURNAL ENTRY HEADER | Journal Entry Name | The name assigned to the JOURNAL ENTRY header. | No | No |
| JOURNAL ENTRY HEADER | Journal Entry Reversing Ind | The flag assigned to indicate if the JOURNAL ENTRY header was reversed. | No | No |
| JOURNAL ENTRY HEADER | Reversing Dt | The JOURNAL ENTRY header reversing date. | No | No |
| JOURNAL ENTRY LINE | Charge To Employee Party Id | The unique identifier for an instance of the PARTY entity. | No | Yes |
| JOURNAL ENTRY LINE | Created By Employee Party Id | The unique identifier for an instance of the PARTY entity. | No | Yes |
| JOURNAL ENTRY LINE | Credit Ind | The flag assigned to indicate if the JOURNAL ENTRY line is a credit account transaction. | No | No |
| JOURNAL ENTRY LINE | GL Account Num | The unique Chart of Account code for the GL ACCOUNT. | No | Yes |

APPENDIX A-continued

Attribute Definitions

| Entity Name | Attribute Name | Attribute Definition | PK | FK |
|---|---|---|---|---|
| JOURNAL ENTRY LINE | Internal Org Party Id | The unique identifier for an internal organization. | No | Yes |
| JOURNAL ENTRY LINE | Journal Entry Header Id | The unique identifier for the JOURNAL ENTRY header. | Yes | Yes |
| JOURNAL ENTRY LINE | Journal Entry Line Amt | The monetary amount of the JOURNAL ENTRY line. | No | No |
| JOURNAL ENTRY LINE | Journal Entry Line Desc | The description of the JOURNAL ENTRY line. | No | No |
| JOURNAL ENTRY LINE | Journal Entry Line Num | The JOURNAL ENTRY line number. | Yes | No |
| KIOSK | Kiosk Loc Id | System generated number used to identify a LOCATION. | Yes | Yes |
| KIOSK | Kiosk Type Cd | Unique code used to identify a KIOSK TYPE. Example: 1 = Airport Check-in Automation, 2 = Airport Lounge Information, 3 = Mall Internet based Kiosk for reservations, etc | No | Yes |
| KIOSK | Location Org Id | The unique identifier for an organization. | Yes | Yes |
| KIOSK TYPE | Kiosk Type Cd | Unique code used to identify a KIOSK TYPE. Example: 1 = Airport Check-in Automation, 2 = Airport Lounge Information, 3 = Mall Internet based Kiosk for reservations, etc | Yes | No |
| KIOSK TYPE | Kiosk Type Desc | A description of the types of KIOSKs. Example: Airport Check-in Automation, Mall Internet based Kiosk for reservations, etc. | No | No |
| LABOR EXPENSE | GL Account Num | The unique Chart of Account code for the GL ACCOUNT. | Yes | Yes |
| LABOR EXPENSE | Internal Org Party Id | The unique identifier for an internal organization. | Yes | Yes |
| LABOR EXPENSE | Labor Expense Amt DD | The derived amount of an labor EXPENSE account. | No | No |
| LABOR EXPENSE | Labor Expense Type Cd | The unique code assigned to the labor EXPENSE type. Labor expenses include salary, wages and benefits. | No | Yes |
| LABOR EXPENSE | Labor Type Cd | The unique code assigned to the labor type. (e.g. that labor performed by employees or contractors) | Yes | No |
| LABOR EXPENSE | Labor Type Desc | The description of the labor type. | No | No |
| LABOR EXPENSE TYPE | Labor Expense Type Cd | The unique code assigned to the labor EXPENSE type. Labor expenses include salary, wages and benefits. | Yes | No |
| LABOR EXPENSE TYPE | Labor Expense Type Desc | The description of the labor EXPENSE type. | No | No |
| LEG | Destination Facility Id | A unique number assigned to a TRAVEL FACILITY to give it a unique identity. | Yes | Yes |
| LEG | Flight Num | A unique identifier assigned to a Flight scheduled for generating revenue and utilized by the general public. | Yes | Yes |
| LEG | Leg Seq Num | A numeric sequence assigned to each leg in the order in which they appear in a Scheduled Flight. Example: For a round trip flight from LAX to NYC that stops in Chicago both ways, the FlightSegmentSeqNBRs would be as follows: 1 = LAX to ORD, 2 = ORD to LGA, 3 = LGA to ORD, 4 = ORD to LAX. | No | No |
| LEG | Origin Facility Id | A unique number assigned to a TRAVEL FACILITY to give it a unique identity. | Yes | Yes |
| LEG BOOKING (HISTORY) | Adjustment Cnt | An adjustment, also referred to as an ADJ, is a facility that allows us to plan on upgrading people. The sum of adjustments for all compartments for a flight on a given date and days to departure is always 0. i.e., if you upgrade 2 people to business class from economy, Adjustment Cnt for business class is +2 and Adjustment Cnt for economy is −2 | No | No |
| LEG BOOKING (HISTORY) | Allowed Overbook Pct | The percentage to which a travel provider is prepared to overbook capacity to take into account cancelling and noshowing passengers. | No | No |
| LEG BOOKING (HISTORY) | Blocked Seat Cnt | Seats being held back (not for sale) at the leg/service class level | No | No |
| LEG BOOKING (HISTORY) | Capacity Cnt | Number of physical seats present in a configuration. It does not include the deadweight seat count. | No | No |
| LEG BOOKING (HISTORY) | Days To Dept Cnt | A designated point in time across the booking history of a flight (i.e. x days before departure) at which key metrics for a flight are recorded. Usually a flight is made available for booking by | Yes | No |

APPENDIX A-continued

Attribute Definitions

| Entity Name | Attribute Name | Attribute Definition | PK | FK |
|---|---|---|---|---|
| | | the inventory system 365 days in advance. As the flight departure date nears, the metrics are recorded more frequently and they are recorded further apart during the early part of a flight's booking life. This is called a Checkpoint by some airlines | | |
| LEG BOOKING (HISTORY) | Deadweight Seat Cnt | Number of seats that have to be sacrificed because of the associated weight of equipment and/or cargo on an airplane Only at LEG level, since it is an flight operations element. | No | No |
| LEG BOOKING (HISTORY) | Destination Facility Id | A unique number assigned to a TRAVEL FACILITY to give it a unique identity. | Yes | Yes |
| LEG BOOKING (HISTORY) | Flight Num | A unique identifier assigned to a Flight scheduled for generating revenue and utilized by the general public. | Yes | Yes |
| LEG BOOKING (HISTORY) | Gross Availability Cnt DD | Capacity Cnt * (1 + Allowed Overbook Pct) − Leg Seats Booked Cnt − Blocked Seat Cnt + Adjustment Cnt | No | No |
| LEG BOOKING (HISTORY) | Origin Facility Id | A unique number assigned to a TRAVEL FACILITY to give it a unique identity. | Yes | Yes |
| LEG BOOKING (HISTORY) | Sched Depart Dttm | The scheduled departure date and time. | Yes | Yes |
| LEG BOOKING (HISTORY) | Seats Booked Cnt | Number of seats booked at this time. | No | No |
| LEG BOOKING (HISTORY) | Seats Ticketed Cnt | Number of seats that have been ticketed at this time. | No | No |
| LEG BOOKING (HISTORY) | Service Class Cd | The unique identifier of a specific CLASS OF SERVICE offered by a TRAVEL PROVIDER. Example: A (First Class), B (Business Class) or C (Economy Class). | Yes | Yes |
| LEG FLOWN (SUMMARY) | Capacity Cnt | Number of physical seats present in a configuration | No | No |
| LEG FLOWN (SUMMARY) | Cost Per Seat Mile Amt DD | A derived (DD) amount based on operating cost that varies depending on the VEHICLE MODEL. This is a measure that TRAVEL PROVIDERs calculate to make seating arrangement plans. Once the seating arrangement is determined for a PRODUCT segment, the cost per seat mile/kilometer will remain the same until the seat arrangement is changed again. | No | No |
| LEG FLOWN (SUMMARY) | Destination Facility Id | A unique number assigned to a TRAVEL FACILITY to give it a unique identity. | Yes | Yes |
| LEG FLOWN (SUMMARY) | Flight Num | A unique identifier assigned to a Flight scheduled for generating revenue and utilized by the general public. | Yes | Yes |
| LEG FLOWN (SUMMARY) | Origin Facility Id | A unique number assigned to a TRAVEL FACILITY to give it a unique identity. | Yes | Yes |
| LEG FLOWN (SUMMARY) | Sched Depart Dttm | The scheduled departure date and time. | Yes | Yes |
| LEG FLOWN (SUMMARY) | Seats Booked Cnt | Number of seats booked. | No | No |
| LEG FLOWN (SUMMARY) | Seats Flown Cnt | Number of seats that actually contained a flown passenger | No | No |
| LEG FLOWN (SUMMARY) | Seats Ticketed Cnt | Number of seats that have been ticketed. | No | No |
| LEG FLOWN (SUMMARY) | Service Class Cd | The unique identifier of a specific CLASS OF SERVICE offered by a TRAVEL PROVIDER. Example: A (First Class), B (Business Class) or C (Economy Class). | Yes | Yes |
| LEG FLOWN (SUMMARY) | Weight Factor Pct | A ratio weighted for the Service Class seats and calculated based on the size of seats and the number of "upper" class seats that can be provided compared to economy seats. This weight uses economy seats as a base, therefore, the weight for economy class seats is 1.0. Similar to Cost per seat mile/kilometer, this measure will remain the same until the seat arrangement is changed again. FIRST CLASS EXAMPLE: Weight for First Class Seat = The Number of Economy Class Seats that could be provided in the space assigned for First Class seats divided by the Number of First Class Seats Provided Example: For a wide body "twin aisle" type aircraft (767, 777, 747, DC10, A300/340) with the following seat arrangement: | No | No |

APPENDIX A-continued

Attribute Definitions

| Entity Name | Attribute Name | Attribute Definition | PK | FK |
|---|---|---|---|---|
| | | First Class: 3 Rows of 4 seats (72" length) per row occupying 216" of length of aircraft Economy Class: 20 Rows of 8 seats (30" length) per row The 216" length space in First Class can accommodate 7 Rows of 8 seats per row of Economy Class seats, therefore, Weight for First Class Se | | |
| LEG INCIDENT | Destination Facility Id | A unique number assigned to a TRAVEL FACILITY to give it a unique identity. | Yes | Yes |
| LEG INCIDENT | Flight Num | A unique identifier assigned to a Flight scheduled for generating revenue and utilized by the general public. | Yes | Yes |
| LEG INCIDENT | Incident Reason Cd | The code assigned to every single reason that corresponds to every incident that may occur during a flight. Example: flight delayed due to weather, flight diverted because of closed airport, etc. | No | Yes |
| LEG INCIDENT | Incident Type Cd | Defines code assigned to every single incident that may occur. Examples: 1 = Flight delayed, 2 = Flight cancelled, 3 = Flight diverted, etc. | Yes | Yes |
| LEG INCIDENT | Origin Facility Id | A unique number assigned to a TRAVEL FACILITY to give it a unique identity. | Yes | Yes |
| LEG INCIDENT | Sched Depart Dttm | The scheduled departure date and time. | Yes | Yes |
| LIABILITY ACCOUNT | GL Account Num | The unique Chart of Account code for the GL ACCOUNT. | Yes | Yes |
| LIABILITY ACCOUNT | Liability Account Type Cd | The unique code assigned to the LIABILITY ACCOUNT type. Types of liability accounts are current liability and non-current liability. | No | Yes |
| LIABILITY ACCOUNT | Liability Amt DD | The derived amount of a LIABILITY ACCOUNT. | No | No |
| LIABILITY ACCOUNT | Liability Desc | The description of the LIABILITY ACCOUNT. | No | No |
| LIABILITY ACCOUNT | Liability Party Id | The unique identifier for an instance of the PARTY entity. | No | Yes |
| LIABILITY ACCOUNT TYPE | Liability Account Type Cd | The unique code assigned to the LIABILITY ACCOUNT type. Types of liability accounts are current liability and non-current liability. | Yes | No |
| LIABILITY ACCOUNT TYPE | Liability Account Type Desc | The description of the LIABILITY ACCOUNT type. | No | No |
| LOCATION | Channel Cd | The unique identifier for an instance of the CHANNEL entity. | No | Yes |
| LOCATION | District Id | System generated number used to identify a DISTRICT. | No | Yes |
| LOCATION | Location Id | System generated number used to identify a LOCATION. | Yes | No |
| LOCATION | Location Name | The name of the LOCATION. | No | No |
| LOCATION | Location Org Id | The unique identifier for an organization. Indicates the ORGANIZATION that the LOCATION belongs to | Yes | Yes |
| LOCATION | Location Type Cd | A numeric code used to identify a LOCATION TYPE. Example: 1 = Airport Ticket Office, 2 = City Ticket Office, etc. | No | Yes |
| LOCATION | Parent Location Id | System generated number used to identify a LOCATION. This recursive structure allows the capture of a hierarchy of LOCATIONs within LOCATIONs within the same ORGANIZATION. Example: A KIOSK located within a CITY TICKET OFFICE. Note: If one wants to capture LOCATIONs residing in external ORGANIZATION's facilities as well, just rolename the recursive relationship to migrate a non-key "Parent Location Org Id" foreign key. | No | Yes |
| LOCATION ADDRESS | Address Id | A number used to uniquely identify an ADDRESS. | No | Yes |
| LOCATION ADDRESS | Address Usage Cd | The unique identifier for an instance of the ADDRESS USAGE entity. | Yes | Yes |
| LOCATION ADDRESS | Location Id | System generated number used to identify a LOCATION. | Yes | Yes |
| LOCATION ADDRESS | Location Org Id | The unique identifier for an organization. | Yes | Yes |
| LOCATION OPERATING COST | Actual Operating Cost Amt | The actual Operating Cost amount for a specific OPERATING COST type, for a specific time period, at a specific LOCATION. | No | No |
| LOCATION OPERATING COST | Location Id | System generated number used to identify a LOCATION. | Yes | Yes |
| LOCATION OPERATING COST | Location Org Id | The unique identifier for an organization. | Yes | Yes |
| LOCATION | Operating Cost Cd | A numeric or user defined code used to identify | Yes | Yes |

APPENDIX A-continued

Attribute Definitions

| Entity Name | Attribute Name | Attribute Definition | PK | FK |
|---|---|---|---|---|
| OPERATING COST LOCATION | | an Operating Cost (OPER COST). | | |
| OPERATING COST | Plan Operating Cost Amt | The planned OPER COST amount for a specific OPER COST type, for a specific time period, at a specific LOCATION. | No | No |
| LOCATION TRAIT | Location Trait Cd | A numeric or user defined code used to identify a LOCATION TRAIT. | Yes | No |
| LOCATION TRAIT | Location Trait Desc | A description of a LOCATION TRAIT | No | No |
| LOCATION TRAIT VALUE | Location Id | System generated number used to identify a LOCATION. | Yes | Yes |
| LOCATION TRAIT VALUE | Location Org Id | The unique identifier for an organization. | Yes | Yes |
| LOCATION TRAIT VALUE | Location Trait Cd | A numeric or user defined code used to identify a LOCATION TRAIT. | Yes | Yes |
| LOCATION TRAIT VALUE | Location Trait Val | The actual value enumerating a LOCATION TRAIT. | No | No |
| LOCATION TYPE | Location Type Cd | A numeric code used to identify a LOCATION TYPE. Example: 1 = Airport Ticket Office, 2 = City Ticket Office, etc. | Yes | No |
| LOCATION TYPE | Location Type Desc | A brief description describing the type of LOCATION. Example: Airport Ticket Office, City Ticket Office, etc. | No | No |
| LODGING ORGANIZATION | Lodging Org Id | The unique identifier for an organization. | Yes | Yes |
| LODGING PRODUCT | Product Id | The unique identifier for an instance of the PRODUCT entity | Yes | Yes |
| LODGING PROPERTY | Property Id | A sequence of digits used to identify an ASSET. | Yes | Yes |
| LODGING RESERVATION | Reservation Seq Num | This attribute identifies a specific RESERVATION ITEM. | Yes | Yes |
| LODGING RESERVATION | Reservation Transaction Id | A unique identifier for this TRAVEL TRANSACTION. | Yes | Yes |
| LONG TERM DEBT ACCOUNT | GL Account Num | The unique Chart of Account code for the GL ACCOUNT. | Yes | Yes |
| LOYALTY ACCOUNT | Loyalty Account Creation Dt | The date that this LOYALTY ACCOUNT was established. | No | No |
| LOYALTY ACCOUNT | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| LOYALTY ACCOUNT | Loyalty Level Cd | A unique number assigned to a specific award level used to promote and encourage product usage (utilization). | No | Yes |
| LOYALTY ACCOUNT | Loyalty Program Id | A unique code assigned to an award program when implemented. | No | Yes |
| LOYALTY ACCOUNT EVENT | Event Dttm | The date and time that a loyalty event occurred | Yes | No |
| LOYALTY ACCOUNT EVENT | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| LOYALTY ACCOUNT EVENT | Loyalty Event Cd | A code which describes the type of award update given to the customer. Changes will indicate when points are added or subtracted to the customers total via new earnings and/or redemption. Example: E for Earned Reward, R for Redemption and L = Level Change | No | Yes |
| LOYALTY EVENT TYPE | Loyalty Event Cd | A code which describes the type of award update given to the customer. Changes will indicate when points are added or subtracted to the customers total via new earnings and/or redemption. Example: E for Earned Reward, R for Redemption and L = Level Change | Yes | No |
| LOYALTY EVENT TYPE | Loyalty Event Desc | A description of the type of award update given to the customer. Changes will indicate when points are added or subtracted to the customer's total via new earnings and/or redemption. Example: Earned Reward, Redemption, Level Change | No | No |
| LOYALTY PROGRAM | Loyalty Program Desc | A textual description of the Award Program, how it works, what are the award potentials, limits and limitations, etc. | No | No |
| LOYALTY PROGRAM | Loyalty Program Effective Dt | The first calendar day that an Award Program starts and becomes effective for customer participation. | No | No |

APPENDIX A-continued

Attribute Definitions

| Entity Name | Attribute Name | Attribute Definition | PK | FK |
|---|---|---|---|---|
| LOYALTY PROGRAM | Loyalty Program End Dt | The last calendar day that an Award Program ends and is no longer effective for customer participation. | No | No |
| LOYALTY PROGRAM | Loyalty Program Id | A unique code assigned to an award program when implemented. | Yes | No |
| LOYALTY PROGRAM | Loyalty Program Name | Name of the Loyalty Program. Example: "Mileage Plus", "AAdvantage", "Sky Miles", etc. | No | No |
| LOYALTY PROGRAM | Program Owner Party Id | The unique identifier for an organization. | No | Yes |
| MARKETING EXPENSE ACCOUNT | GL Account Num | The unique Chart of Account code for the GL ACCOUNT. | Yes | Yes |
| MODEL RUN | Model Id | The unique identifier for an instance of the ANALYTICAL MODEL entity. | Yes | Yes |
| MODEL RUN | Model Run Dt | The Date (and time if needed) that the model was executed. | No | No |
| MODEL RUN | Model Run Id | An identifier (or sequential number) that uniquely describes this particular run of the ANALYTICAL MODEL. | Yes | No |
| MSA | Msa Cd | The unique code for an instance of the MSA entity. | Yes | No |
| MSA | Msa Desc | Text that describes an instance of the MSA entity. | No | No |
| MULTIMEDIA COMPONENT | MM Component Create Dt | The date the component was created. | No | No |
| MULTIMEDIA COMPONENT | MM Component Desc | A textual description of the component that provides information about the component. Example: Left side-bar frame in the home page AIRLINE's model airplane with full livery detail. | No | No |
| MULTIMEDIA COMPONENT | MM Component File Name | Filename of the component. Example: logo.jpg | No | No |
| MULTIMEDIA COMPONENT | MM Component File Size Meas | The size of the file. | No | No |
| MULTIMEDIA COMPONENT | MM Component Id | System generated number for identifying a component. If source database has a unique identifier, the same can be substituted here. | Yes | No |
| MULTIMEDIA COMPONENT | MM Component Origin URL Txt | The uniform resource locator for of the component. | No | No |
| MULTIMEDIA COMPONENT | MM Component Type Cd | A code to identify the class or kind of a component | No | No |
| MULTIMEDIA COMPONENT | MM Component Usage Ind | Description of the component's usage that indicates whether it is being used or not. | No | No |
| MULTIMEDIA COMPONENT | Product Id | The unique identifier for an instance of the PRODUCT entity | No | Yes |
| NAICS | NAICS Cd | A 6 digit code for The North American Industry Classification System. NAICS was developed jointly by the U.S., Canada, and Mexico to provide new comparability in statistics about business activity across North America. | Yes | No |
| NAICS | NAICS Desc | A textual description of the code. | No | No |
| NAME TYPE | Name Type Cd | A unique code for the type of name for this individual or organization could have such as 'doing business as' (dba), legal name, alias, phonetics, etc. | Yes | No |
| NAME TYPE | Name Type Desc | The description of the code such as 'doing business as', legal name, alias, phonetic name. | No | No |
| NAVIGATION LEVEL | Nav Level Desc | Description of the NAVIGATION LEVEL or the name of the levels in the hierarchical structure(s) of the web site that the shopper will browse down through to get to product-specific web pages. Example: Department Level, Product Category Level, Product Sub Category Level, etc. | No | No |
| NAVIGATION LEVEL | Nav Level Id | The unique identifier for an instance of the NAVIGATION LEVEL entity. | Yes | No |
| NAVIGATION LEVEL | Parent Nav Level Id | Allows for a multi-level hierarchical structure. | No | Yes |
| NON REVENUE | Payment Line Num | This attribute associates a specific PAYMENT with a specific PURCHASE ITEM. | Yes | Yes |
| NON REVENUE | Purchase Tran Id | A unique identifier for this TRAVEL TRANSACTION. | Yes | Yes |
| NON TRAVEL OFFER | Offer Id | The unique identifier for an instance of the OFFER entity. | Yes | Yes |
| NON TRAVEL PRODUCT | Product Id | The unique identifier for an instance of the PRODUCT entity | Yes | Yes |
| NONCURRENT LIABILITY ACCOUNT | GL Account Num | The unique Chart of Account code for the GL ACCOUNT. | Yes | Yes |

APPENDIX A-continued

Attribute Definitions

| Entity Name | Attribute Name | Attribute Definition | PK | FK |
|---|---|---|---|---|
| NONCURRENT LIABILITY ACCOUNT | Noncurrent Liab Acct Type Cd | The unique code assigned to the non-current LIABILITY account type. Types of non-current liabilities include deferred income taxes, long-term debt and reserves. | No | Yes |
| NONCURRENT LIABILITY ACCOUNT | Noncurrent Liability Amt | The monetary amount of a non-current LIABILITY account. | No | No |
| NONCURRENT LIABILITY ACCT TYPE | Noncurrent Liab Acct Type Cd | The unique code assigned to the non-current LIABILITY account type. Types of non-current liabilities include deferred income taxes, long-term debt and reserves. | Yes | No |
| NONCURRENT LIABILITY ACCT TYPE | Noncurrent Liab Acct Type Desc | The description of the non-current LIABILITY account type. | No | No |
| NONDEPRECIABLE ASSET ACCOUNT | GL Account Num | The unique Chart of Account code for the GL ACCOUNT. | Yes | Yes |
| NONDIVIDEND EQUITY ACCOUNT | GL Account Num | The unique Chart of Account code for the GL ACCOUNT. | Yes | Yes |
| NONDIVIDEND EQUITY ACCOUNT | Nondividend Eq Acct Type Cd | The unique code assigned to the NONDIVIDEND EQUITY ACCOUNT type. Types of non-dividend equity accounts include retained earnings, treasury stock and foreign currency adjustments. | No | Yes |
| NONDIVIDEND EQUITY ACCT TYPE | Nondividend Eq Acct Type Cd | The unique code assigned to the NONDIVIDEND EQUITY ACCOUNT type. Types of non-dividend equity accounts include retained earnings, treasury stock and foreign currency adjustments. | Yes | No |
| NONDIVIDEND EQUITY ACCT TYPE | Nondividend Eq Acct Type Desc | The description of the NONDIVIDEND EQUITY ACCOUNT type. | No | No |
| NONVOTING STOCK ACCOUNT | GL Account Num | The unique Chart of Account code for the GL ACCOUNT. | Yes | Yes |
| OFFER | Ad Id | The unique identifier for an instance of the AD entity. | No | Yes |
| OFFER | Channel Cd | The unique identifier for an instance of the CHANNEL entity. | No | Yes |
| OFFER | Offer Desc | Text that describes an instance of the OFFER entity. | No | No |
| OFFER | Offer Id | The unique identifier for an instance of the OFFER entity. | Yes | No |
| OFFER | Offer Type Cd | A unique code identifying a type of OFFER. | No | Yes |
| OFFER | Promo Id | The unique identifier for an instance of the PROMOTION entity. | No | Yes |
| OFFER TYPE | Offer Type Cd | A unique code identifying a type of OFFER. | Yes | No |
| OFFER TYPE | Offer Type Desc | Describes the subtype of the OFFER. Example: TRAVEL OFFER, EMAIL OFFER, etc.) | No | No |
| OnD PAIR | Destination Facility Id | A unique number assigned to a TRAVEL FACILITY to give it a unique identity. | Yes | Yes |
| OnD PAIR | Origin Facility Id | A unique number assigned to a TRAVEL FACILITY to give it a unique identity. | Yes | Yes |
| OnD PRODUCT | Actual Distance Meas | The actual travel distance between the two TRAVEL FACILITYs. | No | No |
| OnD PRODUCT | Award Distance Meas | The number of base LOYALTY ACCOUNT units awarded for this OnD PRODUCT. | No | No |
| OnD PRODUCT | Destination Facility Id | A unique number assigned to a TRAVEL FACILITY to give it a unique identity. | No | Yes |
| OnD PRODUCT | OnD Product Type Cd | A code the identifies the type of OnD PRODUCT | No | Yes |
| OnD PRODUCT | One Way Ind | Indicates if this is a one way product. | No | No |
| OnD PRODUCT | Origin Facility Id | A unique number assigned to a TRAVEL FACILITY to give it a unique identity. | No | Yes |
| OnD PRODUCT | Product Id | The unique identifier for an instance of the PRODUCT entity | Yes | Yes |
| OnD PRODUCT | Return Ind | Indicates if this is a return trip product, where the passenger travels from an origin to a destination, and then back again to their original origin. | No | No |
| OnD PRODUCT TYPE | OnD Product Type Cd | A code the identifies the type of OnD PRODUCT | Yes | No |
| OnD PRODUCT TYPE | OnD Product Type Desc | A textual description of the type of OnD PRODUCT | No | No |
| OnD TIMETABLE | Arrival Tm | The arrival time published in the schedule for a specific OnD. | No | No |
| OnD TIMETABLE | Arrival Week Day Id | This attribute is a system or user assigned number that designated a day of the week. Example: 1 = Monday, 2 = Tuesday 3 = Wednesday, 4 = Thursday, 5 = Friday, 6 = Saturday, 7 = Sunday | No | Yes |

APPENDIX A-continued

Attribute Definitions

| Entity Name | Attribute Name | Attribute Definition | PK | FK |
|---|---|---|---|---|
| OnD TIMETABLE | Departure Tm | The scheduled time of departure for a flight as found in the OnD SCHEDULE entity. | No | No |
| OnD TIMETABLE | Departure Week Day Id | This attribute is a system or user assigned number that designated a day of the week. Example: 1 = Monday, 2 = Tuesday 3 = Wednesday, 4 = Thursday, 5 = Friday, 6 = Saturday, 7 = Sunday | Yes | Yes |
| OnD TIMETABLE | Destination Facility Id | A unique number assigned to a TRAVEL FACILITY to give it a unique identity. | Yes | Yes |
| OnD TIMETABLE | Flight Num | A unique identifier assigned to a Flight scheduled for generating revenue and utilized by the general public. | Yes | Yes |
| OnD TIMETABLE | Origin Facility Id | A unique number assigned to a TRAVEL FACILITY to give it a unique identity. | Yes | Yes |
| OnD TIMETABLE | Transport Vehicle Config Id | Identifies a specific configuration of a TRANSPORT VEHICLE | No | Yes |
| OPERATING COST | Operating Cost Cd | A numeric or user defined code used to identify an Operating Cost (OPER COST). | Yes | No |
| OPERATING COST | Operating Cost Desc | A description of the types of OPERATING COSTs for a LOCATION. | No | No |
| OPERATING COST | Operating Cost Type Cd | A numeric or user defined code used to identify a COST CONTROL TYPE. | No | Yes |
| OPERATING COST TYPE | Operating Cost Type Cd | A numeric or user defined code used to identify a COST CONTROL TYPE. | Yes | No |
| OPERATING COST TYPE | Operating Cost Type Desc | A description of the control level that the TRAVEL PROVIDER has over minimizing the LOCATION expenditure for a specific OPER COST. | No | No |
| OPERATING EXPENSE ACCOUNT | GL Account Num | The unique Chart of Account code for the GL ACCOUNT. | Yes | Yes |
| OPERATING EXPENSE ACCOUNT | Operating Expense Amt | The monetary amount of an operating EXPENSE account. | No | No |
| OPERATING EXPENSE ACCOUNT | Operating Expns Acct Type Cd | The unique code assigned to the operating EXPENSE account type. Operating expenses include marketing, general and administrative, research and development, facilities and others. | No | Yes |
| OPERATING EXPENSE ACCOUNT TYPE | Operating Expns Acct Type Cd | The unique code assigned to the operating EXPENSE account type. Operating expenses include marketing, general and administrative, research and development, facilities and others. | Yes | No |
| OPERATING EXPENSE ACCOUNT TYPE | Operating Expns Acct Type Desc | The description of the operating EXPENSE account type. | No | No |
| OPERATING SYSTEM | Operating System Cd | Code that identifies the computer operating system being used | Yes | No |
| OPERATING SYSTEM | Operating System Name | The name of the computer operating system being used | No | No |
| OPERATING SYSTEM | Operating System Version Num | The release version of the computer operating system being used. | No | No |
| ORG BUSINESS TYPE | Org Business Type Cd | A unique code that classifies organizations into types For Businesses examples can be hospital, inpatient hospital, outpatient clinic, gas station, retail store. For internal organizations the business types could be marketing, financial, sales etc. | Yes | No |
| ORG BUSINESS TYPE | Org Business Type Desc | A description of the code. | No | No |
| ORG ORG BUSINESS TYPE | Org Business Type Cd | A unique code that classifies organizations into types For Businesses examples can be hospital, inpatient hospital, outpatient clinic, gas station, retail store. For internal organizations the business types could be marketing, financial, sales etc. | Yes | Yes |
| ORG ORG BUSINESS TYPE | Organization Party Id | The unique identifier for an organization. | Yes | Yes |
| ORGANIZATION | Org Type Cd | A unique code used to identify the sub-type discriminator for an organization. Valid sub-type occurrences are businesses and internal organizations. | No | Yes |
| ORGANIZATION | Organization Party Id | The unique identifier for an organization. | Yes | Yes |
| ORGANIZATION | Parent Organization Party Id | The unique identifier for an organization. This recursive structure allows the capture of a hierarchy of ORGANIZATIONs within a given ORGANIZATION. It is intended to support tree structure type relationships between | No | Yes |

APPENDIX A-continued

Attribute Definitions

| Entity Name | Attribute Name | Attribute Definition | PK | FK |
|---|---|---|---|---|
| | | ORGANIZATIONs within the same parent ORGANIZATION. It could be used to model parent subsidiary relationships or 'sub divisions' within a company. Relationships between an organization and an external entity e.g a customer or supplier are captured in the PARTY PARTY construct. | | |
| ORGANIZATION NAME (HISTORY) | Name Type Cd | A unique code for the type of name for this organization could have such as 'doing business as' (dba), legal name, alias, phonetics, etc. | Yes | Yes |
| ORGANIZATION NAME (HISTORY) | Org Name | The name for the organization such as Los Angeles Coin Club, Oakwood Country Club, Coca Cola, Prime Rate Bank. | No | No |
| ORGANIZATION NAME (HISTORY) | Org Name Desc | A text description of the organization name. | No | No |
| ORGANIZATION NAME (HISTORY) | Org Name End Dt | The date this name ceased to be used by this organization. | No | No |
| ORGANIZATION NAME (HISTORY) | Org Name Start Dt | The date this name became known or started to be used by this organization. | Yes | No |
| ORGANIZATION NAME (HISTORY) | Organization Party Id | The unique identifier for an organization. | Yes | Yes |
| ORGANIZATION TYPE | Org Type Cd | A unique code used to identify the sub-type discriminator for an organization. Valid sub-type occurrences are businesses and internal organizations. | Yes | No |
| ORGANIZATION TYPE | Org Type Desc | A description of the code. | No | No |
| OTHER ASSET ACCOUNT | GL Account Num | The unique Chart of Account code for the GL ACCOUNT. | Yes | Yes |
| OTHER ASSET ACCOUNT | Other Asset Account Type Cd | The unique code assigned to the OTHER ASSET account type. For example: investments, deferred charges or intangible asset. | No | Yes |
| OTHER ASSET ACCOUNT | Other Asset Amt | The monetary amount of an other ASSET account. | No | No |
| OTHER ASSET ACCOUNT | Other Asset Party Id | The unique identifier for an instance of the PARTY entity. | No | Yes |
| OTHER ASSET ACCOUNT TYPE | Other Asset Account Type Cd | The unique code assigned to the OTHER ASSET account type. For example: investments, deferred charges or intangible asset. | Yes | No |
| OTHER ASSET ACCOUNT TYPE | Other Asset Account Type Desc | The description of the OTHER ASSET account type. | No | No |
| OTHER EXPENSE ACCOUNT | GL Account Num | The unique Chart of Account code for the GL ACCOUNT. | Yes | Yes |
| OTHER EXPENSE ACCOUNT | Other Expense Amt | The monetary amount of an OTHER EXPENSE account | No | No |
| OTHER OP EXPENSE ACCOUNT | GL Account Num | The unique Chart of Account code for the GL ACCOUNT. | Yes | Yes |
| OTHER REVENUE ACCOUNT | GL Account Num | The unique Chart of Account code for the GL ACCOUNT. | Yes | Yes |
| OTHER REVENUE ACCOUNT | Other Revenue Amt | The monetary amount of an other REVENUE account. | No | No |
| PAGE REQUEST STATUS | Page Request Status Cd | The status of the click action. Examples include 200, 404, 401 | Yes | No |
| PAGE REQUEST STATUS | Page Request Status Desc | A description of the code. | No | No |
| PAGE VIEW | Current Web Page Id | The unique identifier of a particular WEB PAGE instance the visitor is currently viewing. | No | Yes |
| PAGE VIEW | Data Transferred Meas | The amount of data transferred from the server to the client as a result of an interaction (this data could be useful for bandwidth calculations) | No | No |
| PAGE VIEW | Entry Flag Cd | Uniquely identifies the order of the pages viewed during a Web visit. Examples: 21 - First Page, 22 - Exit Page, 23 - Intermediate Page. Source-> Web Log | No | Yes |
| PAGE VIEW | HTML Response File Id | A unique identifier for the actual HTML file that is returned to the user as a result of a click. It is possible that the HTML returned could be larger than the maximum size allowed for a single row in Teradata, in that case this entity could not be used as is to store that information. Source-> Operational DB or Log File | No | Yes |
| PAGE VIEW | Interaction Security Status Cd | The security status of an interaction - over a secure server or a non-secure server | No | No |
| PAGE VIEW | Interaction Task Cd | Coding scheme for identifying an interaction task | No | Yes |
| PAGE VIEW | Interaction Task Params Txt | Parameters, if used in an interaction task. For example, search terms | No | No |

APPENDIX A-continued

Attribute Definitions

| Entity Name | Attribute Name | Attribute Definition | PK | FK |
| --- | --- | --- | --- | --- |
| PAGE VIEW | Interaction Task Status Cd | The status of an interaction task - For example, Success or Failure | No | No |
| PAGE VIEW | Page Processing Duration Tm | Web Servers can be configured to log the time it takes them to display a page on a Visitor's browser. This is where that information would be stored. It can also be calculated from Network Sniffer Logs. weblog->time_taken | No | No |
| PAGE VIEW | Page Request Status Cd | The status of the click action. Examples include 200, 404, 401 | No | Yes |
| PAGE VIEW | Page View Clicks Cnt | The number of clicks that occurred during a Page Viewing. weblog-> Click_Number. | No | No |
| PAGE VIEW | Page View Cookie Id | Some Web sites store information in a small text file called a "cookie," on your hard disk. Cookies contain information about you and your preferences. For example, if you inquire about a flight schedule at an airline's Web site, the site might create a cookie that contains your itinerary. Or it might only contain a record of which pages within the site you visited, to help the site customize the view for you the next time you visit. Allowing a Web site to create a cookie does not give that or any other site access to the rest of your computer, and only the site that created the cookie can read it. weblog->cookie | No | No |
| PAGE VIEW | Page View Cookie Txt | The contents that are stored within a Cookie File. weblog->cookie_value | No | No |
| PAGE VIEW | Page View End Dttm | The date and time on which Web Page ceases to be viewed. | No | No |
| PAGE VIEW | Page View Id | Unique Identifier for a page viewed by a visitor to the web site. Results from a click on a link. | Yes | No |
| PAGE VIEW | Page View Sequence Num | The ordinal number that sequences PAGE VIEW instances within the context of a particular WEB VISIT (Visit Id) | No | No |
| PAGE VIEW | Page View Start Dttm | The date and time that this PAGE VIEW instance occurred. | No | No |
| PAGE VIEW | Referring MM Component Id | The unique identifier for the Multimedia Component from which this page view was referred. | No | Yes |
| PAGE VIEW | Referring Page View Id | Unique Identifier for a page viewed by a visitor to the web site. Results from a click on a link. | No | Yes |
| PAGE VIEW | Referring Web Page Id | The unique identifier of a particular WEB PAGE instance. | No | Yes |
| PAGE VIEW | Visit Id | The unique identifier for an instance of the VISIT entity. | No | Yes |
| PAGE VIEW | Web Server Error Cd | A classification method to identify a web server error | No | Yes |
| PAGE VIEW | Web Server Id | A classification number for identifying web server | No | Yes |
| PAGE VIEW MM COMPONENT | MM Component Id | System generated number for identifying a component. If source database has a unique identifier, the same can be substituted here. | Yes | Yes |
| PAGE VIEW MM COMPONENT | Page View Id | Unique Identifier for a page viewed by a visitor to the web site. Results from a click on a link. | Yes | Yes |
| PARTNER AWARD | Award Certificate Id | The identifier of a certificate awarded to a customer account. | Yes | Yes |
| PARTNER EARNINGS | Event Dttm | The date and time that a loyalty event occurred | Yes | Yes |
| PARTNER EARNINGS | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| PARTNER EARNINGS | Partner Id | The unique identifier for an organization. | No | Yes |
| PARTNER EARNINGS | Product Id | The unique identifier for an instance of the PRODUCT entity | No | Yes |
| PARTNER PARTY | Partner Alliance Ind | Indicates a partner or alliance | No | No |
| PARTNER PARTY | Partner Id | The unique identifier for an organization. | Yes | Yes |
| PARTNER PRODUCT | Partner Id | The unique identifier for an organization. | Yes | Yes |
| PARTNER PRODUCT | Product Id | The unique identifier for an instance of the PRODUCT entity | Yes | Yes |
| PARTY | Creation Source Type Cd | A code used to uniquely identify how/where the first information about the existence of a Party was obtained. Examples: PL - Purchased Prospect List, WB - Web Site, CC - Customer Care Center, CM - Campaign Reply. | No | Yes |

APPENDIX A-continued

Attribute Definitions

| Entity Name | Attribute Name | Attribute Definition | PK | FK |
|---|---|---|---|---|
| PARTY | Credit Rating Cd | A code that classifies the credit rating level for this PARTY. Example: 1 = Excellent, 2 = Good, 3 = Slow Pay, 4 = Poor, etc. | No | Yes |
| PARTY | First Purchase Dt | The date at which a PARTY made their first purchase. | No | No |
| PARTY | Party Creation Dt | The actual date the PARTY enrolled or registered with the TRAVEL PROVIDER. | No | No |
| PARTY | Party Id | The unique identifier for any individual or group of individuals that is of interest to the enterprise. | Yes | No |
| PARTY | Party Start Dt | The date this party first became of interest to the enterprise. | No | No |
| PARTY | Party Status Cd | The unique identifier for an instance of the PARTY STATUS entity. | No | Yes |
| PARTY | Party Type Cd | The unique identifier for an instance of the PARTY TYPE entity. Example: 1 = INDIVIDUAL, 2 = HOUSEHOLD, 3 = ORGANIZATION,etc. | No | Yes |
| PARTY ADDRESS | Address Id | A number used to uniquely identify an ADDRESS. | No | Yes |
| PARTY ADDRESS | Address Usage Cd | The unique identifier for an instance of the ADDRESS USAGE entity. | Yes | Yes |
| PARTY ADDRESS | Party Id | The unique identifier for an instance of the PARTY entity. | Yes | Yes |
| PARTY ADDRESS (HISTORY) | Address Id | A number used to uniquely identify an ADDRESS. | Yes | Yes |
| PARTY ADDRESS (HISTORY) | Address Usage Cd | A code used to uniquely identify the ADDRESS USAGE. | Yes | Yes |
| PARTY ADDRESS (HISTORY) | Party Address End Dt | The calendar day on which an ADDRESS is no longer associated with a PARTY as categorized by the Address Usage Cd. | No | No |
| PARTY ADDRESS (HISTORY) | Party Address Start Dt | The calendar day on which an ADDRESS is associated with a PARTY, as categorized by the Address Usage Cd. | Yes | No |
| PARTY ADDRESS (HISTORY) | Party Id | The unique identifier for any individual or group of individuals that is of interest to the enterprise. | Yes | Yes |
| PARTY CONTACT EVENT | Associate Id | The unique identifier for an instance of the PARTY entity. | No | Yes |
| PARTY CONTACT EVENT | Event Reason Cd | This attribute is a categorization of the type of reason for an ENROUTE EVENT. Example: 1 = Poor Service, 2 = Flight Delay, 3 = Moving, 4 = Competitor Offer, 5 = Equipment Problem, 6 = Quality, etc | No | Yes |
| PARTY CONTACT EVENT | Event Resolution Type Cd | A code that represents a resolution type used to resolve a specific customer event. | No | Yes |
| PARTY CONTACT EVENT | Event Type Cd | The categorization of the type of customer event. Example: 1 = Complaint, 2 = Happy Call 3 = Change Address | No | Yes |
| PARTY CONTACT EVENT | Party Event Dt | The date on which the customer event occurs or recorded. | Yes | No |
| PARTY CONTACT EVENT | Party Event Resolution Dt | The date on which the customer event ended or was otherwise resolved. | No | No |
| PARTY CONTACT EVENT | Party Event Tm | The time of day that a customer event occurred or was recorded. | Yes | No |
| PARTY CONTACT EVENT | Party Id | The unique identifier for an instance of the PARTY entity. | Yes | Yes |
| PARTY DEMOGRAPHIC | Demog Cd | The unique identifier for an instance of the DEMOGRAPHIC entity. | Yes | Yes |
| PARTY DEMOGRAPHIC | Demog Value Cd | A code referencing a specific DEMOGRAPHIC VALUE for a given demographic code. | No | Yes |
| PARTY DEMOGRAPHIC | Party Id | The unique identifier for an instance of the PARTY entity. | Yes | Yes |
| PARTY IDENTIFICATION | Geography Address Id | A number used to uniquely identify an GEOGRAPHY ADDRESS. | Yes | Yes |
| PARTY IDENTIFICATION | Party Id | The unique identifier for any individual or group of individuals that is of interest to the enterprise. | Yes | Yes |
| PARTY IDENTIFICATION | Party Identification Num | The numbers assigned to a party for identification purposes, as specified by the Party Identification Type Cd. This will be the Social Security Number, Passport Identification, Driver's License, Federal Tax Identification Number, National Identity Card Number, Etc. | No | No |

APPENDIX A-continued

Attribute Definitions

| Entity Name | Attribute Name | Attribute Definition | PK | FK |
|---|---|---|---|---|
| PARTY IDENTIFICATION | Party Identification Type Cd | A code used to uniquely identify the types of legal jurisdiction identification that may be used by a party. Example: SSN = Social Security Number, PASSP = Passport Identification, DRIV = Driver's License, FTIN = Federal Tax Identification Number, NICN = National Identity Card Number. | Yes | Yes |
| PARTY IDENTIFICATION TYPE | Party Identification Type Cd | A code used to uniquely identify the types of legal jurisdiction identification that may be used by a Party. Example: SSN = Social Security Number, PASSP = Passport Identification, DRIV = Driver's License, FTIN = Federal Tax Identification Number, NICN = National Identity Card Number. | Yes | No |
| PARTY IDENTIFICATION TYPE | Party Identification Type Desc | A textual description of a Party Identification Type Cd. | No | No |
| PARTY IDENTIFICATION TYPE | Party Identification Type Name | The name assigned to a Party Identification Type. Examples: Social Security Number, Passport Identification, Driver's License, Federal Tax Identification Number, National Identity Card Number. | No | No |
| PARTY LOGIN | Login Name | The name a PARTY uses to login to a web site, only available for registered users of the site | No | No |
| PARTY LOGIN | Party Id | The unique identifier for any individual or group of individuals that is of interest to the organization. | Yes | Yes |
| PARTY LOGIN | User Id | A unique value assigned by the system to identify a user, typically a cookie | No | No |
| PARTY LOGIN | Web Site Id | A unique identifier for the web site. | Yes | Yes |
| PARTY PARTY RELATIONSHIP (HISTORY) | Party Rel Status Reason Cd | A code used to uniquely identify a reason for a party status type. | No | Yes |
| PARTY PARTY RELATIONSHIP (HISTORY) | Party Rel Status Type Cd | A code used to uniquely identify a party classification. Examples include: P = Prospective (Future) Customer A = Active (Current) Customer C = Canceled (Inactive) Customer U = Unmarketable Customer (e.g. deceased) | No | Yes |
| PARTY PARTY RELATIONSHIP (HISTORY) | Party Relationship End Dttm | The date this relationship ended. | No | No |
| PARTY PARTY RELATIONSHIP (HISTORY) | Party Relationship Start Dttm | The date this relationship started. | Yes | No |
| PARTY PARTY RELATIONSHIP (HISTORY) | Related Party Id | The identifier for a party, individual, organization or household, that is related to another party. | Yes | Yes |
| PARTY PARTY RELATIONSHIP (HISTORY) | Related Party Role Cd | Indicates the relationship of one party to another party Examples: Manager, Employer, Employee, Campaign Vendor, Customer, Reseller, Dealer, Product Manager, Account Executive. Examples: CV—Campaign Vendor, C—Customer, R—Reseller, D—Dealer, BU—Business Unit, SO—Sales Organization, PM—Product Manager, AE—Account Executive. | Yes | Yes |
| PARTY PARTY RELATIONSHIP (HISTORY) | Relates Party Id | The identifier for a party, individual, organization or household, that relates to another party. | Yes | Yes |
| PARTY PARTY RELATIONSHIP (HISTORY) | Relates Party Role Cd | Indicates the relationship of one party to another party Examples: Manager, Employer, Employee, Campaign Vendor, Customer, Reseller, Dealer, Product Manager, Account Executive. Examples: CV—Campaign Vendor, C—Customer, R—Reseller, D—Dealer, BU—Business Unit, SO—Sales Organization, PM—Product Manager, AE—Account Executive. | Yes | Yes |
| PARTY PRIVACY | Party Id | The unique identifier for an instance of the PARTY entity. | Yes | Yes |
| PARTY PRIVACY | Privacy Consent Type Cd | A unique identifier for the privacy consent types of usage. Examples include: Direct Marketing, Third-Party Disclosure, Affiliate Disclosure, Automated Decision. | Yes | Yes |

APPENDIX A-continued

Attribute Definitions

| Entity Name | Attribute Name | Attribute Definition | PK | FK |
|---|---|---|---|---|
| PARTY PRIVACY | Privacy Information Type Cd | A unique identifier code for the values describing the types of personal information that the Customer can implicitly or explicitly consent to usage. Examples include: Name, Address Type Home, Address Type Business, Phone Type Home, Phone Type Business, Phone Type Mobil, etc. Demographic, Employer. | Yes | Yes |
| PARTY PRIVACY | Privacy Option Ind | Indicator for whether a Customer is opting in or out to a specific combination of privacy information type and consent type. Values are: Opt Out = 0, Opt In = 1. | No | No |
| PARTY REL STATUS REASON | Party Rel Status Reason Cd | A code used to uniquely identify a reason for a party relationship status type. | Yes | No |
| PARTY REL STATUS REASON | Party Rel Status Reason Desc | A textual description of a reason for a party relationship status type. | No | No |
| PARTY REL STATUS TYPE | Party Rel Status Type Cd | A code used to uniquely identify a party relationship classification. Examples include: P = Prospective (Future) Customer A = Active (Current) Customer C = Canceled (Inactive) Customer U = Unmarketable Customer (e.g. deceased) | Yes | No |
| PARTY REL STATUS TYPE | Party Rel Status Type Desc | A textual description for the Party Rel Status Type Cd. | No | No |
| PARTY RELATIONSHIP ROLE | Party Relationship Role Cd | Indicates the relationship of one party to another party Examples: Manager, Employer, Employee, Campaign Vendor, Customer, Reseller, Dealer, Product Manager, Account Executive. Examples: CV—Campaign Vendor, C—Customer, R—Reseller, D—Dealer, BU—Business Unit, SO—Sales Organization, PM—Product Manager, AE—Account Executive. | Yes | No |
| PARTY RELATIONSHIP ROLE | Party Relationship Role Desc | A textual description for a Party Relationship Role. | No | No |
| PARTY ROLE | Party Role Cd | A unique identifier for an instance of the PARTY ROLE entity. Example: 1 - Person Making the reservation, 2 - Person for whom the reservation is being made, 3 - Person paying for the reservation, etc. | Yes | No |
| PARTY ROLE | Party Role Desc | Text that describes an instance of the PARTY ROLE entity. | No | No |
| PARTY SCORE | Model Id | The unique identifier for an instance of the ANALYTICAL MODEL entity. | Yes | Yes |
| PARTY SCORE | Model Run Id | An identifier (or sequential number) that uniquely describes this particular run of the ANALYTICAL MODEL. | Yes | Yes |
| PARTY SCORE | Party Id | The unique identifier for an instance of the PARTY entity. | Yes | Yes |
| PARTY SCORE | Party Score Num | The actual score produced for the PARTY by the ANALYTICAL MODEL. Example: Jim Smith has a 'customer profitability' score of 7 out of 10; Acme Supplies has an 'on-time delivery' score of 3 out of 4. | No | No |
| PARTY STATUS | Party Status Cd | The unique identifier for an instance of the PARTY STATUS entity. | Yes | No |
| PARTY STATUS | Party Status Desc | Text that describes an instance of the PARTY STATUS entity. | No | No |
| PARTY TRAN ROLE | Party Id | The unique identifier for an instance of the PARTY entity. | Yes | Yes |
| PARTY TRAN ROLE | Party Role Cd | A unique identifier for an instance of the PARTY ROLE entity. Example: 1 - Person Making the reservation, 2 - Person for whom the reservation is being made, 3 - Person paying for the reservation, etc. | Yes | Yes |
| PARTY TRAN ROLE | Travel Transaction Id | A unique identifier for this TRAVEL TRANSACTION. | Yes | Yes |
| PARTY TRIP FEEDBACK | CUST_EVNT_SQN_NO | | Yes | Yes |
| PARTY TRIP FEEDBACK | Party Event Tm | The time of day that a customer event occurred or was recorded. | Yes | Yes |
| PARTY TRIP FEEDBACK | Party Id | The unique identifier for an instance of the PARTY entity. | Yes | Yes |
| PARTY TRIP FEEDBACK | Trip Event Num | A unique number assigned to an EN ROUTE EVENT entity. | No | Yes |

APPENDIX A-continued

Attribute Definitions

| Entity Name | Attribute Name | Attribute Definition | PK | FK |
|---|---|---|---|---|
| PARTY TYPE | Party Type Cd | The unique identifier for an instance of the PARTY TYPE entity. Example: 1 = INDIVIDUAL, 2 = HOUSEHOLD, 3 = ORGANIZATION, etc. | Yes | No |
| PARTY TYPE | Party Type Desc | Text that describes an instance of the PARTY TYPE entity. | No | No |
| PASSENGER RAILROAD CAR | Transport Vehicle Id | A sequence of digits used to identify an ASSET. | Yes | Yes |
| PASSENGER TRAVEL PROVIDER | Passenger Travel Type Cd | | No | Yes |
| PASSENGER TRAVEL PROVIDER | Travel Provider Id | The unique identifier for an organization. | Yes | Yes |
| PASSENGER TRAVEL TYPE | Passenger Travel Type Cd | A code the identifies the type of PASSENGER TRAVEL PROVIDER | Yes | No |
| PASSENGER TRAVEL TYPE | Passenger Travel Type Desc | A textual description of the type of PASSENGER TRAVEL PROVIDER | No | No |
| PATENTS ACCOUNT | GL Account Num | The unique Chart of Account code for the GL ACCOUNT. | Yes | Yes |
| PAYMENT | Account Id | A sequence of digits used to identify an account established for a PARTY for the purpose of rendering bills and receiving payments. May also be used to make company offerings or track the use of a LOYALTY ACCOUNT. | No | Yes |
| PAYMENT | Payment Amt | This attribute is the monetary amount presented by the purchaser to compensate or partially compensate for PURCHASE. | No | No |
| PAYMENT | Payment Dttm | This attribute is the date and time when a PAYMENT is made by a PARTY. | No | No |
| PAYMENT | Payment Line Num | This attribute associates a specific PAYMENT with a specific PURCHASE ITEM. | Yes | No |
| PAYMENT | Payment Type Cd | The discriminator for the method in which a monetary transaction takes place in exchange for a PURCHASE. Example: 1 = Cash, 2 = Credit Card, 3 = Coupon Exchange, 4 = Certificate Redemption, etc. | No | Yes |
| PAYMENT | Purchase Tran Id | A unique identifier for this TRAVEL TRANSACTION. | Yes | Yes |
| PAYMENT | Settlement Dttm | This attribute is the date and time when a PAYMENT is finally received (settled) by the travel provider. | No | No |
| PAYMENT TYPE | Payment Type Cd | The discriminator for the method in which a monetary transaction takes place in exchange for a PURCHASE. Example: 1 = Cash, 2 = Credit Card, 3 = Coupon Exchange, 4 = Certificate Redemption, etc. | Yes | No |
| PAYMENT TYPE | Payment Type Desc | A brief description of the discriminator for the method in which a monetary transaction takes place in exchange for a Product. Example: Cash, Credit Card, Coupon Exchange, Certificate Redemption, etc. | No | No |
| PERSONA | Individual Party Id | The unique identifier for an individual. | No | Yes |
| PERSONA | Individual Rel Role Cd | Indicates the relationship of one party to another party Examples: Manager, Employer, Employee, Campaign Vendor, Customer, Reseller, Dealer, Product Manager, Account Executive. Examples: CV—Campaign Vendor, C—Customer, R—Reseller, D—Dealer, BU—Business Unit, SO—Sales Organization, PM—Product Manager, AE—Account Executive. | No | Yes |
| PERSONA | Organization Party Id | The unique identifier for an organization. | No | Yes |
| PERSONA | Persona Id | Uniquely identifies an instance of a PERSONA. | Yes | No |
| PLANT ACCOUNT | GL Account Num | The unique Chart of Account code for the GL ACCOUNT. | Yes | Yes |
| PNR | Actual Purge Dt | | No | No |
| PNR | Agent Persona Id | Uniquely identifies an instance of a PERSONA. | No | Yes |
| PNR | GDS Provider Id | The unique identifier for an organization. | No | Yes |
| PNR | Parent PNR Create Dt | The date on which the PNR that this one was split from, was created | No | Yes |
| PNR | Parent PNR Num | The original PNR from which this PNR was split off. May be null. | No | Yes |
| PNR | PNR Create Dt | The creation date of a PNR. This is needed to uniquely identify a PNR, since PNR numbers are re-used over time. | Yes | No |
| PNR | PNR Num | Uniquely identifies a specific occurrence of a PNR. | Yes | No |

APPENDIX A-continued

Attribute Definitions

| Entity Name | Attribute Name | Attribute Definition | PK | FK |
|---|---|---|---|---|
| PNR | PNR Termination Dt | | No | No |
| PNR BOOKING | Agent Persona Id | Uniquely identifies an instance of a PERSONA. The person (Agent) working for a specific Travel Agency or Travel Provider who created the PNR | No | Yes |
| PNR BOOKING | PNR Booking Effective Dt | The date when this PNR becomes valid. | Yes | No |
| PNR BOOKING | PNR Booking Source Txt | The source for this PNR text. | No | No |
| PNR BOOKING | PNR Booking Txt | The booking text associated with a PNR. | No | No |
| PNR BOOKING | PNR Create Dt | The creation date of a PNR. This is needed to uniquely identify a PNR, since PNR numbers are re-used over time. | Yes | Yes |
| PNR BOOKING | PNR Num | Uniquely identifies a specific occurrence of a PNR. | Yes | Yes |
| PNR BOOKING | Terminal Address Id | Terminal address of Point of Sale (POS) device used to make the booking. This address will allow an airline to identify who made the booking. This is important for fraud detection. | No | No |
| PNR FARE | Agent Persona Id | Uniquely identifies an instance of a PERSONA. The person (Agent) working for a specific Travel Agency or Travel Provider who created the PNR | No | Yes |
| PNR FARE | PNR Create Dt | The creation date of a PNR. This is needed to uniquely identify a PNR, since PNR numbers are re-used over time. | Yes | Yes |
| PNR FARE | PNR Fare Effective Dt | Date by when this PNR must be ticketed of the fare expires. | Yes | No |
| PNR FARE | PNR Fare Num | The fare number associated with this PNR. | Yes | No |
| PNR FARE | PNR Fare Source Txt | The source for this PNR fare. | No | No |
| PNR FARE | PNR Fare Txt | The fare text associated with this PNR. | No | No |
| PNR FARE | PNR Fare Type Cd | The fare type code associated with this PNR (i.e. Y, F, M, etc.) | Yes | No |
| PNR FARE | PNR Num | Uniquely identifies a specific occurrence of a PNR. | Yes | Yes |
| PNR FARE | Terminal Address Id | Terminal address of Point of Sale (POS) device used to make the booking. This address will allow an airline to identify who made the booking. This is important for fraud detection. | No | No |
| PNR MISCELLANEOUS | Header Effective Dt | | Yes | No |
| PNR MISCELLANEOUS | Planned PNR Purge Dt | The date on which the PNR will be purged from the operational system. | No | No |
| PNR MISCELLANEOUS | PNR Create Dt | The creation date of a PNR. This is needed to uniquely identify a PNR, since PNR numbers are re-used over time. | Yes | Yes |
| PNR MISCELLANEOUS | PNR Num | Uniquely identifies a specific occurrence of a PNR. | Yes | Yes |
| PNR PAYMENT | Agent Persona Id | Uniquely identifies an instance of a PERSONA. The person (Agent) working for a specific Travel Agency or Travel Provider who created the PNR | No | Yes |
| PNR PAYMENT | Payment Num | Uniquely identifies a specific occurrence of a payment. | Yes | No |
| PNR PAYMENT | PNR Create Dt | The creation date of a PNR. This is needed to uniquely identify a PNR, since PNR numbers are re-used over time. | Yes | Yes |
| PNR PAYMENT | PNR Num | Uniquely identifies a specific occurrence of a PNR. | Yes | Yes |
| PNR PAYMENT | PNR Payment Effective Dt | Date the payment was received. | Yes | No |
| PNR PAYMENT | PNR Payment Source Txt | The source for this PNR payment. | No | No |
| PNR PAYMENT | PNR Payment Txt | The payment text associated with this PNR. | No | No |
| PNR PAYMENT | Terminal Address Id | Terminal address of Point of Sale (POS) device used to make the booking. This address will allow an airline to identify who made the booking. This is important for fraud detection. | No | No |
| PNR REMARK | PNR Create Dt | The creation date of a PNR. This is needed to uniquely identify a PNR, since PNR numbers are re-used over time. | Yes | Yes |
| PNR REMARK | PNR Num | Uniquely identifies a specific occurrence of a PNR. | Yes | Yes |
| PNR REMARK | PNR Remark Effective Dt | Date the Remark was entered into the PNR. | Yes | No |
| PNR REMARK | PNR Remark Num | Uniquely identifies a specific occurrence of a PNR remark | Yes | No |

APPENDIX A-continued

Attribute Definitions

| Entity Name | Attribute Name | Attribute Definition | PK | FK |
|---|---|---|---|---|
| PNR REMARK | PNR Remark Source Txt | The source for this PNR remark. | No | No |
| PNR REMARK | PNR Remark Txt | The remark text associated with this PNR. | No | No |
| PNR REMARK | PNR Remark Type Cd | The code that identifies the meaning of the text in this field of the PNR. | Yes | No |
| POSTAL CODE | Country Cd | The unique code for an instance of the COUNTRY entity. | Yes | Yes |
| POSTAL CODE | County Cd | The unique code for an instance of the COUNTY entity. | No | Yes |
| POSTAL CODE | Msa Cd | The unique code for an instance of the MSA entity. | No | Yes |
| POSTAL CODE | Postal Cd | A unique code for an instance of the POSTAL CODE entity. | Yes | No |
| PREFERENCE | Preference Cd | The identifier for a personal customer preference. Example: 104 - seat type preference 194 - smoking preference 345 - language preference etc | Yes | No |
| PREFERENCE | Preference Desc | A textual description of each personal PREFERENCE. Example: If PREFERENCE is "smoking", then ValueCD = 1 => ValueDESC = yes ValueCD = 2 => ValueDESC = no | No | No |
| PREFERENCE | Preference Group Cd | The high level qualifier for categorizing customer preferences data. Example: 1 = Flight, 2 = Travel and Destination preferences. | No | Yes |
| PREFERENCE GROUP | Preference Group Cd | The high level qualifier for categorizing customer preferences data. Example: 1 = Flight, 2 = Travel and Destination preferences. | Yes | No |
| PREFERENCE GROUP | Preference Group Desc | A textual description of each Customer Preference group used to categorize collected data about customer preferences. | No | No |
| PREFERENCE VALUE | Preference Cd | The identifier for a personal customer preference. Example: 104 - seat type preference 194 - smoking preference 345 - language preference etc | Yes | Yes |
| PREFERENCE VALUE | Preference Value Cd | A code that indicates the preference for this PARTY. Example: 1 = Smoking, 2 = No Smoking | Yes | No |
| PREFERENCE VALUE | Preference Value Desc | Indicates the preference for this code Example: If PREFERENCE is "smoking", then ValueCD = 1 => ValueDESC = yes ValueCD = 2 => ValueDESC = no | No | No |
| PREFERRED STOCK ACCOUNT | GL Account Num | The unique Chart of Account code for the GL ACCOUNT. | Yes | Yes |
| PREFERRED STOCK ACCOUNT | Preferred Shares Outstndng Qty | The number of PREFERRED STOCK shares of a corporation. | No | No |
| PREPAID EXPENSE ACCOUNT | GL Account Num | The unique Chart of Account code for the GL ACCOUNT. | Yes | Yes |
| PREPAID EXPENSE ACCOUNT | Prepaid Party Id | The unique identifier for an instance of the PARTY entity. | No | Yes |
| PRINT AD | Ad Id | The unique identifier for an instance of the AD entity. | Yes | Yes |
| PRIVACY (HISTORY) | Party Id | The unique identifier for an instance of the PARTY entity. | Yes | Yes |
| PRIVACY (HISTORY) | Privacy Change Dt | The Date that the Privacy Option Indicator was changed. | Yes | No |
| PRIVACY (HISTORY) | Privacy Consent Type Cd | A unique identifier for the privacy consent types of usage. Examples include: Direct Marketing, Third-Party Disclosure, Affiliate Disclosure, Automated Decision. | Yes | Yes |
| PRIVACY (HISTORY) | Privacy Information Type Cd | A unique identifier code for the values describing the types of personal information that the Customer can implicitly or explicitly consent to usage. Examples include: Name, Address Type Home, Address Type Business, Phone Type Home, Phone Type Business, Phone Type Mobil, etc. Demographic, Employer. | Yes | Yes |
| PRIVACY (HISTORY) | Privacy New Option Ind | The new value for the Privacy Option Indicator | No | No |
| PRIVACY (HISTORY) | Privacy Old Option Ind | The old value for the Privacy Option Indicator. | No | No |
| PRIVACY CONSENT TYPE | Privacy Consent Type Cd | A unique identifier for the privacy consent types of usage. Examples include: Direct Marketing, Third-Party Disclosure, Affiliate Disclosure, Automated Decision. | Yes | No |
| PRIVACY CONSENT TYPE | Privacy Consent Type Desc | A textual description of the privacy consent types. Examples include: Direct Marketing, Third-Party Disclosure, Affiliate Disclosure. | No | No |

APPENDIX A-continued

Attribute Definitions

| Entity Name | Attribute Name | Attribute Definition | PK | FK |
|---|---|---|---|---|
| PRIVACY INFORMATION CATEGORY | Privacy Category Cd | A code that refers to the Category of privacy data. Every Information Type will belong to one of the privacy categories. Examples are: All = 0, Name = 1, Address = 2, Phone = 3, Demographic = 4, Online Contact = 5, Interaction Data History = 6, Financial Account = 7, Navigation Data History = 8, Employer = 9 | Yes | No |
| PRIVACY INFORMATION CATEGORY | Privacy Category Desc | A textual description of the Category Code. Examples are: ALL, NAME, ADDRESS, PHONE, etc. | No | No |
| PRIVACY INFORMATION TYPE | Privacy Category Cd | A code that refers to the Category of privacy data. Every Information Type will belong to one of the privacy categories. Examples are: All = 0, Name = 1, Address = 2, Phone = 3, Demographic = 4, Online Contact = 5, Interaction Data History = 6, Financial Account = 7, Navigation Data History = 8, Employer = 9 | No | Yes |
| PRIVACY INFORMATION TYPE | Privacy Information Type Cd | A unique identifier code for the values describing the types of personal information that the Customer can implicitly or explicitly consent to usage. Examples include: Name, Address Type Home, Address Type Business, Phone Type Home, Phone Type Business, Phone Type Mobil, etc. Demographic, Employer. | Yes | No |
| PRIVACY INFORMATION TYPE | Privacy Information Type Desc | A textual description for the values describing the Privacy Information Type. Examples are: Name Type, Address Type, Home Address Type, Business Phone Type, Home Phone Type, Business Demographic Type, Employer Type. | No | No |
| PRODUCT | Parent Product Id | The unique identifier for an instance of the PRODUCT entity. Allows a Product to contain or be made up of other Products. | No | Yes |
| PRODUCT | Product Desc | A brief textual description of an instance of the PRODUCT entity. | No | No |
| PRODUCT | Product Id | The unique identifier for an instance of the PRODUCT entity. | Yes | No |
| PRODUCT | Product Type Cd | A code that identifies a sub type of the TRAVEL PRODUCT entity. Example: 1 - OnD Product, 2 - Rental Product, 3 - Lodging Product, etc. | No | Yes |
| PRODUCT | Travel Provider Id | The unique identifier for an organization. | No | Yes |
| PRODUCT TYPE | Product Type Cd | A code that identifies a sub type of the PRODUCT entity. Example: 1 - OnD Product, 2 - Rental Product, 3 - Lodging Product, etc. | Yes | No |
| PRODUCT TYPE | Product Type Desc | A textual description of a sub type of the TRAVEL PRODUCT. Example: OnD Product, Rental Product, Lodging Product, etc. | No | No |
| PROMOTION | Campaign Id | The unique identifier for an instance of the CAMPAIGN entity. | No | Yes |
| PROMOTION | Promo Actual Amt | The actual amount spent on a PROMOTION. | No | No |
| PROMOTION | Promo Budget Amt | The budgeted amount for a PROMOTION. | No | No |
| PROMOTION | Promo Desc | Text that describes an instance of the PROMOTION entity. | No | No |
| PROMOTION | Promo End Dt | The date on which a PROMOTION ends. | No | No |
| PROMOTION | Promo Goal Amt | The amount of revenue a PROMOTION is expected to generate. | No | No |
| PROMOTION | Promo Id | The unique identifier for an instance of the PROMOTION entity. | Yes | No |
| PROMOTION | Promo Start Dt | The date on which a PROMOTION starts. | No | No |
| PROPERTY ACCOUNT | GL Account Num | The unique Chart of Account code for the GL ACCOUNT. | Yes | Yes |
| PROPERTY ACCOUNT | Property Parcel Num | The Parcel number of the PROPERTY. | No | No |
| PURCHASE | Purchase Tran Id | A unique identifier for this TRAVEL TRANSACTION PURCHASE visit. | Yes | Yes |
| PURCHASE ITEM | Fare Basis Cd | The unique codes used to determine the basis of the Fare charged to PARTYs for the purchase of an OnD PRODUCT. | No | Yes |
| PURCHASE ITEM | Issued Party Id | The unique identifier for an instance of the PARTY entity. | No | Yes |
| PURCHASE ITEM | Product Id | The unique identifier for an instance of the PRODUCT entity | No | Yes |
| PURCHASE ITEM | Purchase Seq Num | An identifier for a specific PURCHASE ITEM entity. | Yes | No |

APPENDIX A-continued

Attribute Definitions

| Entity Name | Attribute Name | Attribute Definition | PK | FK |
|---|---|---|---|---|
| PURCHASE ITEM | Purchase Tran Id | A unique identifier for this TRAVEL TRANSACTION PURCHASE visit. | Yes | Yes |
| PURCHASE ITEM | Service Class Cd | The unique identifier of a specific SERVICE CLASS offered by a TRAVEL PROVIDER. Example: A (First Class), B (Business Class) or C (Economy Class). Note: in the case of air travel, this attribute is deriveable from the Fare Basis Cd. | No | Yes |
| PURCHASE ITEM | Ticket Id | A unique identifier for a TICKET. | No | Yes |
| PURCHASE ITEM | Travel Coupon Id | The ordering of a series of one or more TRAVEL COUPONs associated with a single Ticket or Conjunctive Ticket series. | No | Yes |
| QUALITY OF SERVICE INDEX | Product Id | The unique identifier for an instance of the PRODUCT entity | Yes | Yes |
| QUALITY OF SERVICE INDEX | QSI Effective Dt | The calendar day that the QSI was collected and are relevant. | Yes | No |
| QUALITY OF SERVICE INDEX | QSI End Dt | The calendar day that the QSI statistics are no longer relevant. | No | No |
| QUALITY OF SERVICE INDEX | QSI Share Pct | The individual share or percentage of the market as shared by all flights as reported by the Department of Transportation (DOT) for the specified operating airline and market. | No | No |
| QUALITY OF SERVICE INDEX | QSI Value Qty | The actual value as reported by the Department of Transportation (DOT) for the specified operating airline and market. | No | No |
| QUERY STRING FIELD NAME | Query String Field Name Desc | Text description of Query Field String Names. Examples: First name, Site, Location. | No | No |
| QUERY STRING FIELD NAME | Query String Field Name Id | A unique identifier for the domain of parameter names that may appear in the Query String of the URL for a Web Page. Examples: 31 - First name, 32 - Site, 33 - Location. Source-> Web Log | Yes | No |
| QUERY STRING FIELD VALUE | Query String Field Value Desc | Text description for Query String Field Values. Ex: Sylvie, Lebanon, Columbia. | No | No |
| QUERY STRING FIELD VALUE | Query String Field Value Id | Unique identifier for the domain of parameter values that may appear in the query string of the URL for a Web Page. Source-> Web Log. | Yes | No |
| QUERY STRING NAME VALUE | Page View Id | Unique Identifier for a page viewed by a visitor to the web site. Results from a click on a link. | Yes | Yes |
| QUERY STRING NAME VALUE | Query String Current URL Ind | This entity can be used to store both the parameters for the current URL as well as the referring URL. The Query String Current URL Ind attribute is used to distinguish between the two URLs. "Yes" indicates current, "No" indicates referring. Examples: Yes; No Source-> Web Log | No | No |
| QUERY STRING NAME VALUE | Query String Field Name Id | A unique identifier for the domain of parameter names that may appear in the Query String of the URL for a Web Page. Examples: 31 - First name, 32 - Site, 33 - Location. Source-> Web Log | Yes | Yes |
| QUERY STRING NAME VALUE | Query String Field Value Id | Unique identifier for the domain of parameter values that may appear in the query string of the URL for a Web Page. Source-> Web Log. | Yes | Yes |
| QUOTED CHARGE | Charge Type Cd | Identifies a unique occurrence of CHARGE TYPE | Yes | Yes |
| QUOTED CHARGE | Quoted Amt | The amount quoted to a PARTY for a specific charge component. | No | No |
| QUOTED CHARGE | Reservation Seq Num | This attribute identifies a specific RESERVATION ITEM. | Yes | Yes |
| QUOTED CHARGE | Reservation Transaction Id | A unique identifier for this TRAVEL TRANSACTION. | Yes | Yes |
| R AND D EXPENSE ACCOUNT | GL Account Num | The unique Chart of Account code for the GL ACCOUNT. | Yes | Yes |
| RAIL PRODUCT | Product Id | The unique identifier for an instance of the PRODUCT entity | Yes | Yes |
| RAIL STATION | Facility Id | A unique number assigned to a TRAVEL FACILITY to give it a unique identity. | Yes | Yes |
| RAILROAD | Railroad Org Id | The unique identifier for an organization. | Yes | Yes |
| RAILROAD RESERVATION | Reservation Seq Num | This attribute identifies a specific RESERVATION ITEM. | Yes | Yes |
| RAILROAD RESERVATION | Reservation Transaction Id | A unique identifier for this TRAVEL TRANSACTION. | Yes | Yes |
| RAILROAD TICKET | Ticket Id | A unique identifier for a TICKET. | Yes | Yes |

APPENDIX A-continued

Attribute Definitions

| Entity Name | Attribute Name | Attribute Definition | PK | FK |
|---|---|---|---|---|
| RAW LAND ACCOUNT | GL Account Num | The unique Chart of Account code for the GL ACCOUNT. | Yes | Yes |
| REASON | Reason Cd | This code uniquely identifies the reason why two (or more) TRAVEL TRANSACTIONs are related. | Yes | No |
| REASON | Reason Desc | This code describes the reason why two (or more) TRAVEL TRANSACTIONs are related. | No | No |
| RECOMMENDATION | Page Conversion Category Cd | Unique identifier for information concerning the linkage between recommended Offerings and the Web Page that the Offering was displayed on. Source-> Recommendation DB. | No | Yes |
| RECOMMENDATION | Party Id | The unique identifier for any individual or group of individuals that is of interest to the enterprise. | No | Yes |
| RECOMMENDATION | Recommend Conversion Cat Cd | Unique identifier for information concerning the linkage between recommended Offerings and the Web Page that the Offering was displayed on. Source-> Recommendation DB. | No | Yes |
| RECOMMENDATION | Recommendation Clicked Ind | Designates if the user clicked on the Recommendation. 0 - No, 1 - yes. | No | No |
| RECOMMENDATION | Recommendation Dttm | The date and time on which a Recommendation was made. | No | No |
| RECOMMENDATION | Recommendation Id | Unique identifier for each Recommendation that was made by the Recommendation engine. | Yes | No |
| RECOMMENDATION | Visit Id | The unique identifier for an instance of the VISIT entity. | No | Yes |
| REFERRAL | Referral Id | A coding method for classifying a REFERRAL. | Yes | No |
| REFERRAL | Referral Name | Name given to the referring link. Could be used to store the referring url. | No | No |
| REFERRAL | Referral Type Cd | Classifies referrals into various sub-types such as EMAIL referrals, E LOCATION referrals, etc. | No | Yes |
| REFERRAL TYPE | Referral Type Cd | Classifies referrals into various sub-types such as EMAIL referrals, E LOCATION referrals, etc. | Yes | No |
| REFERRAL TYPE | Referral Type Desc | Textual description of a referral | No | No |
| REGION | Division Id | System generated number used to identify a DIVISION. | No | Yes |
| REGION | Region Id | System generated number used to identify a REGION. | Yes | No |
| REGION | Region Name | The name of the REGION. | No | No |
| RENTAL PRODUCT | Product Id | The unique identifier for an instance of the PRODUCT entity | Yes | Yes |
| RENTAL VEHICLE | Manufacturer Org Id | The unique identifier for an instance of the PARTY entity. | No | Yes |
| RENTAL VEHICLE | Rental Vehicle Id | A sequence of digits used to identify an ASSET. | Yes | Yes |
| RENTAL VEHICLE | Vehicle Model Cd | A model code for a TRANSPORT VEHICLE entity. Example: Boeing 737-Model 200. | No | Yes |
| REQUEST TYPE | Request Type Cd | This attribute is the identifier of a type of SPECIAL REQUEST. Example: KM = Kosher Meal, VM = Vegetarian Meal, WC = Wheel Chair SL = Spanish Language Interpreter, etc. | Yes | No |
| REQUEST TYPE | Requested Type Desc | This attribute is a brief description of a type of request. Example: Kosher Meal, Vegetarian Meal, Wheel Chair, Interpreter, etc. | No | No |
| RESERVATION | Reservation Cancel Dt | The calendar day that a reservation is cancelled and no longer valid. | No | No |
| RESERVATION | Reservation Cancel Ind | A canceled reservation due to customer authorization. | No | No |
| RESERVATION | Reservation Close Dt | The calendar day that a reservation is closed and no longer valid. | No | No |
| RESERVATION | Reservation Group Ind | An identifier for a reservation that is made for a GROUP of customers. | No | No |
| RESERVATION | Reservation Status Cd | The domain of status codes used to indicate the state of an itinerary. Example: O for Open, C for Closed. etc | No | Yes |
| RESERVATION | Reservation Transaction Id | A unique identifier for this TRAVEL TRANSACTION. | Yes | Yes |
| RESERVATION ITEM | Booked Party Id | The unique identifier for an instance of the PARTY entity. | No | Yes |
| RESERVATION ITEM | Fare Basis Cd | The unique codes used to determine the basis of the Fare charged to PARTYs for the purchase of an OnD PRODUCT. | No | Yes |
| RESERVATION ITEM | Product Id | The unique identifier for an instance of the PRODUCT entity | No | Yes |
| RESERVATION ITEM | Reservation Item Type Cd | A code the identifies the type of RESERVATION ITEM | No | Yes |

APPENDIX A-continued

Attribute Definitions

| Entity Name | Attribute Name | Attribute Definition | PK | FK |
|---|---|---|---|---|
| RESERVATION ITEM | Reservation Seq Num | This attribute identifies a specific RESERVATION ITEM. | Yes | No |
| RESERVATION ITEM | Reservation Status Cd | The domain of status codes used to indicate the state of an itinerary. Example: O for Open, C for Closed. etc | No | Yes |
| RESERVATION ITEM | Reservation Transaction Id | A unique identifier for this TRAVEL TRANSACTION RESERVATION visit. | Yes | Yes |
| RESERVATION ITEM | Service Class Cd | The unique identifier of a specific SERVICE CLASS offered by a TRAVEL PROVIDER. Example: A (First Class), B (Business Class) or C (Economy Class). | No | Yes |
| RESERVATION ITEM TYPE | Reservation Item Type Desc | A textual description of the type of RESERVATION ITEM | No | No |
| RESERVATION ITEM TYPE | Reservation Item Type Cd | A code the identifies the type of RESERVATION ITEM | Yes | No |
| RESERVATION PREFERENCE | Booked Ind | Indicator that shows if a customer preference was booked as part of a RESERVATION. Example: 0 = No, 1 = Yes. | No | No |
| RESERVATION PREFERENCE | Party Id | The unique identifier for an instance of the PARTY entity. | Yes | Yes |
| RESERVATION PREFERENCE | Preference Cd | The identifier for a personal customer preference. Example: 104 - seat type preference 194 - smoking preference 345 - language preference etc | Yes | Yes |
| RESERVATION PREFERENCE | Preference Value Cd | A code that indicates the preference for this PARTY. Example: 1 = Smoking, 2 = No Smoking | Yes | Yes |
| RESERVATION PREFERENCE | Requested Ind | An indicator that shows that a customer preference was requested as part of the RESERVATION process. Example: 0 = No, 1 = Yes. | No | No |
| RESERVATION PREFERENCE | Reservation Transaction Id | A unique identifier for this TRAVEL TRANSACTION. | Yes | Yes |
| RESERVATION STATUS | Reservation Status Cd | The domain of status codes used to indicate the state of a reservation. Example: Open, Closed, Cancelled. etc | Yes | No |
| RESERVATION STATUS | Reservation Status Desc | This attribute is an explanation of the status codes used to indicate the state of a reservation. Example: Open, Closed, Cancelled | No | No |
| RESERVES ACCOUNT | GL Account Num | The unique Chart of Account code for the GL ACCOUNT. | Yes | Yes |
| RETAINED EARNING ACCOUNT | GL Account Num | The unique Chart of Account code for the GL ACCOUNT. | Yes | Yes |
| RETAINED EARNING ACCOUNT | Retained Earning Amt | The monetary amount of the net profits kept to accumulate in a business after dividends are paid. | No | No |
| RETURN ITEM | Orig Purchase Seq Num | An identifier for a specific PURCHASE ITEM entity. | No | Yes |
| RETURN ITEM | Orig Purchase Tran Id | A unique identifier for this TRAVEL TRANSACTION PURCHASE visit. | No | Yes |
| RETURN ITEM | Purchase Tran Id | A unique identifier for this TRAVEL TRANSACTION PURCHASE visit. | Yes | Yes |
| RETURN ITEM | Return Credit Amt | This attribute contains the amount credited for a specific RETURN ITEM. | No | No |
| RETURN ITEM | Return Reason Cd | The code that represents why a PARTY returns a PURCHASE ITEM. Example: 1 - Illness, 2 - Work conflict, 3 - Changed plans, etc. | No | Yes |
| RETURN ITEM | Return Seq Num | This attribute identifies a specific RETURN ITEM. | Yes | No |
| RETURN REASON | Return Reason Cd | The code that represents why a PARTY returns a PURCHASE ITEM. Example: 1 - Illness, 2 - Work conflict, 3 - Changed plans, etc. | Yes | No |
| RETURN REASON | Return Reason Desc | A textual description for the reason that a PARTY returns a PURCHASE ITEM. | No | No |
| REVENUE ACCOUNT | GL Account Num | The unique Chart of Account code for the GL ACCOUNT. | Yes | Yes |
| REVENUE ACCOUNT | Revenue Account Type Cd | The unique code assigned to the REVENUE ACCOUNT type. Types of revenue accounts include Interest Income and other revenue. | No | Yes |
| REVENUE ACCOUNT | Revenue Desc | The description of the REVENUE ACCOUNT. | No | No |
| REVENUE ACCOUNT TYPE | Revenue Account Type Cd | The unique code assigned to the REVENUE ACCOUNT type. Types of revenue accounts include Interest Income and other revenue. | Yes | No |
| REVENUE ACCOUNT TYPE | Revenue Account Type Desc | The description of the REVENUE ACCOUNT type. | No | No |

APPENDIX A-continued

Attribute Definitions

| Entity Name | Attribute Name | Attribute Definition | PK | FK |
|---|---|---|---|---|
| ROUTE | RM Analyst Associate Id | The unique identifier for an instance of the PARTY entity. The RM Analyst is responsible for managing one or more routes or markets to maximize the revenue obtained from them. | No | Yes |
| ROUTE | Route Cd | The unique code assigned to a route managed by a RM Analyst. | Yes | No |
| ROUTE | Route Group Cd | The unique code assigned to a group of routes managed by a RM Analyst. | No | Yes |
| ROUTE | Route Name | A unique name assigned to a route managed by a RM Analysts. | No | No |
| ROUTE | Route Type Cd | A unique code assigned to a route type managed by a RM Analysts (i.e. 0 - short haul, 1 - long haul). | No | Yes |
| ROUTE GROUP | Parent Group Cd | A unique code assigned to a Parent Group of routes assigned to a RM Analyst. | No | Yes |
| ROUTE GROUP | Route Group Cd | The unique code assigned to a group of routes managed by a RM Analyst. | Yes | No |
| ROUTE GROUP | Route Group Desc | A unique description assigned to a route group managed by a RM Analysts. | No | No |
| ROUTE TYPE | Route Type Cd | A unique code assigned to a route type managed by a RM Analysts (i.e. 0 - short haul, 1 - long haul). | Yes | No |
| ROUTE TYPE | Route Type Desc | A unique description assigned to a route type managed by a RM Analysts. | No | No |
| SALARY | GL Account Num | The unique Chart of Account code for the GL ACCOUNT. | Yes | Yes |
| SALARY | Internal Org Party Id | The unique identifier for an internal organization. | Yes | Yes |
| SALARY | Labor Type Cd | The unique code assigned to the labor type. (e.g. that labor performed by employees or contractors) | Yes | Yes |
| SALARY | Salary Amt | The monetary amount paid to associates as salary. | No | No |
| SALES REVENUE ACCOUNT | GL Account Num | The unique Chart of Account code for the GL ACCOUNT. | Yes | Yes |
| SALES REVENUE ACCOUNT | Sales Revenue Amt | The monetary amount of a SALES REVENUE account. | No | No |
| SCHEDULED LEG | Book End Dt | The last calendar day that the published schedule is effective for the public to book flights according to the listings. | No | No |
| SCHEDULED LEG | Book Start Dt | The first calendar day that the published schedule is effective for the public to book flights according to the listings. | No | No |
| SCHEDULED LEG | Destination Facility Id | A unique number assigned to a TRAVEL FACILITY to give it a unique identity. | Yes | Yes |
| SCHEDULED LEG | Flight Num | A unique identifier assigned to a Flight scheduled for generating revenue and utilized by the general public. | Yes | Yes |
| SCHEDULED LEG | Origin Facility Id | A unique number assigned to a TRAVEL FACILITY to give it a unique identity. | Yes | Yes |
| SCHEDULED LEG | Sched Arrive Dttm | Specific Date and Time used to help identify a SCHEDULED OnD PRODUCT projected arrival. | No | No |
| SCHEDULED LEG | Sched Depart Dttm | The scheduled departure date and time. | Yes | No |
| SCHEDULED LEG | Transport Vehicle Config Id | Identifies a specific configuration of a TRANSPORT VEHICLE. sdsdsdds | No | Yes |
| SCHEDULED LEG | Transport Vehicle Id | A sequence of digits used to identify an ASSET. | No | Yes |
| SCHEDULED SEGMENT | Product Id | The unique identifier for an instance of the PRODUCT entity | Yes | Yes |
| SCHEDULED SEGMENT | Sched Depart Dttm | The scheduled departure date and time. | Yes | No |
| SCHEDULED SEGMENT LEG | Destination Facility Id | A unique number assigned to a TRAVEL FACILITY to give it a unique identity. | Yes | Yes |
| SCHEDULED SEGMENT LEG | Flight Num | A unique identifier assigned to a Flight scheduled for generating revenue and utilized by the general public. | Yes | Yes |
| SCHEDULED SEGMENT LEG | Origin Facility Id | A unique number assigned to a TRAVEL FACILITY to give it a unique identity. | Yes | Yes |
| SCHEDULED SEGMENT LEG | Product Id | The unique identifier for an instance of the PRODUCT entity | Yes | Yes |
| SCHEDULED SEGMENT LEG | Sched Depart Dttm | The scheduled departure date and time. | Yes | Yes |
| SECURITIES ACCOUNT | GL Account Num | The unique Chart of Account code for the GL ACCOUNT. | Yes | Yes |
| SECURITIES ACCOUNT | Security Party Id | The unique identifier for an instance of the PARTY entity. | No | Yes |

APPENDIX A-continued

Attribute Definitions

| Entity Name | Attribute Name | Attribute Definition | PK | FK |
|---|---|---|---|---|
| SEGMENT BOOKING (HISTORY) | Allowed Overbook Pct | The percentage to which a travel provider is prepared to overbook capacity to take into account cancelling and noshowing passengers. | No | No |
| SEGMENT BOOKING (HISTORY) | Blocked Seat Cnt | Seats being held back (not for sale) in certain booking classes | No | No |
| SEGMENT BOOKING (HISTORY) | Booking Class Cd | The booking class code associated with this particular booking (i.e. F, Y, M, etc.). | Yes | Yes |
| SEGMENT BOOKING (HISTORY) | Days To Dept Cnt | A designated point in time across the booking history of a flight (i.e. x days before departure) at which key metrics for a flight are recorded. Usually a flight is made available for booking by the inventory system 365 days in advance. As the flight departure date nears, the metrics are recorded more frequently and they are recorded further apart during the early part of a flight's booking life. This is called a Checkpoint by some airlines | Yes | No |
| SEGMENT BOOKING (HISTORY) | Noshow Estimate Pct | An estimate of the number of booked passengers not checking in (expressed as a percentage of the total number of bookings) | No | No |
| SEGMENT BOOKING (HISTORY) | Product Id | The unique identifier for an instance of the PRODUCT entity | Yes | Yes |
| SEGMENT BOOKING (HISTORY) | Sched Depart Dttm | The scheduled departure date and time. | Yes | Yes |
| SEGMENT BOOKING (HISTORY) | Seats Allocated Cnt | The total number of actual physical seats that have been allocated to the booking class. The sum of all seat alloctions equal the total number of physical seats of the aircraft. Note: When this number is increased from one checkpoint to another, an equivalent decreased allocation must be made in another booking class. The deadweight count has been factored into this allocation. | No | No |
| SEGMENT BOOKING (HISTORY) | Seats Available Cnt DD | The number of seats available to be booked at this time. Metric = Seats Allocated * (1 + Allowed Overbooking Pct) − Seats Booked − Blocked Seat Cnt The Leg Deadweight count (at leg level) has been taken into account for this calculation. | No | No |
| SEGMENT BOOKING (HISTORY) | Seats Booked Cnt | Number of seats booked at this time. | No | No |
| SEGMENT BOOKING (HISTORY) | Seats Ticketed Cnt | Number of seats that have been ticketed at this time | No | No |
| SEGMENT BOOKING (HISTORY) | Waitlist Cnt | Number of booked passengers on waiting list for potential upgrade to this booking class. | No | No |
| SEGMENT FLOWN (SUMMARY) | Booking Class Cd | The booking class code associated with this particular booking (i.e. F, Y, M, etc.). | Yes | Yes |
| SEGMENT FLOWN (SUMMARY) | Denied Cnt DD | The total number of passengers who were denied boarding either due to operational (broken chair, etc) or commercial (overbooking, etc) or personal (drunk, etc.) reasons | No | No |
| SEGMENT FLOWN (SUMMARY) | Denied Commercial Cnt DD | The total number of passengers who were denied boarding due to commercial (overbooking, etc) reasons | No | No |
| SEGMENT FLOWN (SUMMARY) | Denied Compensation Amt DD | The compensation amount provided to passengers whose boarding was denied | No | No |
| SEGMENT FLOWN (SUMMARY) | Denied Operations Cnt DD | The total number of passengers who were denied boarding due to operational (aircraft substituted by a smaller aircraft, broken chair, etc) | No | No |
| SEGMENT FLOWN (SUMMARY) | Denied Standby Cnt | The number of standby passengers who were denied boarding These individuals did not hold a valid ticket for this flight but were standing by to see if space would become available. | No | No |
| SEGMENT FLOWN (SUMMARY) | Denied Voluntary Cnt | The number of passengers who volunteered for denied boarding | No | No |
| SEGMENT FLOWN (SUMMARY) | Denied Voluntary Comp Cnt | The number of passengers who volunteered for denied boarding and received compensation. | No | No |
| SEGMENT FLOWN (SUMMARY) | Denied With Comp Cnt | The number of passengers who were denied boarding and received compensation | No | No |
| SEGMENT FLOWN (SUMMARY) | Go Show Cnt | The number of passengers who showed up just before flight departure with no previous booking and purchased tickets for this specific SEGMENT | No | No |

APPENDIX A-continued

Attribute Definitions

| Entity Name | Attribute Name | Attribute Definition | PK | FK |
|---|---|---|---|---|
| SEGMENT FLOWN (SUMMARY) | No Show Cnt | The number of passengers with confirmed booking who did not show up for a given flight | No | No |
| SEGMENT FLOWN (SUMMARY) | Offload Cnt | The number of passengers who were off loaded to a different flight | No | No |
| SEGMENT FLOWN (SUMMARY) | Product Id | The unique identifier for an instance of the PRODUCT entity | Yes | Yes |
| SEGMENT FLOWN (SUMMARY) | Sched Depart Dttm | The scheduled departure date and time. | Yes | Yes |
| SEGMENT FLOWN (SUMMARY) | Seats Booked Cnt | Number of seats booked. | No | No |
| SEGMENT FLOWN (SUMMARY) | Seats Flown Cnt | Number of seats that actually contained a flown passenger | No | No |
| SEGMENT FLOWN (SUMMARY) | Seats Ticketed Cnt | Number of seats that have been ticketed. | No | No |
| SEGMENT LEG | Critical Leg Ind | Indicates the LEG(s) most likely to be sold out, thus closing out an entire (potentially high profit) SEGMENT, making it unavailable for additional passengers. Sometimes called a "leg index" | No | No |
| SEGMENT LEG | Destination Facility Id | A unique number assigned to a TRAVEL FACILITY to give it a unique identity. | Yes | Yes |
| SEGMENT LEG | Flight Num | A unique identifier assigned to a Flight scheduled for generating revenue and utilized by the general public. | Yes | Yes |
| SEGMENT LEG | Origin Facility Id | A unique number assigned to a TRAVEL FACILITY to give it a unique identity. | Yes | Yes |
| SEGMENT LEG | Product Id | The unique identifier for an instance of the PRODUCT entity | Yes | Yes |
| SEGMENT MEMBER | Party Id | The unique identifier for an instance of the PARTY entity. | Yes | Yes |
| SEGMENT MEMBER | Segmentation Id | The unique identifier for an instance of the SEGMENT entity. | Yes | Yes |
| SEGMENTATION | Model Id | The unique identifier for an instance of the ANALYTICAL MODEL entity. | No | Yes |
| SEGMENTATION | Model Run Id | An identifier (or sequential number) that uniquely describes this particular run of the ANALYTICAL MODEL. | No | Yes |
| SEGMENTATION | Segmentation Desc | Text that describes an instance of the SEGMENTATION entity. | No | No |
| SEGMENTATION | Segmentation Dttm | The date and time on which a SEGMENTATION was generated. | No | No |
| SEGMENTATION | Segmentation Group Id | The unique identifier for an instance of the SEGMENT GROUP entity. | No | Yes |
| SEGMENTATION | Segmentation Id | The unique identifier for an instance of the SEGMENTATION entity. | Yes | No |
| SEGMENTATION COMPONENT | Demog Cd | The unique identifier for an instance of the DEMOGRAPHIC entity. | No | Yes |
| SEGMENTATION COMPONENT | Demog Value Cd | A code referencing a specific DEMOGRAPHIC VALUE for a given demographic code. | No | Yes |
| SEGMENTATION COMPONENT | Segmentation Component Id | Identifies a specific component within a SEGMENTATION COMPONENT. | Yes | No |
| SEGMENTATION COMPONENT | Segmentation Id | The unique identifier for an instance of the SEGMENT entity. | Yes | Yes |
| SEGMENTATION GROUP | Segmentation Group Desc | Textual description for the SEGMENTATION GROUP. Example: "Top Spenders by decile" | No | No |
| SEGMENTATION GROUP | Segmentation Group Id | The unique identifier for an instance of the SEGMENTATION GROUP entity. | Yes | No |
| SERVICE CLASS | Service Class Cd | The unique identifier of a specific CLASS OF SERVICE offered by a TRAVEL PROVIDER. Example: A (First Class), B (Business Class) or C (Economy Class). | Yes | No |
| SERVICE CLASS | Service Class Desc | A brief explanation of a specific CLASS OF SERVICE offered by a TRAVEL PROVIDER. Example: First Class, Business Class or Economy Class. | No | No |
| SERVICE CLASS CONFIGURATION | Cabin Qty | The number of cabins within the specified CLASS OF SERVICE. Used for cruise ships. | No | No |
| SERVICE CLASS CONFIGURATION | Seat Qty | The number of seats within the specified CLASS OF SERVICE. Used for aircrafts, busses, etc. | No | No |
| SERVICE CLASS CONFIGURATION | Service Class Cd | The unique identifier of a specific SERVICE CLASS offered by a TRAVEL PROVIDER. Example: A (First Class), B (Business Class) or C (Economy Class). | Yes | Yes |
| SERVICE CLASS CONFIGURATION | Transport Vehicle Config Id | Identifies a specific configuration of a TRANSPORT VEHICLE | Yes | Yes |
| SET OF BOOKS | Set Of Books Cd | The unique identifier for the SET OF BOOKS. | Yes | No |

APPENDIX A-continued

Attribute Definitions

| Entity Name | Attribute Name | Attribute Definition | PK | FK |
|---|---|---|---|---|
| SET OF BOOKS | Set Of Books Desc | The description of the SET OF BOOKS. | No | No |
| SET OF BOOKS | Set Of Books Name | The name assigned to the SET OF BOOKS. | No | No |
| SHIP PORT | Facility Id | A unique number assigned to a TRAVEL FACILITY to give it a unique identity. | Yes | Yes |
| SHORT TERM DEBT ACCOUNT | GL Account Num | The unique Chart of Account code for the GL ACCOUNT. | Yes | Yes |
| SIC | SIC Cd | A code for the Standard Industry Classification which is a method for classifying businesses by the type of business they are active in, such as services or manufacturing. | Yes | No |
| SIC | SIC Desc | A textual description of the SIC code. | No | No |
| SPECIAL REQUEST | Request Id | A unique identifier associated with a SPECIAL REQUEST entity. | Yes | No |
| SPECIAL REQUEST | Request Type Cd | This attribute is the identifier of a type of SPECIAL REQUEST. Example: KM = Kosher Meal, VM = Vegetarian Meal, WC = Wheel Chair SL = Spanish Language Interpreter, etc. | Yes | Yes |
| SPECIAL REQUEST | Reservation Seq Num | This attribute identifies a specific RESERVATION ITEM. | No | Yes |
| SPECIAL REQUEST | Reservation Transaction Id | A unique identifier for this TRAVEL TRANSACTION RESERVATION visit. | No | Yes |
| SPECIAL REQUEST | Satisfied Ind | The request was met to the customer's satisfaction. | No | No |
| SPECIAL REQUEST | Special Request Charge Amt | Any charge associated with a special request. Examples : Taking a pet along with the passenger | No | No |
| SPECIAL REQUEST | Trip Event Num | A unique number assigned to an EN ROUTE EVENT entity. | No | Yes |
| TELEPHONE ADDRESS | Telephone Address Id | A number used to uniquely identify a TELEPHONE. | Yes | Yes |
| TELEPHONE ADDRESS | Telephone Area Cd | A set of digits in a telephone number that represent the area code. The number of digits may vary by country. | No | No |
| TELEPHONE ADDRESS | Telephone Country Cd | A set of digits in a telephone number that represent the country. The number of digits vary by country. | No | No |
| TELEPHONE ADDRESS | Telephone Exchange Num | A set of digits in a telephone number that represent a central office exchange. The number of digits may vary by country. | No | No |
| TELEPHONE ADDRESS | Telephone Extension Num | The extension for the phone. This may be null if no extension applies to this number. | No | No |
| TELEPHONE ADDRESS | Telephone Home Ind | Indicator for whether the Telephone is a Home number. | No | No |
| TELEPHONE ADDRESS | Telephone Line Num | A set of digits in a telephone number that represent the line number from the central office. The number of digits may vary by country. | No | No |
| TELEPHONE ADDRESS | Telephone Wireline Ind | Indicator for whether the Telephone is a Wireline number. | No | No |
| TELEPHONE COMM TYPE XREF | Telephone Address Id | A number used to uniquely identify a TELEPHONE. | Yes | Yes |
| TELEPHONE COMM TYPE XREF | Telephone Comm Type Cd | A code used to uniquely identify the TELEPHONE COMMUNICATION TYPE. | Yes | Yes |
| TELEPHONE COMMUNICATION TYPE | Telephone Comm Type Cd | Code used to uniquely identify the types of TELEPHONE COMMUNICATIONS. | Yes | No |
| TELEPHONE COMMUNICATION TYPE | Telephone Comm Type Desc | A textual description for a TELEPHONE COMMUNICATION TYPE. | No | No |
| TELEPHONE COMMUNICATION TYPE | Telephone Comm Type Name | The name assigned to a TELEPHONE COMMUNICATION TYPE. | No | No |
| TERRITORY | Country Cd | The unique code for an instance of the COUNTRY entity. | No | Yes |
| TERRITORY | Territory Cd | The unique code for an instance of the TERRITORY entity. | Yes | No |
| TERRITORY | Territory Name | The name for an instance of the TERRITORY entity. | No | No |
| TICKET | Commission Amt | The amount of compensation received by the Travel Agency for booking a flight for a PARTY. | No | No |
| TICKET | Delivery Cd | The domain of delivery types for a ticket. Example: Mailed, E-Ticketed, Customer Pick-Up, etc | No | No |
| TICKET | Purchase Tran Id | A unique identifier for this TRAVEL TRANSACTION. | No | Yes |

APPENDIX A-continued

Attribute Definitions

| Entity Name | Attribute Name | Attribute Definition | PK | FK |
|---|---|---|---|---|
| TICKET | Ticket Desc | A textual description of a specific instance of a TICKET. | No | No |
| TICKET | Ticket Format Cd | Identifies the kind or type of ticket. It is used distinguish between ATB2, E-Ticket, Manual types. Example: A = ATB2, E = E-Ticket, M = Manual Ticket, etc. | No | Yes |
| TICKET | Ticket Id | A unique identifier for a TICKET. | Yes | No |
| TICKET | Ticket Issue Dt | The calendar day that a ticket was issued, either as an E-Ticket, or printed on airline paper stock. | No | No |
| TICKET | Ticket Type Cd | An identifier for a TICKET subtype. Example: 1 - BUS TICKET, 2 - AIRLINE TICKET, 3 - RAILROAD TICKET, etc. | No | Yes |
| TICKET AWARD | Award Certificate Id | The identifier of a certificate awarded to a customer account. | Yes | Yes |
| TICKET AWARD | Ticket Id | A unique identifier for a TICKET. | No | Yes |
| TICKET AWARD CERTIFICATE | Payment Line Num | This attribute associates a specific PAYMENT with a specific PURCHASE ITEM. | Yes | Yes |
| TICKET AWARD CERTIFICATE | Purchase Tran Id | A unique identifier for this TRAVEL TRANSACTION. | Yes | Yes |
| TICKET FORMAT | Ticket Format Cd | Uniquely identifies the kind or type of ticket. | Yes | No |
| TICKET FORMAT | Ticket Format Desc | A textual description of the kind or type of Ticket. It is used distinguish between ATB2, E-Ticket, and Manual types. Example: A = ATB2, E = E-Ticket, M =Manual, etc | No | No |
| TICKET PAYMENT | Applied Purchase Amt | This attribute is the monetary amount presented by the purchaser to compensate or partially compensate for a PURCHASE. | No | No |
| TICKET PAYMENT | Payment Line Num | This attribute associates a specific PAYMENT with a specific PURCHASE ITEM. | Yes | Yes |
| TICKET PAYMENT | Purchase Tran Id | A unique identifier for this TRAVEL TRANSACTION. | Yes | Yes |
| TICKET PAYMENT | Ticket Id | A unique identifier for a TICKET. | Yes | Yes |
| TICKET TYPE | Ticket Type Cd | An identifier for a TICKET subtype. Example: 1 - BUS TICKET, 2 - AIRLINE TICKET, 3 - RAILROAD TICKET, etc. | Yes | No |
| TICKET TYPE | Ticket Type Desc | A textual description of a TICKET subtype. Example: BUS TICKET, CRUISE LINE TICKET, AIRLINE TICKET, etc. | No | No |
| TIME ZONE | Time Zone Cd | The code for a time zone. Examples: 0 = Greenwich Mean Time (GMT), 7 = GMT-0700, 10 =GMT-1000, etc. | Yes | No |
| TIME ZONE | Time Zone Desc | A description of the code. Examples: Greenwich Mean Time; GMT-0700; GMT-1000, etc. | No | No |
| TRANSFER EARNINGS | Event Dttm | The date and time that a loyalty event occurred | Yes | Yes |
| TRANSFER EARNINGS | Loyalty Account Id | A sequence of digits used to identify an account established for a PARTY for the purpose of rendering bills and receiving payments. May also be used to make company offerings or track the use of a LOYALTY ACCOUNT. | Yes | Yes |
| TRANSPORT VEHICLE | Transport Vehicle Config Id | Identifies a specific configuration of a TRANSPORT VEHICLE | No | Yes |
| TRANSPORT VEHICLE | Transport Vehicle Id | A sequence of digits used to identify an ASSET. | Yes | Yes |
| TRANSPORT VEHICLE | Transport Vehicle Type Cd | | No | Yes |
| TRANSPORT VEHICLE CONFIG | Manufacturer Org Id | The unique identifier for an instance of the PARTY entity. | No | Yes |
| TRANSPORT VEHICLE CONFIG | Transport Vehicle Config Id | Identifies a specific configuration of a TRANSPORT VEHICLE | Yes | No |
| TRANSPORT VEHICLE CONFIG | Vehicle Model Cd | A model code for a TRANSPORT VEHICLE entity. Example: Boeing 737-Model 200. | No | Yes |
| TRANSPORT VEHICLE TYPE | Transport Vehicle Type Cd | A code the identifies the type of TRANSPORT VEHICLE | Yes | No |
| TRANSPORT VEHICLE TYPE | Transport Vehicle Type Desc | A textual description of the type of TRANSPORT VEHICLE Example: Cruise Ship, Aircraft, etc. | No | No |
| TRANSPORTED PASSENGER | Booking Class Cd | The booking class code associated with this particular booking (i.e. F, Y, M, etc.). | No | Yes |
| TRANSPORTED PASSENGER | Product Id | The unique identifier for an instance of the PRODUCT entity | No | Yes |
| TRANSPORTED PASSENGER | Sched Depart Dttm | The scheduled departure date and time. | No | Yes |
| TRANSPORTED PASSENGER | Ticket Id | A unique identifier for a TICKET. | Yes | Yes |

APPENDIX A-continued

Attribute Definitions

| Entity Name | Attribute Name | Attribute Definition | PK | FK |
|---|---|---|---|---|
| TRANSPORTED PASSENGER | Travel Coupon Id | The ordering of a series of one or more TRAVEL COUPONs associated with a single Ticket or Conjunctive Ticket series. | Yes | Yes |
| TRAVEL AGENCY | IATA Cd | The International Air Transportation Association number assigned to a specified travel agency. | No | No |
| TRAVEL AGENCY | Travel Agency Id | The unique identifier for an organization. | Yes | Yes |
| TRAVEL AGENCY | Travel Agency Type Cd | A code that identifies the type of TRAVEL AGENCY. Example: 1 - Consolidators/Reseller, 2 - Wholesalers, 3 - Tour Brokers, etc. | No | No |
| TRAVEL COUPON | Product Id | The unique identifier for an instance of the PRODUCT entity | No | Yes |
| TRAVEL COUPON | Sched Depart Dttm | The scheduled departure date and time. | No | Yes |
| TRAVEL COUPON | Ticket Id | A unique identifier for a TICKET. | Yes | Yes |
| TRAVEL COUPON | Travel Coupon Fare Amt | The amount paid by a certain PARTY in the referenced TRAVEL COUPON. | No | No |
| TRAVEL COUPON | Travel Coupon Id | The ordering of a series of one or more TRAVEL COUPONs associated with a single Ticket or Conjunctive Ticket series. | Yes | No |
| TRAVEL FACILITY | Address Id | A number used to uniquely identify an ADDRESS. | No | Yes |
| TRAVEL FACILITY | Facility Id | A unique number assigned to a TRAVEL FACILITY to give it a unique identity. | Yes | No |
| TRAVEL FACILITY | Facility Type Cd | A code used to identify the type of TRAVEL FACILITY. Example: 1 = BUSDEPOT, 2 = RAIL STATION, 3 = AIRPORT, etc. | No | Yes |
| TRAVEL FACILITY GROUP | Travel Facility Group Cd | Uniquely identifies an occurrence of the TRAVEL FACILITY GROUP | Yes | No |
| TRAVEL FACILITY GROUP | Travel Facility Group Desc | A textual description for a grouping of TRAVEL FACILITIES used for Marketing or Analytical purposes. Example: "Chicago Market", "Caribbean Ports", etc. | No | No |
| TRAVEL FACILITY GROUP XREF | Facility Id | A unique number assigned to a TRAVEL FACILITY to give it a unique identity. | Yes | Yes |
| TRAVEL FACILITY GROUP XREF | Travel Facility Group Cd | Uniquely identifies an occurrence of the TRAVEL FACILITY GROUP | Yes | Yes |
| TRAVEL FACILITY LOCATION | Facility Id | A unique number assigned to a TRAVEL FACILITY to give it a unique identity. | No | Yes |
| TRAVEL FACILITY LOCATION | Facility Ticket Off Id | System generated number used to identify a LOCATION. | Yes | Yes |
| TRAVEL FACILITY LOCATION | Location Org Id | The unique identifier for an organization. | Yes | Yes |
| TRAVEL FACILITY TYPE | Facility Type Desc | A textual description of a TRAVEL FACILITY type. Example: Bus Depot, Rail Station, Airport, etc. | No | No |
| TRAVEL FACILITY TYPE | Facility Type Cd | A code used to identify the type of TRAVEL FACILITY. Example: 1 = BUSDEPOT, 2 = RAIL STATION, 3 = AIRPORT, etc. | Yes | No |
| TRAVEL OFFER | Offer Id | The unique identifier for an instance of the OFFER entity. | Yes | Yes |
| TRAVEL OFFER XREF | Offer Id | The unique identifier for an instance of the OFFER entity. | Yes | Yes |
| TRAVEL OFFER XREF | Offer Line Num | Differentiates different LINES appearing on an ITEM OFFER XREF. | Yes | No |
| TRAVEL OFFER XREF | Product Id | The unique identifier for an instance of the PRODUCT entity | No | Yes |
| TRAVEL PASS | Payment Line Num | This attribute associates a specific PAYMENT with a specific PURCHASE ITEM. | Yes | Yes |
| TRAVEL PASS | Purchase Tran Id | A unique identifier for this TRAVEL TRANSACTION. | Yes | Yes |
| TRAVEL PASS | Travel Pass Id | The identifier of a special travel account such as a Universal Airline Travel Pass (UATP) card where pre-purchased miles are deducted for receiving a Ticket | No | No |
| TRAVEL PROVIDER | Travel Provider Id | The unique identifier for an organization. | Yes | Yes |
| TRAVEL PROVIDER | Travel Provider Type Cd | A code that identifies a sub type of the TRAVEL PROVIDER entity. Example: 1 - Passenger Travel Provider, 2 - Car Rental Provider, 3 - Lodging Provider, etc. | No | Yes |
| TRAVEL PROVIDER TYPE | Travel Provider Type Cd | A code that identifies a sub type of the TRAVEL PROVIDER entity. Example: 1 - Passenger Travel Provider, 2 - Car Rental Provider, 3 - Lodging Provider, etc. | Yes | No |

APPENDIX A-continued

Attribute Definitions

| Entity Name | Attribute Name | Attribute Definition | PK | FK |
|---|---|---|---|---|
| TRAVEL PROVIDER TYPE | Travel Provider Type Desc | A textual description of a sub type of the TRAVEL PROVIDER entity. Example: Passenger Travel Provider, Car Rental Provider, Lodging Provider, etc. | No | No |
| TRAVEL TRANSACTION | Contract Id | This attribute is the identifier for a contract agreement. | No | Yes |
| TRAVEL TRANSACTION | Offer Id | The unique identifier for an instance of the OFFER entity. The PROMOTIONAL OFFER that generated or prompted this TRANSACTION | No | Yes |
| TRAVEL TRANSACTION | Page View Id | | No | Yes |
| TRAVEL TRANSACTION | PNR Create Dt | The creation date of a PNR. This is needed to uniquely identify a PNR, since PNR numbers are re-used over time. | No | Yes |
| TRAVEL TRANSACTION | PNR Num | Uniquely identifies a specific occurrence of a PNR. | No | Yes |
| TRAVEL TRANSACTION | Transaction Dttm | The date and time of a specific TRAVEL TRANSACTION. | No | No |
| TRAVEL TRANSACTION | Travel Transaction Id | A unique identifier for this TRAVEL TRANSACTION. | Yes | No |
| TRAVEL TRANSACTION | Travel Transaction Type Cd | A code the identifies the type of TRAVEL TRANSACTION | No | Yes |
| TRAVEL TRANSACTION | Trip Id | | No | Yes |
| TRAVEL TRANSACTION | Visit Id | The unique identifier for an instance of the VISIT entity. | No | Yes |
| TRAVEL TRANSACTION TYPE | Travel Transaction Type Cd | A code the identifies the type of TRAVEL TRANSACTION | Yes | No |
| TRAVEL TRANSACTION TYPE | Travel Transaction Type Desc | A textual description of the type of TRAVEL TRANSACTION Example: Browse, Reservation, Purchase. | No | No |
| TRAVEL TRANSACTION XREF | Original Transaction Id | A unique identifier for a TRAVEL TRANSACTION. | Yes | Yes |
| TRAVEL TRANSACTION XREF | Reason Cd | This code uniquely identifies the reason why two (or more) TRAVEL TRANSACTIONs are related. | No | Yes |
| TRAVEL TRANSACTION XREF | Related Transaction Id | A unique identifier for a related TRAVEL TRANSACTION. | Yes | Yes |
| TREASURY STOCK ACCOUNT | GL Account Num | The unique Chart of Account code for the GL ACCOUNT. | Yes | Yes |
| TREASURY STOCK ACCOUNT | Treasury Stock Amt | The monetary amount of a TREASURY STOCK account. | No | No |
| TREASURY STOCK ACCOUNT | Treasury Stock Qty | The number of TREASURY STOCK shares of a CORPORATION. | No | No |
| TRIP | Business Ind | Indicates if the TRIP is for business (or leisure) purpose. | No | No |
| TRIP | Trip Desc | Textual description of trip for Marketing Purposes | No | No |
| TRIP | Trip Id | Identifies a unique occurrence of a TRIP. | Yes | No |
| TRIP EVENT | Associate Id | The unique identifier for an instance of the PARTY entity. | No | Yes |
| TRIP EVENT | Ticket Id | A unique identifier for a TICKET. | No | Yes |
| TRIP EVENT | Travel Coupon Id | The ordering of a series of one or more TRAVEL COUPONs associated with a single Ticket or Conjunctive Ticket series. | No | Yes |
| TRIP EVENT | Trip Event Dttm | A specific date and time associated with an event represented by a TRIP EVENT entity. | No | No |
| TRIP EVENT | Trip Event Num | A unique number assigned to a TRIP EVENT entity. | Yes | No |
| TRIP EVENT | Trip Event Type Cd | An identifier for an TRIP EVENT subtype. | No | Yes |
| TRIP EVENT | Trip Id | Identifies a unique occurence of a TRIP. | No | Yes |
| TRIP EVENT TYPE | Trip Event Type Cd | An identifier for a TRIP EVENT subtype. | Yes | No |
| TRIP EVENT TYPE | Trip Event Type Desc | A textual description of a TRIP EVENT subtype. | No | No |
| TURN BACK | Destination Facility Id | A unique number assigned to a TRAVEL FACILITY to give it a unique identity. | Yes | Yes |
| TURN BACK | Flight Num | A unique identifier assigned to a Flight scheduled for generating revenue and utilized by the general public. | Yes | Yes |
| TURN BACK | Incident Type Cd | Defines code assigned to every single incident that may occur. Examples: 1 = Flight delayed, 2 = Flight cancelled, 3 = Flight diverted, etc. | Yes | Yes |
| TURN BACK | Origin Facility Id | A unique number assigned to a TRAVEL FACILITY to give it a unique identity. | Yes | Yes |
| TURN BACK | Sched Depart Dttm | The scheduled departure date and time. | Yes | Yes |
| TV AD | Ad Id | The unique identifier for an instance of the AD entity. | Yes | Yes |

APPENDIX A-continued

Attribute Definitions

| Entity Name | Attribute Name | Attribute Definition | PK | FK |
|---|---|---|---|---|
| UPGRADE AWARD | Award Certificate Id | The identifier of a certificate awarded to a customer account. | Yes | Yes |
| UPGRADE AWARD | Ticket Id | A unique identifier for a TICKET. | No | Yes |
| UPGRADE AWARD | Travel Coupon Id | The ordering of a series of one or more TRAVEL COUPONs associated with a single Ticket or Conjunctive Ticket series. | No | Yes |
| VEHICLE MODEL | Manufacturer Org Id | The unique identifier for an instance of the PARTY entity. | Yes | Yes |
| VEHICLE MODEL | Vehicle Model Cd | A model code for a TRANSPORT VEHICLE entity. Example: Boeing 737-Model 200. | Yes | No |
| VEHICLE MODEL | Vehicle Model Desc | A textual description of the model of a TRANSPORT VEHICLE. Example: Widebody, Jumbo Jet, Cruise Liner, etc. | No | No |
| VISIT | End Date Dttm | The date and time that a VISIT ended. For WEB VISITs this can be whenever x minutes without any activity have elapsed. | No | No |
| VISIT | Location Id | System generated number used to identify a LOCATION. | No | Yes |
| VISIT | Location Org Id | The unique identifier for an organization. | No | Yes |
| VISIT | Start Date Dttm | The date and time on which a VISIT started. | No | No |
| VISIT | Visit Id | The unique identifier for an instance of the VISIT entity. | Yes | No |
| VISIT | Visiting Persona Id | Uniquely identifies an instance of a PERSONA. | No | Yes |
| VISITOR DOMAIN | Domain Root Cd | A unique identifier for the root name of the domain server. Examples: 11 - .com, 12 - .net, 13 - .org. Source-> Web Log | No | Yes |
| VISITOR DOMAIN | Visitor Domain Id | Number used to identify the internet domain of a customer computer used for accessing the organization's web site | Yes | No |
| VISITOR DOMAIN | Visitor Domain Name | The domain name of the visitor minus the domain root. Examples: aol; daytonoh.ncr; swsrv04.attbi | No | No |
| VOTING STOCK ACCOUNT | GL Account Num | The unique Chart of Account code for the GL ACCOUNT. | Yes | Yes |
| WAGES | GL Account Num | The unique Chart of Account code for the GL ACCOUNT. | Yes | Yes |
| WAGES | Internal Org Party Id | The unique identifier for an internal organization. | Yes | Yes |
| WAGES | Labor Type Cd | The unique code assigned to the labor type. (e.g. that labor performed by employees or contractors) | Yes | Yes |
| WAGES | Wage Amt | The monetary amount paid to associates as wages. | No | No |
| WEB AD | Web Ad Id | The unique identifier for an instance of the AD entity. | Yes | Yes |
| WEB AD | Web Ad Type Cd | Identifies the type of WEB AD. | No | Yes |
| WEB AD PLACEMENT | Address Id | A number used to uniquely identify an ADDRESS. | No | Yes |
| WEB AD PLACEMENT | Channel Cd | The unique identifier for an instance of the CHANNEL entity. | No | Yes |
| WEB AD PLACEMENT | Contract Id | This attribute is the identifier for a contract agreement. | No | Yes |
| WEB AD PLACEMENT | E Location Id | Unique value that identifies this particular E LOCATION. | No | Yes |
| WEB AD PLACEMENT | Web Ad Id | The unique identifier for an instance of the AD entity. | No | Yes |
| WEB AD PLACEMENT | Web Ad Placement Id | The unique identifier that identifies a particular instance of WEB AD PLACEMENT. | Yes | No |
| WEB AD PLACEMENT | Web Ad Plcmnt Desc | This is a text description of where the Advertisement is placed. | No | No |
| WEB AD PLACEMENT | Web Ad Plcmnt End Dttm | The date and time the web ad was removed from service. This attribute may be placed in a supertype (AD PLACEMENT) if same exists. | No | No |
| WEB AD PLACEMENT | Web Ad Plcmnt Referral Fee Amt | The cost to the Enterprise of having a WEB AD displayed on a referral Web site. This could be a combination of the number of impressions and the number of click throughs. | No | No |
| WEB AD PLACEMENT | Web Ad Plcmnt Start Dttm | The date and time the web ad was placed in service. This attribute may be placed in a supertype (AD PLACEMENT) if same exists. | No | No |
| WEB AD PLACEMENT | Web Ad Plcmnt URI Stem Txt | The URI Stem of the Advertisement, this does not include the query string. | No | No |

APPENDIX A-continued

Attribute Definitions

| Entity Name | Attribute Name | Attribute Definition | PK | FK |
|---|---|---|---|---|
| WEB AD PLACEMENT | Web Ad Plcmnt URI Txt | The URI of the Advertisement, whether that Advertisement be a banner displayed on a publisher's page or a web page interposed between a link of interest to a visitor and the target of that link. | No | No |
| WEB AD PLACEMENT | Web Ad Position Cd | A code used for identifying the placement of an ad on a web page | No | Yes |
| WEB AD PLACEMENT | Web Ad Provider Cost Amt | The cost to the Ad Service Provider for placing this advertisement. | No | No |
| WEB AD PLACEMENT | Web Ad Tracking Cd | An unique code that can be imbedded in a web link, to aid in tracking links that are clicked on. | No | No |
| WEB AD PLACEMENT STATS | Web Ad Placement Id | The unique identifier that identifies a particular instance of WEB AD PLACEMENT. | Yes | Yes |
| WEB AD PLACEMENT STATS | Web Ad Stats Clickthrus Qty | The number of times a WEB AD was clicked on to take a customer to the Enterprise's web site. | No | No |
| WEB AD PLACEMENT STATS | Web Ad Stats Dttm | The date and time that the instance of WEB AD PLACEMENT STATS was created | Yes | No |
| WEB AD PLACEMENT STATS | Web Ad Stats Impressions Qty | The number of times a WEB AD is displayed by a referral web site between the start and end dates | No | No |
| WEB AD PLACEMENT STATS | Web Ad Stats Provider Party Id | The unique identifier for an instance of the PARTY entity. | No | Yes |
| WEB AD POSITION | Web Ad Position Cd | A code used for identifying the placement of an ad on a web page | Yes | No |
| WEB AD POSITION | Web Ad Position Desc | Description of the ad placement such as top right hand corner, bottom left corner, center right, etc | No | No |
| WEB AD TYPE | Web Ad Type Cd | Identifies the type of WEB AD. | Yes | No |
| WEB AD TYPE | Web Ad Type Desc | A textual description of the type of WEB AD | No | No |
| WEB BANNER AD | Web Ad Id | The unique identifier for an instance of the AD entity. | Yes | Yes |
| WEB GROUP PUBLISHER | Publisher Party Id | The unique identifier for any individual or group of individuals that is of interest to the enterprise. | Yes | Yes |
| WEB GROUP PUBLISHER | Web Site Group Cd | A unique code for a group of ad publisher sites. | Yes | Yes |
| WEB IDENTIFICATION METHOD | Web Identification Method Cd | A unique identifier for the means by which a Party is identified for a Web Visit. There are three possible values: IP address, cookie, and registered. | Yes | No |
| WEB IDENTIFICATION METHOD | Web Identification Method Desc | A textual description for a Web Identification Method. Examples: IP Address, Cookie, Registered. | No | No |
| WEB PAGE | Channel Cd | The unique identifier for an instance of the CHANNEL entity. | No | Yes |
| WEB PAGE | IP Address Id | Unique identifier for Internet Protocol Addresses. Example: 5534113 | No | Yes |
| WEB PAGE | Location Org Id | The unique identifier for an organization. | No | Yes |
| WEB PAGE | Web Page Desc | Textual description of this particular WEB PAGE. It can describe the design principles or other characteristics of the web page. Example: "This is a web page consisting of 3 frames with a horizontal menu bar at the top and a navigation menu bar at the left and a main are in the middle . . ." | No | No |
| WEB PAGE | Web Page Document Path Desc | The document path is an absolute or relative pathname to the requested document. For example: /solutions/fs-ldm.html | No | No |
| WEB PAGE | Web Page Domain Name | The name of the Web Page Internet domain as registered as resolved from the IP address. Example for web: www.ncr. Text description of the IP address. This can be accomplished using a DNS (Domain Name Server) look up and some additional translation. For example - 123.34.451.006 (ip address) - www.someportal.com (text) - Someportal inc (text description) | No | No |
| WEB PAGE | Web Page Generation Type Cd | A coding scheme for identifying the method involved in generating a page instance | No | Yes |
| WEB PAGE | Web Page Id | The unique identifier of a particular WEB PAGE instance. | Yes | No |
| WEB PAGE | Web Page Name | The name given to this particular WEB PAGE. For dynamically generated web pages, the web page name may be an intelligent concatenation of information about the script being executed with look up values for (some of) the parameters | No | No |

APPENDIX A-continued

Attribute Definitions

| Entity Name | Attribute Name | Attribute Definition | PK | FK |
|---|---|---|---|---|
| | | involved. Example: "macys.com home page", "Men's - accessories - DKNY Leather Backpack - product display", "Check out page", etc. | | |
| WEB PAGE | Web Page Scheme Desc | The scheme specifies a communication protocol such as "http://" | No | No |
| WEB PAGE | Web Page Type Cd | Code that identifies a particular type of WEB PAGE | No | Yes |
| WEB PAGE | Web Page URI Stem Desc | A portion of the URI that is after the first slash and not part of the query. In the below example it is "/sorters/portfolio_sorter.asp" Example: http://www.ncr.com/sorters/portfolio_sorter.asp | No | No |
| WEB PAGE | Web Page URL Txt | The uniform resource locator associated with a WEB PAGE. | No | No |
| WEB PAGE | Web Site Id | A unique identifier for the web site. | No | Yes |
| WEB PAGE | Web Site Nav Id | The unique identifier for an instance of the WEB SITE NAVIGATION entity. | No | Yes |
| WEB PAGE | Web Site Section Id | A unique identifier for a WEB SITE SECTION | No | Yes |
| WEB PAGE | Web Store Id | System generated number used to identify a LOCATION. | No | Yes |
| WEB PAGE CONTEXT | Context Cd | Unique identifier for the business intent represented by Web Pages. | Yes | Yes |
| WEB PAGE CONTEXT | Web Page Context Rank Num | A number used to prioritize each Context on a Web Page that has multiple functions (primary function, secondary function, etc). | No | No |
| WEB PAGE CONTEXT | Web Page Id | The unique identifier of a particular WEB PAGE instance. | Yes | Yes |
| WEB PAGE GENERATION TYPE | Web Page Generation Type Cd | A coding scheme for identifying the method involved in generating a page instance | Yes | No |
| WEB PAGE GENERATION TYPE | Web Page Generation Type Desc | A textual description of the page instance type code | No | No |
| WEB PAGE MM COMPONENT | Link To Web Page Id | The unique identifier of a particular WEB PAGE instance. | No | Yes |
| WEB PAGE MM COMPONENT | Multimedia Component Id | System generated number for identifying a component. If source database has a unique identifier, the same can be substituted here. | Yes | Yes |
| WEB PAGE MM COMPONENT | Web Page Component End Dttm | The date and time when this component ended being used on this web page for this region. | No | No |
| WEB PAGE MM COMPONENT | Web Page Component Note Txt | Additional information recorded about the specific web page component. | No | No |
| WEB PAGE MM COMPONENT | Web Page Component Start Dttm | The date and time when this component started being used on this web page for this region. | Yes | No |
| WEB PAGE MM COMPONENT | Web Page Component Type Cd | Specifies how the component is being used on this specific page for marketing purposes. | No | No |
| WEB PAGE MM COMPONENT | Web Page Id | The unique identifier of a particular WEB PAGE instance. | Yes | Yes |
| WEB PAGE MM COMPONENT | Web Page Region Cd | The identifier for the web page region. | Yes | Yes |
| WEB PAGE PAGE REGION | Web Page Id | The unique identifier of a particular WEB PAGE instance. | Yes | Yes |
| WEB PAGE PAGE REGION | Web Page Region Cd | The identifier for the web page region. | Yes | Yes |
| WEB PAGE REGION | Web Page Region Cd | The identifier for the web page region. | Yes | No |
| WEB PAGE REGION | Web Page Region Desc | A description of the web page region for this web page. | No | No |
| WEB PAGE TYPE | Web Page Type Cd | Code that identifies a particular type of WEB PAGE | Yes | No |
| WEB PAGE TYPE | Web Page Type Desc | Textual description of this particular type of WEB PAGE | No | No |
| WEB SECTION TYPE | Web Section Type Cd | A unique code for a SECTION TYPE | Yes | No |
| WEB SECTION TYPE | Web Section Type Desc | A description of the SECTION TYPE | No | No |
| WEB SERVER | Geography Address Id | A number used to uniquely identify a GEOGRAPHY ADDRESS. | No | Yes |
| WEB SERVER | Web Server Capacity Meas | The number of http transactions that can be handled by the Web Server per given unit of time without a significant degradation in its performance. | No | No |
| WEB SERVER | Web Server Domain Name | The name of the Web Servers Internet domain as registered as resolved from the IP address. Example for web: www.ncr. Text description of the IP address. This can be accomplished using a DNS (Domain Name Server) look up and some additional translation. For example - | No | No |

APPENDIX A-continued

Attribute Definitions

| Entity Name | Attribute Name | Attribute Definition | PK | FK |
|---|---|---|---|---|
| | | 123.34.451.006 (ip address) - www.someportal.com (text) - Someportal inc (text description) | | |
| WEB SERVER | Web Server Hit Cnt | The number of hits this Web Server has received. | No | No |
| WEB SERVER | Web Server Id | A classification number for identifying web server | Yes | No |
| WEB SERVER | Web Server IP Address Id | Unique identifier for Internet Protocol Addresses. Example: 5534113 | No | Yes |
| WEB SERVER | Web Server Name | Name of the web server | No | No |
| WEB SERVER | Web Server Port Num | The port utilized by the Web Server. Weblog-> Webserver_port | No | No |
| WEB SERVER | Web Server Secure Ind | Designates if a Web Server is secure or non-secure. | No | No |
| WEB SERVER | Web Server Software Cd | Uniquely identifies the software being utilized by the Web Server. Examples: 11 = Apache, 12 = IIS. Source-> Web Server | No | Yes |
| WEB SERVER | Web Server Time Zone Cd | The code for a time zone. Examples: 0 = Greenwich Mean Time (GMT), 7 = GMT-0700, 10 = GMT-1000, etc. | No | Yes |
| WEB SERVER ACTIVITY | Web Server Client Delay Tm | The delay between the time the client receives a data frame and requests for the next data frame, listed in Msec. | No | No |
| WEB SERVER ACTIVITY | Web Server Delay Tm | The Web Server delay in handling a http/https request, listed in Msec. | No | No |
| WEB SERVER ACTIVITY | Web Server End Dttm | The date and time on which operational metrics for a Web Server ceases to be recorded. | No | No |
| WEB SERVER ACTIVITY | Web Server Error Cd | A classification method to identify a web server error | No | Yes |
| WEB SERVER ACTIVITY | Web Server Hits Per Minute Cnt | Number of requests processed by the Web Server in a minute. | No | No |
| WEB SERVER ACTIVITY | Web Server Id | A classification number for identifying web server | Yes | Yes |
| WEB SERVER ACTIVITY | Web Server Network Delay Tm | The delay experienced by the client due to network traffic, listed in Msec. | No | No |
| WEB SERVER ACTIVITY | Web Server Non Secure Load Qty | The number of non-secured HTTP requests handled by the Web Server. | No | No |
| WEB SERVER ACTIVITY | Web Server Refused Request Qty | Number of requests that could not be handled by the Web Server. | No | No |
| WEB SERVER ACTIVITY | Web Server Request Aborted Qty | Number of requests that were cancelled by the Web Server. | No | No |
| WEB SERVER ACTIVITY | Web Server Roundtrip Tm | Time between a client request to the instance when the client receives the server response, listed in Msec. | No | No |
| WEB SERVER ACTIVITY | Web Server Secure Load Qty | The number of secured HTTP requests handled by the Web Server. | No | No |
| WEB SERVER ACTIVITY | Web Server Start Dttm | The date and time on which operational metrics for a Web Server begins to be recorded. | Yes | No |
| WEB SERVER ERROR | Web Server Error Cd | A classification method to identify a web server error | Yes | No |
| WEB SERVER ERROR | Web Server Error Desc | Description of the error code | No | No |
| WEB SERVER SOFTWARE | Web Server Software Cd | Uniquely identifies the software being utilized by the Web Server. Examples: 11 = Apache, 12 = IIS. Source-> Web Server | Yes | No |
| WEB SERVER SOFTWARE | Web Server Software Name | The name assigned to Web Server Software. Examples: Apache, IIS. | No | No |
| WEB SITE | Channel Cd | The unique identifier for an instance of the CHANNEL entity. | No | Yes |
| WEB SITE | Geography Address Id | A number used to uniquely identify a GEOGRAPHY ADDRESS. | No | Yes |
| WEB SITE | Party Id | The unique identifier for an instance of the PARTY entity. It identifies the owner of the web site. | No | Yes |
| WEB SITE | Web Site Content Cd | A unique code for a WEB SITE CONTENT TYPE | No | Yes |
| WEB SITE | Web Site Id | A unique identifier for the web site. | Yes | No |
| WEB SITE | Web Site Name | The name of the web site. | No | No |
| WEB SITE | Web Site URI Desc | The Uniform Resource Indicator which is a generic category that includes both URLs (Uniform Resource Locator) and URN (Uniform Resource Name). Example of URI would be: "http://www.ncr.com" | No | No |
| WEB SITE CONTENT TYPE | Web Site Content Cd | A unique code for a WEB SITE CONTENT TYPE | Yes | No |

APPENDIX A-continued

Attribute Definitions

| Entity Name | Attribute Name | Attribute Definition | PK | FK |
| --- | --- | --- | --- | --- |
| WEB SITE CONTENT TYPE | Web Site Content Desc | A description of the WEB SITE CONTENT TYPE | No | No |
| WEB SITE CRAWLER (HISTORY) | Crawler Id | Unique identifier assigned to a specific program search engine that takes information from a Web Site. | Yes | Yes |
| WEB SITE CRAWLER (HISTORY) | Web Site Crawler Dttm | The date on which a Web Site is accessed by a Crawler. | Yes | No |
| WEB SITE CRAWLER (HISTORY) | Web Site Id | A unique identifier for the web site. | Yes | Yes |
| WEB SITE GROUP | Web Site Group Cd | A unique code for a group of ad publisher sites. | Yes | No |
| WEB SITE GROUP | Web Site Group Desc | A description of the group of sites such as Computer and Technology. | No | No |
| WEB SITE GROUP XREF | Web Site Group Cd | A unique code for a group of ad publisher sites. | Yes | Yes |
| WEB SITE GROUP XREF | Web Site Id | A unique identifier for the web site. | Yes | Yes |
| WEB SITE NAVIGATION | Nav Level Id | The unique identifier for an instance of the NAVIGATION LEVEL entity. | No | Yes |
| WEB SITE NAVIGATION | Parent Web Site Nav Id | Allows for a multi-level hierarchical structure. | No | Yes |
| WEB SITE NAVIGATION | Web Site Nav Desc | Textual description of the single nodes web of the web site hierarchical navigation structure. The structure may be very similar to the web page hierarchy of the web site. Example: "Mens department", "Mens accessories category", etc. | No | No |
| WEB SITE NAVIGATION | Web Site Nav Id | The unique identifier for an instance of the WEB SITE NAVIGATION entity. | Yes | No |
| WEB SITE SECTION | Channel Cd | The unique identifier for an instance of the CHANNEL entity. | No | Yes |
| WEB SITE SECTION | Web Section Type Cd | A unique code for a SECTION TYPE | No | Yes |
| WEB SITE SECTION | Web Site Id | A unique identifier for the web site. | No | Yes |
| WEB SITE SECTION | Web Site Section Desc | A description of the WEB SITE SECTION | No | No |
| WEB SITE SECTION | Web Site Section Id | A unique identifier for a WEB SITE SECTION | Yes | No |
| WEB SITE SERVER | Web Server Id | A classification number for identifying web server | Yes | Yes |
| WEB SITE SERVER | Web Site Id | A unique identifier for the web site. | Yes | Yes |
| WEB STORE | Location Org Id | The unique identifier for an organization. | Yes | Yes |
| WEB STORE | Web Store Id | System generated number used to identify a LOCATION. | Yes | Yes |
| WEB TEXT AD | Web Ad Id | The unique identifier for an instance of the AD entity. | Yes | Yes |
| WEB VISIT | Authenticated User Desc | The authenticated user ID passed in a request made via HTTP SSL. If the request was for a password-protected document then this is the user ID used in the request. | No | No |
| WEB VISIT | Browser Id | The unique identifier for this specific web browser installed on this specific piece of hardware. Probably a cookie ID. | No | Yes |
| WEB VISIT | Connect Speed Meas | The actual throughput of the actual internet connection. Can be expressed in baud, or K/s, etc. Can be an average in the case of a variable speed connection. | No | No |
| WEB VISIT | Electronic Address Id | A number used to uniquely identify an ELECTRONIC ADDRESS. If the visit was referred by an email address as opposed to another web site then this contains the email address. | No | Yes |
| WEB VISIT | Email Client Application Cd | A unique identifier for the email application used by a client to read and send email, such as Microsoft Outlook Express 5.0. Source-> Email application log file. | No | Yes |
| WEB VISIT | Ending Web Page Id | The unique identifier of a particular WEB PAGE instance - the last page visited. | No | Yes |
| WEB VISIT | Exit Method Cd | Unique identifier for the methods by which a user may leave a Web Site. This would have the value 'timeout' for most Web Visits but other values could be defined for explicit actions that result in a user exiting the Web Site such as clicking a logout button. Source-> Information generated during web log transformation or from Operational DB. | No | Yes |
| WEB VISIT | IP Address Id | | No | Yes |
| WEB VISIT | Persona Id | Uniquely identifies an instance of a PERSONA. | No | Yes |
| WEB VISIT | Referral Id | A coding method for classifying a REFERRAL. | No | Yes |

APPENDIX A-continued

Attribute Definitions

| Entity Name | Attribute Name | Attribute Definition | PK | FK |
|---|---|---|---|---|
| WEB VISIT | Screen Colors Num | The maximum number of colors capable of being displayed by the Web Visitor's system, expressed either in number of colors (16, 16.7M), or bit size (8, 24). | No | No |
| WEB VISIT | Screen Resolution Cd | The unique code representing the horizontal and vertical pixel display area of the Web Visitor's monitor. | No | No |
| WEB VISIT | Starting Web Page Id | The unique identifier of a particular WEB PAGE instance - the first page visited. | No | Yes |
| WEB VISIT | Visit Duration Tm DD | The amount of time for this Web Visit. Can be derived by calculating the delta of the start and end times for the first and last events (from PAGE VIEW) that make up the Visit. | No | No |
| WEB VISIT | Visit Id | The unique identifier for an instance of the VISIT entity. | Yes | Yes |
| WEB VISIT | Visitor Domain Id | Number used to identify the internet domain of a customer computer used for accessing the organization's web site | No | Yes |
| WEB VISIT | Visitor Search String Txt | The visitors search string | No | No |
| WEB VISIT | Web Identification Method Cd | A unique identifier for the means by which a Party is identified for a Web Visit. There are three possible values: IP address, cookie, and registered. | No | Yes |
| WEB VISIT | Web Visit Authorizing User Id | The user who authorized this Web Visit. weblog->authuser staging->visit->authuser. | No | No |
| WEB VISIT | Web Visit Clicks Cnt DD | The number of clicks that occurred during this Web Visit. Derived from PAGE VIEW Page View Clicks Cnt attribute. weblog-> max(clickid) Web Visit->visit->(session_id). | No | No |
| WEB VISIT | Web Visit Ref Web Site Id | A unique identifier for the web site. | No | Yes |
| WEB VISIT | Web Visit Type Cd | A code that classifies the result derived from a WEB VISIT. Possible values include Browse, 1st Purchase, Repeat Purchase, etc. | No | Yes |
| WEB VISIT | Web Visit Web Site Id | A unique identifier for the web site. | No | Yes |
| WEB VISIT FILE | File Download Id | A unique identifier for Files that were downloaded from a Web Site. For example, an MP3 site would keep records on what songs were downloaded. | Yes | Yes |
| WEB VISIT FILE | Visit Id | The unique identifier for an instance of the VISIT entity. For industry models that have an EVENT, this attribute represents the event for a WEB VISIT. | Yes | Yes |
| WEB VISIT TYPE | Web Visit Type Cd | A code that classifies the result derived from a WEB VISIT. Possible values include Browse, 1st Purchase, Repeat Purchase, etc. | Yes | No |
| WEB VISIT TYPE | Web Visit Type Desc | A description of the type of web visit. | No | No |
| WEEK DAY | Week Day Desc | This attribute is a name that designates a day of the week. Example: Monday, Tuesday, Wednesday Thursday, Friday, Saturday, Sunday | No | No |
| WEEK DAY | Week Day Id | This attribute is a system or user assigned number that designated a day of the week. Example: 1 = Monday, 2 = Tuesday 3 = Wednesday, 4 = Thursday, 5 = Friday, 6 = Saturday, 7 = Sunday | Yes | No |
| WORLD REGION | World Region Cd | A unique number used to identify a WORLD REGION. | Yes | No |
| WORLD REGION | World Region Name | The name assigned to the world REGION. | No | No |
| YIELD LEVEL | Yield Level Cd | A unique code that identifies the yield level (i.e. 0 - Low, 1 - Medium, 2 - High). | Yes | No |
| YIELD LEVEL | Yield Level Desc | A textual description of the yield level. | No | No |

What is claimed is:

1. A method for managing inventory, pricing and demand forecasting for an airline travel provider, comprising the steps of:

establishing a relational database within a computer data storage device for storing and organizing information for an airline travel provider, said information being organized within said database in accordance with a logical data model comprising a plurality of entities and relationships defining the manner in which said information is stored and organized within said database, said logical data model including:

a first subject area comprising a plurality of entities and relationships defining the manner in which revenue information for said airline travel provider is stored and organized within said relational database;

a second subject area comprising a plurality of entities and relationships defining the manner in which product and service information for said airline travel provider is stored and organized within said relational database, said product and service information including flight information and flight segment information; and a third subject area comprising a plurality of entities and relationships defining the manner in which customer information for said airline travel provider is stored and organized within said relational database, said customer information including Passenger Name Record (PNR) data;

populating said relational database with revenue, product and service, and customer information for said airline travel provider;

analyzing, by an application server computer executing a revenue management application, Passenger Name Record (PNR), booking, ticketing, inventory, schedule, authorization adjustment and flown/ticket lift data contained within said database; and identifying, by an application server computer executing a revenue management application, fraudulent and improper booking and ticketing activity.

* * * * *